United States Patent
Huang

(10) Patent No.: US 12,441,766 B2
(45) Date of Patent: Oct. 14, 2025

(54) ARTIFICIAL RECOMBINANT PROTEIN FOR IMPROVING PERFORMANCE OF ACTIVE PROTEIN OR POLYPEPTIDE AND USE THEREOF

(71) Applicant: ZHEJIANG DOER BIOLOGICS CORPORATION, Zhejiang (CN)

(72) Inventor: Yanshan Huang, Zhejiang (CN)

(73) Assignee: ZHEJIANG DOER BIOLOGICS CORPORATION, Zhejiang (CN)

( * ) Notice: Subject to any disclaimer, the term of this patent is extended or adjusted under 35 U.S.C. 154(b) by 1196 days.

(21) Appl. No.: 17/290,755

(22) PCT Filed: Sep. 17, 2019

(86) PCT No.: PCT/CN2019/106092
§ 371 (c)(1),
(2) Date: Dec. 29, 2021

(87) PCT Pub. No.: WO2020/093789
PCT Pub. Date: May 14, 2020

(65) Prior Publication Data
US 2022/0119448 A1    Apr. 21, 2022

(30) Foreign Application Priority Data
Nov. 7, 2018  (CN) .......................... 201811319700.1

(51) Int. Cl.
| | |
|---|---|
| *C07K 7/08* | (2006.01) |
| *A61K 38/00* | (2006.01) |
| *A61K 47/64* | (2017.01) |
| *C07K 14/495* | (2006.01) |
| *C07K 14/605* | (2006.01) |
| *C07K 14/61* | (2006.01) |
| *C12N 9/78* | (2006.01) |

(52) U.S. Cl.
CPC .............. *C07K 7/08* (2013.01); *A61K 47/64* (2017.08); *C07K 14/495* (2013.01); *C07K 14/605* (2013.01); *C07K 14/61* (2013.01); *C12N 9/78* (2013.01); *C12Y 305/03001* (2013.01); *A61K 38/00* (2013.01); *C07K 2319/31* (2013.01)

(58) Field of Classification Search
CPC ...... C07K 7/08; C07K 14/495; C07K 14/605; C07K 14/61; C07K 2319/31; A61K 47/64; A61K 38/00; C12N 9/78; C12Y 305/03001
See application file for complete search history.

(56) References Cited

FOREIGN PATENT DOCUMENTS

| CN | 10161668 S | 12/2009 |
|---|---|---|
| CN | 101970678 A | 2/2011 |
| CN | 102164949 A | 8/2011 |
| CN | 104302408 A | 1/2015 |

OTHER PUBLICATIONS

Breibeck and Skerra, "The polypeptide biophysics of proline/alanine-rich sequences (PAS): Recombinant biopolymers with PEG-like properties." Biopolymers, 2018;109:e23069. (Year: 2017).*
Lu et al., "Ionic polypeptides iwht unusual helical stability." Nature Communications. 2:206. (Year: 2011).*
Otagiri, Albumin in Medicine: Pathological and Clinical Application. Springer Publishing. ISBN 978-981-10-2116-9 (Year: 2016).*
"HSA CFSSP," CFSSP: Chou and Fasman Secondary Structure Prediction Server, downloaded from the internet Oct. 24, 2024 < https://www.biogem.org/tool/chou-fasman/index.php> (Year: 2008).*
Mikhailov, O., "Gelatin as It is: History and Modernity." International Journal of Molecular Sciences, 24, 3583: 1-31. (Year: 2023).*

* cited by examiner

*Primary Examiner* — Suzanne M Noakes
(74) *Attorney, Agent, or Firm* — IPRTOP LLC

(57) ABSTRACT

The present disclosure provides an artificial recombinant protein for improving the performance of an active protein or polypeptide and the use thereof. The present disclosure provides a polypeptide unit (U) or a polypeptide complex unit (PU) that is very effective for prolonging the biological activity and half-life of a protein or polypeptide or improving the in-vivo and in-vitro properties of a protein or polypeptide, the polypeptide unit (U) being mainly composed of proline (P), alanine (A) and glutamic acid (E). The present disclosure also provides a biologically active fusion protein comprising the polypeptide unit (U) or the polypeptide complex unit (PU) and an active protein or polypeptide connected thereto.

19 Claims, 7 Drawing Sheets
Specification includes a Sequence Listing.

SEQUENCE LISTING

```
<160> NUMBER OF SEQ ID NOS: 131

<210> SEQ ID NO 1
<211> LENGTH: 33
<212> TYPE: PRT
<213> ORGANISM: Artificial Sequence
<220> FEATURE:
<223> OTHER INFORMATION: Glucagon-like Peptide-2 analog GLP-2G

<400> SEQUENCE: 1

His Gly Asp Gly Ser Phe Ser Asp Glu Met Asn Thr Ile Leu Asp Asn
1               5                   10                  15

Leu Ala Ala Arg Asp Phe Ile Asn Trp Leu Ile Gln Thr Lys Ile Thr
            20                  25                  30

Asp

<210> SEQ ID NO 2
<211> LENGTH: 29
<212> TYPE: PRT
<213> ORGANISM: Artificial Sequence
<220> FEATURE:
<223> OTHER INFORMATION: Glucagon

<400> SEQUENCE: 2
```

His Ser Gln Gly Thr Phe Thr Ser Asp Tyr Ser Lys Tyr Leu Asp Ser
1               5                   10                  15

Arg Arg Ala Gln Asp Phe Val Gln Trp Leu Met Asn Thr
            20                  25

<210> SEQ ID NO 3
<211> LENGTH: 126
<212> TYPE: PRT
<213> ORGANISM: Artificial Sequence
<220> FEATURE:
<223> OTHER INFORMATION: ARVEGF

<400> SEQUENCE: 3

Gly Ser Asp Leu Asp Lys Lys Leu Leu Glu Ala Ala Arg Ala Gly Gln
1               5                   10                  15

Asp Asp Glu Val Arg Ile Leu Met Ala Asn Gly Ala Asp Val Asn Ala
            20                  25                  30

Arg Asp Ser Thr Gly Trp Thr Pro Leu His Leu Ala Ala Pro Trp Gly
        35                  40                  45

His Pro Glu Ile Val Glu Val Leu Leu Lys Asn Gly Ala Asp Val Asn
    50                  55                  60

Ala Ala Asp Phe Gln Gly Trp Thr Pro Leu His Leu Ala Ala Ala Val
65                  70                  75                  80

Gly His Leu Glu Ile Val Glu Val Leu Leu Lys Tyr Gly Ala Asp Val
                85                  90                  95

Asn Ala Gln Asp Lys Phe Gly Lys Thr Ala Phe Asp Ile Ser Ile Asp
            100                 105                 110

Asn Gly Asn Glu Asp Leu Ala Glu Ile Leu Gln Lys Ala Ala
        115                 120                 125

<210> SEQ ID NO 4
<211> LENGTH: 133
<212> TYPE: PRT
<213> ORGANISM: Artificial Sequence
<220> FEATURE:
<223> OTHER INFORMATION: IL-2

<400> SEQUENCE: 4

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
            20                  25                  30

Asn Pro Lys Leu Thr Arg Met Leu Thr Phe Lys Phe Tyr Met Pro Lys
        35                  40                  45

Lys Ala Thr Glu Leu Lys His Leu Gln Cys Leu Glu Glu Glu Leu Lys
    50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
    130

-continued

```
<210> SEQ ID NO 5
<211> LENGTH: 191
<212> TYPE: PRT
<213> ORGANISM: Artificial Sequence
<220> FEATURE:
<223> OTHER INFORMATION: hGH

<400> SEQUENCE: 5

Phe Pro Thr Ile Pro Leu Ser Arg Leu Phe Asp Asn Ala Met Leu Arg
1               5                   10                  15

Ala His Arg Leu His Gln Leu Ala Phe Asp Thr Tyr Gln Glu Phe Glu
            20                  25                  30

Glu Ala Tyr Ile Pro Lys Glu Gln Lys Tyr Ser Phe Leu Gln Asn Pro
        35                  40                  45

Gln Thr Ser Leu Cys Phe Ser Glu Ser Ile Pro Thr Pro Ser Asn Arg
    50                  55                  60

Glu Glu Thr Gln Gln Lys Ser Asn Leu Glu Leu Leu Arg Ile Ser Leu
65                  70                  75                  80

Leu Leu Ile Gln Ser Trp Leu Glu Pro Val Gln Phe Leu Arg Ser Val
                85                  90                  95

Phe Ala Asn Ser Leu Val Tyr Gly Ala Ser Asp Ser Asn Val Tyr Asp
            100                 105                 110

Leu Leu Lys Asp Leu Glu Glu Gly Ile Gln Thr Leu Met Gly Arg Leu
        115                 120                 125

Glu Asp Gly Ser Pro Arg Thr Gly Gln Ile Phe Lys Gln Thr Tyr Ser
    130                 135                 140

Lys Phe Asp Thr Asn Ser His Asn Asp Asp Ala Leu Leu Lys Asn Tyr
145                 150                 155                 160

Gly Leu Leu Tyr Cys Phe Arg Lys Asp Met Asp Lys Val Glu Thr Phe
                165                 170                 175

Leu Arg Ile Val Gln Cys Arg Ser Val Glu Gly Ser Cys Gly Phe
            180                 185                 190

<210> SEQ ID NO 6
<211> LENGTH: 114
<212> TYPE: PRT
<213> ORGANISM: Artificial Sequence
<220> FEATURE:
<223> OTHER INFORMATION: IL-15

<400> SEQUENCE: 6

Asn Trp Val Asn Val Ile Ser Asp Leu Lys Lys Ile Glu Asp Leu Ile
1               5                   10                  15

Gln Ser Met His Ile Asp Ala Thr Leu Tyr Thr Glu Ser Asp Val His
            20                  25                  30

Pro Ser Cys Lys Val Thr Ala Met Lys Cys Phe Leu Leu Glu Leu Gln
        35                  40                  45

Val Ile Ser Leu Glu Ser Gly Asp Ala Ser Ile His Asp Thr Val Glu
    50                  55                  60

Asn Leu Ile Ile Leu Ala Asn Asn Ser Leu Ser Ser Asn Gly Asn Val
65                  70                  75                  80

Thr Glu Ser Gly Cys Lys Glu Cys Glu Glu Leu Glu Glu Lys Asn Ile
                85                  90                  95

Lys Glu Phe Leu Gln Ser Phe Val His Ile Val Gln Met Phe Ile Asn
            100                 105                 110

Thr Ser
```

-continued

```
<210> SEQ ID NO 7
<211> LENGTH: 321
<212> TYPE: PRT
<213> ORGANISM: Artificial Sequence
<220> FEATURE:
<223> OTHER INFORMATION: Arginase 1

<400> SEQUENCE: 7

Ser Ala Lys Ser Arg Thr Ile Gly Ile Ile Gly Ala Pro Phe Ser Lys
1               5                   10                  15

Gly Gln Pro Arg Gly Gly Val Glu Glu Gly Pro Thr Val Leu Arg Lys
            20                  25                  30

Ala Gly Leu Leu Glu Lys Leu Lys Glu Gln Glu Cys Asp Val Lys Asp
        35                  40                  45

Tyr Gly Asp Leu Pro Phe Ala Asp Ile Pro Asn Asp Ser Pro Phe Gln
    50                  55                  60

Ile Val Lys Asn Pro Arg Ser Val Gly Lys Ala Ser Glu Gln Leu Ala
65                  70                  75                  80

Gly Lys Val Ala Glu Val Lys Lys Asn Gly Arg Ile Ser Leu Val Leu
                85                  90                  95

Gly Gly Asp His Ser Leu Ala Ile Gly Ser Ile Ser Gly His Ala Arg
            100                 105                 110

Val His Pro Asp Leu Gly Val Ile Trp Val Asp Ala His Thr Asp Ile
        115                 120                 125

Asn Thr Pro Leu Thr Thr Thr Ser Gly Asn Leu His Gly Gln Pro Val
    130                 135                 140

Ser Phe Leu Leu Lys Glu Leu Lys Gly Lys Ile Pro Asp Val Pro Gly
145                 150                 155                 160

Phe Ser Trp Val Thr Pro Cys Ile Ser Ala Lys Asp Ile Val Tyr Ile
                165                 170                 175

Gly Leu Arg Asp Val Asp Pro Gly Glu His Tyr Ile Leu Lys Thr Leu
            180                 185                 190

Gly Ile Lys Tyr Phe Ser Met Thr Glu Val Asp Arg Leu Gly Ile Gly
        195                 200                 205

Lys Val Met Glu Glu Thr Leu Ser Tyr Leu Leu Gly Arg Lys Lys Arg
    210                 215                 220

Pro Ile His Leu Ser Phe Asp Val Asp Gly Leu Asp Pro Ser Phe Thr
225                 230                 235                 240

Pro Ala Thr Gly Thr Pro Val Val Gly Gly Leu Thr Tyr Arg Glu Gly
                245                 250                 255

Leu Tyr Ile Thr Glu Glu Ile Tyr Lys Thr Gly Leu Leu Ser Gly Leu
            260                 265                 270

Asp Ile Met Glu Val Asn Pro Ser Leu Gly Lys Thr Pro Glu Glu Val
        275                 280                 285

Thr Arg Thr Val Asn Thr Ala Val Ala Ile Thr Leu Ala Cys Phe Gly
    290                 295                 300

Leu Ala Arg Glu Gly Asn His Lys Pro Ile Asp Tyr Leu Asn Pro Pro
305                 310                 315                 320

Lys

<210> SEQ ID NO 8
<211> LENGTH: 216
<212> TYPE: PRT
<213> ORGANISM: Artificial Sequence
<220> FEATURE:
<223> OTHER INFORMATION: FGF19
```

-continued

<400> SEQUENCE: 8

Met Arg Ser Gly Cys Val Val His Val Trp Ile Leu Ala Gly Leu
1               5                   10                  15

Trp Leu Ala Val Ala Gly Arg Pro Leu Ala Phe Ser Asp Ala Gly Pro
                20                  25                  30

His Val His Tyr Gly Trp Gly Asp Pro Ile Arg Leu Arg His Leu Tyr
            35                  40                  45

Thr Ser Gly Pro His Gly Leu Ser Ser Cys Phe Leu Arg Ile Arg Ala
        50                  55                  60

Asp Gly Val Val Asp Cys Ala Arg Gly Gln Ser Ala His Ser Leu Leu
65                  70                  75                  80

Glu Ile Lys Ala Val Ala Leu Arg Thr Val Ala Ile Lys Gly Val His
                85                  90                  95

Ser Val Arg Tyr Leu Cys Met Gly Ala Asp Gly Lys Met Gln Gly Leu
            100                 105                 110

Leu Gln Tyr Ser Glu Glu Asp Cys Ala Phe Glu Glu Glu Ile Arg Pro
        115                 120                 125

Asp Gly Tyr Asn Val Tyr Arg Ser Glu Lys His Arg Leu Pro Val Ser
    130                 135                 140

Leu Ser Ser Ala Lys Gln Arg Gln Leu Tyr Lys Asn Arg Gly Phe Leu
145                 150                 155                 160

Pro Leu Ser His Phe Leu Pro Met Leu Pro Met Val Pro Glu Glu Pro
                165                 170                 175

Glu Asp Leu Arg Gly His Leu Glu Ser Asp Met Phe Ser Ser Pro Leu
            180                 185                 190

Glu Thr Asp Ser Met Asp Pro Phe Gly Leu Val Thr Gly Leu Glu Ala
        195                 200                 205

Val Arg Ser Pro Ser Phe Glu Lys
    210                 215

<210> SEQ ID NO 9
<211> LENGTH: 174
<212> TYPE: PRT
<213> ORGANISM: Artificial Sequence
<220> FEATURE:
<223> OTHER INFORMATION: G-CSF

<400> SEQUENCE: 9

Ala Pro Thr Tyr Arg Ala Ser Ser Leu Pro Gln Ser Phe Leu Leu Lys
1               5                   10                  15

Ser Leu Glu Gln Val Arg Lys Ile Gln Gly Asp Gly Ala Ala Leu Gln
                20                  25                  30

Glu Lys Leu Cys Ala Thr Tyr Lys Leu Cys His Pro Glu Glu Leu Val
            35                  40                  45

Leu Leu Gly His Ser Leu Gly Ile Pro Trp Ala Pro Leu Ser Ser Cys
        50                  55                  60

Pro Ser Gln Ala Leu Gln Leu Ala Gly Cys Leu Ser Gln Leu His Ser
65                  70                  75                  80

Gly Leu Phe Leu Tyr Gln Gly Leu Leu Gln Ala Leu Glu Gly Ile Ser
                85                  90                  95

Pro Glu Leu Gly Pro Thr Leu Asp Thr Leu Gln Leu Asp Val Ala Asp
            100                 105                 110

Phe Ala Thr Thr Ile Trp Gln Gln Met Glu Glu Leu Gly Met Ala Pro
        115                 120                 125

Ala Leu Gln Pro Thr Gln Gly Ala Met Pro Ala Phe Ala Ser Ala Phe

```
                    130                 135                 140
Gln Arg Arg Ala Gly Gly Val Leu Val Ala Ser His Leu Gln Ser Phe
145                 150                 155                 160

Leu Glu Val Ser Tyr Arg Val Leu Arg His Leu Ala Gln Pro
                165                 170

<210> SEQ ID NO 10
<211> LENGTH: 165
<212> TYPE: PRT
<213> ORGANISM: Artificial Sequence
<220> FEATURE:
<223> OTHER INFORMATION: EPO

<400> SEQUENCE: 10

Ala Pro Pro Arg Leu Ile Cys Asp Ser Arg Val Leu Glu Arg Tyr Leu
1               5                   10                  15

Leu Glu Ala Lys Glu Ala Glu Asn Ile Thr Thr Gly Cys Ala Glu His
                20                  25                  30

Cys Ser Leu Asn Glu Asn Ile Thr Val Pro Asp Thr Lys Val Asn Phe
            35                  40                  45

Tyr Ala Trp Lys Arg Met Glu Val Gly Gln Gln Ala Val Glu Val Trp
50                  55                  60

Gln Gly Leu Ala Leu Leu Ser Glu Ala Val Leu Arg Gly Gln Ala Leu
65                  70                  75                  80

Leu Val Asn Ser Ser Gln Pro Trp Glu Pro Leu Gln Leu His Val Asp
                85                  90                  95

Lys Ala Val Ser Gly Leu Arg Ser Leu Thr Thr Leu Leu Arg Ala Leu
            100                 105                 110

Gly Ala Gln Glu Ala Ile Ser Pro Pro Asp Ala Ala Ser Ala Ala Pro
        115                 120                 125

Leu Arg Thr Ile Thr Ala Asp Thr Phe Arg Lys Leu Phe Arg Val Tyr
130                 135                 140

Ser Asn Phe Leu Arg Gly Lys Leu Lys Leu Tyr Thr Gly Glu Ala Cys
145                 150                 155                 160

Arg Thr Gly Asp Arg
                165

<210> SEQ ID NO 11
<211> LENGTH: 39
<212> TYPE: PRT
<213> ORGANISM: Artificial Sequence
<220> FEATURE:
<223> OTHER INFORMATION: Exendin-4

<400> SEQUENCE: 11

His Gly Glu Gly Thr Phe Thr Ser Asp Leu Ser Lys Gln Met Glu Glu
1               5                   10                  15

Glu Ala Val Arg Leu Phe Ile Glu Trp Leu Lys Asn Gly Gly Pro Ser
                20                  25                  30

Ser Gly Ala Pro Pro Pro Ser
        35

<210> SEQ ID NO 12
<211> LENGTH: 184
<212> TYPE: PRT
<213> ORGANISM: Artificial Sequence
<220> FEATURE:
<223> OTHER INFORMATION: IL-6

<400> SEQUENCE: 12
```

-continued

Pro Val Pro Gly Glu Asp Ser Lys Asp Val Ala Ala Pro His Arg
1               5                   10                  15

Gln Pro Leu Thr Ser Ser Glu Arg Ile Asp Lys Gln Ile Arg Tyr Ile
            20                  25                  30

Leu Asp Gly Ile Ser Ala Leu Arg Lys Glu Thr Cys Asn Lys Ser Asn
            35                  40                  45

Met Cys Glu Ser Ser Lys Glu Ala Leu Ala Glu Asn Asn Leu Asn Leu
        50                  55                  60

Pro Lys Met Ala Glu Lys Asp Gly Cys Phe Gln Ser Gly Phe Asn Glu
65                  70                  75                  80

Glu Thr Cys Leu Val Lys Ile Ile Thr Gly Leu Leu Glu Phe Glu Val
                85                  90                  95

Tyr Leu Glu Tyr Leu Gln Asn Arg Phe Glu Ser Ser Glu Glu Gln Ala
                100                 105                 110

Arg Ala Val Gln Met Ser Thr Lys Val Leu Ile Gln Phe Leu Gln Lys
            115                 120                 125

Lys Ala Lys Asn Leu Asp Ala Ile Thr Thr Pro Asp Pro Thr Thr Asn
130                 135                 140

Ala Ser Leu Leu Thr Lys Leu Gln Ala Gln Asn Gln Trp Leu Gln Asp
145                 150                 155                 160

Met Thr Thr His Leu Ile Leu Arg Ser Phe Lys Glu Phe Leu Gln Ser
                165                 170                 175

Ser Leu Arg Ala Leu Arg Gln Met
                180

<210> SEQ ID NO 13
<211> LENGTH: 31
<212> TYPE: PRT
<213> ORGANISM: Artificial Sequence
<220> FEATURE:
<223> OTHER INFORMATION: GLP-1 analog

<400> SEQUENCE: 13

His Gly Glu Gly Thr Phe Thr Ser Asp Val Ser Ser Tyr Leu Glu Glu
1               5                   10                  15

Gln Ala Ala Lys Glu Phe Ile Ala Trp Leu Val Lys Gly Gly Gly
            20                  25                  30

<210> SEQ ID NO 14
<211> LENGTH: 151
<212> TYPE: PRT
<213> ORGANISM: Artificial Sequence
<220> FEATURE:
<223> OTHER INFORMATION: M-CSF

<400> SEQUENCE: 14

Val Ser Glu Tyr Cys Ser His Met Ile Gly Ser Gly His Leu Gln Ser
1               5                   10                  15

Leu Gln Arg Leu Ile Asp Ser Gln Met Glu Thr Ser Cys Gln Ile Thr
            20                  25                  30

Phe Glu Phe Val Asp Gln Glu Gln Leu Lys Asp Pro Val Cys Tyr Leu
            35                  40                  45

Lys Lys Ala Phe Leu Leu Val Gln Asp Ile Met Glu Asp Thr Met Arg
        50                  55                  60

Phe Arg Asp Asn Thr Pro Asn Ala Ile Ala Ile Val Gln Leu Gln Glu
65                  70                  75                  80

Leu Ser Leu Arg Leu Lys Ser Cys Phe Thr Lys Asp Tyr Glu Glu His

```
                85                  90                  95

Asp Lys Ala Cys Val Arg Thr Phe Tyr Glu Thr Pro Leu Gln Leu Leu
            100                 105                 110

Glu Lys Val Lys Asn Val Phe Asn Glu Thr Lys Asn Leu Leu Asp Lys
            115                 120                 125

Asp Trp Asn Ile Phe Ser Lys Asn Cys Asn Asn Ser Phe Ala Glu Cys
        130                 135                 140

Ser Ser Gln Asp Val Val Thr
145                 150

<210> SEQ ID NO 15
<211> LENGTH: 112
<212> TYPE: PRT
<213> ORGANISM: Artificial Sequence
<220> FEATURE:
<223> OTHER INFORMATION: GDF15

<400> SEQUENCE: 15

Ala Arg Asn Gly Asp His Cys Pro Leu Gly Pro Gly Arg Cys Cys Arg
1               5                   10                  15

Leu His Thr Val Arg Ala Ser Leu Glu Asp Leu Gly Trp Ala Asp Trp
            20                  25                  30

Val Leu Ser Pro Arg Glu Val Gln Val Thr Met Cys Ile Gly Ala Cys
        35                  40                  45

Pro Ser Gln Phe Arg Ala Ala Asn Met His Ala Gln Ile Lys Thr Ser
    50                  55                  60

Leu His Arg Leu Lys Pro Asp Thr Val Pro Ala Pro Cys Cys Val Pro
65                  70                  75                  80

Ala Ser Tyr Asn Pro Met Val Leu Ile Gln Lys Thr Asp Thr Gly Val
                85                  90                  95

Ser Leu Gln Thr Tyr Asp Asp Leu Leu Ala Lys Asp Cys His Cys Ile
            100                 105                 110

<210> SEQ ID NO 16
<211> LENGTH: 181
<212> TYPE: PRT
<213> ORGANISM: Artificial Sequence
<220> FEATURE:
<223> OTHER INFORMATION: FGF21

<400> SEQUENCE: 16

His Pro Ile Pro Asp Ser Ser Pro Leu Leu Gln Phe Gly Gly Gln Val
1               5                   10                  15

Arg Gln Arg Tyr Leu Tyr Thr Asp Asp Ala Gln Gln Thr Glu Ala His
            20                  25                  30

Leu Glu Ile Arg Glu Asp Gly Thr Val Gly Gly Ala Ala Asp Gln Ser
        35                  40                  45

Pro Glu Ser Leu Leu Gln Leu Lys Ala Leu Lys Pro Gly Val Ile Gln
    50                  55                  60

Ile Leu Gly Val Lys Thr Ser Arg Phe Leu Cys Gln Arg Pro Asp Gly
65                  70                  75                  80

Ala Leu Tyr Gly Ser Leu His Phe Asp Pro Glu Ala Cys Ser Phe Arg
                85                  90                  95

Glu Arg Leu Leu Glu Asp Gly Tyr Asn Val Tyr Gln Ser Glu Ala His
            100                 105                 110

Gly Leu Pro Leu His Leu Pro Gly Asn Lys Ser Pro His Arg Asp Pro
        115                 120                 125
```

```
Ala Pro Arg Gly Pro Ala Arg Phe Leu Pro Leu Pro Gly Leu Pro Pro
    130                 135                 140
Ala Leu Pro Glu Pro Pro Gly Ile Leu Ala Pro Gln Pro Pro Asp Val
145                 150                 155                 160
Gly Ser Ser Asp Pro Leu Ser Met Val Gly Gly Ser Gln Gly Arg Ser
                165                 170                 175
Pro Ser Tyr Glu Ser
            180

<210> SEQ ID NO 17
<211> LENGTH: 19
<212> TYPE: PRT
<213> ORGANISM: Artificial Sequence
<220> FEATURE:
<223> OTHER INFORMATION: Polypeptide unit

<400> SEQUENCE: 17

Pro Pro Pro Pro Pro Pro Pro Pro Pro Pro Pro Pro Pro Pro Pro Ala
1               5                   10                  15
Glu Ala Glu

<210> SEQ ID NO 18
<211> LENGTH: 19
<212> TYPE: PRT
<213> ORGANISM: Artificial Sequence
<220> FEATURE:
<223> OTHER INFORMATION: Polypeptide unit

<400> SEQUENCE: 18

Pro Pro Pro Ala Glu Pro Pro Ala Pro Pro Pro Glu Pro Pro Pro Pro
1               5                   10                  15
Pro Pro Pro

<210> SEQ ID NO 19
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 19

Ala Pro Pro Ala Glu Glu Pro Ala Glu Ala Pro Ala Glu Pro Pro Ala
1               5                   10                  15
Ala Pro Glu Ala
            20

<210> SEQ ID NO 20
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 20

Ala Glu Pro Ala Pro Pro Glu Glu Ala Ala Pro Ala Ala Pro Ala Ala
1               5                   10                  15
Pro Glu Pro Glu
            20

<210> SEQ ID NO 21
<211> LENGTH: 20
<212> TYPE: PRT
<213> ORGANISM: Artificial Sequence
```

```
<220> FEATURE:
<223> OTHER INFORMATION: Exemplary polypeptide unit

<400> SEQUENCE: 21

Ala Pro Glu Glu Pro Ala Pro Glu Ala Pro Ala Ala Pro Ala Glu Ala
1               5                   10                  15

Pro Pro Ala Pro
            20

<210> SEQ ID NO 22
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 22

Ala Ala Pro Ala Glu Glu Ala Glu Ala Pro Glu Ala Pro Pro Ala Pro
1               5                   10                  15

Ala Pro Glu Pro
            20

<210> SEQ ID NO 23
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 23

Ala Glu Pro Ala Pro Pro Ala Ala Glu Pro Ala Pro Pro Ala Ala Glu
1               5                   10                  15

Ala Ala Glu Pro
            20

<210> SEQ ID NO 24
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 24

Ala Pro Ala Ala Glu Ala Ala Pro Pro Ala Glu Ala Ala Glu Pro Glu
1               5                   10                  15

Pro Glu Ala Pro
            20

<210> SEQ ID NO 25
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 25

Ala Pro Ala Pro Pro Glu Ala Glu Glu Pro Pro Glu Ala Ala Pro Ala
1               5                   10                  15

Pro Ala Pro Ala
            20

<210> SEQ ID NO 26
<211> LENGTH: 20
<212> TYPE: PRT
```

```
<213> ORGANISM: Artificial Sequence
<220> FEATURE:
<223> OTHER INFORMATION: Exemplary polypeptide unit

<400> SEQUENCE: 26

Ala Ala Glu Ala Glu Ala Ala Glu Ala Glu Pro Pro Ala Pro Pro Ala
1               5                   10                  15

Pro Glu Pro Ala
            20

<210> SEQ ID NO 27
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 27

Ala Pro Pro Glu Ala Pro Glu Ala Pro Glu Ala Ala Pro Ala Ala Pro
1               5                   10                  15

Glu Pro Ala Glu
            20

<210> SEQ ID NO 28
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 28

Ala Pro Pro Glu Ala Glu Pro Pro Glu Ala Pro Glu Ala Ala Glu Ala
1               5                   10                  15

Ala Pro Ala Pro
            20

<210> SEQ ID NO 29
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 29

Ala Pro Ala Glu Ala Pro Ala Ala Ala Glu Glu Ala Pro Pro Ala Glu
1               5                   10                  15

Pro Ala Pro Glu
            20

<210> SEQ ID NO 30
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 30

Ala Ala Glu Ala Pro Ala Ala Pro Pro Ala Pro Glu Pro Glu Ala Glu
1               5                   10                  15

Pro Glu Pro Ala
            20

<210> SEQ ID NO 31
<211> LENGTH: 20
```

```
<212> TYPE: PRT
<213> ORGANISM: Artificial Sequence
<220> FEATURE:
<223> OTHER INFORMATION: Exemplary polypeptide unit

<400> SEQUENCE: 31

Ala Ala Glu Ala Pro Ala Pro Glu Pro Ala Ala Glu Pro Glu Pro Ala
1               5                   10                  15

Pro Glu Ala Pro
            20

<210> SEQ ID NO 32
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 32

Ala Glu Ala Glu Pro Ala Ala Pro Ala Pro Ala Glu Pro Ala Glu Pro
1               5                   10                  15

Glu Ala Pro Ala
            20

<210> SEQ ID NO 33
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 33

Ala Glu Pro Ala Ala Pro Ala Pro Ala Glu Pro Ala Ala Pro Ala Pro
1               5                   10                  15

Glu Ala Pro Ala
            20

<210> SEQ ID NO 34
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 34

Ala Pro Ala Pro Glu Ala Pro Ala Ala Glu Pro Ala Ala Pro Ala Pro
1               5                   10                  15

Ala Glu Pro Ala
            20

<210> SEQ ID NO 35
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 35

Ala Ala Pro Pro Ala Pro Ala Pro Ala Ala Ala Glu Glu Ala Pro Ala
1               5                   10                  15

Glu Ala Pro Ala
            20

<210> SEQ ID NO 36
```

-continued

```
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 36

Ala Glu Pro Ala Ala Pro Ala Ala Pro Glu Pro Glu Pro Ala Ala Pro
1               5                   10                  15

Ala Glu Ala Ala
            20

<210> SEQ ID NO 37
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 37

Ala Pro Pro Glu Pro Pro Ala Glu Ala Ala Pro Ala Ala Ala Glu Ala
1               5                   10                  15

Pro Ala Glu Ala
            20

<210> SEQ ID NO 38
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 38

Ala Ala Pro Ala Ala Ala Glu Pro Pro Ala Glu Ala Glu Ala Pro
1               5                   10                  15

Ala Pro Pro Ala
            20

<210> SEQ ID NO 39
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 39

Ala Pro Ala Ala Pro Pro Glu Glu Ala Ala Ala Glu Pro Pro Ala Ala
1               5                   10                  15

Glu Ala Ala Pro
            20

<210> SEQ ID NO 40
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 40

Ala Ala Glu Ala Ala Pro Ala Ala Pro Ala Ala Pro Glu Pro Ala Glu
1               5                   10                  15

Glu Ala Ala Pro
            20
```

```
<210> SEQ ID NO 41
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 41

Ala Pro Glu Ala Ala Pro Ala Ala Ala Glu Pro Ala Pro Ala Pro Ala
1               5                   10                  15

Ala Pro Glu Pro
            20

<210> SEQ ID NO 42
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 42

Ala Pro Ala Glu Ala Ala Glu Ala Ala Pro Glu Ala Pro Glu Pro Ala
1               5                   10                  15

Ala Pro Ala Ala
            20

<210> SEQ ID NO 43
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 43

Ala Glu Ala Ala Ala Pro Ala Glu Ala Ala Pro Ala Pro Ala Pro Glu
1               5                   10                  15

Ala Pro Ala Pro
            20

<210> SEQ ID NO 44
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 44

Ala Ala Glu Ala Ala Glu Ala Ala Pro Ala Glu Pro Glu Pro Pro Ala
1               5                   10                  15

Pro Pro Ala Pro
            20

<210> SEQ ID NO 45
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 45

Ala Glu Ala Ala Glu Ala Pro Ala Pro Ala Ala Pro Pro Ala Ala Pro
1               5                   10                  15

Ala Pro Glu Pro
            20
```

```
<210> SEQ ID NO 46
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 46

Ala Pro Glu Ala Pro Ala Glu Glu Ala Glu Pro Ala Ala Ala Pro Pro
1               5                   10                  15

Ala Glu Ala Pro
            20

<210> SEQ ID NO 47
<211> LENGTH: 20
<212> TYPE: PRT
<213> ORGANISM: Artificial Sequence
<220> FEATURE:
<223> OTHER INFORMATION: Exemplary polypeptide unit

<400> SEQUENCE: 47

Ala Pro Ala Pro Pro Ala Glu Ala Glu Ala Glu Ala Pro Pro Ala Ala
1               5                   10                  15

Pro Glu Pro Ala
            20

<210> SEQ ID NO 48
<211> LENGTH: 100
<212> TYPE: PRT
<213> ORGANISM: Artificial Sequence
<220> FEATURE:
<223> OTHER INFORMATION: Polypeptide complex unit

<400> SEQUENCE: 48

Ala Pro Pro Ala Glu Glu Pro Ala Glu Glu Pro Ala Glu Pro Pro Ala
1               5                   10                  15

Ala Pro Glu Ala Ala Pro Pro Ala Glu Glu Pro Ala Glu Ala Pro Ala
                20                  25                  30

Glu Pro Pro Ala Ala Pro Glu Ala Ala Pro Pro Ala Glu Glu Pro Ala
            35                  40                  45

Glu Ala Pro Ala Glu Pro Pro Ala Ala Pro Glu Ala Ala Pro Pro Ala
        50                  55                  60

Glu Glu Pro Ala Glu Ala Pro Ala Glu Pro Pro Ala Ala Pro Glu Ala
65                  70                  75                  80

Ala Pro Pro Ala Glu Glu Pro Ala Glu Ala Pro Ala Glu Pro Pro Ala
                85                  90                  95

Ala Pro Glu Ala
            100

<210> SEQ ID NO 49
<211> LENGTH: 200
<212> TYPE: PRT
<213> ORGANISM: Artificial Sequence
<220> FEATURE:
<223> OTHER INFORMATION: Polypeptide complex unit

<400> SEQUENCE: 49

Ala Glu Pro Ala Pro Pro Glu Glu Ala Ala Pro Ala Ala Pro Ala Ala
1               5                   10                  15

Pro Glu Pro Glu Ala Glu Pro Ala Pro Pro Glu Glu Ala Ala Pro Ala
                20                  25                  30
```

```
Ala Pro Ala Ala Pro Glu Pro Glu Ala Pro Ala Pro Glu Glu
        35                  40                  45

Ala Ala Pro Ala Ala Pro Ala Ala Pro Glu Pro Glu Ala Glu Pro Ala
    50                  55                  60

Pro Pro Glu Glu Ala Ala Pro Ala Ala Pro Ala Ala Pro Glu Pro Glu
65                  70                  75                  80

Ala Glu Pro Ala Pro Pro Glu Glu Ala Ala Pro Ala Ala Pro Ala Ala
                85                  90                  95

Pro Glu Pro Glu Ala Glu Pro Ala Pro Pro Glu Glu Ala Ala Pro Ala
            100                 105                 110

Ala Pro Ala Ala Pro Glu Pro Glu Ala Glu Pro Ala Pro Pro Glu Glu
        115                 120                 125

Ala Ala Pro Ala Ala Pro Ala Ala Pro Glu Pro Glu Ala Glu Pro Ala
    130                 135                 140

Pro Pro Glu Glu Ala Ala Pro Ala Ala Pro Ala Ala Pro Glu Pro Glu
145                 150                 155                 160

Ala Glu Pro Ala Pro Pro Glu Glu Ala Ala Pro Ala Ala Pro Ala Ala
                165                 170                 175

Pro Glu Pro Glu Ala Glu Pro Ala Pro Pro Glu Glu Ala Ala Pro Ala
            180                 185                 190

Ala Pro Ala Ala Pro Glu Pro Glu
        195                 200

<210> SEQ ID NO 50
<211> LENGTH: 240
<212> TYPE: PRT
<213> ORGANISM: Artificial Sequence
<220> FEATURE:
<223> OTHER INFORMATION: Polypeptide complex unit

<400> SEQUENCE: 50

Ala Pro Glu Glu Pro Ala Pro Glu Ala Pro Ala Ala Pro Ala Glu Ala
1               5                   10                  15

Pro Pro Ala Pro Ala Pro Glu Glu Pro Ala Pro Glu Ala Pro Ala Ala
            20                  25                  30

Pro Ala Glu Ala Pro Pro Ala Pro Ala Pro Glu Glu Pro Ala Pro Glu
        35                  40                  45

Ala Pro Ala Ala Pro Ala Glu Ala Pro Pro Ala Pro Ala Pro Glu Glu
    50                  55                  60

Pro Ala Pro Glu Ala Pro Ala Ala Pro Ala Glu Ala Pro Pro Ala Pro
65                  70                  75                  80

Ala Pro Glu Glu Pro Ala Pro Glu Ala Pro Ala Ala Pro Ala Glu Ala
                85                  90                  95

Pro Pro Ala Pro Ala Pro Glu Glu Pro Ala Pro Glu Ala Pro Ala Ala
            100                 105                 110

Pro Ala Glu Ala Pro Pro Ala Pro Ala Pro Glu Glu Pro Ala Pro Glu
        115                 120                 125

Ala Pro Ala Ala Pro Ala Glu Ala Pro Pro Ala Pro Ala Pro Glu Glu
    130                 135                 140

Pro Ala Pro Glu Ala Pro Ala Ala Pro Ala Glu Ala Pro Pro Ala Pro
145                 150                 155                 160

Ala Pro Glu Glu Pro Ala Pro Glu Ala Pro Ala Ala Pro Ala Glu Ala
                165                 170                 175

Pro Pro Ala Pro Ala Pro Glu Glu Pro Ala Pro Glu Ala Pro Ala Ala
            180                 185                 190
```

```
Pro Ala Glu Ala Pro Ala Pro Ala Pro Glu Ala Pro Glu
        195                 200                 205
Ala Pro Ala Ala Pro Ala Glu Ala Pro Ala Pro Ala Glu Glu
    210                 215                 220
Pro Ala Pro Glu Ala Pro Ala Ala Pro Ala Glu Ala Pro Pro Ala Pro
225                 230                 235                 240
```

<210> SEQ ID NO 51
<211> LENGTH: 340
<212> TYPE: PRT
<213> ORGANISM: Artificial Sequence
<220> FEATURE:
<223> OTHER INFORMATION: Polypeptide complex unit

<400> SEQUENCE: 51

```
Ala Ala Pro Ala Glu Glu Ala Glu Ala Pro Glu Ala Pro Pro Ala Pro
1               5                   10                  15
Ala Pro Glu Pro Ala Ala Pro Ala Glu Glu Ala Glu Ala Pro Glu Ala
                20                  25                  30
Pro Pro Ala Pro Ala Pro Glu Pro Ala Ala Pro Ala Glu Glu Ala Glu
            35                  40                  45
Ala Pro Glu Ala Pro Pro Ala Pro Ala Pro Glu Pro Ala Ala Pro Ala
50                  55                  60
Glu Glu Ala Glu Ala Pro Glu Ala Pro Pro Ala Pro Ala Pro Glu Pro
65                  70                  75                  80
Ala Ala Pro Ala Glu Glu Ala Glu Ala Pro Glu Ala Pro Pro Ala Pro
                85                  90                  95
Ala Pro Glu Pro Ala Ala Pro Ala Glu Glu Ala Glu Ala Pro Glu Ala
                100                 105                 110
Pro Pro Ala Pro Ala Pro Glu Pro Ala Ala Pro Ala Glu Glu Ala Glu
            115                 120                 125
Ala Pro Glu Ala Pro Pro Ala Pro Ala Pro Glu Pro Ala Ala Pro Ala
    130                 135                 140
Glu Glu Ala Glu Ala Pro Glu Ala Pro Pro Ala Pro Ala Pro Glu Pro
145                 150                 155                 160
Ala Ala Pro Ala Glu Glu Ala Glu Ala Pro Glu Ala Pro Pro Ala Pro
                165                 170                 175
Ala Pro Glu Pro Ala Ala Pro Ala Glu Glu Ala Glu Ala Pro Glu Ala
                180                 185                 190
Pro Pro Ala Pro Ala Pro Glu Pro Ala Ala Pro Ala Glu Glu Ala Glu
            195                 200                 205
Ala Pro Glu Ala Pro Pro Ala Pro Ala Pro Glu Pro Ala Ala Pro Ala
    210                 215                 220
Glu Glu Ala Glu Ala Pro Glu Ala Pro Pro Ala Pro Ala Pro Glu Pro
225                 230                 235                 240
Ala Ala Pro Ala Glu Glu Ala Glu Ala Pro Glu Ala Pro Pro Ala Pro
                245                 250                 255
Ala Pro Glu Pro Ala Ala Pro Ala Glu Glu Ala Glu Ala Pro Glu Ala
                260                 265                 270
Pro Pro Ala Pro Ala Pro Glu Pro Ala Ala Pro Ala Glu Glu Ala Glu
            275                 280                 285
Ala Pro Glu Ala Pro Pro Ala Pro Ala Pro Glu Pro Ala Ala Pro Ala
    290                 295                 300
Glu Glu Ala Glu Ala Pro Glu Ala Pro Pro Ala Pro Ala Pro Glu Pro
305                 310                 315                 320
```

Ala Ala Pro Ala Glu Ala Glu Ala Pro Glu Ala Pro Pro Ala Pro
            325                 330                 335
Ala Pro Glu Pro
        340

<210> SEQ ID NO 52
<211> LENGTH: 180
<212> TYPE: PRT
<213> ORGANISM: Artificial Sequence
<220> FEATURE:
<223> OTHER INFORMATION: Polypeptide complex unit

<400> SEQUENCE: 52

Ala Glu Pro Ala Pro Pro Ala Ala Glu Pro Ala Pro Pro Ala Ala Glu
1               5                   10                  15

Ala Ala Glu Pro Ala Glu Pro Ala Pro Pro Ala Ala Glu Pro Ala Pro
            20                  25                  30

Pro Ala Ala Glu Ala Ala Glu Pro Ala Glu Pro Ala Pro Pro Ala Ala
        35                  40                  45

Glu Pro Ala Pro Pro Ala Ala Glu Ala Ala Glu Pro Ala Glu Pro Ala
    50                  55                  60

Pro Pro Ala Ala Glu Pro Ala Pro Pro Ala Ala Glu Ala Ala Glu Pro
65                  70                  75                  80

Ala Glu Pro Ala Pro Pro Ala Ala Glu Pro Ala Pro Pro Ala Ala Glu
                85                  90                  95

Ala Ala Glu Pro Ala Glu Pro Ala Pro Pro Ala Ala Glu Pro Ala Pro
            100                 105                 110

Pro Ala Ala Glu Ala Ala Glu Pro Ala Glu Pro Ala Pro Pro Ala Ala
        115                 120                 125

Glu Pro Ala Pro Pro Ala Ala Glu Ala Ala Glu Pro Ala Glu Pro Ala
    130                 135                 140

Pro Pro Ala Ala Glu Pro Ala Pro Pro Ala Ala Glu Ala Ala Glu Pro
145                 150                 155                 160

Ala Glu Pro Ala Pro Pro Ala Ala Glu Pro Ala Pro Pro Ala Ala Glu
                165                 170                 175

Ala Ala Glu Pro
            180

<210> SEQ ID NO 53
<211> LENGTH: 300
<212> TYPE: PRT
<213> ORGANISM: Artificial Sequence
<220> FEATURE:
<223> OTHER INFORMATION: Polypeptide complex unit

<400> SEQUENCE: 53

Ala Pro Ala Ala Glu Ala Pro Pro Ala Glu Ala Ala Glu Pro Glu
1               5                   10                  15

Pro Glu Ala Pro Ala Pro Ala Glu Ala Ala Pro Pro Ala Glu Ala
            20                  25                  30

Ala Glu Pro Glu Pro Glu Ala Pro Ala Pro Ala Glu Ala Ala Pro
        35                  40                  45

Pro Ala Glu Ala Ala Glu Pro Glu Pro Glu Ala Pro Ala Pro Ala
    50                  55                  60

Glu Ala Ala Pro Pro Ala Glu Ala Ala Glu Pro Glu Pro Glu Ala Pro
65                  70                  75                  80

Ala Pro Ala Ala Glu Ala Ala Pro Pro Ala Glu Ala Ala Glu Pro Glu
                85                  90                  95

```
Pro Glu Ala Pro Ala Pro Ala Glu Ala Ala Pro Pro Ala Glu Ala
            100                 105                 110

Ala Glu Pro Glu Pro Glu Ala Pro Ala Pro Ala Ala Glu Ala Ala Pro
        115                 120                 125

Pro Ala Glu Ala Ala Glu Pro Glu Pro Glu Ala Pro Ala Pro Ala Ala
    130                 135                 140

Glu Ala Ala Pro Pro Ala Glu Ala Ala Glu Pro Glu Pro Glu Ala Pro
145                 150                 155                 160

Ala Pro Ala Ala Glu Ala Ala Pro Pro Ala Glu Ala Ala Glu Pro Glu
                165                 170                 175

Pro Glu Ala Pro Ala Pro Ala Ala Glu Ala Ala Pro Pro Ala Glu Ala
            180                 185                 190

Ala Glu Pro Glu Pro Glu Ala Pro Ala Pro Ala Ala Glu Ala Ala Pro
        195                 200                 205

Pro Ala Glu Ala Ala Glu Pro Glu Pro Glu Ala Pro Ala Pro Ala Ala
    210                 215                 220

Glu Ala Ala Pro Pro Ala Glu Ala Ala Glu Pro Glu Pro Glu Ala Pro
225                 230                 235                 240

Ala Pro Ala Ala Glu Ala Ala Pro Pro Ala Glu Ala Ala Glu Pro Glu
                245                 250                 255

Pro Glu Ala Pro Ala Pro Ala Ala Glu Ala Ala Pro Pro Ala Glu Ala
            260                 265                 270

Ala Glu Pro Glu Pro Glu Ala Pro Ala Pro Ala Ala Glu Ala Ala Pro
        275                 280                 285

Pro Ala Glu Ala Ala Glu Pro Glu Ala Pro
    290                 295                 300

<210> SEQ ID NO 54
<211> LENGTH: 420
<212> TYPE: PRT
<213> ORGANISM: Artificial Sequence
<220> FEATURE:
<223> OTHER INFORMATION: Polypeptide complex unit

<400> SEQUENCE: 54

Ala Pro Ala Pro Pro Glu Ala Glu Glu Pro Pro Glu Ala Ala Pro Ala
1               5                   10                  15

Pro Ala Pro Ala Ala Pro Ala Pro Pro Glu Ala Glu Glu Pro Pro Glu
                20                  25                  30

Ala Ala Pro Ala Pro Ala Pro Ala Ala Pro Ala Pro Pro Glu Ala Glu
            35                  40                  45

Glu Pro Pro Glu Ala Ala Pro Ala Pro Ala Pro Ala Ala Pro Ala Pro
50                  55                  60

Pro Glu Ala Glu Glu Pro Pro Glu Ala Ala Pro Ala Pro Ala Pro Ala
65                  70                  75                  80

Ala Pro Ala Pro Pro Glu Ala Glu Glu Pro Pro Glu Ala Ala Pro Ala
                85                  90                  95

Pro Ala Pro Ala Ala Pro Ala Pro Pro Glu Ala Glu Glu Pro Pro Glu
            100                 105                 110

Ala Ala Pro Ala Pro Ala Pro Ala Ala Pro Ala Pro Pro Glu Ala Glu
        115                 120                 125

Glu Pro Pro Glu Ala Ala Pro Ala Pro Ala Pro Ala Ala Pro Ala Pro
    130                 135                 140

Pro Glu Ala Glu Glu Pro Pro Glu Ala Ala Pro Ala Pro Ala Pro Ala
145                 150                 155                 160
```

Ala Pro Ala Pro Pro Glu Ala Glu Glu Pro Pro Ala Ala Pro Ala
                165                 170                 175

Pro Ala Pro Ala Ala Pro Ala Pro Pro Glu Ala Glu Glu Pro Pro Glu
            180                 185                 190

Ala Ala Pro Ala Pro Ala Pro Ala Ala Pro Ala Pro Pro Glu Ala Glu
            195                 200                 205

Glu Pro Pro Glu Ala Ala Pro Ala Pro Ala Pro Ala Ala Pro Ala Pro
210                 215                 220

Pro Glu Ala Glu Glu Pro Pro Ala Ala Pro Ala Pro Ala Pro Ala
225                 230                 235                 240

Ala Pro Ala Pro Pro Glu Ala Glu Glu Pro Pro Glu Ala Ala Pro Ala
                245                 250                 255

Pro Ala Pro Ala Ala Pro Ala Pro Pro Glu Ala Glu Glu Pro Pro Glu
            260                 265                 270

Ala Ala Pro Ala Pro Ala Pro Ala Ala Pro Ala Pro Pro Glu Ala Glu
            275                 280                 285

Glu Pro Pro Glu Ala Ala Pro Ala Pro Ala Pro Ala Ala Pro Ala Pro
290                 295                 300

Pro Glu Ala Glu Glu Pro Pro Glu Ala Ala Pro Ala Pro Ala Pro Ala
305                 310                 315                 320

Ala Pro Ala Pro Pro Glu Ala Glu Glu Pro Pro Glu Ala Ala Pro Ala
                325                 330                 335

Pro Ala Pro Ala Ala Pro Ala Pro Pro Glu Ala Glu Glu Pro Pro Glu
            340                 345                 350

Ala Ala Pro Ala Pro Ala Pro Ala Ala Pro Ala Pro Pro Glu Ala Glu
            355                 360                 365

Glu Pro Pro Glu Ala Ala Pro Ala Pro Ala Pro Ala Ala Pro Ala Pro
370                 375                 380

Pro Glu Ala Glu Glu Pro Pro Glu Ala Ala Pro Ala Pro Ala Pro Ala
385                 390                 395                 400

Ala Pro Ala Pro Pro Glu Ala Glu Glu Pro Pro Glu Ala Ala Pro Ala
                405                 410                 415

Pro Ala Pro Ala
            420

<210> SEQ ID NO 55
<211> LENGTH: 120
<212> TYPE: PRT
<213> ORGANISM: Artificial Sequence
<220> FEATURE:
<223> OTHER INFORMATION: Polypeptide complex unit

<400> SEQUENCE: 55

Ala Ala Glu Ala Glu Ala Ala Glu Ala Glu Pro Pro Ala Pro Pro Ala
1               5                   10                  15

Pro Glu Pro Ala Ala Ala Glu Ala Glu Ala Ala Glu Ala Glu Pro Pro
            20                  25                  30

Ala Pro Pro Ala Pro Glu Pro Ala Ala Ala Glu Ala Glu Ala Ala Glu
        35                  40                  45

Ala Glu Pro Pro Ala Pro Pro Ala Pro Glu Pro Ala Ala Ala Glu Ala
    50                  55                  60

Glu Ala Ala Glu Ala Glu Pro Pro Ala Pro Pro Ala Pro Glu Pro Ala
65                  70                  75                  80

Ala Ala Glu Ala Glu Ala Ala Glu Ala Glu Pro Pro Ala Pro Pro Ala
                85                  90                  95

```
Pro Glu Pro Ala Ala Glu Ala Glu Ala Glu Ala Glu Pro Pro
                100                 105                 110
Ala Pro Pro Ala Pro Glu Pro Ala
        115                 120

<210> SEQ ID NO 56
<211> LENGTH: 140
<212> TYPE: PRT
<213> ORGANISM: Artificial Sequence
<220> FEATURE:
<223> OTHER INFORMATION: Polypeptide complex unit

<400> SEQUENCE: 56

Ala Pro Pro Glu Ala Pro Glu Ala Pro Glu Ala Ala Pro Ala Ala Pro
1               5                   10                  15
Glu Pro Ala Glu Ala Pro Pro Glu Ala Pro Glu Ala Pro Glu Ala Ala
                20                  25                  30
Pro Ala Ala Pro Glu Pro Ala Glu Ala Pro Pro Glu Ala Pro Glu Ala
            35                  40                  45
Pro Glu Ala Ala Pro Ala Ala Pro Glu Pro Ala Glu Ala Pro Pro Glu
        50                  55                  60
Ala Pro Glu Ala Pro Glu Ala Ala Pro Ala Ala Pro Glu Pro Ala Glu
65                  70                  75                  80
Ala Pro Pro Glu Ala Pro Glu Ala Pro Glu Ala Ala Pro Ala Ala Pro
                85                  90                  95
Glu Pro Ala Glu Ala Pro Pro Glu Ala Pro Glu Ala Pro Glu Ala Ala
                100                 105                 110
Pro Ala Ala Pro Glu Pro Ala Glu Ala Pro Pro Glu Ala Pro Glu Ala
            115                 120                 125
Pro Glu Ala Ala Pro Ala Ala Pro Glu Pro Ala Glu
        130                 135                 140

<210> SEQ ID NO 57
<211> LENGTH: 160
<212> TYPE: PRT
<213> ORGANISM: Artificial Sequence
<220> FEATURE:
<223> OTHER INFORMATION: Polypeptide complex unit

<400> SEQUENCE: 57

Ala Pro Pro Glu Ala Glu Pro Pro Glu Ala Pro Glu Ala Ala Glu Ala
1               5                   10                  15
Ala Pro Ala Pro Ala Pro Pro Glu Ala Glu Pro Pro Glu Ala Pro Glu
                20                  25                  30
Ala Ala Glu Ala Ala Pro Ala Pro Ala Pro Pro Glu Ala Glu Pro Pro
            35                  40                  45
Glu Ala Pro Glu Ala Ala Glu Ala Ala Pro Ala Pro Ala Pro Pro Glu
        50                  55                  60
Ala Glu Pro Pro Glu Ala Pro Glu Ala Ala Glu Ala Ala Pro Ala Pro
65                  70                  75                  80
Ala Pro Pro Glu Ala Glu Pro Pro Glu Ala Pro Glu Ala Ala Glu Ala
                85                  90                  95
Ala Pro Ala Pro Ala Pro Pro Glu Ala Glu Pro Pro Glu Ala Pro Glu
                100                 105                 110
Ala Ala Glu Ala Ala Pro Ala Pro Ala Pro Pro Glu Ala Glu Pro Pro
            115                 120                 125
Glu Ala Pro Glu Ala Ala Glu Ala Ala Pro Ala Pro Ala Pro Pro Glu
```

```
            130                 135                 140
Ala Glu Pro Pro Glu Ala Pro Glu Ala Ala Glu Ala Ala Pro Ala Pro
145                 150                 155                 160

<210> SEQ ID NO 58
<211> LENGTH: 200
<212> TYPE: PRT
<213> ORGANISM: Artificial Sequence
<220> FEATURE:
<223> OTHER INFORMATION: Polypeptide complex unit

<400> SEQUENCE: 58

Ala Pro Ala Glu Ala Pro Ala Ala Glu Glu Ala Pro Pro Ala Glu
1               5                   10                  15

Pro Ala Pro Glu Ala Pro Ala Glu Ala Pro Ala Ala Glu Glu Ala
                20                  25                  30

Pro Pro Ala Glu Pro Ala Pro Glu Ala Pro Ala Glu Ala Pro Ala Ala
            35                  40                  45

Ala Glu Glu Ala Pro Pro Ala Glu Pro Ala Pro Glu Ala Pro Ala Glu
        50                  55                  60

Ala Pro Ala Ala Ala Glu Glu Ala Pro Pro Ala Glu Pro Ala Pro Glu
65                  70                  75                  80

Ala Pro Ala Glu Ala Pro Ala Ala Glu Glu Ala Pro Pro Ala Glu
                85                  90                  95

Pro Ala Pro Glu Ala Pro Ala Glu Ala Pro Ala Ala Glu Glu Ala
                100                 105                 110

Pro Pro Ala Glu Pro Ala Pro Glu Ala Pro Ala Glu Ala Pro Ala Ala
            115                 120                 125

Ala Glu Glu Ala Pro Pro Ala Glu Pro Ala Pro Glu Ala Pro Ala Glu
        130                 135                 140

Ala Pro Ala Ala Ala Glu Glu Ala Pro Pro Ala Glu Pro Ala Pro Glu
145                 150                 155                 160

Ala Pro Ala Glu Ala Pro Ala Ala Glu Glu Ala Pro Pro Ala Glu
                165                 170                 175

Pro Ala Pro Glu Ala Pro Ala Glu Ala Pro Ala Ala Glu Glu Ala
                180                 185                 190

Pro Pro Ala Glu Pro Ala Pro Glu
        195                 200

<210> SEQ ID NO 59
<211> LENGTH: 260
<212> TYPE: PRT
<213> ORGANISM: Artificial Sequence
<220> FEATURE:
<223> OTHER INFORMATION: Polypeptide complex unit

<400> SEQUENCE: 59

Ala Ala Glu Ala Pro Ala Ala Pro Pro Ala Pro Glu Pro Glu Ala Glu
1               5                   10                  15

Pro Glu Pro Ala Ala Glu Ala Ala Ala Pro Glu Ala Pro Glu
                20                  25                  30

Pro Glu Ala Glu Pro Glu Pro Ala Ala Ala Glu Ala Pro Ala Ala Pro
            35                  40                  45

Pro Ala Pro Glu Pro Glu Ala Glu Pro Glu Pro Ala Ala Ala Glu Ala
        50                  55                  60

Pro Ala Ala Pro Pro Ala Pro Glu Pro Glu Ala Glu Pro Glu Pro Ala
65                  70                  75                  80
```

```
Ala Ala Glu Ala Pro Ala Pro Ala Pro Glu Pro Glu Ala Glu
                85                  90                  95

Pro Glu Pro Ala Ala Ala Glu Ala Pro Ala Ala Pro Pro Ala Pro Glu
            100                 105                 110

Pro Glu Ala Glu Pro Glu Pro Ala Ala Ala Glu Ala Pro Ala Ala Pro
            115                 120                 125

Pro Ala Pro Glu Pro Glu Ala Glu Pro Glu Pro Ala Ala Ala Glu Ala
        130                 135                 140

Pro Ala Ala Pro Pro Ala Pro Glu Pro Glu Ala Glu Pro Glu Pro Ala
145                 150                 155                 160

Ala Ala Glu Ala Pro Ala Ala Pro Pro Ala Pro Glu Pro Glu Ala Glu
                165                 170                 175

Pro Glu Pro Ala Ala Ala Glu Ala Pro Ala Ala Pro Pro Ala Pro Glu
            180                 185                 190

Pro Glu Ala Glu Pro Glu Pro Ala Ala Ala Glu Ala Pro Ala Ala Pro
            195                 200                 205

Pro Ala Pro Glu Pro Glu Ala Glu Pro Glu Pro Ala Ala Ala Glu Ala
        210                 215                 220

Pro Ala Ala Pro Pro Ala Pro Glu Pro Glu Ala Glu Pro Glu Pro Ala
225                 230                 235                 240

Ala Ala Glu Ala Pro Ala Ala Pro Pro Ala Pro Glu Pro Glu Ala Glu
                245                 250                 255

Pro Glu Pro Ala
        260

<210> SEQ ID NO 60
<211> LENGTH: 180
<212> TYPE: PRT
<213> ORGANISM: Artificial Sequence
<220> FEATURE:
<223> OTHER INFORMATION: Polypeptide complex unit

<400> SEQUENCE: 60

Ala Ala Glu Ala Pro Ala Pro Glu Pro Ala Ala Glu Pro Glu Pro Ala
1               5                   10                  15

Pro Glu Ala Pro Ala Ala Glu Ala Pro Ala Pro Glu Pro Ala Ala Glu
            20                  25                  30

Pro Glu Pro Ala Pro Glu Ala Pro Ala Ala Glu Ala Pro Ala Pro Glu
        35                  40                  45

Pro Ala Ala Glu Pro Glu Pro Ala Pro Glu Ala Pro Ala Ala Glu Ala
        50                  55                  60

Pro Ala Pro Glu Pro Ala Ala Glu Pro Glu Pro Ala Pro Glu Ala Pro
65                  70                  75                  80

Ala Ala Glu Ala Pro Ala Pro Glu Pro Ala Ala Glu Pro Glu Pro Ala
                85                  90                  95

Pro Glu Ala Pro Ala Ala Glu Ala Pro Ala Pro Glu Pro Ala Ala Glu
            100                 105                 110

Pro Glu Pro Ala Pro Glu Ala Pro Ala Ala Glu Ala Pro Ala Pro Glu
            115                 120                 125

Pro Ala Ala Glu Pro Glu Pro Ala Pro Glu Ala Pro Ala Ala Glu Ala
        130                 135                 140

Pro Ala Pro Glu Pro Ala Ala Glu Pro Glu Pro Ala Pro Glu Ala Pro
145                 150                 155                 160

Ala Ala Glu Ala Pro Ala Pro Glu Pro Ala Ala Glu Pro Glu Pro Ala
                165                 170                 175
```

Pro Glu Ala Pro
            180

<210> SEQ ID NO 61
<211> LENGTH: 140
<212> TYPE: PRT
<213> ORGANISM: Artificial Sequence
<220> FEATURE:
<223> OTHER INFORMATION: Polypeptide complex unit

<400> SEQUENCE: 61

Ala Glu Ala Glu Pro Ala Ala Pro Ala Glu Pro Ala Glu Pro
1               5                   10                  15

Glu Ala Pro Ala Ala Glu Ala Glu Pro Ala Ala Pro Ala Glu
                20                  25                  30

Pro Ala Glu Pro Glu Ala Pro Ala Ala Glu Ala Glu Pro Ala Ala Pro
            35                  40                  45

Ala Pro Ala Glu Pro Ala Glu Pro Glu Ala Pro Ala Ala Glu Ala Glu
            50                  55                  60

Pro Ala Ala Pro Ala Pro Ala Glu Pro Ala Glu Pro Glu Ala Pro Ala
65                  70                  75                  80

Ala Glu Ala Glu Pro Ala Ala Pro Ala Pro Ala Glu Pro Ala Glu Pro
                85                  90                  95

Glu Ala Pro Ala Ala Glu Ala Glu Pro Ala Ala Pro Ala Pro Ala Glu
                100                 105                 110

Pro Ala Glu Pro Glu Ala Pro Ala Ala Glu Ala Glu Pro Ala Ala Pro
        115                 120                 125

Ala Pro Ala Glu Pro Ala Glu Pro Glu Ala Pro Ala
        130                 135                 140

<210> SEQ ID NO 62
<211> LENGTH: 192
<212> TYPE: PRT
<213> ORGANISM: Artificial Sequence
<220> FEATURE:
<223> OTHER INFORMATION: Polypeptide complex unit

<400> SEQUENCE: 62

Ala Glu Pro Ala Ala Pro Ala Pro Ala Glu Pro Ala Ala Pro Ala Pro
1               5                   10                  15

Glu Ala Pro Ala Ala Glu Pro Ala Ala Pro Ala Pro Ala Glu Pro Ala
                20                  25                  30

Ala Pro Ala Pro Glu Ala Pro Ala Ala Glu Pro Ala Ala Pro Ala Pro
            35                  40                  45

Ala Glu Pro Ala Ala Pro Ala Pro Glu Ala Pro Ala Ala Glu Pro Ala
            50                  55                  60

Ala Pro Ala Pro Ala Glu Pro Ala Ala Pro Ala Pro Glu Ala Pro Ala
65                  70                  75                  80

Ala Glu Pro Ala Ala Pro Ala Pro Ala Glu Pro Ala Ala Pro Ala Pro
                85                  90                  95

Glu Ala Pro Ala Ala Glu Pro Ala Ala Pro Ala Pro Ala Glu Pro Ala
                100                 105                 110

Ala Pro Ala Pro Glu Ala Pro Ala Ala Glu Pro Ala Ala Pro Ala Pro
        115                 120                 125

Ala Glu Pro Ala Ala Pro Ala Pro Glu Ala Pro Ala Ala Glu Pro Ala
        130                 135                 140

Ala Pro Ala Pro Ala Glu Pro Ala Ala Pro Ala Pro Glu Ala Pro Ala
145                 150                 155                 160

```
Ala Glu Pro Ala Ala Pro Ala Glu Pro Ala Ala Pro Ala Pro
                165                 170                 175

Glu Ala Pro Ala Ala Glu Pro Ala Pro Ala Pro Ala Glu Pro Ala
        180                 185                 190
```

<210> SEQ ID NO 63
<211> LENGTH: 100
<212> TYPE: PRT
<213> ORGANISM: Artificial Sequence
<220> FEATURE:
<223> OTHER INFORMATION: Polypeptide complex unit

<400> SEQUENCE: 63

```
Ala Pro Ala Pro Glu Ala Pro Ala Ala Glu Pro Ala Ala Pro Ala Pro
1               5                   10                  15

Ala Glu Pro Ala Ala Pro Ala Pro Glu Ala Pro Ala Ala Glu Pro Ala
            20                  25                  30

Ala Pro Ala Pro Ala Glu Pro Ala Ala Pro Ala Pro Glu Ala Pro Ala
        35                  40                  45

Ala Glu Pro Ala Ala Pro Ala Pro Ala Glu Pro Ala Ala Pro Ala Pro
    50                  55                  60

Glu Ala Pro Ala Ala Glu Pro Ala Ala Pro Ala Pro Ala Glu Pro Ala
65                  70                  75                  80

Ala Pro Ala Pro Glu Ala Pro Ala Ala Glu Pro Ala Ala Pro Ala Pro
                85                  90                  95

Ala Glu Pro Ala
        100
```

<210> SEQ ID NO 64
<211> LENGTH: 120
<212> TYPE: PRT
<213> ORGANISM: Artificial Sequence
<220> FEATURE:
<223> OTHER INFORMATION: Polypeptide complex unit

<400> SEQUENCE: 64

```
Ala Ala Pro Pro Ala Pro Ala Pro Ala Ala Glu Glu Ala Pro Ala
1               5                   10                  15

Glu Ala Pro Ala Ala Ala Pro Pro Ala Pro Ala Pro Ala Ala Glu
            20                  25                  30

Glu Ala Pro Ala Glu Ala Pro Ala Ala Ala Pro Pro Ala Pro Ala Pro
        35                  40                  45

Ala Ala Ala Glu Glu Ala Pro Ala Glu Ala Pro Ala Ala Ala Pro Pro
    50                  55                  60

Ala Pro Ala Pro Ala Ala Ala Glu Glu Ala Pro Ala Glu Ala Pro Ala
65                  70                  75                  80

Ala Ala Pro Pro Ala Pro Ala Pro Ala Ala Ala Glu Glu Ala Pro Ala
                85                  90                  95

Glu Ala Pro Ala Ala Ala Pro Pro Ala Pro Ala Pro Ala Ala Ala Glu
        100                 105                 110

Glu Ala Pro Ala Glu Ala Pro Ala
        115                 120
```

<210> SEQ ID NO 65
<211> LENGTH: 160
<212> TYPE: PRT
<213> ORGANISM: Artificial Sequence
<220> FEATURE:
<223> OTHER INFORMATION: Polypeptide complex unit

<400> SEQUENCE: 65

Ala Glu Pro Ala Ala Pro Ala Ala Pro Glu Pro Glu Pro Ala Ala Pro
1               5                   10                  15

Ala Glu Ala Ala Ala Glu Pro Ala Ala Pro Ala Ala Pro Glu Pro Glu
            20                  25                  30

Pro Ala Ala Pro Ala Glu Ala Ala Ala Glu Pro Ala Ala Pro Ala Ala
            35                  40                  45

Pro Glu Pro Glu Pro Ala Ala Pro Ala Glu Ala Ala Ala Glu Pro Ala
    50                  55                  60

Ala Pro Ala Ala Pro Glu Pro Glu Pro Ala Ala Pro Ala Glu Ala Ala
65                  70                  75                  80

Ala Glu Pro Ala Ala Pro Ala Ala Pro Glu Pro Glu Pro Ala Ala Pro
                85                  90                  95

Ala Glu Ala Ala Ala Glu Pro Ala Ala Pro Ala Ala Pro Glu Pro Glu
            100                 105                 110

Pro Ala Ala Pro Ala Glu Ala Ala Ala Glu Pro Ala Ala Pro Ala Ala
            115                 120                 125

Pro Glu Pro Glu Pro Ala Ala Pro Ala Glu Ala Ala Ala Glu Pro Ala
    130                 135                 140

Ala Pro Ala Ala Pro Glu Pro Glu Pro Ala Ala Pro Ala Glu Ala Ala
145                 150                 155                 160

<210> SEQ ID NO 66
<211> LENGTH: 200
<212> TYPE: PRT
<213> ORGANISM: Artificial Sequence
<220> FEATURE:
<223> OTHER INFORMATION: Polypeptide complex unit

<400> SEQUENCE: 66

Ala Pro Pro Glu Pro Pro Ala Glu Ala Ala Pro Ala Ala Ala Glu Ala
1               5                   10                  15

Pro Ala Glu Ala Ala Pro Pro Glu Pro Pro Ala Glu Ala Ala Pro Ala
            20                  25                  30

Ala Ala Glu Ala Pro Ala Glu Ala Ala Pro Pro Glu Pro Pro Ala Glu
            35                  40                  45

Ala Ala Pro Ala Ala Ala Glu Ala Pro Ala Glu Ala Ala Pro Pro Glu
    50                  55                  60

Pro Pro Ala Glu Ala Ala Pro Ala Ala Ala Glu Ala Pro Ala Glu Ala
65                  70                  75                  80

Ala Pro Pro Glu Pro Pro Ala Glu Ala Ala Pro Ala Ala Ala Glu Ala
                85                  90                  95

Pro Ala Glu Ala Ala Pro Pro Glu Pro Pro Ala Glu Ala Ala Pro Ala
            100                 105                 110

Ala Ala Glu Ala Pro Ala Glu Ala Ala Pro Pro Glu Pro Pro Ala Glu
            115                 120                 125

Ala Ala Pro Ala Ala Ala Glu Ala Pro Ala Glu Ala Ala Pro Pro Glu
            130                 135                 140

Pro Pro Ala Glu Ala Ala Pro Ala Ala Ala Glu Ala Pro Ala Glu Ala
145                 150                 155                 160

Ala Pro Pro Glu Pro Pro Ala Glu Ala Ala Pro Ala Ala Ala Glu Ala
                165                 170                 175

Pro Ala Glu Ala Ala Pro Pro Glu Pro Pro Ala Glu Ala Ala Pro Ala
            180                 185                 190

Ala Ala Glu Ala Pro Ala Glu Ala
        195                 200

<210> SEQ ID NO 67
<211> LENGTH: 140
<212> TYPE: PRT
<213> ORGANISM: Artificial Sequence
<220> FEATURE:
<223> OTHER INFORMATION: Polypeptide complex unit

<400> SEQUENCE: 67

Ala Ala Pro Ala Ala Ala Glu Pro Pro Ala Ala Glu Ala Glu Ala Pro
1               5                   10                  15

Ala Pro Pro Ala Ala Ala Pro Ala Ala Ala Glu Pro Pro Ala Ala Glu
            20                  25                  30

Ala Glu Ala Pro Ala Pro Pro Ala Ala Ala Pro Ala Ala Ala Glu Pro
        35                  40                  45

Pro Ala Ala Glu Ala Glu Ala Pro Ala Pro Pro Ala Ala Ala Pro Ala
    50                  55                  60

Ala Ala Glu Pro Pro Ala Ala Glu Ala Glu Ala Pro Ala Pro Pro Ala
65                  70                  75                  80

Ala Ala Pro Ala Ala Ala Glu Pro Pro Ala Ala Glu Ala Glu Ala Pro
                85                  90                  95

Ala Pro Pro Ala Ala Ala Pro Ala Ala Ala Glu Pro Pro Ala Ala Glu
            100                 105                 110

Ala Glu Ala Pro Ala Pro Pro Ala Ala Ala Pro Ala Ala Ala Glu Pro
        115                 120                 125

Pro Ala Ala Glu Ala Glu Ala Pro Ala Pro Pro Ala
    130                 135                 140

<210> SEQ ID NO 68
<211> LENGTH: 220
<212> TYPE: PRT
<213> ORGANISM: Artificial Sequence
<220> FEATURE:
<223> OTHER INFORMATION: Polypeptide complex unit

<400> SEQUENCE: 68

Ala Pro Ala Ala Pro Pro Glu Glu Ala Ala Ala Glu Pro Pro Ala Ala
1               5                   10                  15

Glu Ala Ala Pro Ala Pro Ala Pro Pro Glu Glu Ala Ala Ala Glu
            20                  25                  30

Pro Pro Ala Ala Glu Ala Ala Pro Ala Pro Ala Ala Pro Pro Glu Glu
        35                  40                  45

Ala Ala Ala Glu Pro Pro Ala Ala Glu Ala Ala Pro Ala Pro Ala Ala
    50                  55                  60

Pro Pro Glu Glu Ala Ala Ala Glu Pro Pro Ala Ala Glu Ala Ala Pro
65                  70                  75                  80

Ala Pro Ala Ala Pro Pro Glu Glu Ala Ala Ala Glu Pro Pro Ala Ala
                85                  90                  95

Glu Ala Ala Pro Ala Pro Ala Ala Pro Pro Glu Glu Ala Ala Ala Glu
            100                 105                 110

Pro Pro Ala Ala Glu Ala Ala Pro Ala Pro Ala Ala Pro Pro Glu Glu
        115                 120                 125

Ala Ala Ala Glu Pro Pro Ala Ala Glu Ala Ala Pro Ala Pro Ala Ala
    130                 135                 140

Pro Pro Glu Glu Ala Ala Ala Glu Pro Pro Ala Ala Glu Ala Ala Pro
145                 150                 155                 160

Ala Pro Ala Ala Pro Pro Glu Glu Ala Ala Glu Pro Pro Ala Ala
                165                 170                 175

Glu Ala Ala Pro Ala Pro Ala Ala Pro Pro Glu Ala Ala Ala Glu
                180                 185                 190

Pro Pro Ala Ala Glu Ala Ala Pro Ala Pro Ala Ala Pro Pro Glu Glu
        195                 200                 205

Ala Ala Ala Glu Pro Pro Ala Ala Glu Ala Ala Pro
        210                 215                 220

<210> SEQ ID NO 69
<211> LENGTH: 180
<212> TYPE: PRT
<213> ORGANISM: Artificial Sequence
<220> FEATURE:
<223> OTHER INFORMATION: Polypeptide complex unit

<400> SEQUENCE: 69

Ala Ala Glu Ala Ala Pro Ala Ala Pro Ala Pro Glu Pro Ala Glu
1               5                   10                  15

Glu Ala Ala Pro Ala Ala Glu Ala Ala Pro Ala Ala Pro Ala Ala Pro
                20                  25                  30

Glu Pro Ala Glu Glu Ala Ala Pro Ala Ala Glu Ala Ala Pro Ala Ala
        35                  40                  45

Pro Ala Ala Pro Glu Pro Ala Glu Glu Ala Ala Pro Ala Ala Glu Ala
    50                  55                  60

Ala Pro Ala Ala Pro Ala Ala Pro Glu Pro Ala Glu Glu Ala Ala Pro
65                  70                  75                  80

Ala Ala Glu Ala Ala Pro Ala Ala Pro Ala Ala Pro Glu Pro Ala Glu
                85                  90                  95

Glu Ala Ala Pro Ala Ala Glu Ala Ala Pro Ala Ala Pro Ala Ala Pro
            100                 105                 110

Glu Pro Ala Glu Glu Ala Ala Pro Ala Ala Glu Ala Ala Pro Ala Ala
        115                 120                 125

Pro Ala Ala Pro Glu Pro Ala Glu Glu Ala Ala Pro Ala Ala Glu Ala
    130                 135                 140

Ala Pro Ala Ala Pro Ala Ala Pro Glu Pro Ala Glu Glu Ala Ala Pro
145                 150                 155                 160

Ala Ala Glu Ala Ala Pro Ala Pro Ala Ala Pro Glu Pro Ala Glu
                165                 170                 175

Glu Ala Ala Pro
        180

<210> SEQ ID NO 70
<211> LENGTH: 140
<212> TYPE: PRT
<213> ORGANISM: Artificial Sequence
<220> FEATURE:
<223> OTHER INFORMATION: Polypeptide complex unit

<400> SEQUENCE: 70

Ala Pro Glu Ala Ala Pro Ala Ala Ala Glu Pro Ala Pro Ala Pro Ala
1               5                   10                  15

Ala Pro Glu Pro Ala Pro Glu Ala Ala Pro Ala Ala Ala Glu Pro Ala
                20                  25                  30

Pro Ala Pro Ala Ala Pro Glu Pro Ala Pro Glu Ala Ala Pro Ala Ala
        35                  40                  45

Ala Glu Pro Ala Pro Ala Pro Ala Ala Pro Glu Pro Ala Pro Glu Ala

```
Ala Pro Ala Ala Glu Pro Ala Pro Ala Pro Ala Ala Pro Glu Pro
65                  70                  75                  80

Ala Pro Glu Ala Ala Pro Ala Ala Glu Pro Ala Pro Ala Pro Ala
                85                  90                  95

Ala Pro Glu Pro Ala Pro Glu Ala Ala Pro Ala Ala Ala Glu Pro Ala
            100                 105                 110

Pro Ala Pro Ala Ala Pro Glu Pro Ala Pro Glu Ala Ala Pro Ala Ala
            115                 120                 125

Ala Glu Pro Ala Pro Ala Pro Ala Ala Pro Glu Pro
        130                 135                 140

<210> SEQ ID NO 71
<211> LENGTH: 160
<212> TYPE: PRT
<213> ORGANISM: Artificial Sequence
<220> FEATURE:
<223> OTHER INFORMATION: Polypeptide complex unit

<400> SEQUENCE: 71

Ala Pro Ala Glu Ala Ala Glu Ala Ala Pro Glu Ala Pro Glu Pro Ala
1               5                   10                  15

Ala Pro Ala Ala Ala Pro Ala Glu Ala Ala Glu Ala Ala Pro Glu Ala
                20                  25                  30

Pro Glu Pro Ala Ala Pro Ala Ala Ala Pro Ala Glu Ala Ala Glu Ala
            35                  40                  45

Ala Pro Glu Ala Pro Glu Pro Ala Ala Pro Ala Ala Ala Pro Ala Glu
        50                  55                  60

Ala Ala Glu Ala Ala Pro Glu Ala Pro Glu Pro Ala Ala Pro Ala Ala
65                  70                  75                  80

Ala Pro Ala Glu Ala Ala Glu Ala Ala Pro Glu Ala Pro Glu Pro Ala
                85                  90                  95

Ala Pro Ala Ala Ala Pro Ala Glu Ala Ala Glu Ala Ala Pro Glu Ala
            100                 105                 110

Pro Glu Pro Ala Ala Pro Ala Ala Ala Pro Ala Glu Ala Ala Glu Ala
            115                 120                 125

Ala Pro Glu Ala Pro Glu Pro Ala Ala Pro Ala Ala Ala Pro Ala Glu
        130                 135                 140

Ala Ala Glu Ala Ala Pro Glu Ala Pro Glu Pro Ala Ala Pro Ala Ala
145                 150                 155                 160

<210> SEQ ID NO 72
<211> LENGTH: 100
<212> TYPE: PRT
<213> ORGANISM: Artificial Sequence
<220> FEATURE:
<223> OTHER INFORMATION: Polypeptide complex unit

<400> SEQUENCE: 72

Ala Glu Ala Ala Ala Pro Ala Glu Ala Ala Pro Ala Pro Ala Pro Glu
1               5                   10                  15

Ala Pro Ala Pro Ala Glu Ala Ala Ala Pro Ala Glu Ala Ala Pro Ala
                20                  25                  30

Pro Ala Pro Glu Ala Pro Ala Pro Glu Ala Ala Ala Pro Ala Glu
            35                  40                  45

Ala Ala Pro Ala Pro Ala Pro Glu Ala Pro Ala Pro Glu Ala Ala
        50                  55                  60
```

Ala Pro Ala Glu Ala Pro Ala Pro Glu Ala Pro Ala Pro
65                  70                  75                  80

Ala Glu Ala Ala Ala Pro Ala Glu Ala Pro Ala Pro Ala Pro Glu
                85                  90                  95

Ala Pro Ala Pro
        100

<210> SEQ ID NO 73
<211> LENGTH: 120
<212> TYPE: PRT
<213> ORGANISM: Artificial Sequence
<220> FEATURE:
<223> OTHER INFORMATION: Polypeptide complex unit

<400> SEQUENCE: 73

Ala Ala Glu Ala Ala Glu Ala Ala Pro Ala Glu Pro Glu Pro Pro Ala
1               5                   10                  15

Pro Pro Ala Pro Ala Ala Glu Ala Ala Glu Ala Ala Pro Ala Glu Pro
                20                  25                  30

Glu Pro Pro Ala Pro Pro Ala Pro Ala Ala Glu Ala Ala Glu Ala Ala
            35                  40                  45

Pro Ala Glu Pro Glu Pro Pro Ala Pro Pro Ala Pro Ala Ala Glu Ala
        50                  55                  60

Ala Glu Ala Ala Pro Ala Glu Pro Glu Pro Pro Ala Pro Pro Ala Pro
65                  70                  75                  80

Ala Ala Glu Ala Ala Glu Ala Ala Pro Ala Glu Pro Glu Pro Pro Ala
                85                  90                  95

Pro Pro Ala Pro Ala Ala Glu Ala Ala Glu Ala Ala Pro Ala Glu Pro
            100                 105                 110

Glu Pro Pro Ala Pro Pro Ala Pro
        115                 120

<210> SEQ ID NO 74
<211> LENGTH: 160
<212> TYPE: PRT
<213> ORGANISM: Artificial Sequence
<220> FEATURE:
<223> OTHER INFORMATION: Polypeptide complex unit

<400> SEQUENCE: 74

Ala Glu Ala Ala Glu Ala Pro Ala Pro Ala Pro Pro Ala Ala Pro
1               5                   10                  15

Ala Pro Glu Pro Ala Glu Ala Ala Glu Ala Pro Ala Pro Ala Ala Pro
                20                  25                  30

Pro Ala Ala Pro Ala Pro Glu Pro Ala Glu Ala Ala Glu Ala Pro Ala
            35                  40                  45

Pro Ala Ala Pro Pro Ala Ala Pro Ala Pro Glu Pro Ala Glu Ala Ala
        50                  55                  60

Glu Ala Pro Ala Pro Ala Ala Pro Pro Ala Ala Pro Ala Pro Glu Pro
65                  70                  75                  80

Ala Glu Ala Ala Glu Ala Pro Ala Pro Ala Ala Pro Pro Ala Ala Pro
                85                  90                  95

Ala Pro Glu Pro Ala Glu Ala Ala Glu Ala Pro Ala Pro Ala Ala Pro
            100                 105                 110

Pro Ala Ala Pro Ala Pro Glu Pro Ala Glu Ala Ala Glu Ala Pro Ala
        115                 120                 125

Pro Ala Ala Pro Pro Ala Ala Pro Ala Pro Glu Pro Ala Glu Ala Ala
        130                 135                 140

```
Glu Ala Pro Ala Pro Ala Ala Pro Ala Ala Pro Ala Pro Glu Pro
145                 150                 155                 160
```

<210> SEQ ID NO 75
<211> LENGTH: 180
<212> TYPE: PRT
<213> ORGANISM: Artificial Sequence
<220> FEATURE:
<223> OTHER INFORMATION: Polypeptide complex unit

<400> SEQUENCE: 75

```
Ala Pro Glu Ala Pro Ala Glu Glu Ala Glu Pro Ala Ala Ala Pro Pro
1               5                   10                  15

Ala Glu Ala Pro Ala Pro Glu Ala Pro Ala Glu Glu Ala Glu Pro Ala
                20                  25                  30

Ala Ala Pro Pro Ala Glu Ala Pro Ala Pro Glu Ala Pro Ala Glu Glu
            35                  40                  45

Ala Glu Pro Ala Ala Ala Pro Pro Ala Glu Ala Pro Ala Pro Glu Ala
        50                  55                  60

Pro Ala Glu Glu Ala Glu Pro Ala Ala Ala Pro Pro Ala Glu Ala Pro
65                  70                  75                  80

Ala Pro Glu Ala Pro Ala Glu Glu Ala Glu Pro Ala Ala Ala Pro Pro
                85                  90                  95

Ala Glu Ala Pro Ala Pro Glu Ala Pro Ala Glu Glu Ala Glu Pro Ala
                100                 105                 110

Ala Ala Pro Pro Ala Glu Ala Pro Ala Pro Glu Ala Pro Ala Glu Glu
            115                 120                 125

Ala Glu Pro Ala Ala Ala Pro Pro Ala Glu Ala Pro Ala Pro Glu Ala
        130                 135                 140

Pro Ala Glu Glu Ala Glu Pro Ala Ala Ala Pro Pro Ala Glu Ala Pro
145                 150                 155                 160

Ala Pro Glu Ala Pro Ala Glu Glu Ala Glu Pro Ala Ala Ala Pro Pro
                165                 170                 175

Ala Glu Ala Pro
            180
```

<210> SEQ ID NO 76
<211> LENGTH: 240
<212> TYPE: PRT
<213> ORGANISM: Artificial Sequence
<220> FEATURE:
<223> OTHER INFORMATION: Polypeptide complex unit

<400> SEQUENCE: 76

```
Ala Pro Ala Pro Pro Ala Glu Ala Glu Ala Glu Ala Pro Pro Ala Ala
1               5                   10                  15

Pro Glu Pro Ala Ala Pro Ala Pro Ala Glu Ala Glu Ala Glu Ala
                20                  25                  30

Pro Pro Ala Ala Pro Glu Pro Ala Ala Pro Ala Pro Pro Ala Glu Ala
            35                  40                  45

Glu Ala Glu Ala Pro Pro Ala Ala Pro Glu Pro Ala Ala Pro Ala Pro
        50                  55                  60

Pro Ala Glu Ala Glu Ala Glu Ala Pro Pro Ala Ala Pro Glu Pro Ala
65                  70                  75                  80

Ala Pro Ala Pro Pro Ala Glu Ala Glu Ala Glu Ala Pro Pro Ala Ala
                85                  90                  95

Pro Glu Pro Ala Ala Pro Ala Pro Pro Ala Glu Ala Glu Ala Glu Ala
```

```
                100                 105                 110
Pro Pro Ala Ala Pro Glu Pro Ala Ala Pro Ala Pro Ala Glu Ala
            115                 120                 125
Glu Ala Glu Ala Pro Ala Ala Pro Glu Pro Ala Ala Pro Ala Pro
            130                 135                 140
Pro Ala Glu Ala Glu Ala Glu Ala Pro Pro Ala Pro Glu Pro Ala
145                 150                 155                 160
Ala Pro Ala Pro Pro Ala Glu Ala Glu Ala Glu Ala Pro Pro Ala Ala
                165                 170                 175
Pro Glu Pro Ala Ala Pro Ala Pro Pro Ala Glu Ala Glu Ala Glu Ala
            180                 185                 190
Pro Pro Ala Ala Pro Glu Pro Ala Ala Pro Ala Pro Pro Ala Glu Ala
            195                 200                 205
Glu Ala Glu Ala Pro Pro Ala Ala Pro Glu Pro Ala Ala Pro Ala Pro
            210                 215                 220
Pro Ala Glu Ala Glu Ala Glu Ala Pro Pro Ala Ala Pro Glu Pro Ala
225                 230                 235                 240
```

<210> SEQ ID NO 77
<211> LENGTH: 280
<212> TYPE: PRT
<213> ORGANISM: Artificial Sequence
<220> FEATURE:
<223> OTHER INFORMATION: Polypeptide complex unit

<400> SEQUENCE: 77

```
Ala Glu Pro Ala Pro Ala Ala Glu Pro Ala Pro Pro Ala Ala Glu
1               5                   10                  15
Ala Ala Glu Pro Ala Ala Pro Ala Glu Pro Glu Ala Pro Glu Ala
            20                  25                  30
Pro Pro Ala Pro Ala Pro Glu Pro Ala Pro Ala Ala Glu Ala Ala Pro
            35                  40                  45
Pro Ala Glu Ala Ala Glu Pro Glu Pro Glu Ala Pro Ala Pro Ala Ala
            50                  55                  60
Glu Ala Ala Pro Pro Ala Glu Ala Ala Glu Pro Glu Pro Glu Ala Pro
65                  70                  75                  80
Ala Pro Ala Pro Pro Glu Ala Glu Glu Pro Pro Glu Ala Ala Pro Ala
                85                  90                  95
Pro Ala Pro Ala Ala Pro Pro Glu Ala Pro Glu Ala Pro Glu Ala Ala
            100                 105                 110
Pro Ala Ala Pro Glu Pro Ala Glu Ala Ala Glu Ala Pro Ala Pro Glu
            115                 120                 125
Pro Ala Ala Glu Pro Glu Pro Ala Pro Glu Ala Pro Ala Ala Glu Ala
            130                 135                 140
Pro Ala Pro Glu Pro Ala Ala Glu Pro Glu Pro Ala Pro Glu Ala Pro
145                 150                 155                 160
Ala Ala Glu Ala Pro Ala Pro Glu Pro Ala Ala Glu Pro Glu Pro Ala
                165                 170                 175
Pro Glu Ala Pro Ala Pro Ala Pro Pro Glu Ala Glu Glu Pro Pro Glu
            180                 185                 190
Ala Ala Pro Ala Pro Ala Pro Ala Ala Glu Pro Ala Pro Pro Glu Glu
            195                 200                 205
Ala Ala Pro Ala Ala Pro Ala Ala Pro Glu Pro Glu Ala Ala Pro Ala
            210                 215                 220
Glu Glu Ala Glu Ala Pro Glu Ala Pro Pro Ala Pro Ala Pro Glu Pro
```

```
                225                 230                 235                 240
Ala Pro Pro Ala Glu Glu Pro Ala Glu Ala Pro Ala Glu Pro Pro Ala
                    245                 250                 255
Ala Pro Glu Ala Ala Ala Glu Ala Glu Ala Glu Ala Glu Pro Pro
                260                 265                 270
Ala Pro Pro Ala Pro Glu Pro Ala
            275                 280

<210> SEQ ID NO 78
<211> LENGTH: 300
<212> TYPE: PRT
<213> ORGANISM: Artificial Sequence
<220> FEATURE:
<223> OTHER INFORMATION: Polypeptide complex unit

<400> SEQUENCE: 78

Ala Ala Glu Ala Pro Ala Ala Pro Pro Ala Pro Glu Pro Glu Ala Glu
1               5                   10                  15
Pro Glu Pro Ala Ala Ala Glu Ala Pro Ala Ala Pro Pro Ala Pro Glu
                20                  25                  30
Pro Glu Ala Glu Pro Glu Pro Ala Ala Pro Glu Glu Pro Ala Pro Glu
            35                  40                  45
Ala Pro Ala Ala Pro Ala Glu Ala Pro Pro Ala Pro Ala Pro Pro Ala
        50                  55                  60
Glu Glu Pro Ala Glu Ala Pro Ala Glu Pro Pro Ala Ala Pro Glu Ala
65                  70                  75                  80
Ala Pro Pro Glu Ala Glu Pro Pro Glu Ala Pro Glu Ala Ala Glu Ala
                85                  90                  95
Ala Pro Ala Pro Ala Ala Pro Ala Glu Glu Ala Glu Ala Pro Glu Ala
                100                 105                 110
Pro Pro Ala Pro Ala Pro Glu Pro Ala Pro Glu Ala Pro Ala Ala
            115                 120                 125
Ala Glu Glu Ala Pro Pro Ala Glu Pro Ala Pro Glu Ala Pro Pro Ala
        130                 135                 140
Glu Glu Pro Ala Glu Ala Pro Ala Glu Pro Pro Ala Ala Pro Glu Ala
145                 150                 155                 160
Ala Ala Glu Ala Pro Ala Pro Glu Pro Ala Ala Glu Pro Glu Pro Ala
                165                 170                 175
Pro Glu Ala Pro Ala Glu Pro Ala Pro Pro Ala Ala Glu Pro Ala Pro
                180                 185                 190
Pro Ala Ala Glu Ala Ala Glu Pro Ala Glu Pro Ala Pro Pro Ala Ala
            195                 200                 205
Glu Pro Ala Pro Pro Ala Ala Glu Ala Ala Glu Pro Ala Pro Pro Ala
        210                 215                 220
Glu Glu Pro Ala Glu Ala Pro Ala Glu Pro Pro Ala Ala Pro Glu Ala
225                 230                 235                 240
Ala Ala Pro Ala Glu Glu Ala Glu Ala Pro Glu Ala Pro Pro Ala Pro
                245                 250                 255
Ala Pro Glu Pro Ala Glu Pro Ala Pro Pro Ala Ala Glu Pro Ala Pro
                260                 265                 270
Pro Ala Ala Glu Ala Ala Glu Pro Ala Ala Glu Ala Pro Ala Ala Pro
            275                 280                 285
Pro Ala Pro Glu Pro Glu Ala Glu Pro Glu Pro Ala
        290                 295                 300
```

<210> SEQ ID NO 79
<211> LENGTH: 340
<212> TYPE: PRT
<213> ORGANISM: Artificial Sequence
<220> FEATURE:
<223> OTHER INFORMATION: Polypeptide complex unit

<400> SEQUENCE: 79

```
Ala Pro Pro Glu Ala Pro Glu Ala Pro Glu Ala Ala Pro Ala Ala Pro
1               5                   10                  15

Glu Pro Ala Glu Ala Pro Pro Ala Glu Pro Ala Glu Ala Ala Pro Ala
                20                  25                  30

Glu Pro Pro Ala Ala Pro Glu Ala Ala Pro Ala Pro Pro Glu Ala Glu
            35                  40                  45

Glu Pro Pro Glu Ala Ala Pro Ala Pro Ala Pro Ala Ala Ala Glu Ala
        50                  55                  60

Glu Ala Ala Glu Ala Glu Pro Pro Ala Pro Pro Pro Glu Pro Pro Ala
65                  70                  75                  80

Ala Pro Pro Glu Ala Glu Pro Pro Glu Ala Pro Glu Ala Ala Glu Ala
                85                  90                  95

Ala Pro Ala Pro Ala Pro Ala Glu Ala Ala Pro Pro Ala Glu Ala Ala
                100                 105                 110

Ala Glu Pro Glu Pro Glu Ala Pro Ala Ala Glu Ala Glu Ala Ala Glu
            115                 120                 125

Ala Glu Pro Pro Ala Pro Ala Pro Ala Glu Pro Ala Ala Pro Pro Ala
        130                 135                 140

Glu Glu Pro Ala Glu Ala Pro Pro Glu Pro Pro Ala Ala Pro Glu Ala
145                 150                 155                 160

Ala Ala Glu Ala Pro Ala Ala Pro Pro Ala Pro Glu Pro Glu Ala Glu
                165                 170                 175

Pro Glu Pro Ala Ala Pro Ala Pro Pro Glu Ala Glu Glu Pro Pro Glu
            180                 185                 190

Ala Ala Pro Ala Pro Ala Pro Ala Ala Glu Pro Ala Pro Pro Ala Ala
            195                 200                 205

Glu Pro Ala Pro Pro Ala Ala Glu Ala Ala Glu Pro Ala Pro Ala Pro
        210                 215                 220

Pro Glu Ala Glu Glu Pro Pro Glu Ala Ala Pro Ala Pro Ala Pro Ala
225                 230                 235                 240

Ala Pro Ala Glu Ala Pro Ala Ala Glu Glu Pro Pro Ala Pro Ala Glu
                245                 250                 255

Pro Ala Pro Glu Ala Pro Ala Ala Glu Ala Pro Pro Ala Glu Ala Ala
            260                 265                 270

Ala Glu Pro Glu Pro Glu Ala Pro Ala Pro Ala Glu Glu Pro Ala Ala
        275                 280                 285

Glu Ala Pro Ala Glu Pro Pro Ala Ala Pro Ala Ala Pro Glu Glu Ala
        290                 295                 300

Pro Ala Pro Glu Ala Pro Ala Ala Pro Ala Glu Ala Pro Pro Ala Pro
305                 310                 315                 320

Ala Glu Pro Ala Pro Pro Glu Glu Ala Ala Pro Ala Ala Pro Ala Ala
                325                 330                 335

Pro Glu Pro Glu
            340
```

<210> SEQ ID NO 80
<211> LENGTH: 260
<212> TYPE: PRT

-continued

<213> ORGANISM: Artificial Sequence
<220> FEATURE:
<223> OTHER INFORMATION: Polypeptide complex unit

<400> SEQUENCE: 80

Ala Pro Ala Ala Glu Ala Ala Pro Pro Ala Glu Ala Ala Glu Pro Glu
1               5                   10                  15

Pro Glu Ala Pro Ala Ala Pro Ala Glu Glu Ala Glu Ala Pro Glu Ala
                20                  25                  30

Pro Pro Ala Pro Ala Pro Glu Ala Glu Pro Ala Pro Pro Glu Glu
            35                  40                  45

Ala Ala Pro Ala Ala Pro Ala Ala Pro Glu Pro Glu Ala Pro Ala Glu
50                  55                  60

Ala Pro Ala Ala Ala Glu Glu Ala Pro Pro Ala Glu Pro Ala Pro Glu
65                  70                  75                  80

Ala Pro Pro Glu Ala Pro Glu Ala Pro Glu Ala Ala Pro Ala Ala Pro
                85                  90                  95

Glu Pro Ala Glu Ala Pro Ala Ala Glu Ala Ala Pro Pro Ala Glu Ala
                100                 105                 110

Ala Glu Pro Glu Pro Glu Ala Pro Ala Pro Ala Ala Glu Ala Ala Pro
        115                 120                 125

Pro Ala Glu Ala Ala Glu Pro Glu Pro Glu Ala Pro Ala Pro Ala Pro
        130                 135                 140

Pro Glu Ala Glu Glu Pro Glu Ala Ala Pro Ala Pro Ala Pro Pro Ala
145                 150                 155                 160

Ala Glu Pro Ala Pro Pro Glu Glu Ala Ala Pro Ala Ala Pro Ala Ala
                165                 170                 175

Pro Glu Pro Glu Ala Pro Ala Pro Pro Glu Ala Glu Glu Pro Pro Glu
                180                 185                 190

Ala Ala Pro Ala Pro Ala Pro Ala Ala Pro Ala Glu Glu Ala Glu
                195                 200                 205

Ala Pro Glu Ala Pro Pro Ala Pro Ala Pro Glu Pro Ala Pro Pro Ala
        210                 215                 220

Glu Glu Pro Ala Glu Ala Pro Ala Glu Pro Pro Ala Ala Pro Glu Ala
225                 230                 235                 240

Ala Ala Glu Ala Pro Ala Ala Pro Pro Ala Pro Glu Pro Glu Ala Glu
                245                 250                 255

Pro Glu Pro Ala
        260

<210> SEQ ID NO 81
<211> LENGTH: 340
<212> TYPE: PRT
<213> ORGANISM: Artificial Sequence
<220> FEATURE:
<223> OTHER INFORMATION: Polypeptide complex unit

<400> SEQUENCE: 81

Ala Pro Ala Pro Pro Glu Ala Glu Glu Pro Glu Ala Ala Pro Ala
1               5                   10                  15

Pro Ala Pro Ala Ala Glu Pro Ala Pro Pro Glu Glu Ala Ala Pro Ala
                20                  25                  30

Ala Pro Ala Ala Pro Glu Pro Glu Ala Pro Ala Pro Pro Glu Ala Glu
        35                  40                  45

Glu Pro Pro Glu Ala Ala Pro Ala Pro Ala Pro Ala Ala Pro Ala Ala
        50                  55                  60

Glu Ala Ala Pro Pro Ala Glu Ala Glu Pro Glu Pro Glu Ala Pro
65                  70                  75                  80

Ala Ala Glu Ala Glu Ala Ala Glu Ala Glu Pro Pro Ala Pro Pro Ala
                85                  90                  95

Pro Glu Pro Ala Ala Pro Ala Ala Glu Ala Ala Pro Pro Ala Glu Ala
            100                 105                 110

Ala Glu Pro Glu Pro Glu Ala Pro Ala Pro Pro Glu Ala Pro Glu Ala
            115                 120                 125

Pro Glu Ala Ala Pro Ala Ala Pro Glu Pro Ala Glu Ala Ala Glu Ala
        130                 135                 140

Pro Ala Ala Pro Pro Ala Pro Glu Pro Glu Ala Glu Pro Glu Pro Ala
145                 150                 155                 160

Ala Ala Glu Ala Pro Ala Ala Pro Pro Ala Pro Glu Pro Glu Ala Glu
                165                 170                 175

Pro Glu Pro Ala Ala Ala Glu Ala Glu Ala Ala Glu Ala Glu Pro Pro
            180                 185                 190

Ala Pro Pro Ala Pro Glu Pro Ala Ala Pro Pro Ala Glu Glu Pro Ala
        195                 200                 205

Glu Ala Pro Ala Glu Pro Pro Ala Ala Pro Glu Ala Ala Pro Ala Pro
    210                 215                 220

Pro Glu Ala Glu Glu Pro Pro Glu Ala Ala Pro Ala Pro Ala Pro Ala
225                 230                 235                 240

Ala Ala Glu Ala Pro Ala Pro Glu Pro Ala Ala Glu Pro Glu Pro Ala
                245                 250                 255

Pro Glu Ala Pro Ala Glu Pro Ala Pro Pro Ala Ala Glu Pro Ala Pro
            260                 265                 270

Pro Ala Ala Glu Ala Ala Glu Pro Ala Ala Pro Ala Glu Glu Ala Glu
        275                 280                 285

Ala Pro Glu Ala Pro Pro Ala Pro Ala Pro Glu Pro Ala Pro Ala Ala
        290                 295                 300

Glu Ala Ala Pro Pro Ala Glu Ala Ala Glu Pro Glu Pro Glu Ala Pro
305                 310                 315                 320

Ala Ala Glu Ala Glu Ala Ala Glu Ala Glu Pro Pro Ala Pro Pro Ala
                325                 330                 335

Pro Glu Pro Ala
            340

<210> SEQ ID NO 82
<211> LENGTH: 320
<212> TYPE: PRT
<213> ORGANISM: Artificial Sequence
<220> FEATURE:
<223> OTHER INFORMATION: Polypeptide complex unit

<400> SEQUENCE: 82

Ala Pro Pro Glu Ala Pro Glu Ala Pro Glu Ala Ala Pro Ala Ala Pro
1               5                   10                  15

Glu Pro Ala Glu Ala Pro Pro Glu Pro Glu Ala Pro Glu Ala Ala
                20                  25                  30

Pro Ala Ala Pro Glu Pro Ala Glu Ala Ala Pro Ala Glu Glu Ala Glu
        35                  40                  45

Ala Pro Glu Ala Pro Pro Ala Pro Ala Pro Glu Pro Ala Pro Pro Glu
        50                  55                  60

Ala Pro Glu Ala Pro Glu Ala Ala Pro Ala Ala Pro Glu Pro Ala Glu
65                  70                  75                  80

Ala Pro Ala Pro Pro Glu Ala Glu Glu Pro Pro Glu Ala Ala Pro Ala
            85                  90                  95

Pro Ala Pro Ala Ala Glu Pro Ala Pro Pro Glu Glu Ala Ala Pro Ala
               100                 105                 110

Ala Pro Ala Ala Pro Glu Pro Glu Ala Pro Pro Ala Glu Glu Pro Ala
            115                 120                 125

Glu Ala Pro Ala Glu Pro Pro Ala Ala Pro Glu Ala Ala Pro Pro Ala
         130                 135                 140

Glu Glu Pro Ala Glu Ala Pro Ala Glu Pro Pro Ala Ala Pro Glu Ala
145                 150                 155                 160

Ala Pro Ala Glu Ala Pro Ala Ala Glu Glu Ala Pro Pro Ala Pro Glu
            165                 170                 175

Pro Ala Pro Glu Ala Pro Ala Ala Glu Ala Ala Pro Pro Ala Glu Ala
            180                 185                 190

Ala Glu Pro Glu Pro Glu Ala Pro Ala Glu Pro Ala Pro Pro Ala Ala
            195                 200                 205

Glu Pro Ala Pro Pro Ala Ala Glu Ala Ala Glu Pro Ala Pro Pro Glu
            210                 215                 220

Ala Pro Glu Ala Pro Glu Ala Pro Ala Ala Pro Glu Pro Ala Pro Glu
225                 230                 235                 240

Ala Glu Pro Ala Pro Pro Glu Ala Ala Pro Ala Ala Pro Ala Ala Ala
            245                 250                 255

Pro Glu Pro Glu Ala Glu Pro Ala Pro Pro Glu Glu Ala Ala Pro Ala
            260                 265                 270

Ala Pro Ala Ala Pro Glu Pro Glu Ala Ala Glu Ala Pro Ala Ala Pro
            275                 280                 285

Pro Ala Pro Glu Pro Glu Ala Glu Pro Glu Pro Ala Ala Glu Ala Glu
            290                 295                 300

Pro Ala Ala Pro Ala Pro Ala Glu Pro Ala Glu Pro Glu Ala Pro Ala
305                 310                 315                 320

<210> SEQ ID NO 83
<211> LENGTH: 320
<212> TYPE: PRT
<213> ORGANISM: Artificial Sequence
<220> FEATURE:
<223> OTHER INFORMATION: Polypeptide complex unit

<400> SEQUENCE: 83

Ala Pro Ala Glu Ala Pro Ala Ala Ala Glu Glu Ala Pro Pro Ala Glu
1               5                   10                  15

Pro Ala Pro Glu Ala Pro Glu Glu Pro Ala Glu Ala Pro Ala Ala
            20                  25                  30

Pro Ala Glu Ala Pro Pro Ala Pro Ala Glu Pro Ala Pro Pro Glu Glu
         35                  40                  45

Ala Ala Pro Ala Ala Pro Ala Ala Pro Glu Pro Glu Ala Ala Pro Ala
            50                  55                  60

Glu Glu Ala Glu Ala Pro Glu Ala Pro Pro Ala Pro Ala Pro Glu Pro
65                  70                  75                  80

Ala Pro Ala Glu Ala Pro Ala Ala Glu Glu Ala Pro Pro Ala Glu
            85                  90                  95

Pro Ala Pro Glu Ala Pro Ala Pro Pro Glu Ala Glu Glu Pro Pro Glu
            100                 105                 110

Ala Ala Pro Ala Pro Ala Pro Ala Ala Pro Pro Glu Ala Pro Glu Ala
            115                 120                 125

Pro Glu Ala Ala Pro Ala Ala Pro Glu Pro Ala Ala Glu Pro Ala
    130                 135                 140

Pro Pro Glu Glu Ala Ala Pro Ala Ala Pro Ala Ala Pro Glu Pro Glu
145                 150                 155                 160

Ala Ala Glu Ala Pro Ala Ala Pro Pro Ala Pro Glu Pro Glu Ala Glu
                165                 170                 175

Pro Glu Pro Ala Ala Pro Glu Glu Pro Ala Pro Glu Ala Pro Ala Ala
            180                 185                 190

Pro Ala Glu Ala Pro Ala Pro Ala Pro Ala Ala Glu Ala Ala Pro
        195                 200                 205

Pro Ala Glu Ala Ala Glu Pro Glu Pro Glu Ala Pro Ala Ala Glu Ala
    210                 215                 220

Glu Ala Ala Glu Ala Glu Pro Pro Ala Pro Pro Ala Pro Glu Pro Ala
225                 230                 235                 240

Ala Pro Pro Glu Ala Glu Pro Pro Glu Ala Pro Glu Ala Ala Glu Ala
                245                 250                 255

Ala Pro Ala Pro Ala Glu Pro Ala Pro Pro Ala Ala Glu Pro Ala Pro
            260                 265                 270

Pro Ala Ala Glu Ala Ala Glu Pro Ala Pro Pro Glu Ala Glu Pro Pro
    275                 280                 285

Glu Ala Pro Glu Ala Ala Glu Ala Ala Pro Ala Pro Ala Pro Glu Glu
        290                 295                 300

Pro Ala Pro Glu Ala Pro Ala Ala Pro Ala Glu Ala Pro Pro Ala Pro
305                 310                 315                 320

<210> SEQ ID NO 84
<211> LENGTH: 340
<212> TYPE: PRT
<213> ORGANISM: Artificial Sequence
<220> FEATURE:
<223> OTHER INFORMATION: Polypeptide complex unit

<400> SEQUENCE: 84

Ala Ala Glu Ala Pro Ala Pro Glu Pro Ala Ala Glu Pro Glu Pro Ala
1               5                   10                  15

Pro Glu Ala Pro Ala Pro Pro Glu Ala Glu Pro Glu Ala Pro Glu
            20                  25                  30

Ala Ala Glu Ala Ala Pro Ala Pro Ala Glu Pro Ala Pro Pro Glu Glu
        35                  40                  45

Ala Ala Pro Ala Ala Pro Ala Ala Pro Glu Pro Glu Ala Ala Pro Ala
    50                  55                  60

Glu Glu Ala Glu Ala Pro Ala Pro Pro Ala Pro Ala Pro Glu Pro
65                  70                  75                  80

Ala Glu Ala Glu Pro Ala Ala Pro Ala Pro Ala Glu Pro Ala Glu Pro
                85                  90                  95

Glu Ala Pro Ala Ala Pro Ala Pro Glu Ala Glu Glu Pro Pro Glu
            100                 105                 110

Ala Ala Pro Ala Pro Ala Pro Ala Ala Glu Ala Glu Ala Ala Glu
        115                 120                 125

Ala Glu Pro Pro Ala Pro Pro Ala Pro Glu Pro Ala Ala Glu Pro Ala
    130                 135                 140

Pro Pro Glu Glu Ala Ala Pro Ala Ala Pro Ala Ala Pro Glu Pro Glu
145                 150                 155                 160

Ala Ala Glu Ala Pro Ala Pro Glu Pro Ala Ala Glu Pro Glu Pro Ala
                165                 170                 175

```
Pro Glu Ala Pro Ala Pro Ala Pro Pro Glu Ala Glu Glu Pro Pro Glu
                180                 185                 190

Ala Ala Pro Ala Pro Ala Pro Ala Ala Pro Ala Glu Glu Ala Glu
            195                 200                 205

Ala Pro Glu Ala Pro Pro Ala Pro Glu Pro Ala Ala Glu Ala
        210                 215                 220

Glu Ala Ala Glu Ala Glu Pro Pro Ala Pro Ala Pro Glu Pro Ala
225                 230                 235                 240

Ala Pro Ala Glu Ala Pro Ala Ala Glu Ala Pro Pro Ala Glu
            245                 250                 255

Pro Ala Pro Glu Ala Pro Ala Pro Glu Ala Glu Glu Pro Pro Glu
        260                 265                 270

Ala Ala Pro Ala Pro Ala Pro Ala Ala Glu Ala Glu Pro Ala Ala Pro
            275                 280                 285

Ala Pro Ala Glu Pro Ala Glu Pro Glu Ala Pro Ala Ala Ala Pro Ala
        290                 295                 300

Glu Glu Ala Glu Ala Pro Glu Ala Pro Pro Ala Pro Ala Pro Glu Pro
305                 310                 315                 320

Ala Ala Glu Ala Pro Ala Ala Pro Pro Ala Glu Pro Glu Ala Glu
            325                 330                 335

Pro Glu Pro Ala
            340

<210> SEQ ID NO 85
<211> LENGTH: 280
<212> TYPE: PRT
<213> ORGANISM: Artificial Sequence
<220> FEATURE:
<223> OTHER INFORMATION: Polypeptide complex unit

<400> SEQUENCE: 85

Ala Pro Ala Glu Ala Pro Ala Ala Ala Glu Glu Ala Pro Pro Ala Glu
1               5                   10                  15

Pro Ala Pro Glu Ala Pro Glu Glu Pro Ala Pro Glu Ala Pro Ala Ala
                20                  25                  30

Pro Ala Glu Ala Pro Pro Ala Pro Ala Glu Pro Ala Pro Pro Ala Ala
            35                  40                  45

Glu Pro Ala Pro Pro Ala Ala Glu Ala Ala Glu Pro Ala Pro Ala Ala
        50                  55                  60

Glu Ala Ala Pro Pro Ala Glu Ala Ala Glu Pro Glu Pro Glu Ala Pro
65                  70                  75                  80

Ala Glu Pro Ala Pro Pro Glu Glu Ala Ala Pro Ala Ala Pro Ala Ala
            85                  90                  95

Pro Glu Pro Glu Ala Pro Pro Glu Ala Pro Glu Ala Pro Glu Ala Ala
                100                 105                 110

Pro Ala Ala Pro Glu Pro Ala Glu Ala Pro Ala Ala Glu Ala Ala Pro
            115                 120                 125

Pro Ala Glu Ala Ala Glu Pro Glu Pro Glu Ala Pro Ala Glu Pro Ala
        130                 135                 140

Pro Pro Ala Ala Glu Pro Ala Pro Pro Ala Ala Glu Ala Ala Glu Pro
145                 150                 155                 160

Ala Glu Ala Glu Pro Ala Ala Pro Ala Pro Ala Glu Pro Ala Glu Pro
            165                 170                 175

Glu Ala Pro Ala Ala Ala Glu Ala Pro Ala Ala Pro Pro Ala Pro Glu
                180                 185                 190
```

Pro Glu Ala Glu Pro Glu Pro Ala Pro Ala Ala Glu Ala Ala Pro
            195                 200                 205

Pro Ala Glu Ala Glu Pro Glu Pro Glu Ala Pro Ala Ala Pro Ala
        210                 215                 220

Glu Glu Ala Glu Ala Pro Glu Ala Pro Pro Ala Pro Ala Pro Glu Pro
225                 230                 235                 240

Ala Ala Glu Ala Glu Ala Ala Glu Ala Glu Pro Pro Ala Pro Pro Ala
                245                 250                 255

Pro Glu Pro Ala Ala Glu Ala Pro Ala Pro Glu Pro Ala Ala Glu
        260                 265                 270

Pro Glu Pro Ala Pro Glu Ala Pro
        275                 280

<210> SEQ ID NO 86
<211> LENGTH: 320
<212> TYPE: PRT
<213> ORGANISM: Artificial Sequence
<220> FEATURE:
<223> OTHER INFORMATION: Polypeptide complex unit

<400> SEQUENCE: 86

Ala Pro Ala Ala Glu Ala Ala Pro Pro Ala Glu Ala Ala Glu Pro Glu
1               5                   10                  15

Pro Glu Ala Pro Ala Pro Pro Ala Glu Pro Ala Glu Ala Pro Ala
        20                  25                  30

Glu Pro Pro Ala Ala Pro Glu Ala Ala Ala Glu Ala Glu Ala Ala Glu
            35                  40                  45

Ala Glu Pro Pro Ala Pro Pro Ala Pro Glu Pro Ala Ala Ala Glu Ala
50                  55                  60

Glu Ala Ala Glu Ala Glu Pro Pro Ala Pro Pro Ala Pro Glu Pro Ala
65                  70                  75                  80

Ala Ala Glu Ala Pro Ala Pro Glu Pro Ala Ala Glu Pro Glu Pro Ala
                85                  90                  95

Pro Glu Ala Pro Ala Pro Ala Pro Pro Glu Ala Glu Glu Pro Pro Glu
            100                 105                 110

Ala Ala Pro Ala Pro Ala Pro Ala Ala Pro Ala Pro Pro Glu Ala Glu
        115                 120                 125

Glu Pro Pro Glu Ala Ala Pro Ala Pro Ala Pro Ala Ala Glu Pro Ala
130                 135                 140

Pro Pro Glu Glu Ala Ala Pro Ala Ala Pro Ala Ala Pro Glu Pro Glu
145                 150                 155                 160

Ala Ala Glu Ala Pro Ala Pro Glu Pro Ala Ala Glu Pro Glu Pro Ala
                165                 170                 175

Pro Glu Ala Pro Ala Glu Ala Glu Pro Ala Ala Pro Ala Pro Ala Glu
            180                 185                 190

Pro Ala Glu Pro Glu Ala Pro Ala Ala Glu Ala Glu Pro Ala Ala Pro
        195                 200                 205

Ala Pro Ala Glu Pro Ala Glu Pro Glu Ala Pro Ala Ala Ala Glu Ala
    210                 215                 220

Glu Ala Ala Glu Ala Glu Pro Pro Ala Pro Pro Ala Pro Glu Pro Ala
225                 230                 235                 240

Ala Ala Glu Ala Pro Ala Ala Pro Pro Ala Pro Glu Pro Glu Ala Glu
                245                 250                 255

Pro Glu Pro Ala Ala Pro Ala Ala Glu Ala Ala Pro Pro Ala Glu Ala
            260                 265                 270

Ala Glu Pro Glu Pro Glu Ala Pro Ala Glu Pro Ala Ala
            275                 280                 285

Ala Glu Glu Ala Pro Pro Ala Glu Pro Ala Pro Glu Ala Pro Ala Pro
            290                 295                 300

Pro Glu Ala Glu Glu Pro Pro Glu Ala Ala Pro Ala Pro Ala Pro Ala
305                 310                 315                 320

<210> SEQ ID NO 87
<211> LENGTH: 320
<212> TYPE: PRT
<213> ORGANISM: Artificial Sequence
<220> FEATURE:
<223> OTHER INFORMATION: Polypeptide complex unit

<400> SEQUENCE: 87

Ala Glu Pro Ala Pro Pro Ala Ala Glu Pro Ala Pro Pro Ala Ala Glu
1               5                   10                  15

Ala Ala Glu Pro Ala Glu Pro Ala Pro Pro Glu Glu Ala Ala Pro Ala
            20                  25                  30

Ala Pro Ala Ala Pro Glu Pro Glu Ala Pro Ala Ala Glu Ala Ala Pro
            35                  40                  45

Pro Ala Glu Ala Ala Glu Pro Glu Pro Glu Ala Pro Ala Pro Ala Ala
            50                  55                  60

Glu Ala Ala Pro Pro Ala Glu Ala Ala Glu Pro Glu Pro Glu Ala Pro
65                  70                  75                  80

Ala Pro Ala Ala Glu Ala Ala Pro Pro Ala Glu Ala Ala Glu Pro Glu
                85                  90                  95

Pro Glu Ala Pro Ala Pro Pro Glu Ala Pro Glu Ala Pro Ala Ala
            100                 105                 110

Pro Ala Ala Pro Glu Pro Ala Glu Ala Glu Pro Ala Pro Pro Ala Ala
            115                 120                 125

Glu Pro Ala Pro Pro Ala Ala Glu Ala Ala Glu Pro Ala Pro Pro Ala
            130                 135                 140

Glu Glu Pro Ala Glu Ala Pro Ala Glu Pro Pro Ala Ala Pro Glu Ala
145                 150                 155                 160

Ala Pro Ala Ala Glu Ala Ala Pro Pro Ala Glu Ala Ala Glu Pro Glu
                165                 170                 175

Pro Glu Ala Pro Ala Pro Pro Glu Ala Pro Glu Ala Pro Glu Ala Ala
            180                 185                 190

Pro Ala Ala Pro Glu Pro Ala Glu Ala Pro Glu Glu Pro Ala Pro Glu
            195                 200                 205

Ala Pro Ala Ala Pro Ala Glu Ala Pro Pro Ala Pro Ala Glu Pro Ala
            210                 215                 220

Pro Pro Glu Glu Ala Ala Pro Ala Ala Pro Ala Ala Pro Glu Pro Glu
225                 230                 235                 240

Ala Pro Ala Glu Ala Pro Ala Ala Ala Glu Glu Ala Pro Pro Ala Glu
                245                 250                 255

Pro Ala Pro Glu Ala Ala Pro Ala Glu Ala Glu Ala Pro Glu Glu Ala
            260                 265                 270

Pro Pro Ala Pro Ala Pro Glu Pro Ala Pro Ala Ala Glu Ala Ala Pro
            275                 280                 285

Pro Ala Glu Ala Ala Glu Pro Glu Pro Glu Ala Pro Ala Glu Glu Ala
            290                 295                 300

Glu Ala Ala Glu Ala Glu Pro Pro Ala Pro Pro Ala Pro Glu Pro Ala
305                 310                 315                 320

<210> SEQ ID NO 88
<211> LENGTH: 300
<212> TYPE: PRT
<213> ORGANISM: Artificial Sequence
<220> FEATURE:
<223> OTHER INFORMATION: Polypeptide complex unit

<400> SEQUENCE: 88

```
Ala Ala Pro Ala Glu Glu Ala Glu Ala Pro Glu Ala Pro Ala Pro
1               5                   10                  15

Ala Pro Glu Pro Ala Pro Glu Glu Pro Ala Pro Glu Ala Pro Ala Ala
            20                  25                  30

Pro Ala Glu Ala Pro Pro Ala Pro Ala Pro Ala Ala Glu Ala Ala Pro
            35                  40                  45

Pro Ala Glu Ala Ala Glu Pro Glu Pro Glu Ala Pro Ala Ala Glu Ala
            50                  55                  60

Pro Ala Pro Glu Pro Ala Ala Glu Pro Glu Pro Ala Pro Glu Ala Pro
65                  70                  75                  80

Ala Pro Pro Glu Ala Glu Pro Pro Glu Ala Pro Glu Ala Ala Glu Ala
                85                  90                  95

Ala Pro Ala Pro Ala Ala Pro Ala Glu Glu Ala Glu Ala Pro Glu Ala
                100                 105                 110

Pro Pro Ala Pro Ala Pro Glu Pro Ala Ala Glu Ala Glu Ala Ala Glu
            115                 120                 125

Ala Glu Pro Pro Ala Pro Pro Ala Pro Glu Pro Ala Ala Pro Pro Glu
            130                 135                 140

Ala Pro Glu Ala Pro Glu Ala Ala Pro Ala Pro Glu Pro Ala Ala Glu
145                 150                 155                 160

Ala Ala Glu Ala Pro Ala Ala Pro Pro Ala Pro Glu Pro Glu Ala Glu
                165                 170                 175

Pro Glu Pro Ala Ala Glu Pro Ala Pro Pro Ala Ala Glu Pro Ala Pro
            180                 185                 190

Pro Ala Ala Glu Ala Ala Glu Pro Ala Pro Ala Ala Glu Ala Ala Pro
            195                 200                 205

Pro Ala Glu Ala Ala Glu Pro Glu Pro Glu Ala Pro Ala Glu Pro Ala
            210                 215                 220

Pro Pro Ala Ala Glu Pro Ala Pro Pro Ala Ala Glu Ala Ala Glu Pro
225                 230                 235                 240

Ala Ala Glu Ala Pro Ala Ala Pro Pro Ala Pro Glu Pro Glu Ala Glu
                245                 250                 255

Pro Glu Pro Ala Ala Pro Ala Ala Glu Ala Ala Pro Pro Ala Glu Ala
            260                 265                 270

Ala Glu Pro Glu Pro Glu Ala Pro Ala Pro Ala Ala Glu Ala Ala Pro
            275                 280                 285

Pro Ala Glu Ala Ala Glu Pro Glu Pro Glu Ala Pro
    290                 295                 300
```

<210> SEQ ID NO 89
<211> LENGTH: 300
<212> TYPE: PRT
<213> ORGANISM: Artificial Sequence
<220> FEATURE:
<223> OTHER INFORMATION: Polypeptide complex unit

<400> SEQUENCE: 89

```
Ala Ala Pro Pro Ala Pro Ala Pro Ala Ala Ala Glu Glu Ala Pro Ala
1               5                   10                  15
```

```
Glu Ala Pro Ala Ala Pro Pro Ala Pro Ala Pro Ala Ala Glu
             20                  25                  30

Glu Ala Pro Ala Glu Ala Pro Ala Pro Glu Pro Ala Glu
             35                  40                  45

Ala Ala Pro Ala Ala Ala Glu Ala Pro Ala Glu Ala Ala Glu Ala
 50                  55                  60

Pro Ala Pro Glu Pro Ala Ala Glu Pro Glu Pro Ala Pro Glu Ala Pro
 65                  70                  75                  80

Ala Glu Pro Ala Ala Pro Ala Pro Ala Glu Pro Ala Ala Pro Ala Pro
                 85                  90                  95

Glu Ala Pro Ala Ala Pro Glu Ala Pro Ala Glu Glu Ala Glu Pro Ala
             100                 105                 110

Ala Ala Pro Pro Ala Glu Ala Pro Ala Pro Glu Ala Pro Ala Glu Glu
             115                 120                 125

Ala Glu Pro Ala Ala Ala Pro Pro Ala Glu Ala Pro Ala Pro Glu Ala
 130                 135                 140

Ala Pro Ala Ala Ala Glu Pro Ala Pro Ala Pro Ala Ala Pro Glu Pro
145                 150                 155                 160

Ala Ala Glu Ala Ala Glu Ala Ala Pro Ala Glu Pro Glu Pro Pro Ala
                 165                 170                 175

Pro Pro Ala Pro Ala Ala Pro Pro Ala Pro Ala Pro Ala Ala Ala Glu
             180                 185                 190

Glu Ala Pro Ala Glu Ala Pro Ala Ala Ala Pro Pro Ala Pro
                 195                 200                 205

Ala Ala Ala Glu Glu Ala Pro Ala Glu Ala Pro Ala Ala Ala Pro Ala
             210                 215                 220

Glu Pro Ala Ala Pro Pro Ala Pro Glu Ala Ala Pro Ala Ala Glu Ala
225                 230                 235                 240

Ala Glu Ala Ala Ala Pro Ala Glu Ala Ala Pro Ala Pro Ala Pro Glu
                 245                 250                 255

Ala Pro Ala Pro Ala Glu Pro Ala Ala Pro Ala Ala Pro Glu Pro Glu
             260                 265                 270

Pro Ala Ala Pro Ala Glu Ala Ala Ala Pro Pro Glu Pro Pro Ala Glu
             275                 280                 285

Ala Ala Pro Ala Ala Ala Glu Ala Pro Ala Glu Ala
             290                 295                 300

<210> SEQ ID NO 90
<211> LENGTH: 300
<212> TYPE: PRT
<213> ORGANISM: Artificial Sequence
<220> FEATURE:
<223> OTHER INFORMATION: Polypeptide complex unit

<400> SEQUENCE: 90

Ala Glu Pro Ala Ala Pro Ala Ala Pro Glu Pro Glu Pro Ala Ala Pro
 1               5                  10                  15

Ala Glu Ala Ala Ala Pro Pro Glu Pro Pro Ala Glu Ala Ala Pro Ala
             20                  25                  30

Ala Ala Glu Ala Pro Ala Glu Ala Ala Pro Ala Ala Pro Pro Glu Glu
             35                  40                  45

Ala Ala Ala Glu Pro Pro Ala Ala Glu Ala Ala Pro Ala Pro Ala Pro
 50                  55                  60

Pro Ala Glu Ala Glu Ala Glu Ala Pro Pro Ala Ala Pro Glu Pro Ala
65                  70                  75                  80
```

Ala Glu Pro Ala Ala Pro Ala Pro Ala Glu Pro Ala Ala Pro Ala Pro
                85                  90                  95

Glu Ala Pro Ala Ala Pro Ala Pro Pro Ala Glu Ala Glu Ala Glu Ala
                100                 105                 110

Pro Pro Ala Ala Pro Glu Pro Ala Ala Ala Pro Ala Glu Pro Ala Ala
                115                 120                 125

Pro Pro Ala Pro Glu Ala Ala Pro Ala Ala Glu Ala Ala Ala Glu Ala
                130                 135                 140

Ala Pro Ala Ala Pro Ala Ala Pro Glu Pro Ala Glu Glu Ala Ala Pro
145                 150                 155                 160

Ala Ala Glu Ala Ala Pro Ala Ala Pro Ala Ala Pro Glu Pro Ala Glu
                165                 170                 175

Glu Ala Ala Pro Ala Ala Pro Ala Glu Pro Ala Ala Pro Pro Ala Pro
                180                 185                 190

Glu Ala Ala Pro Ala Ala Glu Ala Ala Glu Pro Ala Ala Pro Ala Pro
                195                 200                 205

Ala Glu Pro Ala Ala Pro Ala Pro Glu Ala Pro Ala Ala Ala Pro Ala
                210                 215                 220

Ala Ala Glu Pro Pro Ala Ala Glu Ala Glu Ala Pro Ala Pro Pro Ala
225                 230                 235                 240

Ala Ala Glu Ala Ala Glu Ala Ala Pro Ala Glu Pro Glu Pro Pro Ala
                245                 250                 255

Pro Pro Ala Pro Ala Pro Pro Glu Pro Pro Glu Ala Ala Pro Pro Ala
                260                 265                 270

Ala Ala Glu Ala Ala Pro Ala Glu Ala Ala Ala Glu Ala Ala Pro Ala Ala
                275                 280                 285

Pro Ala Ala Pro Glu Pro Ala Glu Glu Ala Ala Pro
                290                 295                 300

<210> SEQ ID NO 91
<211> LENGTH: 280
<212> TYPE: PRT
<213> ORGANISM: Artificial Sequence
<220> FEATURE:
<223> OTHER INFORMATION: Polypeptide complex unit

<400> SEQUENCE: 91

Ala Glu Ala Ala Glu Ala Pro Pro Ala Ala Pro Pro Ala Ala Pro
1               5                   10                  15

Ala Pro Glu Pro Ala Pro Ala Pro Pro Ala Glu Ala Glu Ala Glu Ala
                20                  25                  30

Pro Pro Ala Ala Pro Glu Pro Ala Ala Pro Pro Glu Pro Pro Ala Glu
                35                  40                  45

Ala Ala Pro Ala Ala Ala Glu Ala Pro Glu Ala Ala Glu Ala Ala
                50                  55                  60

Glu Ala Pro Ala Pro Ala Ala Pro Pro Ala Pro Ala Pro Glu Pro
65                  70                  75                  80

Ala Ala Glu Ala Ala Glu Ala Ala Pro Ala Glu Pro Glu Pro Pro Ala
                85                  90                  95

Pro Pro Ala Pro Ala Pro Glu Ala Pro Ala Glu Ala Glu Pro Ala
                100                 105                 110

Ala Ala Pro Pro Ala Glu Ala Pro Ala Pro Glu Ala Ala Glu Ala
                115                 120                 125

Ala Pro Glu Ala Pro Glu Pro Ala Ala Pro Ala Ala Ala Ala Pro Pro
                130                 135                 140

Ala Pro Ala Pro Ala Ala Glu Glu Ala Pro Ala Glu Pro Ala
145                 150                 155                 160

Ala Glu Ala Ala Ala Pro Ala Ala Pro Ala Pro Ala Pro Glu
                165                 170                 175

Ala Pro Ala Pro Ala Ala Pro Pro Ala Pro Ala Ala Ala Glu
            180                 185                 190

Glu Ala Pro Ala Glu Pro Ala Ala Pro Ala Ala Ala Glu Pro
        195                 200                 205

Pro Ala Ala Glu Ala Glu Ala Pro Ala Pro Pro Ala Ala Pro Pro
    210                 215                 220

Ala Pro Ala Pro Ala Ala Glu Glu Ala Pro Ala Glu Ala Pro Ala
225                 230                 235                 240

Ala Glu Ala Ala Ala Pro Ala Glu Ala Ala Pro Ala Pro Ala Pro Glu
                245                 250                 255

Ala Pro Ala Pro Ala Pro Ala Ala Pro Pro Glu Glu Ala Ala Ala Glu
            260                 265                 270

Pro Pro Ala Ala Glu Ala Ala Pro
    275                 280

<210> SEQ ID NO 92
<211> LENGTH: 260
<212> TYPE: PRT
<213> ORGANISM: Artificial Sequence
<220> FEATURE:
<223> OTHER INFORMATION: Polypeptide complex unit

<400> SEQUENCE: 92

Ala Ala Pro Ala Glu Pro Ala Ala Pro Pro Ala Pro Glu Ala Ala Pro
1               5                   10                  15

Ala Ala Glu Ala Ala Glu Ala Ala Glu Ala Pro Ala Pro Ala Ala Pro
                20                  25                  30

Pro Ala Ala Pro Ala Pro Glu Pro Ala Ala Pro Pro Ala Pro Ala Pro
            35                  40                  45

Ala Ala Ala Glu Glu Ala Pro Ala Glu Ala Pro Ala Ala Glu Ala Ala
        50                  55                  60

Ala Pro Ala Glu Ala Ala Pro Ala Pro Ala Pro Glu Ala Pro Ala Pro
65                  70                  75                  80

Ala Glu Ala Ala Ala Pro Ala Glu Ala Ala Pro Ala Pro Ala Pro Glu
                85                  90                  95

Ala Pro Ala Pro Ala Pro Ala Pro Pro Ala Glu Ala Glu Ala Glu Ala
            100                 105                 110

Pro Pro Ala Ala Pro Glu Pro Ala Ala Pro Glu Ala Pro Ala Glu Glu
        115                 120                 125

Ala Glu Pro Ala Ala Ala Pro Ala Glu Ala Ala Pro Ala Pro Glu Ala
    130                 135                 140

Ala Pro Ala Ala Ala Glu Pro Ala Pro Ala Pro Ala Ala Pro Glu Pro
145                 150                 155                 160

Ala Pro Ala Glu Ala Ala Glu Ala Ala Pro Glu Ala Pro Glu Pro Ala
                165                 170                 175

Ala Pro Ala Ala Ala Glu Ala Ala Glu Ala Pro Ala Pro Ala Ala Pro
            180                 185                 190

Pro Ala Ala Pro Ala Pro Glu Pro Ala Ala Pro Pro Ala Pro Glu Glu
        195                 200                 205

Ala Ala Ala Glu Pro Pro Ala Ala Glu Ala Ala Pro Ala Glu Pro Ala
    210                 215                 220

Ala Pro Ala Pro Glu Pro Glu Pro Ala Ala Pro Ala Glu Ala Ala
225                 230                 235                 240

Ala Ala Pro Ala Ala Ala Glu Pro Pro Ala Glu Ala Glu Ala Pro
                245                 250                 255

Ala Pro Pro Ala
            260

<210> SEQ ID NO 93
<211> LENGTH: 280
<212> TYPE: PRT
<213> ORGANISM: Artificial Sequence
<220> FEATURE:
<223> OTHER INFORMATION: Polypeptide complex unit

<400> SEQUENCE: 93

Ala Pro Ala Pro Pro Ala Glu Ala Glu Ala Glu Ala Pro Pro Ala Ala
1               5                   10                  15

Pro Glu Pro Ala Ala Ala Pro Ala Glu Pro Ala Ala Pro Pro Ala Pro
                20                  25                  30

Glu Ala Ala Pro Ala Glu Ala Ala Ala Pro Ala Ala Ala Glu Pro
            35                  40                  45

Pro Ala Ala Glu Ala Glu Ala Pro Ala Pro Pro Ala Ala Glu Ala Ala
    50                  55                  60

Glu Ala Pro Ala Pro Ala Ala Pro Pro Ala Ala Pro Ala Pro Glu Pro
65                  70                  75                  80

Ala Glu Ala Ala Ala Pro Ala Glu Ala Ala Pro Ala Pro Ala Pro Glu
                85                  90                  95

Ala Pro Ala Pro Ala Pro Glu Ala Pro Ala Glu Glu Ala Glu Pro Ala
                100                 105                 110

Ala Ala Pro Pro Ala Glu Ala Pro Ala Pro Glu Ala Pro Ala Glu Glu
            115                 120                 125

Ala Glu Pro Ala Ala Ala Pro Pro Ala Glu Ala Pro Ala Ala Pro Ala
    130                 135                 140

Ala Ala Glu Pro Pro Ala Ala Glu Ala Glu Ala Pro Ala Pro Pro Ala
145                 150                 155                 160

Ala Ala Pro Ala Glu Pro Ala Ala Pro Pro Ala Pro Glu Ala Ala Pro
                165                 170                 175

Ala Ala Glu Ala Ala Pro Pro Glu Pro Pro Ala Glu Ala Ala Pro Ala
                180                 185                 190

Ala Ala Glu Ala Pro Ala Glu Ala Ala Pro Ala Ala Pro Glu Glu
            195                 200                 205

Ala Ala Ala Glu Pro Pro Ala Ala Glu Ala Ala Pro Ala Ala Glu Ala
    210                 215                 220

Ala Glu Ala Ala Pro Ala Glu Pro Glu Pro Pro Ala Pro Pro Ala Pro
225                 230                 235                 240

Ala Glu Ala Ala Ala Pro Ala Glu Ala Ala Pro Ala Pro Ala Pro Glu
                245                 250                 255

Ala Pro Ala Pro Ala Pro Glu Ala Pro Ala Glu Glu Ala Glu Pro Ala
                260                 265                 270

Ala Ala Pro Pro Ala Glu Ala Pro
            275                 280

<210> SEQ ID NO 94
<211> LENGTH: 240
<212> TYPE: PRT
<213> ORGANISM: Artificial Sequence
<220> FEATURE:
<223> OTHER INFORMATION: Polypeptide complex unit

<400> SEQUENCE: 94

Ala Glu Pro Ala Ala Pro Ala Pro Glu Pro Ala Ala Pro Ala Pro
1               5                   10                  15

Glu Ala Pro Ala Ala Glu Ala Ala Glu Ala Pro Ala Pro Ala Ala Pro
                20                  25                  30

Pro Ala Ala Pro Ala Pro Glu Pro Ala Pro Pro Glu Pro Pro Ala Glu
            35                  40                  45

Ala Ala Pro Ala Ala Ala Glu Ala Pro Ala Glu Ala Ala Glu Ala Ala
            50                  55                  60

Glu Ala Pro Ala Pro Ala Ala Pro Pro Ala Ala Pro Ala Glu Pro
65                  70                  75                  80

Ala Glu Ala Ala Ala Pro Ala Glu Ala Ala Pro Ala Pro Ala Pro Glu
            85                  90                  95

Ala Pro Ala Pro Ala Glu Pro Ala Ala Pro Ala Ala Pro Glu Pro Glu
            100                 105                 110

Pro Ala Ala Pro Ala Glu Ala Ala Ala Pro Pro Glu Pro Pro Ala Glu
            115                 120                 125

Ala Ala Pro Ala Ala Ala Glu Ala Pro Ala Glu Ala Ala Pro Glu Ala
            130                 135                 140

Ala Pro Ala Ala Ala Glu Pro Ala Pro Ala Pro Ala Ala Pro Glu Pro
145                 150                 155                 160

Ala Glu Ala Ala Ala Pro Ala Glu Ala Ala Pro Ala Pro Ala Pro Glu
            165                 170                 175

Ala Pro Ala Pro Ala Glu Ala Ala Glu Ala Pro Ala Pro Ala Ala Pro
            180                 185                 190

Pro Ala Ala Pro Ala Pro Glu Pro Ala Pro Pro Glu Pro Pro Ala Glu
            195                 200                 205

Ala Ala Pro Ala Ala Ala Glu Ala Pro Ala Glu Ala Ala Ala Glu Ala
            210                 215                 220

Ala Glu Ala Ala Pro Ala Glu Pro Glu Pro Ala Pro Pro Ala Pro
225                 230                 235                 240

<210> SEQ ID NO 95
<211> LENGTH: 300
<212> TYPE: PRT
<213> ORGANISM: Artificial Sequence
<220> FEATURE:
<223> OTHER INFORMATION: Polypeptide complex unit

<400> SEQUENCE: 95

Ala Pro Ala Ala Pro Pro Glu Glu Ala Ala Ala Glu Pro Pro Ala Ala
1               5                   10                  15

Glu Ala Ala Pro Ala Ala Pro Pro Ala Pro Ala Pro Ala Ala Ala Glu
                20                  25                  30

Glu Ala Pro Ala Glu Ala Pro Ala Ala Pro Ala Ala Pro Pro Glu Glu
            35                  40                  45

Ala Ala Ala Glu Pro Pro Ala Ala Glu Ala Ala Pro Ala Ala Pro Pro
            50                  55                  60

Ala Pro Ala Glu Ala Ala Pro Ala Pro Pro Glu Ala Pro Pro Ala Pro
65                  70                  75                  80

Ala Glu Pro Ala Ala Pro Ala Pro Ala Glu Pro Ala Ala Pro Ala Pro
            85                  90                  95

Glu Ala Pro Ala Ala Ala Glu Ala Ala Glu Ala Ala Pro Ala Glu Pro

```
            100                 105                 110
Glu Pro Pro Ala Pro Pro Ala Pro Ala Pro Ala Pro Pro Ala Glu Ala
            115                 120                 125
Glu Ala Glu Ala Pro Pro Ala Pro Ala Glu Pro Ala Ala Pro Glu Ala
            130                 135                 140
Ala Pro Ala Ala Ala Glu Pro Ala Pro Ala Pro Ala Ala Pro Glu Pro
145                 150                 155                 160
Ala Ala Pro Ala Glu Pro Ala Ala Pro Pro Ala Pro Glu Ala Ala Pro
                165                 170                 175
Ala Ala Glu Ala Ala Pro Pro Glu Pro Pro Ala Glu Ala Ala Pro Ala
                180                 185                 190
Ala Ala Glu Ala Pro Ala Glu Ala Ala Ala Pro Ala Ala Ala Glu Pro
                195                 200                 205
Pro Ala Ala Glu Ala Glu Ala Pro Ala Pro Pro Ala Ala Ala Pro Ala
                210                 215                 220
Glu Pro Ala Ala Pro Pro Ala Pro Glu Ala Ala Pro Ala Ala Glu Ala
225                 230                 235                 240
Ala Glu Ala Ala Glu Ala Pro Ala Pro Ala Ala Pro Pro Ala Ala Pro
                    245                 250                 255
Ala Pro Glu Pro Ala Ala Glu Ala Ala Pro Ala Ala Pro Ala Ala Pro
                260                 265                 270
Glu Pro Ala Glu Glu Ala Ala Pro Ala Ala Pro Ala Ala Ala Glu Pro
                275                 280                 285
Pro Ala Ala Glu Ala Glu Ala Pro Ala Pro Pro Ala
                290                 295                 300

<210> SEQ ID NO 96
<211> LENGTH: 300
<212> TYPE: PRT
<213> ORGANISM: Artificial Sequence
<220> FEATURE:
<223> OTHER INFORMATION: Polypeptide complex unit

<400> SEQUENCE: 96

Ala Pro Pro Glu Pro Pro Ala Glu Ala Ala Pro Ala Ala Ala Glu Ala
1               5                   10                  15
Pro Ala Glu Ala Ala Ala Pro Pro Ala Pro Ala Pro Ala Ala Ala Glu
                20                  25                  30
Glu Ala Pro Ala Glu Ala Pro Ala Ala Ala Pro Ala Pro Ala Pro Ala
            35                  40                  45
Ala Ala Ala Glu Glu Ala Pro Glu Ala Pro Ala Ala Ala Pro Pro Pro
50                  55                  60
Ala Pro Ala Pro Ala Ala Ala Glu Glu Ala Pro Ala Glu Ala Pro Ala
65                  70                  75                  80
Ala Pro Pro Glu Pro Pro Ala Glu Ala Ala Pro Ala Ala Ala Glu Ala
                85                  90                  95
Pro Ala Glu Ala Ala Pro Ala Pro Pro Ala Glu Ala Glu Ala Glu Ala
                100                 105                 110
Pro Pro Ala Ala Pro Glu Pro Ala Ala Ala Glu Ala Pro Ala Pro Glu
                115                 120                 125
Pro Ala Ala Glu Pro Glu Pro Ala Pro Glu Ala Pro Ala Pro Glu Ala
                130                 135                 140
Ala Pro Ala Ala Ala Glu Pro Ala Pro Ala Pro Ala Ala Pro Glu Pro
145                 150                 155                 160
Ala Ala Glu Ala Ala Glu Ala Ala Pro Ala Glu Pro Glu Pro Pro Ala
```

165                 170                 175

Pro Pro Ala Pro Ala Glu Pro Ala Ala Pro Ala Ala Pro Glu Pro Glu
            180                 185                 190

Pro Ala Ala Pro Ala Glu Ala Ala Ala Pro Ala Ala Pro Pro Glu Glu
            195                 200                 205

Ala Ala Ala Glu Pro Pro Ala Ala Glu Ala Ala Pro Ala Pro Pro Glu
            210                 215                 220

Pro Pro Ala Glu Ala Ala Pro Ala Ala Glu Ala Pro Ala Glu Ala
225                 230                 235                 240

Ala Ala Pro Ala Ala Glu Pro Pro Ala Glu Ala Glu Ala Pro
            245                 250                 255

Ala Pro Pro Ala Ala Pro Pro Ala Pro Ala Pro Ala Ala Glu
            260                 265                 270

Glu Ala Pro Ala Glu Ala Pro Ala Ala Pro Glu Pro Pro Ala Glu
            275                 280                 285

Ala Ala Pro Ala Ala Ala Glu Ala Pro Ala Glu Ala
            290                 295                 300

<210> SEQ ID NO 97
<211> LENGTH: 260
<212> TYPE: PRT
<213> ORGANISM: Artificial Sequence
<220> FEATURE:
<223> OTHER INFORMATION: Polypeptide complex unit

<400> SEQUENCE: 97

Ala Pro Ala Ala Pro Pro Glu Glu Ala Ala Glu Pro Pro Ala Ala
1               5                   10                  15

Glu Ala Ala Pro Ala Ala Glu Ala Ala Pro Ala Ala Pro Ala Ala Pro
            20                  25                  30

Glu Pro Ala Glu Glu Ala Ala Pro Ala Ala Glu Ala Ala Pro Ala Ala
            35                  40                  45

Pro Ala Ala Pro Glu Pro Ala Glu Glu Ala Ala Pro Ala Glu Ala Ala
            50                  55                  60

Ala Pro Ala Glu Ala Ala Pro Ala Pro Ala Pro Glu Ala Pro Ala Pro
65                  70                  75                  80

Ala Glu Pro Ala Ala Pro Ala Pro Ala Glu Pro Ala Ala Pro Ala Pro
            85                  90                  95

Glu Ala Pro Ala Ala Pro Ala Pro Pro Ala Glu Ala Glu Ala Glu Ala
            100                 105                 110

Pro Pro Ala Ala Pro Glu Pro Ala Ala Pro Ala Glu Ala Ala Glu Ala
            115                 120                 125

Ala Pro Glu Ala Pro Glu Pro Ala Ala Pro Ala Ala Ala Ala Pro Ala
            130                 135                 140

Ala Ala Glu Pro Pro Ala Ala Glu Glu Ala Pro Ala Pro Pro Ala
145                 150                 155                 160

Ala Glu Ala Ala Ala Pro Ala Glu Ala Ala Pro Ala Pro Ala Pro Glu
            165                 170                 175

Ala Pro Ala Pro Ala Ala Pro Ala Glu Pro Ala Ala Pro Pro Ala Pro
            180                 185                 190

Glu Ala Ala Pro Ala Ala Glu Ala Ala Pro Glu Ala Ala Pro Ala Ala
            195                 200                 205

Ala Glu Pro Ala Pro Ala Pro Ala Ala Pro Glu Pro Ala Ala Pro Pro
            210                 215                 220

Ala Pro Ala Pro Ala Ala Ala Glu Glu Ala Pro Ala Glu Ala Pro Ala

```
225                 230                 235                 240
Ala Ala Glu Ala Ala Glu Ala Ala Pro Ala Glu Pro Glu Pro Pro Ala
                245                 250                 255

Pro Pro Ala Pro
            260

<210> SEQ ID NO 98
<211> LENGTH: 280
<212> TYPE: PRT
<213> ORGANISM: Artificial Sequence
<220> FEATURE:
<223> OTHER INFORMATION: Polypeptide complex unit

<400> SEQUENCE: 98

Ala Glu Pro Ala Ala Pro Ala Ala Pro Glu Pro Glu Pro Ala Ala Pro
1               5                   10                  15

Ala Glu Ala Ala Ala Pro Pro Glu Pro Pro Ala Glu Ala Ala Pro Ala
                20                  25                  30

Ala Ala Glu Ala Pro Ala Glu Ala Ala Pro Glu Ala Ala Pro Ala Ala
                35                  40                  45

Ala Glu Pro Ala Pro Ala Pro Ala Ala Pro Glu Pro Ala Glu Ala Ala
            50                  55                  60

Ala Pro Ala Glu Ala Ala Pro Ala Pro Ala Pro Glu Ala Pro Ala Pro
65                  70                  75                  80

Ala Glu Ala Ala Ala Pro Ala Glu Ala Ala Pro Ala Pro Ala Pro Glu
                85                  90                  95

Ala Pro Ala Pro Ala Pro Ala Pro Pro Ala Glu Ala Glu Ala Glu Ala
                100                 105                 110

Pro Pro Ala Ala Pro Glu Pro Ala Ala Pro Ala Glu Ala Ala Glu Ala
                115                 120                 125

Ala Pro Glu Ala Pro Glu Pro Ala Ala Pro Ala Ala Ala Pro Glu Ala
            130                 135                 140

Ala Pro Ala Ala Ala Glu Pro Ala Pro Ala Pro Ala Ala Pro Glu Pro
145                 150                 155                 160

Ala Ala Pro Ala Glu Pro Ala Ala Pro Pro Ala Pro Glu Ala Ala Pro
                165                 170                 175

Ala Ala Glu Ala Ala Pro Pro Glu Pro Pro Ala Glu Ala Ala Pro Ala
                180                 185                 190

Ala Ala Glu Ala Pro Ala Glu Ala Ala Pro Ala Ala Pro Pro Glu Glu
                195                 200                 205

Ala Ala Ala Glu Pro Pro Ala Glu Ala Ala Pro Ala Pro Ala Pro Glu
            210                 215                 220

Pro Pro Ala Glu Ala Ala Pro Ala Ala Ala Glu Ala Pro Ala Glu Ala
225                 230                 235                 240

Ala Glu Pro Ala Ala Pro Ala Ala Pro Glu Pro Glu Pro Ala Ala Pro
                245                 250                 255

Ala Glu Ala Ala Ala Ala Pro Pro Ala Pro Ala Ala Ala Glu
                260                 265                 270

Glu Ala Pro Ala Glu Ala Pro Ala
            275                 280

<210> SEQ ID NO 99
<211> LENGTH: 240
<212> TYPE: PRT
<213> ORGANISM: Artificial Sequence
<220> FEATURE:
<223> OTHER INFORMATION: Polypeptide complex unit
```

<400> SEQUENCE: 99

| Ala | Ala | Glu | Ala | Ala | Pro | Ala | Ala | Pro | Ala | Pro | Glu | Pro | Ala | Glu |
|---|---|---|---|---|---|---|---|---|---|---|---|---|---|---|
| 1 | | | | 5 | | | | | 10 | | | | | 15 |

Glu Ala Ala Pro Ala Glu Pro Ala Ala Pro Ala Ala Pro Glu Pro Glu
              20                    25                    30

Pro Ala Ala Pro Ala Glu Ala Ala Ala Glu Ala Ala Pro Ala Ala
          35                    40                    45

Pro Ala Ala Pro Glu Pro Ala Glu Glu Ala Ala Pro Ala Glu Ala Ala
    50                    55                    60

Glu Ala Pro Ala Pro Ala Ala Pro Pro Ala Ala Pro Ala Pro Glu Pro
65                    70                    75                    80

Ala Glu Ala Ala Ala Pro Ala Glu Ala Ala Pro Ala Pro Ala Pro Glu
              85                    90                    95

Ala Pro Ala Pro Ala Ala Glu Ala Ala Glu Ala Ala Pro Ala Glu Pro
            100                    105                  110

Glu Pro Pro Ala Pro Pro Ala Pro Ala Ala Pro Ala Ala Ala Glu Pro
          115                    120                  125

Pro Ala Ala Glu Ala Glu Ala Pro Ala Pro Pro Ala Ala Ala Pro Ala
130                    135                    140

Ala Ala Glu Pro Pro Ala Ala Glu Ala Glu Ala Pro Ala Pro Pro Ala
145                    150                    155                  160

Ala Pro Ala Ala Pro Pro Glu Glu Ala Ala Ala Glu Pro Pro Ala Ala
            165                    170                  175

Glu Ala Ala Pro Ala Pro Pro Glu Pro Pro Ala Glu Ala Ala Pro Ala
          180                    185                  190

Ala Ala Glu Ala Pro Ala Glu Ala Ala Ala Pro Pro Ala Pro Ala Pro
         195                    200                  205

Ala Ala Ala Glu Glu Ala Pro Ala Glu Ala Pro Ala Ala Pro Pro
210                    215                    220

Ala Pro Ala Pro Ala Ala Ala Glu Glu Ala Pro Ala Glu Ala Pro Ala
225                    230                    235                  240

<210> SEQ ID NO 100
<211> LENGTH: 240
<212> TYPE: PRT
<213> ORGANISM: Artificial Sequence
<220> FEATURE:
<223> OTHER INFORMATION: Polypeptide complex unit

<400> SEQUENCE: 100

Ala Ala Pro Pro Ala Pro Ala Pro Ala Ala Glu Glu Ala Pro Ala
1                  5                    10                  15

Glu Ala Pro Ala Ala Pro Pro Glu Pro Pro Ala Glu Ala Ala Pro Ala
            20                    25                  30

Ala Ala Glu Ala Pro Ala Glu Ala Ala Glu Pro Ala Ala Pro Ala Pro
          35                    40                    45

Ala Glu Pro Ala Ala Pro Ala Pro Glu Ala Pro Ala Ala Glu Pro Ala
    50                    55                    60

Ala Pro Ala Pro Ala Glu Pro Ala Ala Pro Ala Pro Glu Ala Pro Ala
65                    70                    75                    80

Ala Ala Glu Ala Ala Glu Ala Ala Pro Ala Glu Pro Glu Pro Pro Ala
            85                    90                    95

Pro Pro Ala Pro Ala Pro Ala Pro Pro Ala Glu Ala Glu Ala Glu Ala
            100                    105                  110

```
Pro Pro Ala Ala Pro Glu Pro Ala Pro Glu Ala Pro Ala Glu Glu
            115                 120                 125
Ala Glu Pro Ala Ala Ala Pro Pro Ala Glu Ala Pro Ala Glu Pro Ala
    130                 135                 140
Ala Pro Ala Ala Pro Glu Pro Glu Pro Ala Ala Pro Ala Glu Ala Ala
145                 150                 155                 160
Ala Pro Pro Glu Pro Pro Ala Glu Ala Ala Pro Ala Ala Glu Ala
                165                 170                 175
Pro Ala Glu Ala Ala Glu Pro Ala Pro Ala Ala Pro Glu Pro Glu
                180                 185                 190
Pro Ala Ala Pro Ala Glu Ala Ala Ala Pro Pro Ala Pro Ala Pro
            195                 200                 205
Ala Ala Ala Glu Glu Ala Pro Ala Glu Ala Pro Ala Ala Pro Glu Ala
    210                 215                 220
Ala Pro Ala Ala Ala Glu Pro Ala Pro Ala Pro Ala Ala Pro Glu Pro
225                 230                 235                 240
```

<210> SEQ ID NO 101
<211> LENGTH: 220
<212> TYPE: PRT
<213> ORGANISM: Artificial Sequence
<220> FEATURE:
<223> OTHER INFORMATION: Polypeptide complex unit

<400> SEQUENCE: 101

```
Ala Ala Glu Ala Ala Pro Ala Ala Pro Ala Ala Pro Glu Pro Ala Glu
1               5                   10                  15
Glu Ala Ala Pro Ala Pro Pro Glu Pro Pro Ala Glu Ala Ala Pro Ala
                20                  25                  30
Ala Ala Glu Ala Pro Ala Glu Ala Ala Glu Pro Ala Ala Pro Ala Pro
            35                  40                  45
Ala Glu Pro Ala Ala Pro Ala Pro Glu Ala Pro Ala Ala Glu Ala Ala
        50                  55                  60
Glu Ala Pro Ala Pro Ala Ala Pro Pro Ala Ala Pro Ala Pro Glu Pro
65                  70                  75                  80
Ala Pro Ala Pro Pro Ala Glu Ala Glu Ala Glu Ala Pro Pro Ala Ala
                85                  90                  95
Pro Glu Pro Ala Ala Pro Ala Pro Pro Ala Glu Ala Glu Ala Glu Ala
            100                 105                 110
Pro Pro Ala Ala Pro Glu Pro Ala Ala Ala Pro Ala Ala Ala Glu Pro
        115                 120                 125
Pro Ala Ala Glu Ala Glu Ala Pro Ala Pro Ala Ala Pro Glu Glu Ala
    130                 135                 140
Ala Pro Ala Ala Ala Glu Pro Ala Pro Ala Pro Ala Ala Pro Glu Pro
145                 150                 155                 160
Ala Glu Pro Ala Ala Pro Pro Ala Glu Pro Ala Ala Pro Ala Pro
                165                 170                 175
Glu Ala Pro Ala Ala Pro Ala Pro Pro Ala Glu Ala Glu Ala Glu Ala
            180                 185                 190
Pro Pro Ala Ala Pro Glu Pro Ala Ala Ala Pro Ala Glu Pro Ala Ala
        195                 200                 205
Pro Pro Ala Pro Glu Ala Ala Pro Ala Ala Glu Ala
    210                 215                 220
```

<210> SEQ ID NO 102
<211> LENGTH: 220

```
<212> TYPE: PRT
<213> ORGANISM: Artificial Sequence
<220> FEATURE:
<223> OTHER INFORMATION: Polypeptide complex unit

<400> SEQUENCE: 102

Ala Ala Pro Ala Glu Pro Ala Pro Pro Ala Pro Glu Ala Ala Pro
1               5                   10                  15

Ala Ala Glu Ala Ala Pro Pro Glu Pro Pro Ala Glu Ala Ala Pro Ala
                20                  25                  30

Ala Ala Glu Ala Pro Ala Glu Ala Ala Pro Ala Ala Pro Pro Glu Glu
            35                  40                  45

Ala Ala Ala Glu Pro Pro Ala Glu Ala Ala Pro Ala Glu Ala Ala
            50                  55                  60

Ala Pro Ala Glu Ala Ala Pro Ala Pro Ala Glu Ala Pro Ala Pro
65                  70                  75                  80

Ala Pro Ala Pro Pro Ala Glu Ala Glu Ala Glu Ala Pro Ala Ala
                85                  90                  95

Pro Glu Pro Ala Ala Glu Ala Ala Glu Ala Ala Pro Ala Glu Pro
                100                 105                 110

Glu Pro Pro Ala Pro Pro Ala Pro Ala Ala Pro Pro Ala Pro Ala Pro
            115                 120                 125

Ala Ala Ala Glu Glu Ala Pro Ala Glu Ala Pro Ala Ala Ala Pro Ala
130                 135                 140

Ala Ala Glu Pro Pro Ala Ala Glu Ala Glu Ala Pro Ala Pro Pro Ala
145                 150                 155                 160

Ala Ala Glu Ala Ala Pro Ala Ala Pro Ala Ala Pro Glu Pro Ala Glu
                165                 170                 175

Glu Ala Ala Pro Ala Ala Pro Pro Ala Pro Ala Pro Ala Ala Ala Glu
            180                 185                 190

Glu Ala Pro Ala Glu Ala Pro Ala Ala Pro Pro Ala Pro Ala Pro
            195                 200                 205

Ala Ala Ala Glu Glu Ala Pro Ala Glu Ala Pro Ala
            210                 215                 220

<210> SEQ ID NO 103
<211> LENGTH: 240
<212> TYPE: PRT
<213> ORGANISM: Artificial Sequence
<220> FEATURE:
<223> OTHER INFORMATION: Polypeptide complex unit

<400> SEQUENCE: 103

Ala Pro Pro Glu Pro Pro Ala Glu Ala Ala Pro Ala Ala Ala Glu Ala
1               5                   10                  15

Pro Ala Glu Ala Ala Pro Pro Glu Pro Pro Ala Glu Ala Ala Pro Ala
                20                  25                  30

Ala Ala Glu Ala Pro Ala Glu Ala Ala Ala Glu Ala Ala Pro Ala Ala
            35                  40                  45

Pro Ala Ala Pro Glu Pro Ala Glu Ala Ala Pro Ala Pro Ala Ala
            50                  55                  60

Pro Pro Glu Glu Ala Ala Ala Glu Pro Pro Ala Ala Glu Ala Ala Pro
65                  70                  75                  80

Ala Glu Ala Ala Ala Pro Ala Glu Ala Ala Pro Ala Pro Ala Pro Glu
                85                  90                  95

Ala Pro Ala Pro Ala Pro Glu Ala Pro Ala Glu Glu Ala Glu Pro Ala
                100                 105                 110
```

```
Ala Ala Pro Pro Ala Glu Ala Pro Pro Ala Ala Pro Glu Glu
        115                 120                 125

Ala Ala Ala Glu Pro Pro Ala Ala Glu Ala Ala Pro Ala Ala Pro Ala
        130                 135                 140

Glu Pro Ala Ala Pro Ala Pro Glu Ala Ala Pro Ala Ala Glu Ala
145                 150                 155                 160

Ala Pro Ala Ala Pro Pro Glu Glu Ala Ala Ala Glu Pro Pro Ala Ala
                165                 170                 175

Glu Ala Ala Pro Ala Ala Pro Ala Ala Ala Glu Pro Pro Ala Ala Glu
        180                 185                 190

Ala Glu Ala Pro Ala Pro Pro Ala Ala Glu Pro Ala Ala Pro Ala Pro
        195                 200                 205

Ala Glu Pro Ala Ala Pro Ala Pro Glu Ala Pro Ala Ala Pro Glu Ala
        210                 215                 220

Pro Ala Glu Glu Ala Glu Pro Ala Ala Ala Pro Pro Ala Glu Ala Pro
225                 230                 235                 240

<210> SEQ ID NO 104
<211> LENGTH: 200
<212> TYPE: PRT
<213> ORGANISM: Artificial Sequence
<220> FEATURE:
<223> OTHER INFORMATION: Polypeptide complex unit

<400> SEQUENCE: 104

Ala Ala Glu Ala Ala Glu Ala Ala Pro Ala Glu Pro Glu Pro Pro Ala
1               5                   10                  15

Pro Pro Ala Pro Ala Pro Ala Pro Pro Ala Glu Ala Glu Ala Glu Ala
            20                  25                  30

Pro Pro Ala Ala Pro Glu Pro Ala Ala Pro Pro Ala Pro Ala Pro
            35                  40                  45

Ala Ala Ala Glu Glu Ala Pro Ala Glu Ala Pro Ala Ala Glu Ala Ala
        50                  55                  60

Glu Ala Pro Ala Pro Ala Ala Pro Pro Ala Pro Ala Pro Glu Pro
65                  70                  75                  80

Ala Pro Glu Ala Pro Ala Glu Glu Ala Glu Pro Ala Ala Ala Pro Pro
                85                  90                  95

Ala Glu Ala Pro Ala Ala Glu Ala Ala Glu Ala Ala Pro Ala Glu Pro
            100                 105                 110

Glu Pro Pro Ala Pro Pro Ala Pro Ala Ala Pro Ala Glu Pro Ala Ala
        115                 120                 125

Pro Pro Ala Pro Glu Ala Ala Pro Ala Ala Glu Ala Ala Pro Pro Glu
        130                 135                 140

Pro Pro Ala Glu Ala Ala Pro Ala Ala Ala Glu Ala Pro Ala Glu Ala
145                 150                 155                 160

Ala Ala Glu Ala Ala Pro Ala Ala Pro Ala Ala Pro Glu Pro Ala Glu
                165                 170                 175

Glu Ala Ala Pro Ala Ala Pro Ala Ala Ala Glu Pro Pro Ala Ala Glu
            180                 185                 190

Ala Glu Ala Pro Ala Pro Pro Ala
        195                 200

<210> SEQ ID NO 105
<211> LENGTH: 240
<212> TYPE: PRT
<213> ORGANISM: Artificial Sequence
```

<220> FEATURE:
<223> OTHER INFORMATION: Polypeptide complex unit

<400> SEQUENCE: 105

```
Ala Glu Ala Ala Glu Ala Pro Ala Pro Ala Ala Pro Pro Ala Ala Pro
1               5                   10                  15

Ala Pro Glu Pro Ala Ala Pro Ala Glu Pro Ala Ala Pro Pro Ala Pro
                20                  25                  30

Glu Ala Ala Pro Ala Ala Glu Ala Ala Pro Glu Ala Ala Pro Ala Ala
            35                  40                  45

Ala Glu Pro Ala Pro Ala Pro Ala Ala Pro Glu Pro Ala Glu Ala Ala
        50                  55                  60

Ala Pro Ala Glu Ala Ala Pro Ala Pro Ala Pro Glu Ala Pro Ala Pro
65                  70                  75                  80

Ala Glu Ala Ala Ala Pro Ala Glu Ala Ala Pro Ala Pro Ala Pro Glu
                85                  90                  95

Ala Pro Ala Pro Ala Ala Glu Ala Ala Glu Ala Ala Pro Ala Glu Pro
                100                 105                 110

Glu Pro Pro Ala Pro Pro Ala Pro Ala Glu Pro Ala Ala Pro Ala Ala
            115                 120                 125

Pro Glu Pro Glu Pro Ala Ala Pro Ala Glu Ala Ala Ala Ala Pro Ala
        130                 135                 140

Ala Ala Glu Pro Pro Ala Ala Glu Ala Glu Ala Pro Ala Pro Pro Ala
145                 150                 155                 160

Ala Glu Pro Ala Ala Pro Ala Ala Pro Glu Pro Glu Pro Ala Ala Pro
                165                 170                 175

Ala Glu Ala Ala Ala Pro Pro Glu Pro Pro Ala Glu Ala Ala Pro Ala
                180                 185                 190

Ala Ala Glu Ala Ala Pro Ala Glu Ala Ala Pro Ala Ala Ala Glu Pro
            195                 200                 205

Pro Ala Ala Glu Ala Glu Ala Pro Ala Pro Pro Ala Ala Ala Glu Ala
        210                 215                 220

Ala Pro Ala Ala Pro Ala Ala Pro Glu Pro Ala Glu Glu Ala Ala Pro
225                 230                 235                 240
```

<210> SEQ ID NO 106
<211> LENGTH: 521
<212> TYPE: PRT
<213> ORGANISM: Artificial Sequence
<220> FEATURE:
<223> OTHER INFORMATION: Fusion protein

<400> SEQUENCE: 106

```
Ala Pro Pro Ala Glu Glu Pro Ala Glu Ala Pro Ala Glu Pro Pro Ala
1               5                   10                  15

Ala Pro Glu Ala Ala Pro Pro Ala Glu Pro Ala Ala Glu Ala Pro Ala
                20                  25                  30

Glu Pro Pro Ala Ala Pro Glu Ala Ala Pro Ala Ala Glu Glu Pro Ala
            35                  40                  45

Glu Ala Pro Ala Glu Pro Pro Ala Ala Pro Glu Ala Ala Pro Pro Ala
        50                  55                  60

Glu Glu Pro Ala Glu Ala Pro Ala Glu Pro Ala Ala Ala Pro Glu Ala
65                  70                  75                  80

Ala Pro Pro Ala Glu Glu Pro Ala Glu Ala Pro Ala Glu Pro Pro Ala
                85                  90                  95

Ala Pro Glu Ala Ala Pro Pro Ala Glu Glu Pro Ala Glu Ala Pro Ala
```

```
              100                 105                 110
Glu Pro Pro Ala Ala Pro Glu Ala Pro Ala Glu Glu Pro Ala
            115                 120                 125
Glu Ala Pro Ala Glu Pro Pro Ala Ala Pro Glu Ala Pro Pro Ala
130                 135                 140
Glu Glu Pro Ala Glu Ala Pro Ala Glu Pro Pro Ala Ala Pro Glu Ala
145                 150                 155                 160
Ala Pro Pro Ala Glu Glu Pro Ala Glu Ala Pro Ala Glu Pro Pro Ala
                165                 170                 175
Ala Pro Glu Ala Ala Pro Pro Ala Glu Glu Pro Ala Glu Ala Pro Ala
                180                 185                 190
Glu Pro Pro Ala Ala Pro Glu Ala Ser Ala Lys Ser Arg Thr Ile Gly
                195                 200                 205
Ile Ile Gly Ala Pro Phe Ser Lys Gly Gln Pro Arg Gly Gly Val Glu
            210                 215                 220
Glu Gly Pro Thr Val Leu Arg Lys Ala Gly Leu Leu Glu Lys Leu Lys
225                 230                 235                 240
Glu Gln Glu Cys Asp Val Lys Asp Tyr Gly Asp Leu Pro Phe Ala Asp
                245                 250                 255
Ile Pro Asn Asp Ser Pro Phe Gln Ile Val Lys Asn Pro Arg Ser Val
                260                 265                 270
Gly Lys Ala Ser Glu Gln Leu Ala Gly Lys Val Ala Glu Val Lys Lys
            275                 280                 285
Asn Gly Arg Ile Ser Leu Val Leu Gly Gly Asp His Ser Leu Ala Ile
            290                 295                 300
Gly Ser Ile Ser Gly His Ala Arg Val His Pro Asp Leu Gly Val Ile
305                 310                 315                 320
Trp Val Asp Ala His Thr Asp Ile Asn Thr Pro Leu Thr Thr Thr Ser
                325                 330                 335
Gly Asn Leu His Gly Gln Pro Val Ser Phe Leu Leu Lys Glu Leu Lys
            340                 345                 350
Gly Lys Ile Pro Asp Val Pro Gly Phe Ser Trp Val Thr Pro Cys Ile
            355                 360                 365
Ser Ala Lys Asp Ile Val Tyr Ile Gly Leu Arg Asp Val Asp Pro Gly
            370                 375                 380
Glu His Tyr Ile Leu Lys Thr Leu Gly Ile Lys Tyr Phe Ser Met Thr
385                 390                 395                 400
Glu Val Asp Arg Leu Gly Ile Gly Lys Val Met Glu Glu Thr Leu Ser
                405                 410                 415
Tyr Leu Leu Gly Arg Lys Lys Arg Pro Ile His Leu Ser Phe Asp Val
                420                 425                 430
Asp Gly Leu Asp Pro Ser Phe Thr Pro Ala Thr Gly Thr Pro Val Val
                435                 440                 445
Gly Gly Leu Thr Tyr Arg Glu Gly Leu Tyr Ile Thr Glu Glu Ile Tyr
            450                 455                 460
Lys Thr Gly Leu Leu Ser Gly Leu Asp Ile Met Glu Val Asn Pro Ser
465                 470                 475                 480
Leu Gly Lys Thr Pro Glu Glu Val Thr Arg Thr Val Asn Thr Ala Val
                485                 490                 495
Ala Ile Thr Leu Ala Cys Phe Gly Leu Ala Arg Glu Gly Asn His Lys
                500                 505                 510
Pro Ile Asp Tyr Leu Asn Pro Pro Lys
                515                 520
```

<210> SEQ ID NO 107
<211> LENGTH: 521
<212> TYPE: PRT
<213> ORGANISM: Artificial Sequence
<220> FEATURE:
<223> OTHER INFORMATION: Fusion protein

<400> SEQUENCE: 107

```
Ala Pro Pro Ala Glu Glu Pro Ala Glu Ala Pro Ala Glu Pro Pro Ala
1               5                   10                  15

Ala Pro Glu Ala Ala Pro Pro Ala Glu Pro Ala Glu Ala Pro Ala
            20                  25                  30

Glu Pro Pro Ala Ala Pro Glu Ala Pro Ala Glu Glu Pro Ala
                35                  40                  45

Glu Ala Pro Ala Glu Pro Pro Ala Ala Pro Glu Ala Ala Pro Pro Ala
50                  55                  60

Glu Glu Pro Ala Glu Ala Pro Ala Glu Pro Pro Ala Ala Pro Glu Ala
65                  70                  75                  80

Ala Pro Pro Ala Glu Glu Pro Ala Glu Ala Pro Ala Glu Pro Pro Ala
                85                  90                  95

Ala Pro Glu Ala Ser Ala Lys Ser Arg Thr Ile Gly Ile Ile Gly Ala
                100                 105                 110

Pro Phe Ser Lys Gly Gln Pro Arg Gly Gly Val Glu Glu Gly Pro Thr
            115                 120                 125

Val Leu Arg Lys Ala Gly Leu Leu Glu Lys Leu Lys Glu Gln Glu Cys
            130                 135                 140

Asp Val Lys Asp Tyr Gly Asp Leu Pro Phe Ala Asp Ile Pro Asn Asp
145                 150                 155                 160

Ser Pro Phe Gln Ile Val Lys Asn Pro Arg Ser Val Gly Lys Ala Ser
                165                 170                 175

Glu Gln Leu Ala Gly Lys Val Ala Glu Val Lys Lys Asn Gly Arg Ile
            180                 185                 190

Ser Leu Val Leu Gly Gly Asp His Ser Leu Ala Ile Gly Ser Ile Ser
            195                 200                 205

Gly His Ala Arg Val His Pro Asp Leu Gly Val Ile Trp Val Asp Ala
        210                 215                 220

His Thr Asp Ile Asn Thr Pro Leu Thr Thr Ser Gly Asn Leu His
225                 230                 235                 240

Gly Gln Pro Val Ser Phe Leu Leu Lys Glu Leu Lys Gly Lys Ile Pro
                245                 250                 255

Asp Val Pro Gly Phe Ser Trp Val Thr Pro Cys Ile Ser Ala Lys Asp
            260                 265                 270

Ile Val Tyr Ile Gly Leu Arg Asp Val Asp Pro Gly Glu His Tyr Ile
            275                 280                 285

Leu Lys Thr Leu Gly Ile Lys Tyr Phe Ser Met Thr Glu Val Asp Arg
        290                 295                 300

Leu Gly Ile Gly Lys Val Met Glu Glu Thr Leu Ser Tyr Leu Leu Gly
305                 310                 315                 320

Arg Lys Lys Arg Pro Ile His Leu Ser Phe Asp Val Asp Gly Leu Asp
            325                 330                 335

Pro Ser Phe Thr Pro Ala Thr Gly Thr Pro Val Val Gly Gly Leu Thr
                340                 345                 350

Tyr Arg Glu Gly Leu Tyr Ile Thr Glu Glu Ile Tyr Lys Thr Gly Leu
            355                 360                 365
```

-continued

```
Leu Ser Gly Leu Asp Ile Met Glu Val Asn Pro Ser Leu Gly Lys Thr
    370                 375                 380

Pro Glu Glu Val Thr Arg Thr Val Asn Thr Ala Val Ala Ile Thr Leu
385                 390                 395                 400

Ala Cys Phe Gly Leu Ala Arg Glu Gly Asn His Lys Pro Ile Asp Tyr
                405                 410                 415

Leu Asn Pro Pro Lys Ala Pro Pro Ala Glu Pro Ala Glu Ala Pro
                420                 425                 430

Ala Glu Pro Pro Ala Ala Pro Glu Ala Ala Pro Pro Ala Glu Glu Pro
            435                 440                 445

Ala Glu Ala Pro Ala Glu Pro Ala Ala Pro Glu Ala Ala Pro Pro
            450                 455                 460

Ala Glu Glu Pro Ala Glu Ala Pro Ala Glu Pro Pro Ala Ala Pro Glu
465                 470                 475                 480

Ala Ala Pro Pro Ala Glu Glu Pro Ala Glu Ala Pro Ala Glu Pro Pro
                485                 490                 495

Ala Ala Pro Glu Ala Ala Pro Pro Ala Glu Glu Pro Ala Glu Ala Pro
                500                 505                 510

Ala Glu Pro Pro Ala Ala Pro Glu Ala
            515                 520

<210> SEQ ID NO 108
<211> LENGTH: 521
<212> TYPE: PRT
<213> ORGANISM: Artificial Sequence
<220> FEATURE:
<223> OTHER INFORMATION: Fusion protein

<400> SEQUENCE: 108

Ala Glu Pro Ala Ala Pro Ala Pro Ala Glu Pro Ala Ala Pro Ala Pro
1               5                   10                  15

Glu Ala Pro Ala Ala Glu Pro Ala Ala Pro Ala Pro Glu Ala Pro Ala
                20                  25                  30

Ala Pro Ala Pro Glu Ala Pro Ala Ala Glu Pro Ala Ala Pro Ala Pro
                35                  40                  45

Ala Glu Pro Ala Ala Pro Ala Pro Glu Ala Pro Ala Ala Glu Pro Ala
    50                  55                  60

Ala Pro Ala Pro Ala Glu Pro Ala Ala Pro Ala Pro Glu Ala Pro Ala
65                  70                  75                  80

Ala Glu Pro Ala Ala Pro Ala Pro Glu Ala Pro Ala Ala Pro Ala Pro
            85                  90                  95

Glu Ala Pro Ala Ala Glu Pro Ala Ala Pro Ala Pro Glu Ala Pro Ala
                100                 105                 110

Ala Pro Ala Pro Glu Ala Pro Ala Ala Glu Pro Ala Ala Pro Ala Pro
            115                 120                 125

Ala Glu Pro Ala Ala Pro Ala Pro Glu Ala Pro Ala Ala Glu Pro Ala
            130                 135                 140

Ala Pro Ala Pro Ala Glu Pro Ala Ala Pro Ala Pro Glu Ala Pro Ala
145                 150                 155                 160

Ala Glu Pro Ala Ala Pro Ala Pro Glu Ala Pro Ala Ala Pro Ala Pro
                165                 170                 175

Glu Ala Pro Ala Ala Glu Pro Ala Ala Pro Ala Pro Glu Ala Pro Ala
                180                 185                 190

Ala Pro Ala Pro Glu Ala Pro Ala Ser Ala Lys Ser Arg Thr Ile Gly
            195                 200                 205
```

Ile Ile Gly Ala Pro Phe Ser Lys Gly Gln Pro Arg Gly Val Glu
    210                 215                 220

Glu Gly Pro Thr Val Leu Arg Lys Ala Gly Leu Leu Glu Lys Leu Lys
225                 230                 235                 240

Glu Gln Glu Cys Asp Val Lys Asp Tyr Gly Asp Leu Pro Phe Ala Asp
                245                 250                 255

Ile Pro Asn Asp Ser Pro Phe Gln Ile Val Lys Asn Pro Arg Ser Val
                260                 265                 270

Gly Lys Ala Ser Glu Gln Leu Ala Gly Lys Val Ala Glu Val Lys Lys
            275                 280                 285

Asn Gly Arg Ile Ser Leu Val Leu Gly Gly Asp His Ser Leu Ala Ile
290                 295                 300

Gly Ser Ile Ser Gly His Ala Arg Val His Pro Asp Leu Gly Val Ile
305                 310                 315                 320

Trp Val Asp Ala His Thr Asp Ile Asn Thr Pro Leu Thr Thr Thr Ser
                325                 330                 335

Gly Asn Leu His Gly Gln Pro Val Ser Phe Leu Leu Lys Glu Leu Lys
                340                 345                 350

Gly Lys Ile Pro Asp Val Pro Gly Phe Ser Trp Val Thr Pro Cys Ile
            355                 360                 365

Ser Ala Lys Asp Ile Val Tyr Ile Gly Leu Arg Asp Val Asp Pro Gly
370                 375                 380

Glu His Tyr Ile Leu Lys Thr Leu Gly Ile Lys Tyr Phe Ser Met Thr
385                 390                 395                 400

Glu Val Asp Arg Leu Gly Ile Gly Lys Val Met Glu Glu Thr Leu Ser
                405                 410                 415

Tyr Leu Leu Gly Arg Lys Lys Arg Pro Ile His Leu Ser Phe Asp Val
                420                 425                 430

Asp Gly Leu Asp Pro Ser Phe Thr Pro Ala Thr Gly Thr Pro Val Val
            435                 440                 445

Gly Gly Leu Thr Tyr Arg Glu Gly Leu Tyr Ile Thr Glu Glu Ile Tyr
450                 455                 460

Lys Thr Gly Leu Leu Ser Gly Leu Asp Ile Met Glu Val Asn Pro Ser
465                 470                 475                 480

Leu Gly Lys Thr Pro Glu Glu Val Thr Arg Thr Val Asn Thr Ala Val
                485                 490                 495

Ala Ile Thr Leu Ala Cys Phe Gly Leu Ala Arg Glu Gly Asn His Lys
            500                 505                 510

Pro Ile Asp Tyr Leu Asn Pro Pro Lys
            515                 520

<210> SEQ ID NO 109
<211> LENGTH: 521
<212> TYPE: PRT
<213> ORGANISM: Artificial Sequence
<220> FEATURE:
<223> OTHER INFORMATION: Fusion protein

<400> SEQUENCE: 109

Ala Glu Pro Ala Ala Pro Ala Pro Ala Glu Pro Ala Ala Pro Ala Pro
1               5                   10                  15

Glu Ala Pro Ala Ala Glu Pro Ala Ala Pro Ala Pro Ala Glu Pro Ala
                20                  25                  30

Ala Pro Ala Pro Glu Ala Pro Ala Ala Glu Pro Ala Ala Pro Ala Pro
            35                  40                  45

```
Ala Glu Pro Ala Ala Pro Ala Pro Glu Ala Pro Ala Ala Glu Pro Ala
     50                  55                  60

Ala Pro Ala Pro Ala Glu Pro Ala Ala Pro Ala Pro Glu Ala Pro Ala
 65              70                  75                  80

Ala Glu Pro Ala Ala Pro Ala Pro Ala Glu Pro Ala Ala Pro Ala Pro
             85                  90                  95

Glu Ala Pro Ala Ser Ala Lys Ser Arg Thr Ile Gly Ile Ile Gly Ala
            100                 105                 110

Pro Phe Ser Lys Gly Gln Pro Arg Gly Gly Val Glu Glu Gly Pro Thr
            115                 120                 125

Val Leu Arg Lys Ala Gly Leu Leu Glu Lys Leu Lys Glu Gln Glu Cys
            130                 135                 140

Asp Val Lys Asp Tyr Gly Asp Leu Pro Phe Ala Asp Ile Pro Asn Asp
145                 150                 155                 160

Ser Pro Phe Gln Ile Val Lys Asn Pro Arg Ser Val Gly Lys Ala Ser
                165                 170                 175

Glu Gln Leu Ala Gly Lys Val Ala Glu Val Lys Lys Asn Gly Arg Ile
            180                 185                 190

Ser Leu Val Leu Gly Gly Asp His Ser Leu Ala Ile Gly Ser Ile Ser
            195                 200                 205

Gly His Ala Arg Val His Pro Asp Leu Gly Val Ile Trp Val Asp Ala
            210                 215                 220

His Thr Asp Ile Asn Thr Pro Leu Thr Thr Thr Ser Gly Asn Leu His
225                 230                 235                 240

Gly Gln Pro Val Ser Phe Leu Leu Lys Glu Leu Lys Gly Lys Ile Pro
                245                 250                 255

Asp Val Pro Gly Phe Ser Trp Val Thr Pro Cys Ile Ser Ala Lys Asp
            260                 265                 270

Ile Val Tyr Ile Gly Leu Arg Asp Val Asp Pro Gly Glu His Tyr Ile
            275                 280                 285

Leu Lys Thr Leu Gly Ile Lys Tyr Phe Ser Met Thr Glu Val Asp Arg
            290                 295                 300

Leu Gly Ile Gly Lys Val Met Glu Glu Thr Leu Ser Tyr Leu Leu Gly
305                 310                 315                 320

Arg Lys Lys Arg Pro Ile His Leu Ser Phe Asp Val Asp Gly Leu Asp
            325                 330                 335

Pro Ser Phe Thr Pro Ala Thr Gly Thr Pro Val Val Gly Gly Leu Thr
            340                 345                 350

Tyr Arg Glu Gly Leu Tyr Ile Thr Glu Glu Ile Tyr Lys Thr Gly Leu
            355                 360                 365

Leu Ser Gly Leu Asp Ile Met Glu Val Asn Pro Ser Leu Gly Lys Thr
            370                 375                 380

Pro Glu Glu Val Thr Arg Thr Val Asn Thr Ala Val Ala Ile Thr Leu
385                 390                 395                 400

Ala Cys Phe Gly Leu Ala Arg Glu Gly Asn His Lys Pro Ile Asp Tyr
                405                 410                 415

Leu Asn Pro Pro Lys Ala Pro Ala Pro Glu Ala Pro Ala Ala Glu Pro
            420                 425                 430

Ala Ala Pro Ala Pro Ala Glu Pro Ala Ala Pro Ala Pro Glu Ala Pro
            435                 440                 445

Ala Ala Glu Pro Ala Ala Pro Ala Pro Ala Glu Pro Ala Ala Pro Ala
            450                 455                 460
```

```
Pro Glu Ala Pro Ala Ala Glu Pro Ala Pro Ala Ala Glu Pro
465                 470                 475                 480

Ala Ala Pro Ala Pro Glu Ala Pro Ala Ala Glu Pro Ala Ala Pro Ala
                485                 490                 495

Pro Ala Glu Pro Ala Ala Pro Ala Pro Glu Ala Pro Ala Ala Glu Pro
                500                 505                 510

Ala Ala Pro Ala Pro Ala Glu Pro Ala
            515                 520

<210> SEQ ID NO 110
<211> LENGTH: 941
<212> TYPE: PRT
<213> ORGANISM: Artificial Sequence
<220> FEATURE:
<223> OTHER INFORMATION: Fusion protein

<400> SEQUENCE: 110

Ala Glu Pro Ala Pro Pro Ala Ala Glu Pro Ala Pro Pro Ala Ala Glu
1               5                   10                  15

Ala Ala Glu Pro Ala Ala Pro Ala Glu Ala Glu Ala Pro Glu Ala
                20                  25                  30

Pro Pro Ala Pro Ala Pro Glu Pro Ala Pro Ala Glu Ala Ala Pro
            35                  40                  45

Pro Ala Glu Ala Ala Glu Pro Glu Pro Glu Ala Pro Ala Pro Ala Ala
                50                  55                  60

Glu Ala Ala Pro Ala Glu Ala Ala Glu Pro Glu Pro Glu Ala Pro
65                  70                  75                  80

Ala Pro Ala Pro Pro Glu Ala Glu Glu Pro Glu Ala Ala Pro Ala
                85                  90                  95

Pro Ala Pro Ala Ala Pro Pro Glu Ala Pro Glu Ala Pro Glu Ala Ala
                100                 105                 110

Pro Ala Ala Pro Glu Pro Ala Glu Ala Ala Glu Ala Pro Ala Pro Glu
            115                 120                 125

Pro Ala Ala Glu Pro Glu Pro Ala Pro Glu Ala Pro Ala Ala Glu Ala
            130                 135                 140

Pro Ala Pro Glu Pro Ala Ala Glu Pro Glu Pro Ala Pro Glu Ala Pro
145                 150                 155                 160

Ala Ala Glu Ala Pro Ala Pro Glu Pro Ala Ala Glu Pro Glu Pro Ala
                165                 170                 175

Pro Glu Ala Pro Ala Pro Ala Pro Glu Ala Glu Glu Pro Pro Glu
            180                 185                 190

Ala Ala Pro Ala Pro Ala Pro Ala Ala Glu Pro Ala Pro Pro Glu Glu
                195                 200                 205

Ala Ala Pro Ala Pro Ala Ala Pro Glu Pro Glu Ala Ala Pro Ala
                210                 215                 220

Glu Glu Ala Glu Ala Pro Glu Ala Pro Pro Ala Pro Ala Pro Glu Pro
225                 230                 235                 240

Ala Pro Pro Ala Glu Glu Pro Ala Glu Ala Pro Ala Glu Pro Pro Ala
                245                 250                 255

Ala Pro Glu Ala Ala Ala Glu Ala Glu Ala Ala Glu Ala Glu Pro Pro
                260                 265                 270

Ala Pro Pro Ala Pro Glu Pro Ala Ser Ala Lys Ser Arg Thr Ile Gly
            275                 280                 285

Ile Ile Gly Ala Pro Phe Ser Lys Gly Gln Pro Arg Gly Gly Val Glu
            290                 295                 300
```

```
Glu Gly Pro Thr Val Leu Arg Lys Ala Gly Leu Glu Lys Leu Lys
305                 310                 315                 320

Glu Gln Glu Cys Asp Val Lys Asp Tyr Gly Asp Leu Pro Phe Ala Asp
            325                 330                 335

Ile Pro Asn Asp Ser Pro Phe Gln Ile Val Lys Asn Pro Arg Ser Val
                340                 345                 350

Gly Lys Ala Ser Glu Gln Leu Ala Gly Lys Val Ala Glu Val Lys Lys
            355                 360                 365

Asn Gly Arg Ile Ser Leu Val Leu Gly Gly Asp His Ser Leu Ala Ile
370                 375                 380

Gly Ser Ile Ser Gly His Ala Arg Val His Pro Asp Leu Gly Val Ile
385                 390                 395                 400

Trp Val Asp Ala His Thr Asp Ile Asn Thr Pro Leu Thr Thr Thr Ser
                405                 410                 415

Gly Asn Leu His Gly Gln Pro Val Ser Phe Leu Leu Lys Glu Leu Lys
                420                 425                 430

Gly Lys Ile Pro Asp Val Pro Gly Phe Ser Trp Val Thr Pro Cys Ile
            435                 440                 445

Ser Ala Lys Asp Ile Val Tyr Ile Gly Leu Arg Asp Val Asp Pro Gly
450                 455                 460

Glu His Tyr Ile Leu Lys Thr Leu Gly Ile Lys Tyr Phe Ser Met Thr
465                 470                 475                 480

Glu Val Asp Arg Leu Gly Ile Gly Lys Val Met Glu Glu Thr Leu Ser
                485                 490                 495

Tyr Leu Leu Gly Arg Lys Lys Arg Pro Ile His Leu Ser Phe Asp Val
                500                 505                 510

Asp Gly Leu Asp Pro Ser Phe Thr Pro Ala Thr Gly Thr Pro Val Val
            515                 520                 525

Gly Gly Leu Thr Tyr Arg Glu Gly Leu Tyr Ile Thr Glu Glu Ile Tyr
            530                 535                 540

Lys Thr Gly Leu Leu Ser Gly Leu Asp Ile Met Glu Val Asn Pro Ser
545                 550                 555                 560

Leu Gly Lys Thr Pro Glu Glu Val Thr Arg Thr Val Asn Thr Ala Val
                565                 570                 575

Ala Ile Thr Leu Ala Cys Phe Gly Leu Ala Arg Glu Gly Asn His Lys
            580                 585                 590

Pro Ile Asp Tyr Leu Asn Pro Lys Ala Pro Glu Ala Pro Glu
            595                 600                 605

Ala Pro Glu Ala Ala Pro Ala Ala Pro Glu Pro Ala Glu Ala Pro Pro
610                 615                 620

Ala Glu Glu Pro Ala Glu Ala Pro Ala Glu Pro Ala Ala Pro Glu
625                 630                 635                 640

Ala Ala Pro Ala Pro Pro Glu Ala Glu Pro Pro Glu Ala Ala Pro
            645                 650                 655

Ala Pro Ala Pro Ala Ala Ala Glu Ala Glu Ala Ala Glu Ala Glu Pro
            660                 665                 670

Pro Ala Pro Pro Ala Pro Glu Pro Ala Ala Pro Pro Glu Ala Glu Pro
            675                 680                 685

Pro Glu Ala Pro Glu Ala Ala Glu Ala Ala Pro Ala Pro Ala
            690                 695                 700

Ala Glu Ala Ala Pro Pro Ala Glu Ala Ala Glu Pro Glu Pro Glu Ala
705                 710                 715                 720

Pro Ala Ala Glu Ala Glu Ala Ala Glu Ala Glu Pro Pro Ala Pro Pro
```

```
                    725                 730                 735
Ala Pro Glu Pro Ala Ala Pro Ala Glu Glu Pro Ala Glu Ala Pro
                740                 745                 750

Ala Glu Pro Pro Ala Ala Pro Glu Ala Ala Glu Ala Pro Ala Ala
                755                 760                 765

Pro Pro Ala Pro Glu Pro Glu Ala Glu Pro Glu Pro Ala Ala Pro Ala
770                 775                 780

Pro Pro Glu Ala Glu Glu Pro Pro Glu Ala Ala Pro Ala Pro Ala Pro
785                 790                 795                 800

Ala Ala Glu Pro Ala Pro Pro Ala Ala Glu Pro Ala Pro Pro Ala Ala
                805                 810                 815

Glu Ala Ala Glu Pro Ala Pro Ala Pro Pro Glu Ala Glu Glu Pro Pro
                820                 825                 830

Glu Ala Ala Pro Ala Pro Ala Pro Ala Ala Pro Ala Glu Ala Pro Ala
                835                 840                 845

Ala Ala Glu Glu Ala Pro Pro Ala Glu Pro Ala Pro Glu Ala Pro Ala
                850                 855                 860

Ala Glu Ala Ala Pro Pro Ala Glu Ala Ala Glu Pro Glu Pro Glu Ala
865                 870                 875                 880

Pro Ala Pro Pro Ala Glu Glu Pro Ala Glu Ala Pro Ala Glu Pro Pro
                885                 890                 895

Ala Ala Pro Glu Ala Ala Pro Glu Glu Pro Ala Pro Glu Ala Pro Ala
                900                 905                 910

Ala Pro Ala Glu Ala Pro Pro Ala Pro Ala Glu Pro Ala Pro Pro Glu
                915                 920                 925

Glu Ala Ala Pro Ala Ala Pro Ala Ala Pro Glu Pro Glu
                930                 935                 940

<210> SEQ ID NO 111
<211> LENGTH: 961
<212> TYPE: PRT
<213> ORGANISM: Artificial Sequence
<220> FEATURE:
<223> OTHER INFORMATION: Fusion protein

<400> SEQUENCE: 111

Ala Ala Glu Ala Pro Ala Ala Pro Pro Ala Pro Glu Pro Glu Ala Glu
1               5                   10                  15

Pro Glu Pro Ala Ala Ala Glu Ala Pro Ala Ala Pro Pro Ala Pro Glu
                20                  25                  30

Pro Glu Ala Glu Pro Glu Pro Ala Ala Pro Glu Glu Pro Ala Pro Glu
                35                  40                  45

Ala Pro Ala Ala Pro Ala Glu Ala Pro Ala Pro Ala Pro Pro Ala
                50                  55                  60

Glu Glu Pro Ala Glu Ala Pro Ala Glu Pro Pro Ala Ala Pro Glu Ala
65                  70                  75                  80

Ala Pro Pro Glu Ala Glu Pro Pro Glu Ala Glu Ala Ala Glu Ala
                85                  90                  95

Ala Pro Ala Pro Ala Ala Pro Glu Glu Ala Glu Ala Pro Glu Ala
                100                 105                 110

Pro Pro Ala Pro Ala Glu Pro Ala Pro Ala Glu Pro Ala Ala
                115                 120                 125

Ala Glu Glu Ala Pro Pro Ala Glu Pro Ala Glu Ala Pro Pro Ala
                130                 135                 140

Glu Glu Pro Ala Glu Ala Pro Ala Glu Pro Pro Ala Ala Pro Glu Ala
```

```
            145                 150                 155                 160
        Ala Ala Glu Ala Pro Ala Pro Glu Pro Ala Ala Glu Pro Pro Ala
                        165                 170                 175

Pro Glu Ala Pro Ala Glu Pro Ala Pro Pro Ala Ala Glu Pro Ala Pro
                        180                 185                 190

Pro Ala Ala Glu Ala Ala Glu Pro Ala Glu Pro Ala Pro Pro Ala Ala
                        195                 200                 205

Glu Pro Ala Pro Pro Ala Ala Glu Ala Ala Glu Pro Ala Pro Pro Ala
        210                 215                 220

Glu Glu Pro Ala Glu Ala Pro Ala Glu Pro Pro Ala Ala Pro Glu Ala
        225                 230                 235                 240

Ala Ala Pro Ala Glu Glu Ala Glu Ala Pro Glu Ala Pro Pro Ala Pro
                        245                 250                 255

Ala Pro Glu Pro Ala Glu Pro Ala Pro Pro Ala Ala Glu Pro Ala Pro
                        260                 265                 270

Pro Ala Ala Glu Ala Ala Glu Pro Ala Ala Glu Ala Pro Ala Ala Pro
                        275                 280                 285

Pro Ala Pro Glu Pro Glu Ala Glu Pro Glu Pro Ala Ser Ala Lys Ser
                        290                 295                 300

Arg Thr Ile Gly Ile Ile Gly Ala Pro Phe Ser Lys Gly Gln Pro Arg
        305                 310                 315                 320

Gly Gly Val Glu Glu Gly Pro Thr Val Leu Arg Lys Ala Gly Leu Leu
                        325                 330                 335

Glu Lys Leu Lys Glu Gln Glu Cys Asp Val Lys Asp Tyr Gly Asp Leu
                        340                 345                 350

Pro Phe Ala Asp Ile Pro Asn Asp Ser Pro Phe Gln Ile Val Lys Asn
                        355                 360                 365

Pro Arg Ser Val Gly Lys Ala Ser Glu Gln Leu Ala Gly Lys Val Ala
                        370                 375                 380

Glu Val Lys Lys Asn Gly Arg Ile Ser Leu Val Leu Gly Gly Asp His
        385                 390                 395                 400

Ser Leu Ala Ile Gly Ser Ile Ser Gly His Ala Arg Val His Pro Asp
                        405                 410                 415

Leu Gly Val Ile Trp Val Asp Ala His Thr Asp Ile Asn Thr Pro Leu
                        420                 425                 430

Thr Thr Thr Ser Gly Asn Leu His Gly Gln Pro Val Ser Phe Leu Leu
                        435                 440                 445

Lys Glu Leu Lys Gly Lys Ile Pro Asp Val Pro Gly Phe Ser Trp Val
        450                 455                 460

Thr Pro Cys Ile Ser Ala Lys Asp Ile Val Tyr Ile Gly Leu Arg Asp
        465                 470                 475                 480

Val Asp Pro Gly Glu His Tyr Ile Leu Lys Thr Leu Gly Ile Lys Tyr
                        485                 490                 495

Phe Ser Met Thr Glu Val Asp Arg Leu Gly Ile Gly Lys Val Met Glu
                        500                 505                 510

Glu Thr Leu Ser Tyr Leu Leu Gly Arg Lys Lys Arg Pro Ile His Leu
                        515                 520                 525

Ser Phe Asp Val Asp Gly Leu Asp Pro Ser Phe Thr Pro Ala Thr Gly
                        530                 535                 540

Thr Pro Val Val Gly Gly Leu Thr Tyr Arg Glu Gly Leu Tyr Ile Thr
        545                 550                 555                 560

Glu Glu Ile Tyr Lys Thr Gly Leu Leu Ser Gly Leu Asp Ile Met Glu
                        565                 570                 575
```

-continued

Val Asn Pro Ser Leu Gly Lys Thr Pro Glu Glu Val Thr Arg Thr Val
            580                 585                 590

Asn Thr Ala Val Ala Ile Thr Leu Ala Cys Phe Gly Leu Ala Arg Glu
        595                 600                 605

Gly Asn His Lys Pro Ile Asp Tyr Leu Asn Pro Lys Ala Pro Ala
610                 615                 620

Pro Pro Glu Ala Glu Pro Pro Glu Ala Ala Pro Ala Pro Ala Pro
625                 630                 635                 640

Ala Ala Glu Pro Ala Pro Pro Glu Ala Ala Pro Ala Ala Pro Ala
            645                 650                 655

Ala Pro Glu Pro Glu Ala Pro Ala Pro Glu Ala Glu Pro Pro
            660                 665                 670

Glu Ala Ala Pro Ala Pro Ala Pro Ala Ala Pro Ala Ala Glu Ala Ala
            675                 680                 685

Pro Pro Ala Glu Ala Ala Glu Pro Glu Pro Glu Ala Pro Ala Ala Glu
            690                 695                 700

Ala Glu Ala Ala Glu Ala Glu Pro Pro Ala Pro Pro Ala Pro Glu Pro
705                 710                 715                 720

Ala Ala Pro Ala Ala Glu Ala Ala Pro Pro Ala Glu Ala Ala Glu Pro
            725                 730                 735

Glu Pro Glu Ala Pro Ala Pro Pro Glu Ala Pro Glu Ala Pro Glu Ala
            740                 745                 750

Ala Pro Ala Ala Pro Glu Pro Ala Glu Ala Glu Ala Pro Ala Ala
            755                 760                 765

Pro Pro Ala Pro Glu Pro Glu Ala Pro Glu Pro Ala Ala Ala Glu
            770                 775                 780

Ala Pro Ala Ala Pro Pro Ala Pro Glu Pro Glu Ala Glu Pro Glu Pro
785                 790                 795                 800

Ala Ala Ala Glu Ala Glu Ala Glu Ala Glu Pro Pro Ala Pro Pro
            805                 810                 815

Ala Pro Glu Pro Ala Ala Pro Pro Ala Glu Glu Pro Ala Glu Ala Pro
            820                 825                 830

Ala Glu Pro Pro Ala Ala Pro Glu Ala Ala Pro Ala Pro Pro Glu Ala
            835                 840                 845

Glu Glu Pro Pro Glu Ala Ala Pro Ala Pro Ala Pro Ala Ala Ala Glu
            850                 855                 860

Ala Pro Ala Pro Glu Pro Ala Ala Glu Pro Glu Pro Ala Pro Glu Ala
865                 870                 875                 880

Pro Ala Glu Pro Ala Pro Pro Ala Ala Glu Pro Ala Pro Pro Ala Ala
                885                 890                 895

Glu Ala Ala Glu Pro Ala Ala Pro Ala Glu Glu Ala Glu Ala Pro Glu
            900                 905                 910

Ala Pro Pro Ala Pro Ala Pro Glu Pro Ala Pro Ala Ala Glu Ala Ala
            915                 920                 925

Pro Pro Ala Glu Ala Ala Glu Pro Glu Pro Glu Ala Pro Ala Ala Glu
            930                 935                 940

Ala Glu Ala Ala Glu Ala Glu Pro Pro Ala Pro Pro Ala Pro Glu Pro
945                 950                 955                 960

Ala

<210> SEQ ID NO 112
<211> LENGTH: 961
<212> TYPE: PRT

<213> ORGANISM: Artificial Sequence
<220> FEATURE:
<223> OTHER INFORMATION: Fusion protein

<400> SEQUENCE: 112

```
Ala Pro Ala Glu Ala Pro Ala Ala Glu Glu Ala Pro Pro Ala Glu
1               5                   10                  15

Pro Ala Pro Glu Ala Pro Glu Glu Pro Ala Pro Glu Ala Pro Ala
                20                  25                  30

Pro Ala Glu Ala Pro Pro Ala Ala Glu Pro Ala Pro Glu Glu
                35                  40              45

Ala Ala Pro Ala Ala Pro Ala Ala Pro Glu Pro Glu Ala Ala Pro Ala
50                  55                  60

Glu Glu Ala Glu Ala Pro Glu Ala Pro Pro Ala Pro Ala Pro Glu Pro
65                  70                  75                  80

Ala Pro Ala Glu Ala Pro Ala Ala Glu Glu Ala Pro Pro Ala Glu
                85                  90                  95

Pro Ala Pro Glu Ala Pro Ala Pro Glu Ala Glu Glu Pro Pro Glu
                100                 105                 110

Ala Ala Pro Ala Pro Ala Pro Ala Ala Pro Glu Ala Pro Glu Ala
                115                 120                 125

Pro Glu Ala Ala Pro Ala Ala Pro Glu Pro Ala Glu Ala Glu Pro Ala
                130                 135                 140

Pro Pro Glu Glu Ala Ala Pro Ala Ala Pro Ala Ala Pro Glu Pro Glu
145                 150                 155                 160

Ala Ala Glu Ala Pro Ala Ala Pro Pro Ala Pro Glu Pro Glu Ala Glu
                165                 170                 175

Pro Glu Pro Ala Ala Pro Glu Glu Pro Ala Pro Glu Ala Pro Ala Ala
                180                 185                 190

Pro Ala Glu Ala Pro Pro Ala Pro Ala Pro Ala Ala Glu Ala Ala Pro
                195                 200                 205

Pro Ala Glu Ala Ala Glu Pro Glu Pro Glu Ala Pro Ala Ala Glu Ala
                210                 215                 220

Glu Ala Ala Glu Ala Glu Pro Pro Ala Pro Pro Ala Pro Glu Pro Ala
225                 230                 235                 240

Ala Pro Pro Glu Ala Glu Pro Pro Glu Ala Pro Glu Ala Ala Glu Ala
                245                 250                 255

Ala Pro Ala Pro Ala Glu Pro Ala Pro Pro Ala Ala Glu Pro Ala Pro
                260                 265                 270

Pro Ala Ala Glu Ala Ala Glu Pro Ala Pro Glu Ala Glu Pro Pro
                275                 280                 285

Glu Ala Pro Glu Ala Ala Glu Ala Ala Pro Ala Pro Ala Pro Glu Glu
                290                 295                 300

Pro Ala Pro Glu Ala Pro Ala Ala Pro Ala Glu Ala Pro Pro Ala Pro
305                 310                 315                 320

Ser Ala Lys Ser Arg Thr Ile Gly Ile Ile Gly Ala Pro Phe Ser Lys
                325                 330                 335

Gly Gln Pro Arg Gly Gly Val Glu Glu Gly Pro Thr Val Leu Arg Lys
                340                 345                 350

Ala Gly Leu Leu Glu Lys Leu Lys Glu Gln Glu Cys Asp Val Lys Asp
                355                 360                 365

Tyr Gly Asp Leu Pro Phe Ala Asp Ile Pro Asn Asp Ser Pro Phe Gln
                370                 375                 380

Ile Val Lys Asn Pro Arg Ser Val Gly Lys Ala Ser Glu Gln Leu Ala
```

```
            385                 390                 395                 400

Gly Lys Val Ala Glu Val Lys Lys Asn Gly Arg Ile Ser Leu Val Leu
                        405                 410                 415

Gly Gly Asp His Ser Leu Ala Ile Gly Ser Ile Ser Gly His Ala Arg
                        420                 425                 430

Val His Pro Asp Leu Gly Val Ile Trp Val Asp Ala His Thr Asp Ile
                        435                 440                 445

Asn Thr Pro Leu Thr Thr Thr Ser Gly Asn Leu His Gly Gln Pro Val
                    450                 455                 460

Ser Phe Leu Leu Lys Glu Leu Lys Gly Lys Ile Pro Asp Val Pro Gly
        465                 470                 475                 480

Phe Ser Trp Val Thr Pro Cys Ile Ser Ala Lys Asp Ile Val Tyr Ile
                        485                 490                 495

Gly Leu Arg Asp Val Asp Pro Gly Glu His Tyr Ile Leu Lys Thr Leu
                        500                 505                 510

Gly Ile Lys Tyr Phe Ser Met Thr Glu Val Asp Arg Leu Gly Ile Gly
                        515                 520                 525

Lys Val Met Glu Glu Thr Leu Ser Tyr Leu Leu Gly Arg Lys Lys Arg
                        530                 535                 540

Pro Ile His Leu Ser Phe Asp Val Asp Gly Leu Asp Pro Ser Phe Thr
        545                 550                 555                 560

Pro Ala Thr Gly Thr Pro Val Val Gly Gly Leu Thr Tyr Arg Glu Gly
                        565                 570                 575

Leu Tyr Ile Thr Glu Glu Ile Tyr Lys Thr Gly Leu Leu Ser Gly Leu
                        580                 585                 590

Asp Ile Met Glu Val Asn Pro Ser Leu Gly Lys Thr Pro Glu Glu Val
                        595                 600                 605

Thr Arg Thr Val Asn Thr Ala Val Ala Ile Thr Leu Ala Cys Phe Gly
                        610                 615                 620

Leu Ala Arg Glu Gly Asn His Lys Pro Ile Asp Tyr Leu Asn Pro Pro
        625                 630                 635                 640

Lys Ala Pro Ala Ala Glu Ala Ala Pro Ala Glu Ala Ala Glu Pro
                        645                 650                 655

Glu Pro Glu Ala Pro Ala Pro Ala Glu Glu Pro Ala Glu Ala Pro
                        660                 665                 670

Ala Glu Pro Pro Ala Ala Pro Glu Ala Ala Glu Ala Glu Ala Ala
                        675                 680                 685

Glu Ala Glu Pro Pro Ala Pro Pro Ala Pro Glu Pro Ala Ala Ala Glu
                        690                 695                 700

Ala Glu Ala Ala Glu Ala Pro Pro Ala Pro Pro Ala Pro Glu Pro
        705                 710                 715                 720

Ala Ala Ala Glu Ala Pro Ala Pro Glu Ala Ala Glu Pro Glu Pro
                        725                 730                 735

Ala Pro Glu Ala Pro Ala Pro Ala Pro Glu Ala Glu Glu Pro Pro
                        740                 745                 750

Glu Ala Ala Pro Ala Pro Ala Pro Ala Ala Pro Ala Pro Pro Glu Ala
                        755                 760                 765

Glu Glu Pro Pro Glu Ala Ala Pro Ala Pro Ala Pro Ala Ala Glu Pro
        770                 775                 780

Ala Pro Pro Glu Glu Ala Ala Pro Ala Ala Pro Ala Ala Pro Glu Pro
        785                 790                 795                 800

Glu Ala Ala Glu Ala Pro Ala Pro Glu Pro Ala Ala Glu Pro Glu Pro
                        805                 810                 815
```

Ala Pro Glu Ala Pro Ala Glu Ala Glu Pro Ala Ala Pro Ala Pro Ala
                820                 825                 830

Glu Pro Ala Glu Pro Glu Ala Pro Ala Ala Glu Pro Ala Ala
                835                 840                 845

Pro Ala Pro Ala Glu Pro Ala Glu Pro Glu Ala Pro Ala Ala Ala Glu
    850                 855                 860

Ala Glu Ala Ala Glu Ala Glu Pro Pro Ala Pro Ala Pro Glu Pro
865                 870                 875                 880

Ala Ala Ala Glu Ala Pro Ala Pro Pro Ala Pro Glu Pro Glu Ala
                885                 890                 895

Glu Pro Glu Pro Ala Ala Pro Ala Ala Glu Ala Ala Pro Pro Ala Glu
                900                 905                 910

Ala Ala Glu Pro Glu Pro Ala Pro Ala Pro Ala Glu Ala Pro Ala
                915                 920                 925

Ala Ala Glu Glu Ala Pro Pro Ala Glu Pro Ala Pro Glu Ala Pro Ala
                930                 935                 940

Pro Pro Glu Ala Glu Glu Pro Pro Glu Ala Ala Pro Ala Pro Ala Pro
945                 950                 955                 960

Ala

<210> SEQ ID NO 113
<211> LENGTH: 825
<212> TYPE: PRT
<213> ORGANISM: Artificial Sequence
<220> FEATURE:
<223> OTHER INFORMATION: Fusion protein

<400> SEQUENCE: 113

Ala Ser Pro Ala Ala Pro Ala Pro Ala Ser Pro Ala Ala Pro Ala Pro
1               5                   10                  15

Ser Ala Pro Ala Ala Ser Pro Ala Ala Pro Ala Pro Ala Ser Pro Ala
                20                  25                  30

Ala Pro Ala Pro Ser Ala Pro Ala Ala Ser Pro Ala Ala Pro Ala Pro
            35                  40                  45

Ala Ser Pro Ala Ala Pro Ala Pro Ser Ala Pro Ala Ala Ser Pro Ala
        50                  55                  60

Ala Pro Ala Pro Ala Ser Pro Ala Ala Pro Ala Pro Ser Ala Pro Ala
65                  70                  75                  80

Ala Ser Pro Ala Ala Pro Ala Pro Ala Ser Pro Ala Ala Pro Ala Pro
                85                  90                  95

Ser Ala Pro Ala Ala Ser Pro Ala Ala Pro Ala Pro Ala Ser Pro Ala
                100                 105                 110

Ala Pro Ala Pro Ser Ala Pro Ala Ala Ser Pro Ala Ala Pro Ala Pro
            115                 120                 125

Ala Ser Pro Ala Ala Pro Ala Pro Ser Ala Pro Ala Ala Ser Pro Ala
        130                 135                 140

Ala Pro Ala Pro Ala Ser Pro Ala Ala Pro Ala Pro Ser Ala Pro Ala
145                 150                 155                 160

Ala Ser Pro Ala Ala Pro Ala Pro Ala Ser Pro Ala Ala Pro Ala Pro
                165                 170                 175

Ser Ala Pro Ala Ala Ser Pro Ala Ala Pro Ala Pro Ala Ser Pro Ala
                180                 185                 190

Ala Pro Ala Pro Ser Ala Pro Ala Ala Ser Pro Ala Ala Pro Ala Pro
            195                 200                 205

Ala Ser Pro Ala Ala Pro Ala Pro Ser Ala Pro Ala Ala Ser Pro Ala
                210                 215                 220

Ala Pro Ala Pro Ala Ser Pro Ala Ala Pro Ala Pro Ser Ala Pro Ala
225                 230                 235                 240

Ala Ser Pro Ala Ala Pro Ala Pro Ser Ala Ser Ala Lys Ser
                245                 250                 255

Arg Thr Ile Gly Ile Ile Gly Ala Pro Phe Ser Lys Gly Gln Pro Arg
                260                 265                 270

Gly Gly Val Glu Glu Gly Pro Thr Val Leu Arg Lys Ala Gly Leu Leu
                275                 280                 285

Glu Lys Leu Lys Glu Gln Glu Cys Asp Val Lys Asp Tyr Gly Asp Leu
                290                 295                 300

Pro Phe Ala Asp Ile Pro Asn Asp Ser Pro Phe Gln Ile Val Lys Asn
305                 310                 315                 320

Pro Arg Ser Val Gly Lys Ala Ser Glu Gln Leu Ala Gly Lys Val Ala
                325                 330                 335

Glu Val Lys Lys Asn Gly Arg Ile Ser Leu Val Leu Gly Asp His
                340                 345                 350

Ser Leu Ala Ile Gly Ser Ile Ser Gly His Ala Arg Val His Pro Asp
                355                 360                 365

Leu Gly Val Ile Trp Val Asp Ala His Thr Asp Ile Asn Thr Pro Leu
                370                 375                 380

Thr Thr Thr Ser Gly Asn Leu His Gly Gln Pro Val Ser Phe Leu Leu
385                 390                 395                 400

Lys Glu Leu Lys Gly Lys Ile Pro Asp Val Pro Gly Phe Ser Trp Val
                405                 410                 415

Thr Pro Cys Ile Ser Ala Lys Asp Ile Val Tyr Ile Gly Leu Arg Asp
                420                 425                 430

Val Asp Pro Gly Glu His Tyr Ile Leu Lys Thr Leu Gly Ile Lys Tyr
                435                 440                 445

Phe Ser Met Thr Glu Val Asp Arg Leu Gly Ile Gly Lys Val Met Glu
                450                 455                 460

Glu Thr Leu Ser Tyr Leu Leu Gly Arg Lys Lys Arg Pro Ile His Leu
465                 470                 475                 480

Ser Phe Asp Val Asp Gly Leu Asp Pro Ser Phe Thr Pro Ala Thr Gly
                485                 490                 495

Thr Pro Val Val Gly Gly Leu Thr Tyr Arg Glu Gly Leu Tyr Ile Thr
                500                 505                 510

Glu Glu Ile Tyr Lys Thr Gly Leu Leu Ser Gly Leu Asp Ile Met Glu
                515                 520                 525

Val Asn Pro Ser Leu Gly Lys Thr Pro Glu Glu Val Thr Arg Thr Val
530                 535                 540

Asn Thr Ala Val Ala Ile Thr Leu Ala Cys Phe Gly Leu Ala Arg Glu
545                 550                 555                 560

Gly Asn His Lys Pro Ile Asp Tyr Leu Asn Pro Lys Ala Ser Pro
                565                 570                 575

Ala Ala Pro Ala Pro Ala Ser Pro Ala Ala Pro Ala Pro Ser Ala Pro
                580                 585                 590

Ala Ala Ser Pro Ala Ala Pro Ala Pro Ser Ala Ala Pro Ala
                595                 600                 605

Pro Ser Ala Pro Ala Ala Ser Pro Ala Ala Pro Ala Pro Ser
610                 615                 620

Ala Ala Pro Ala Pro Ser Ala Pro Ala Ala Ser Pro Ala Ala Pro Ala

```
                625                 630                 635                 640
Pro Ala Ser Pro Ala Pro Ala Pro Ser Ala Pro Ala Ala Ser Pro
                    645                 650                 655
Ala Ala Pro Ala Pro Ala Ser Pro Ala Ala Pro Ala Pro Ser Ala Pro
                    660                 665                 670
Ala Ala Ser Pro Ala Ala Pro Ala Pro Ala Ser Pro Ala Ala Pro Ala
                    675                 680                 685
Pro Ser Ala Pro Ala Ala Ser Pro Ala Ala Pro Ala Pro Ala Ser Pro
                    690                 695                 700
Ala Ala Pro Ala Pro Ser Ala Pro Ala Ala Ser Pro Ala Ala Pro Ala
705                 710                 715                 720
Pro Ala Ser Pro Ala Ala Pro Ala Pro Ser Ala Pro Ala Ala Ser Pro
                    725                 730                 735
Ala Ala Pro Ala Pro Ala Ser Pro Ala Ala Pro Ala Pro Ser Ala Pro
                    740                 745                 750
Ala Ala Ser Pro Ala Ala Pro Ala Pro Ala Ser Pro Ala Ala Pro Ala
                    755                 760                 765
Pro Ser Ala Pro Ala Ala Ser Pro Ala Ala Pro Ala Pro Ala Ser Pro
                    770                 775                 780
Ala Ala Pro Ala Pro Ser Ala Pro Ala Ala Ser Pro Ala Ala Pro Ala
785                 790                 795                 800
Pro Ala Ser Pro Ala Ala Pro Ala Pro Ser Ala Pro Ala Ala Ser Pro
                    805                 810                 815
Ala Ala Pro Ala Pro Ala Ser Pro Ala
                    820                 825

<210> SEQ ID NO 114
<211> LENGTH: 613
<212> TYPE: PRT
<213> ORGANISM: Artificial Sequence
<220> FEATURE:
<223> OTHER INFORMATION: Fusion protein

<400> SEQUENCE: 114

Gly Gly Thr Ser Glu Ser Ala Thr Pro Glu Ser Gly Pro Gly Thr Ser
1               5                   10                  15
Thr Glu Pro Ser Glu Gly Ser Ala Pro Gly Thr Ser Thr Glu Pro Ser
                20                  25                  30
Glu Gly Ser Ala Pro Gly Thr Ser Glu Ser Ala Thr Pro Glu Ser Gly
            35                  40                  45
Pro Gly Thr Ser Thr Glu Pro Ser Glu Gly Ser Ala Pro Gly Thr Ser
        50                  55                  60
Thr Glu Pro Ser Glu Gly Ser Ala Pro Gly Thr Ser Glu Ser Ala Thr
65                  70                  75                  80
Pro Glu Ser Gly Pro Gly Thr Ser Thr Glu Pro Ser Glu Gly Ser Ala
                85                  90                  95
Pro Gly Thr Ser Thr Glu Pro Ser Glu Gly Ser Ala Pro Gly Thr Ser
                100                 105                 110
Thr Glu Pro Ser Glu Gly Ser Ala Pro Gly Ser Pro Ala Gly Ser Pro
                115                 120                 125
Thr Ser Thr Glu Glu Gly Thr Ser Thr Glu Pro Ser Glu Gly Ser Ala
            130                 135                 140
Pro Gly Ser Ala Lys Ser Arg Thr Ile Gly Ile Ile Gly Ala Pro Phe
145                 150                 155                 160
Ser Lys Gly Gln Pro Arg Gly Gly Val Glu Glu Gly Pro Thr Val Leu
```

```
              165                 170                 175
Arg Lys Ala Gly Leu Leu Glu Lys Leu Lys Glu Gln Glu Cys Asp Val
                180                 185                 190

Lys Asp Tyr Gly Asp Leu Pro Phe Ala Asp Ile Pro Asn Asp Ser Pro
            195                 200                 205

Phe Gln Ile Val Lys Asn Pro Arg Ser Val Gly Lys Ala Ser Glu Gln
        210                 215                 220

Leu Ala Gly Lys Val Ala Glu Val Lys Lys Asn Gly Arg Ile Ser Leu
225                 230                 235                 240

Val Leu Gly Gly Asp His Ser Leu Ala Ile Gly Ser Ile Ser Gly His
                245                 250                 255

Ala Arg Val His Pro Asp Leu Gly Val Ile Trp Val Asp Ala His Thr
                260                 265                 270

Asp Ile Asn Thr Pro Leu Thr Thr Thr Ser Gly Asn Leu His Gly Gln
            275                 280                 285

Pro Val Ser Phe Leu Leu Lys Glu Leu Lys Gly Lys Ile Pro Asp Val
        290                 295                 300

Pro Gly Phe Ser Trp Val Thr Pro Cys Ile Ser Ala Lys Asp Ile Val
305                 310                 315                 320

Tyr Ile Gly Leu Arg Asp Val Asp Pro Gly Glu His Tyr Ile Leu Lys
                325                 330                 335

Thr Leu Gly Ile Lys Tyr Phe Ser Met Thr Glu Val Asp Arg Leu Gly
                340                 345                 350

Ile Gly Lys Val Met Glu Glu Thr Leu Ser Tyr Leu Leu Gly Arg Lys
            355                 360                 365

Lys Arg Pro Ile His Leu Ser Phe Asp Val Asp Gly Leu Asp Pro Ser
370                 375                 380

Phe Thr Pro Ala Thr Gly Thr Pro Val Val Gly Gly Leu Thr Tyr Arg
385                 390                 395                 400

Glu Gly Leu Tyr Ile Thr Glu Glu Ile Tyr Lys Thr Gly Leu Leu Ser
                405                 410                 415

Gly Leu Asp Ile Met Glu Val Asn Pro Ser Leu Gly Lys Thr Pro Glu
                420                 425                 430

Glu Val Thr Arg Thr Val Asn Thr Ala Val Ala Ile Thr Leu Ala Cys
            435                 440                 445

Phe Gly Leu Ala Arg Glu Gly Asn His Lys Pro Ile Asp Tyr Leu Asn
        450                 455                 460

Pro Pro Lys Gly Gly Thr Ser Glu Ser Ala Thr Pro Glu Ser Gly Pro
465                 470                 475                 480

Gly Thr Ser Thr Glu Pro Ser Glu Gly Ser Ala Pro Gly Thr Ser Thr
                485                 490                 495

Glu Pro Ser Glu Gly Ser Ala Pro Gly Thr Ser Glu Ser Ala Thr Pro
            500                 505                 510

Glu Ser Gly Pro Gly Thr Ser Thr Glu Pro Ser Glu Gly Ser Ala Pro
        515                 520                 525

Gly Thr Ser Thr Glu Pro Ser Glu Gly Ser Ala Pro Gly Thr Ser Glu
            530                 535                 540

Ser Ala Thr Pro Glu Ser Gly Pro Gly Thr Ser Thr Glu Pro Ser Glu
545                 550                 555                 560

Gly Ser Ala Pro Gly Thr Ser Thr Glu Pro Ser Glu Gly Ser Ala Pro
                565                 570                 575

Gly Thr Ser Thr Glu Pro Ser Glu Gly Ser Ala Pro Gly Ser Pro Ala
            580                 585                 590
```

-continued

Gly Ser Pro Thr Ser Thr Glu Glu Gly Thr Ser Thr Glu Pro Ser Glu
        595                 600                 605

Gly Ser Ala Pro Gly
    610

<210> SEQ ID NO 115
<211> LENGTH: 897
<212> TYPE: PRT
<213> ORGANISM: Artificial Sequence
<220> FEATURE:
<223> OTHER INFORMATION: Fusion protein

<400> SEQUENCE: 115

Gly Ser Gly Gly Glu Gly Gly Ser Gly Gly Glu Gly Gly Ser Gly Gly
1               5                   10                  15

Glu Gly Gly Ser Gly Gly Glu Gly Gly Ser Gly Gly Glu Gly Gly Ser
            20                  25                  30

Gly Gly Glu Gly Gly Ser Gly Gly Glu Gly Gly Ser Gly Gly Glu Gly
        35                  40                  45

Gly Ser Gly Gly Glu Gly Gly Ser Gly Gly Glu Gly Gly Ser Gly Gly
    50                  55                  60

Glu Gly Gly Ser Gly Gly Glu Gly Gly Ser Gly Gly Glu Gly Gly Ser
65                  70                  75                  80

Gly Gly Glu Gly Gly Ser Gly Gly Glu Gly Gly Ser Gly Gly Glu Gly
                85                  90                  95

Gly Ser Gly Gly Glu Gly Gly Ser Gly Gly Glu Gly Gly Ser Gly Gly
            100                 105                 110

Glu Gly Gly Ser Gly Gly Glu Gly Gly Ser Gly Gly Glu Gly Gly Ser
        115                 120                 125

Gly Gly Glu Gly Gly Ser Gly Gly Glu Gly Gly Ser Gly Gly Glu Gly
    130                 135                 140

Gly Ser Gly Gly Glu Gly Gly Ser Gly Gly Glu Gly Gly Ser Gly Gly
145                 150                 155                 160

Glu Gly Gly Ser Gly Gly Glu Gly Gly Ser Gly Gly Glu Gly Gly Ser
                165                 170                 175

Gly Gly Glu Gly Gly Ser Gly Gly Glu Gly Gly Ser Gly Gly Glu Gly
            180                 185                 190

Gly Ser Gly Gly Glu Gly Gly Ser Gly Gly Glu Gly Gly Ser Gly Gly
        195                 200                 205

Glu Gly Gly Ser Gly Gly Glu Gly Gly Ser Gly Gly Glu Gly Gly Ser
    210                 215                 220

Gly Gly Glu Gly Gly Ser Gly Gly Glu Gly Gly Ser Gly Gly Glu Gly
225                 230                 235                 240

Gly Ser Gly Gly Glu Gly Gly Ser Gly Gly Glu Gly Gly Ser Gly Gly
                245                 250                 255

Glu Gly Gly Ser Gly Gly Glu Gly Gly Ser Gly Gly Glu Gly Gly Ser
            260                 265                 270

Gly Gly Glu Gly Gly Ser Gly Gly Glu Gly Gly Ser Gly Gly Glu Gly
        275                 280                 285

Ser Ala Lys Ser Arg Thr Ile Gly Ile Ile Gly Ala Pro Phe Ser Lys
    290                 295                 300

Gly Gln Pro Arg Gly Gly Val Glu Gly Pro Thr Val Leu Arg Lys
305                 310                 315                 320

Ala Gly Leu Leu Glu Lys Leu Lys Glu Gln Glu Cys Asp Val Lys Asp
                325                 330                 335

-continued

```
Tyr Gly Asp Leu Pro Phe Ala Asp Ile Pro Asn Asp Ser Pro Phe Gln
            340                 345                 350

Ile Val Lys Asn Pro Arg Ser Val Gly Lys Ala Ser Glu Gln Leu Ala
        355                 360                 365

Gly Lys Val Ala Glu Val Lys Lys Asn Gly Arg Ile Ser Leu Val Leu
    370                 375                 380

Gly Gly Asp His Ser Leu Ala Ile Gly Ile Ser Gly His Ala Arg
385                 390                 395                 400

Val His Pro Asp Leu Gly Val Ile Trp Val Asp Ala His Thr Asp Ile
                405                 410                 415

Asn Thr Pro Leu Thr Thr Thr Ser Gly Asn Leu His Gly Gln Pro Val
            420                 425                 430

Ser Phe Leu Leu Lys Glu Leu Lys Gly Lys Ile Pro Asp Val Pro Gly
        435                 440                 445

Phe Ser Trp Val Thr Pro Cys Ile Ser Ala Lys Asp Ile Val Tyr Ile
    450                 455                 460

Gly Leu Arg Asp Val Asp Pro Gly Glu His Tyr Ile Leu Lys Thr Leu
465                 470                 475                 480

Gly Ile Lys Tyr Phe Ser Met Thr Glu Val Asp Arg Leu Gly Ile Gly
                485                 490                 495

Lys Val Met Glu Glu Thr Leu Ser Tyr Leu Leu Gly Arg Lys Lys Arg
            500                 505                 510

Pro Ile His Leu Ser Phe Asp Val Asp Gly Leu Asp Pro Ser Phe Thr
        515                 520                 525

Pro Ala Thr Gly Thr Pro Val Val Gly Gly Leu Thr Tyr Arg Glu Gly
    530                 535                 540

Leu Tyr Ile Thr Glu Glu Ile Tyr Lys Thr Gly Leu Leu Ser Gly Leu
545                 550                 555                 560

Asp Ile Met Glu Val Asn Pro Ser Leu Gly Lys Thr Pro Glu Glu Val
                565                 570                 575

Thr Arg Thr Val Asn Thr Ala Val Ala Ile Thr Leu Ala Cys Phe Gly
            580                 585                 590

Leu Ala Arg Glu Gly Asn His Lys Pro Ile Asp Tyr Leu Asn Pro Pro
        595                 600                 605

Lys Gly Ser Gly Gly Glu Gly Gly Ser Gly Gly Glu Gly Gly Ser Gly
    610                 615                 620

Gly Glu Gly Gly Ser Gly Gly Glu Gly Gly Ser Gly Gly Glu Gly Gly
625                 630                 635                 640

Ser Gly Gly Glu Gly Gly Ser Gly Gly Glu Gly Gly Ser Gly Gly Glu
                645                 650                 655

Gly Gly Ser Gly Gly Glu Gly Gly Ser Gly Gly Glu Gly Gly Ser Gly
            660                 665                 670

Gly Glu Gly Gly Ser Gly Gly Glu Gly Gly Ser Gly Gly Glu Gly Gly
        675                 680                 685

Ser Gly Gly Glu Gly Gly Ser Gly Gly Glu Gly Gly Ser Gly Gly Glu
    690                 695                 700

Gly Gly Ser Gly Gly Glu Gly Gly Ser Gly Gly Glu Gly Gly Ser Gly
705                 710                 715                 720

Gly Glu Gly Gly Ser Gly Gly Glu Gly Gly Ser Gly Gly Glu Gly Gly
                725                 730                 735

Ser Gly Gly Glu Gly Gly Ser Gly Gly Glu Gly Gly Ser Gly Gly Glu
            740                 745                 750
```

```
Gly Gly Ser Gly Gly Glu Gly Ser Gly Gly Glu Gly Ser Gly
            755                 760             765
Gly Glu Gly Gly Ser Gly Gly Glu Gly Gly Ser Gly Gly Glu Gly Gly
        770             775             780
Ser Gly Gly Gly Gly Ser Gly Gly Glu Gly Gly Ser Gly Gly Glu
785             790                 795             800
Gly Gly Ser Gly Gly Glu Gly Ser Gly Gly Glu Gly Gly Ser Gly
            805             810                 815
Gly Glu Gly Gly Ser Gly Glu Gly Gly Ser Gly Gly Glu Gly Gly
        820             825             830
Ser Gly Gly Glu Gly Ser Gly Gly Glu Gly Gly Ser Gly Gly Glu
            835             840             845
Gly Gly Ser Gly Gly Glu Gly Gly Ser Gly Gly Glu Gly Ser Gly
            850             855             860
Gly Glu Gly Gly Ser Gly Gly Glu Gly Gly Ser Gly Glu Gly Gly
865             870             875             880
Ser Gly Gly Glu Gly Gly Ser Gly Gly Glu Gly Gly Ser Gly Gly Glu
            885             890             895
Gly

<210> SEQ ID NO 116
<211> LENGTH: 751
<212> TYPE: PRT
<213> ORGANISM: Artificial Sequence
<220> FEATURE:
<223> OTHER INFORMATION: Fusion protein

<400> SEQUENCE: 116

Ala Pro Glu Glu Pro Ala Pro Glu Ala Pro Ala Ala Pro Ala Glu Ala
1               5                   10                  15
Pro Pro Ala Pro Ala Pro Glu Glu Pro Ala Pro Glu Ala Pro Ala Ala
                20                  25                  30
Pro Ala Glu Ala Pro Pro Ala Pro Ala Pro Glu Glu Pro Ala Pro Glu
            35                  40                  45
Ala Pro Ala Ala Pro Ala Glu Ala Pro Pro Ala Pro Ala Pro Glu Glu
        50                  55                  60
Pro Ala Pro Glu Ala Pro Ala Ala Pro Ala Glu Ala Pro Pro Ala Pro
65                  70                  75                  80
Ala Pro Glu Glu Pro Ala Pro Glu Ala Pro Ala Ala Pro Ala Glu Ala
                85                  90                  95
Pro Pro Ala Pro Ala Pro Glu Glu Pro Ala Pro Glu Ala Pro Ala Ala
                100                 105                 110
Pro Ala Glu Ala Pro Pro Ala Pro Ala Pro Glu Glu Pro Ala Pro Glu
            115                 120                 125
Ala Pro Ala Ala Pro Ala Glu Ala Pro Pro Ala Pro Ala Pro Glu Glu
        130                 135                 140
Pro Ala Pro Glu Ala Pro Ala Ala Pro Ala Glu Ala Pro Pro Ala Pro
145                 150                 155                 160
Ala Pro Glu Glu Pro Ala Pro Glu Ala Pro Ala Ala Pro Ala Glu Ala
                165                 170                 175
Pro Pro Ala Pro Ala Pro Glu Glu Pro Ala Pro Glu Ala Pro Ala Ala
                180                 185                 190
Pro Ala Glu Ala Pro Pro Ala Pro Ala Pro Glu Glu Pro Ala Pro Glu
            195                 200                 205
Ala Pro Ala Ala Pro Ala Glu Ala Pro Pro Ala Pro Ala Pro Glu Glu
```

-continued

```
            210                 215                 220
Pro Ala Pro Glu Ala Pro Ala Pro Ala Glu Ala Pro Ala Pro
225                 230                 235                 240

Ala Pro Glu Glu Pro Ala Pro Glu Ala Pro Ala Ala Pro Ala Glu Ala
                245                 250                 255

Pro Pro Ala Pro Ala Pro Glu Glu Pro Ala Pro Glu Ala Pro Ala Ala
                260                 265                 270

Pro Ala Glu Ala Pro Pro Ala Pro Ala Pro Glu Glu Pro Ala Pro Glu
                275                 280                 285

Ala Pro Ala Ala Pro Ala Glu Ala Pro Pro Ala Pro Ala Pro Glu Glu
                290                 295                 300

Pro Ala Pro Glu Ala Pro Ala Ala Pro Ala Glu Ala Pro Pro Ala Pro
305                 310                 315                 320

Ala Pro Glu Glu Pro Ala Pro Glu Ala Pro Ala Ala Pro Ala Glu Ala
                325                 330                 335

Pro Pro Ala Pro Ala Pro Glu Glu Pro Ala Pro Glu Ala Pro Ala Ala
                340                 345                 350

Pro Ala Glu Ala Pro Pro Ala Pro Ala Pro Glu Glu Pro Ala Pro Glu
                355                 360                 365

Ala Pro Ala Ala Pro Ala Glu Ala Pro Pro Ala Pro Ala Pro Glu Glu
                370                 375                 380

Pro Ala Pro Glu Ala Pro Ala Ala Pro Ala Glu Ala Pro Pro Ala Pro
385                 390                 395                 400

Ala Pro Glu Glu Pro Ala Pro Glu Ala Pro Ala Ala Pro Ala Glu Ala
                405                 410                 415

Pro Pro Ala Pro Ala Pro Glu Glu Pro Ala Pro Glu Ala Pro Ala Ala
                420                 425                 430

Pro Ala Glu Ala Pro Pro Ala Pro Ala Pro Glu Glu Pro Ala Pro Glu
                435                 440                 445

Ala Pro Ala Ala Pro Ala Glu Ala Pro Pro Ala Pro Ala Pro Glu Glu
                450                 455                 460

Pro Ala Pro Glu Ala Pro Ala Ala Pro Ala Glu Ala Pro Pro Ala Pro
465                 470                 475                 480

Ala Pro Glu Glu Pro Ala Pro Glu Ala Pro Ala Ala Pro Ala Glu Ala
                485                 490                 495

Pro Pro Ala Pro Ala Pro Glu Glu Pro Ala Pro Glu Ala Pro Ala Ala
                500                 505                 510

Pro Ala Glu Ala Pro Pro Ala Pro Ala Pro Glu Glu Pro Ala Pro Glu
                515                 520                 525

Ala Pro Ala Ala Pro Ala Glu Ala Pro Pro Ala Pro Ala Pro Glu Glu
                530                 535                 540

Pro Ala Pro Glu Ala Pro Ala Ala Pro Ala Glu Ala Pro Pro Ala Pro
545                 550                 555                 560

Phe Pro Thr Ile Pro Leu Ser Arg Leu Phe Asp Asn Ala Met Leu Arg
                565                 570                 575

Ala His Arg Leu His Gln Leu Ala Phe Asp Thr Tyr Gln Glu Phe Glu
                580                 585                 590

Glu Ala Tyr Ile Pro Lys Glu Gln Lys Tyr Ser Phe Leu Gln Asn Pro
                595                 600                 605

Gln Thr Ser Leu Cys Phe Ser Glu Ser Ile Pro Thr Pro Ser Asn Arg
                610                 615                 620

Glu Glu Thr Gln Gln Lys Ser Asn Leu Glu Leu Leu Arg Ile Ser Leu
625                 630                 635                 640
```

```
Leu Leu Ile Gln Ser Trp Leu Glu Pro Val Gln Phe Leu Arg Ser Val
                645                 650                 655
Phe Ala Asn Ser Leu Val Tyr Gly Ala Ser Asp Ser Asn Val Tyr Asp
            660                 665                 670
Leu Leu Lys Asp Leu Glu Glu Gly Ile Gln Thr Leu Met Gly Arg Leu
        675                 680                 685
Glu Asp Gly Ser Pro Arg Thr Gly Gln Ile Phe Lys Gln Thr Tyr Ser
    690                 695                 700
Lys Phe Asp Thr Asn Ser His Asn Asp Asp Ala Leu Leu Lys Asn Tyr
705                 710                 715                 720
Gly Leu Leu Tyr Cys Phe Arg Lys Asp Met Asp Lys Val Glu Thr Phe
                725                 730                 735
Leu Arg Ile Val Gln Cys Arg Ser Val Glu Gly Ser Cys Gly Phe
            740                 745                 750
```

<210> SEQ ID NO 117
<211> LENGTH: 851
<212> TYPE: PRT
<213> ORGANISM: Artificial Sequence
<220> FEATURE:
<223> OTHER INFORMATION: Fusion protein

<400> SEQUENCE: 117

```
Ala Pro Glu Glu Pro Ala Pro Glu Ala Pro Ala Pro Ala Glu Ala
1               5                   10                  15
Pro Pro Ala Pro Ala Pro Glu Glu Pro Ala Pro Glu Ala Pro Ala Ala
                20                  25                  30
Pro Ala Glu Ala Pro Pro Ala Pro Ala Pro Glu Glu Pro Ala Pro Glu
            35                  40                  45
Ala Pro Ala Ala Pro Ala Glu Ala Pro Pro Ala Pro Ala Pro Glu Glu
        50                  55                  60
Pro Ala Pro Glu Ala Pro Ala Ala Pro Ala Glu Ala Pro Pro Ala Pro
65                  70                  75                  80
Ala Pro Glu Glu Pro Ala Pro Glu Ala Pro Ala Ala Pro Ala Glu Ala
                85                  90                  95
Pro Pro Ala Pro Ala Pro Glu Glu Pro Ala Pro Glu Ala Pro Ala Ala
                100                 105                 110
Pro Ala Glu Ala Pro Pro Ala Pro Ala Pro Glu Glu Pro Ala Pro Glu
            115                 120                 125
Ala Pro Ala Ala Pro Ala Glu Ala Pro Pro Ala Pro Ala Pro Glu Glu
        130                 135                 140
Pro Ala Pro Glu Ala Pro Ala Ala Pro Ala Glu Ala Pro Pro Ala Pro
145                 150                 155                 160
Ala Pro Glu Glu Pro Ala Pro Glu Ala Pro Ala Ala Pro Ala Glu Ala
                165                 170                 175
Pro Pro Ala Pro Ala Pro Glu Glu Pro Ala Pro Glu Ala Pro Ala Ala
                180                 185                 190
Pro Ala Glu Ala Pro Pro Ala Pro Ala Pro Glu Glu Pro Ala Pro Glu
            195                 200                 205
Ala Pro Ala Ala Pro Ala Glu Ala Pro Pro Ala Pro Ala Pro Glu Glu
        210                 215                 220
Pro Ala Pro Glu Ala Pro Ala Ala Pro Ala Glu Ala Pro Pro Ala Pro
225                 230                 235                 240
Ala Pro Glu Glu Pro Ala Pro Glu Ala Pro Ala Ala Pro Ala Glu Ala
                245                 250                 255
```

```
Pro Pro Ala Pro Ala Pro Glu Glu Pro Ala Pro Glu Ala Pro Ala Ala
            260                 265                 270
Pro Ala Glu Ala Pro Pro Ala Pro Ala Pro Glu Glu Pro Ala Pro Glu
        275                 280                 285
Ala Pro Ala Ala Pro Ala Glu Ala Pro Pro Ala Pro Ala Pro Glu Glu
    290                 295                 300
Pro Ala Pro Glu Ala Pro Ala Ala Pro Ala Glu Ala Pro Pro Ala Pro
305                 310                 315                 320
Ala Pro Glu Glu Pro Ala Pro Glu Ala Pro Ala Ala Pro Ala Glu Ala
                325                 330                 335
Pro Pro Ala Pro Ala Pro Glu Glu Pro Ala Pro Glu Ala Pro Ala Ala
            340                 345                 350
Pro Ala Glu Ala Pro Pro Ala Pro Ala Pro Glu Glu Pro Ala Pro Glu
        355                 360                 365
Ala Pro Ala Ala Pro Ala Glu Ala Pro Pro Ala Pro Ala Pro Glu Glu
    370                 375                 380
Pro Ala Pro Glu Ala Pro Ala Ala Pro Ala Glu Ala Pro Pro Ala Pro
385                 390                 395                 400
Ala Pro Glu Glu Pro Ala Pro Glu Ala Pro Ala Ala Pro Ala Glu Ala
                405                 410                 415
Pro Pro Ala Pro Ala Pro Glu Glu Pro Ala Pro Glu Ala Pro Ala Ala
            420                 425                 430
Pro Ala Glu Ala Pro Pro Ala Pro Ala Pro Glu Glu Pro Ala Pro Glu
        435                 440                 445
Ala Pro Ala Ala Pro Ala Glu Ala Pro Pro Ala Pro Ala Pro Glu Glu
    450                 455                 460
Pro Ala Pro Glu Ala Pro Ala Ala Pro Ala Glu Ala Pro Pro Ala Pro
465                 470                 475                 480
Ala Pro Glu Glu Pro Ala Pro Glu Ala Pro Ala Ala Pro Ala Glu Ala
                485                 490                 495
Pro Pro Ala Pro Ala Pro Glu Glu Pro Ala Pro Glu Ala Pro Ala Ala
            500                 505                 510
Pro Ala Glu Ala Pro Pro Ala Pro Ala Pro Glu Glu Pro Ala Pro Glu
        515                 520                 525
Ala Pro Ala Ala Pro Ala Glu Ala Pro Pro Ala Pro Ala Pro Glu Glu
    530                 535                 540
Pro Ala Pro Glu Ala Pro Ala Ala Pro Ala Glu Ala Pro Pro Ala Pro
545                 550                 555                 560
Phe Pro Thr Ile Pro Leu Ser Arg Leu Phe Asp Asn Ala Met Leu Arg
                565                 570                 575
Ala His Arg Leu His Gln Leu Ala Phe Asp Thr Tyr Gln Glu Phe Glu
            580                 585                 590
Glu Ala Tyr Ile Pro Lys Glu Gln Lys Tyr Ser Phe Leu Gln Asn Pro
        595                 600                 605
Gln Thr Ser Leu Cys Phe Ser Glu Ser Ile Pro Thr Pro Ser Asn Arg
    610                 615                 620
Glu Glu Thr Gln Gln Lys Ser Asn Leu Glu Leu Leu Arg Ile Ser Leu
625                 630                 635                 640
Leu Leu Ile Gln Ser Trp Leu Glu Pro Val Gln Phe Leu Arg Ser Val
                645                 650                 655
Phe Ala Asn Ser Leu Val Tyr Gly Ala Ser Asp Ser Asn Val Tyr Asp
            660                 665                 670
```

Leu Leu Lys Asp Leu Glu Glu Gly Ile Gln Thr Leu Met Gly Arg Leu
            675                 680                 685

Glu Asp Gly Ser Pro Arg Thr Gly Gln Ile Phe Lys Gln Thr Tyr Ser
    690                 695                 700

Lys Phe Asp Thr Asn Ser His Asn Asp Asp Ala Leu Leu Lys Asn Tyr
705                 710                 715                 720

Gly Leu Leu Tyr Cys Phe Arg Lys Asp Met Asp Lys Val Glu Thr Phe
                725                 730                 735

Leu Arg Ile Val Gln Cys Arg Ser Val Gly Ser Cys Gly Phe Ala
            740                 745                 750

Pro Glu Glu Pro Ala Pro Glu Ala Pro Ala Ala Pro Ala Glu Ala Pro
            755                 760                 765

Pro Ala Pro Ala Pro Glu Glu Pro Ala Pro Glu Ala Pro Ala Ala Pro
            770                 775                 780

Ala Glu Ala Pro Pro Ala Pro Ala Pro Glu Glu Pro Ala Pro Glu Ala
785                 790                 795                 800

Pro Ala Ala Pro Ala Glu Ala Pro Pro Ala Pro Ala Pro Glu Glu Pro
                805                 810                 815

Ala Pro Glu Ala Pro Ala Ala Pro Ala Glu Ala Pro Pro Ala Pro Ala
            820                 825                 830

Pro Glu Glu Pro Ala Pro Glu Ala Pro Ala Ala Pro Ala Glu Ala Pro
            835                 840                 845

Pro Ala Pro
    850

<210> SEQ ID NO 118
<211> LENGTH: 763
<212> TYPE: PRT
<213> ORGANISM: Artificial Sequence
<220> FEATURE:
<223> OTHER INFORMATION: Fusion protein

<400> SEQUENCE: 118

Ala Glu Pro Ala Ala Pro Ala Pro Ala Glu Pro Ala Ala Pro Ala Pro
1               5                   10                  15

Glu Ala Pro Ala Ala Glu Pro Ala Ala Pro Ala Pro Glu Pro Ala
                20                  25                  30

Ala Pro Ala Pro Glu Ala Pro Ala Ala Glu Pro Ala Ala Pro Ala Pro
            35                  40                  45

Ala Glu Pro Ala Ala Pro Ala Pro Glu Ala Pro Ala Ala Glu Pro Ala
        50                  55                  60

Ala Pro Ala Pro Glu Pro Ala Ala Pro Ala Pro Glu Ala Pro Ala
65                  70                  75                  80

Ala Glu Pro Ala Ala Pro Ala Pro Glu Pro Ala Ala Pro Ala Pro
                85                  90                  95

Glu Ala Pro Ala Ala Glu Pro Ala Ala Pro Ala Pro Glu Pro Ala
                100                 105                 110

Ala Pro Ala Pro Glu Ala Pro Ala Ala Glu Pro Ala Ala Pro Ala Pro
            115                 120                 125

Ala Glu Pro Ala Ala Pro Ala Pro Glu Ala Pro Ala Ala Glu Pro Ala
        130                 135                 140

Ala Pro Ala Pro Glu Pro Ala Ala Pro Ala Pro Glu Ala Pro Ala
145                 150                 155                 160

Ala Glu Pro Ala Ala Pro Ala Pro Glu Pro Ala Ala Pro Ala Pro
                165                 170                 175

-continued

```
Glu Ala Pro Ala Ala Glu Pro Ala Ala Pro Ala Pro Glu Pro Ala
                180                 185                 190
Ala Pro Ala Pro Glu Ala Pro Ala Ala Glu Pro Ala Ala Pro Ala Pro
            195                 200                 205
Ala Glu Pro Ala Ala Pro Ala Pro Glu Ala Pro Ala Ala Glu Pro Ala
        210                 215                 220
Ala Pro Ala Pro Ala Glu Pro Ala Ala Pro Ala Pro Glu Ala Pro Ala
225                 230                 235                 240
Ala Glu Pro Ala Ala Pro Ala Pro Glu Ala Pro Ala Ala Pro Ala Pro
            245                 250                 255
Glu Ala Pro Ala Ala Glu Pro Ala Ala Pro Ala Pro Ala Glu Pro Ala
                260                 265                 270
Ala Pro Ala Pro Glu Ala Pro Ala Ala Glu Pro Ala Ala Pro Ala Pro
            275                 280                 285
Ala Glu Pro Ala Ala Pro Ala Pro Glu Ala Pro Ala Ala Glu Pro Ala
        290                 295                 300
Ala Pro Ala Pro Glu Pro Ala Ala Pro Ala Pro Glu Ala Pro Ala
305                 310                 315                 320
Ala Glu Pro Ala Ala Pro Ala Pro Glu Ala Pro Ala Ala Pro Ala Pro
            325                 330                 335
Glu Ala Pro Ala Ala Glu Pro Ala Ala Pro Ala Pro Ala Glu Pro Ala
                340                 345                 350
Ala Pro Ala Pro Glu Ala Pro Ala Ala Glu Pro Ala Ala Pro Ala Pro
            355                 360                 365
Ala Glu Pro Ala Ala Pro Ala Pro Glu Ala Pro Ala Ala Glu Pro Ala
        370                 375                 380
Ala Pro Ala Pro Ala Glu Pro Ala Ala Pro Ala Pro Glu Ala Pro Ala
385                 390                 395                 400
Ala Glu Pro Ala Ala Pro Ala Pro Ala Glu Pro Ala Ala Pro Ala Pro
            405                 410                 415
Glu Ala Pro Ala Ala Glu Pro Ala Ala Pro Ala Pro Ala Glu Pro Ala
                420                 425                 430
Ala Pro Ala Pro Glu Ala Pro Ala Ala Glu Pro Ala Ala Pro Ala Pro
            435                 440                 445
Ala Glu Pro Ala Ala Pro Ala Pro Glu Ala Pro Ala Ala Glu Pro Ala
        450                 455                 460
Ala Pro Ala Pro Ala Glu Pro Ala Ala Pro Ala Pro Glu Ala Pro Ala
465                 470                 475                 480
Ala Glu Pro Ala Ala Pro Ala Pro Glu Ala Pro Ala Ala Pro Ala Pro
            485                 490                 495
Glu Ala Pro Ala Ala Glu Pro Ala Ala Pro Ala Pro Ala Glu Pro Ala
                500                 505                 510
Ala Pro Ala Pro Glu Ala Pro Ala Ala Glu Pro Ala Ala Pro Ala Pro
            515                 520                 525
Ala Glu Pro Ala Ala Pro Ala Pro Glu Ala Pro Ala Ala Glu Pro Ala
        530                 535                 540
Ala Pro Ala Pro Ala Glu Pro Ala Ala Pro Ala Pro Glu Ala Pro Ala
545                 550                 555                 560
Ala Glu Pro Ala Ala Pro Ala Pro Ala Glu Pro Ala Phe Pro Thr Ile
            565                 570                 575
Pro Leu Ser Arg Leu Phe Asp Asn Ala Met Leu Arg Ala His Arg Leu
        580                 585                 590
His Gln Leu Ala Phe Asp Thr Tyr Gln Glu Phe Glu Glu Ala Tyr Ile
```

-continued

```
                595                 600                 605
Pro Lys Glu Gln Lys Tyr Ser Phe Leu Gln Asn Pro Gln Thr Ser Leu
610                 615                 620
Cys Phe Ser Glu Ser Ile Pro Thr Pro Ser Asn Arg Glu Glu Thr Gln
625                 630                 635                 640
Gln Lys Ser Asn Leu Glu Leu Leu Arg Ile Ser Leu Leu Leu Ile Gln
                645                 650                 655
Ser Trp Leu Glu Pro Val Gln Phe Leu Arg Ser Val Phe Ala Asn Ser
                660                 665                 670
Leu Val Tyr Gly Ala Ser Asp Ser Asn Val Tyr Asp Leu Leu Lys Asp
                675                 680                 685
Leu Glu Glu Gly Ile Gln Thr Leu Met Gly Arg Leu Glu Asp Gly Ser
690                 695                 700
Pro Arg Thr Gly Gln Ile Phe Lys Gln Thr Tyr Ser Lys Phe Asp Thr
705                 710                 715                 720
Asn Ser His Asn Asp Asp Ala Leu Leu Lys Asn Tyr Gly Leu Leu Tyr
                725                 730                 735
Cys Phe Arg Lys Asp Met Asp Lys Val Glu Thr Phe Leu Arg Ile Val
                740                 745                 750
Gln Cys Arg Ser Val Glu Gly Ser Cys Gly Phe
                755                 760

<210> SEQ ID NO 119
<211> LENGTH: 855
<212> TYPE: PRT
<213> ORGANISM: Artificial Sequence
<220> FEATURE:
<223> OTHER INFORMATION: Fusion protein

<400> SEQUENCE: 119

Ala Glu Pro Ala Ala Pro Ala Pro Ala Glu Pro Ala Ala Pro Ala Pro
1               5                   10                  15
Glu Ala Pro Ala Ala Glu Pro Ala Ala Pro Ala Pro Ala Glu Pro Ala
                20                  25                  30
Ala Pro Ala Pro Glu Ala Pro Ala Ala Glu Pro Ala Ala Pro Ala Pro
                35                  40                  45
Ala Glu Pro Ala Ala Pro Ala Pro Glu Ala Pro Ala Ala Glu Pro Ala
                50                  55                  60
Ala Pro Ala Pro Ala Glu Pro Ala Ala Pro Ala Pro Glu Ala Pro Ala
65                  70                  75                  80
Ala Glu Pro Ala Ala Pro Ala Pro Ala Glu Pro Ala Ala Pro Ala Pro
                85                  90                  95
Glu Ala Pro Ala Ala Glu Pro Ala Ala Pro Ala Pro Ala Glu Pro Ala
                100                 105                 110
Ala Pro Ala Pro Glu Ala Pro Ala Ala Glu Pro Ala Ala Pro Ala Pro
                115                 120                 125
Ala Glu Pro Ala Ala Pro Ala Pro Glu Ala Pro Ala Ala Glu Pro Ala
                130                 135                 140
Ala Pro Ala Pro Ala Glu Pro Ala Ala Pro Ala Pro Glu Ala Pro Ala
145                 150                 155                 160
Ala Glu Pro Ala Ala Pro Ala Pro Ala Glu Pro Ala Ala Pro Ala Pro
                165                 170                 175
Glu Ala Pro Ala Ala Glu Pro Ala Ala Pro Ala Pro Ala Glu Pro Ala
                180                 185                 190
Ala Pro Ala Pro Glu Ala Pro Ala Ala Glu Pro Ala Ala Pro Ala Pro
```

```
            195                 200                 205
Ala Glu Pro Ala Ala Pro Ala Pro Glu Ala Pro Ala Ala Glu Pro Ala
210                 215                 220
Ala Pro Ala Pro Ala Glu Pro Ala Ala Pro Ala Pro Glu Ala Pro Ala
225                 230                 235                 240
Ala Glu Pro Ala Ala Pro Ala Pro Glu Ala Pro Ala Ala Pro Ala Pro
                245                 250                 255
Glu Ala Pro Ala Ala Glu Pro Ala Ala Pro Ala Pro Ala Glu Pro Ala
                260                 265                 270
Ala Pro Ala Pro Glu Ala Pro Ala Ala Glu Pro Ala Ala Pro Ala Pro
            275                 280                 285
Ala Glu Pro Ala Ala Pro Ala Pro Glu Ala Pro Ala Ala Glu Pro Ala
290                 295                 300
Ala Pro Ala Pro Ala Glu Pro Ala Ala Pro Ala Pro Glu Ala Pro Ala
305                 310                 315                 320
Ala Glu Pro Ala Ala Pro Ala Pro Glu Ala Pro Ala Ala Pro Ala Pro
                325                 330                 335
Glu Ala Pro Ala Ala Glu Pro Ala Ala Pro Ala Pro Ala Glu Pro Ala
                340                 345                 350
Ala Pro Ala Pro Glu Ala Pro Ala Ala Glu Pro Ala Ala Pro Ala Pro
            355                 360                 365
Ala Glu Pro Ala Ala Pro Ala Pro Glu Ala Pro Ala Ala Glu Pro Ala
370                 375                 380
Ala Pro Ala Pro Ala Glu Pro Ala Ala Pro Ala Pro Glu Ala Pro Ala
385                 390                 395                 400
Ala Glu Pro Ala Ala Pro Ala Pro Glu Ala Pro Ala Ala Pro Ala Pro
                405                 410                 415
Glu Ala Pro Ala Ala Glu Pro Ala Ala Pro Ala Pro Ala Glu Pro Ala
                420                 425                 430
Ala Pro Ala Pro Glu Ala Pro Ala Ala Glu Pro Ala Ala Pro Ala Pro
            435                 440                 445
Ala Glu Pro Ala Ala Pro Ala Pro Glu Ala Pro Ala Ala Glu Pro Ala
450                 455                 460
Ala Pro Ala Pro Ala Glu Pro Ala Ala Pro Ala Pro Glu Ala Pro Ala
465                 470                 475                 480
Ala Glu Pro Ala Ala Pro Ala Pro Glu Ala Pro Ala Ala Pro Ala Pro
                485                 490                 495
Glu Ala Pro Ala Ala Glu Pro Ala Ala Pro Ala Pro Ala Glu Pro Ala
                500                 505                 510
Ala Pro Ala Pro Glu Ala Pro Ala Ala Glu Pro Ala Ala Pro Ala Pro
            515                 520                 525
Ala Glu Pro Ala Ala Pro Ala Pro Glu Ala Pro Ala Ala Glu Pro Ala
            530                 535                 540
Ala Pro Ala Pro Ala Glu Pro Ala Ala Pro Ala Pro Glu Ala Pro Ala
545                 550                 555                 560
Ala Glu Pro Ala Ala Pro Ala Pro Glu Pro Ala Phe Pro Thr Ile
                565                 570                 575
Pro Leu Ser Arg Leu Phe Asp Asn Ala Met Leu Arg Ala His Arg Leu
                580                 585                 590
His Gln Leu Ala Phe Asp Thr Tyr Gln Glu Phe Glu Glu Ala Tyr Ile
            595                 600                 605
Pro Lys Glu Gln Lys Tyr Ser Phe Leu Gln Asn Pro Gln Thr Ser Leu
            610                 615                 620
```

```
Cys Phe Ser Glu Ser Ile Pro Thr Pro Ser Asn Arg Glu Glu Thr Gln
625                 630                 635                 640

Gln Lys Ser Asn Leu Glu Leu Leu Arg Ile Ser Leu Leu Leu Ile Gln
            645                 650                 655

Ser Trp Leu Glu Pro Val Gln Phe Leu Arg Ser Val Phe Ala Asn Ser
        660                 665                 670

Leu Val Tyr Gly Ala Ser Asp Ser Asn Val Tyr Asp Leu Leu Lys Asp
            675                 680                 685

Leu Glu Glu Gly Ile Gln Thr Leu Met Gly Arg Leu Glu Asp Gly Ser
    690                 695                 700

Pro Arg Thr Gly Gln Ile Phe Lys Gln Thr Tyr Ser Lys Phe Asp Thr
705                 710                 715                 720

Asn Ser His Asn Asp Asp Ala Leu Leu Lys Asn Tyr Gly Leu Leu Tyr
                725                 730                 735

Cys Phe Arg Lys Asp Met Asp Lys Val Glu Thr Phe Leu Arg Ile Val
            740                 745                 750

Gln Cys Arg Ser Val Glu Gly Ser Cys Gly Phe Ala Glu Pro Ala Ala
                755                 760                 765

Pro Ala Pro Ala Glu Pro Ala Ala Pro Ala Pro Glu Ala Pro Ala Ala
    770                 775                 780

Glu Pro Ala Ala Pro Ala Pro Ala Glu Pro Ala Ala Pro Ala Pro Glu
785                 790                 795                 800

Ala Pro Ala Ala Glu Pro Ala Ala Pro Ala Glu Pro Ala Ala Pro Ala
                805                 810                 815

Pro Ala Pro Glu Ala Pro Ala Ala Glu Pro Ala Ala Pro Ala Pro Ala
            820                 825                 830

Glu Pro Ala Ala Pro Ala Pro Glu Ala Pro Ala Ala Glu Pro Ala Ala
        835                 840                 845

Pro Ala Pro Ala Glu Pro Ala
    850                 855

<210> SEQ ID NO 120
<211> LENGTH: 751
<212> TYPE: PRT
<213> ORGANISM: Artificial Sequence
<220> FEATURE:
<223> OTHER INFORMATION: Fusion protein

<400> SEQUENCE: 120

Ala Pro Pro Glu Pro Ala Glu Ala Ala Pro Ala Ala Ala Glu Ala
1               5                   10                  15

Pro Ala Glu Ala Ala Pro Pro Glu Pro Ala Glu Ala Ala Pro Ala
            20                  25                  30

Ala Ala Glu Ala Pro Ala Glu Ala Pro Pro Glu Pro Pro Ala Glu
        35                  40                  45

Ala Ala Pro Ala Ala Ala Glu Ala Pro Ala Glu Ala Ala Pro Pro Glu
        50                  55                  60

Pro Pro Ala Glu Ala Ala Pro Ala Ala Glu Ala Pro Ala Glu Ala
65                  70                  75                  80

Ala Pro Pro Glu Pro Ala Glu Ala Ala Pro Ala Ala Ala Glu Ala
            85                  90                  95

Pro Ala Glu Ala Ala Pro Pro Glu Pro Pro Ala Glu Ala Ala Pro Ala
            100                 105                 110

Ala Ala Glu Ala Pro Ala Glu Ala Ala Pro Pro Glu Pro Pro Ala Glu
        115                 120                 125
```

Ala Ala Pro Ala Ala Ala Glu Ala Pro Ala Glu Ala Pro Pro Glu
    130                 135                 140

Pro Pro Ala Glu Ala Ala Pro Ala Ala Ala Glu Ala Pro Ala Glu Ala
145                 150                 155                 160

Ala Pro Pro Glu Pro Pro Ala Glu Ala Ala Pro Ala Ala Ala Glu Ala
                165                 170                 175

Pro Ala Glu Ala Ala Pro Pro Glu Pro Pro Ala Glu Ala Ala Pro Ala
                180                 185                 190

Ala Ala Glu Ala Pro Ala Glu Ala Ala Pro Pro Glu Pro Pro Ala Glu
            195                 200                 205

Ala Ala Pro Ala Ala Ala Glu Ala Pro Ala Glu Ala Ala Pro Pro Glu
    210                 215                 220

Pro Pro Ala Glu Ala Ala Pro Ala Ala Ala Glu Ala Pro Ala Glu Ala
225                 230                 235                 240

Ala Pro Pro Glu Pro Pro Ala Glu Ala Ala Pro Ala Ala Ala Glu Ala
                245                 250                 255

Pro Ala Glu Ala Ala Pro Pro Glu Pro Pro Ala Glu Ala Ala Pro Ala
                260                 265                 270

Ala Ala Glu Ala Pro Ala Glu Ala Ala Pro Pro Glu Pro Pro Ala Glu
            275                 280                 285

Ala Ala Pro Ala Ala Ala Glu Ala Pro Ala Glu Ala Ala Pro Pro Glu
    290                 295                 300

Pro Pro Ala Glu Ala Ala Pro Ala Ala Ala Glu Ala Pro Ala Glu Ala
305                 310                 315                 320

Ala Pro Pro Glu Pro Pro Ala Glu Ala Ala Pro Ala Ala Ala Glu Ala
                325                 330                 335

Pro Ala Glu Ala Ala Pro Pro Glu Pro Pro Ala Glu Ala Ala Pro Ala
                340                 345                 350

Ala Ala Glu Ala Pro Ala Glu Ala Ala Pro Pro Glu Pro Pro Ala Glu
            355                 360                 365

Ala Ala Pro Ala Ala Ala Glu Ala Pro Ala Glu Ala Ala Pro Pro Glu
    370                 375                 380

Pro Pro Ala Glu Ala Ala Pro Ala Ala Ala Glu Ala Pro Ala Glu Ala
385                 390                 395                 400

Ala Pro Pro Glu Pro Pro Ala Glu Ala Ala Pro Ala Ala Ala Glu Ala
                405                 410                 415

Pro Ala Glu Ala Ala Pro Pro Glu Pro Pro Ala Glu Ala Ala Pro Ala
                420                 425                 430

Ala Ala Glu Ala Pro Ala Glu Ala Ala Pro Pro Glu Pro Pro Ala Glu
            435                 440                 445

Ala Ala Pro Ala Ala Ala Glu Ala Pro Ala Glu Ala Ala Pro Pro Glu
    450                 455                 460

Pro Pro Ala Glu Ala Ala Pro Ala Ala Ala Glu Ala Pro Ala Glu Ala
465                 470                 475                 480

Ala Pro Pro Glu Pro Pro Ala Glu Ala Ala Pro Ala Ala Ala Glu Ala
                485                 490                 495

Pro Ala Glu Ala Ala Pro Pro Glu Pro Pro Ala Glu Ala Ala Pro Ala
                500                 505                 510

Ala Ala Glu Ala Pro Ala Glu Ala Ala Pro Pro Glu Pro Pro Ala Glu
            515                 520                 525

Ala Ala Pro Ala Ala Ala Glu Ala Pro Ala Glu Ala Ala Pro Pro Glu
    530                 535                 540

```
Pro Pro Ala Glu Ala Ala Pro Ala Ala Ala Glu Ala Pro Ala Glu Ala
545                 550                 555                 560

Phe Pro Thr Ile Pro Leu Ser Arg Leu Phe Asp Asn Ala Met Leu Arg
                565                 570                 575

Ala His Arg Leu His Gln Leu Ala Phe Asp Thr Tyr Gln Glu Phe Glu
            580                 585                 590

Glu Ala Tyr Ile Pro Lys Glu Gln Lys Tyr Ser Phe Leu Gln Asn Pro
        595                 600                 605

Gln Thr Ser Leu Cys Phe Ser Glu Ser Ile Pro Thr Pro Ser Asn Arg
    610                 615                 620

Glu Glu Thr Gln Gln Lys Ser Asn Leu Glu Leu Leu Arg Ile Ser Leu
625                 630                 635                 640

Leu Leu Ile Gln Ser Trp Leu Glu Pro Val Gln Phe Leu Arg Ser Val
                645                 650                 655

Phe Ala Asn Ser Leu Val Tyr Gly Ala Ser Asp Ser Asn Val Tyr Asp
            660                 665                 670

Leu Leu Lys Asp Leu Glu Glu Gly Ile Gln Thr Leu Met Gly Arg Leu
        675                 680                 685

Glu Asp Gly Ser Pro Arg Thr Gly Gln Ile Phe Lys Gln Thr Tyr Ser
    690                 695                 700

Lys Phe Asp Thr Asn Ser His Asn Asp Asp Ala Leu Leu Lys Asn Tyr
705                 710                 715                 720

Gly Leu Leu Tyr Cys Phe Arg Lys Asp Met Asp Lys Val Glu Thr Phe
                725                 730                 735

Leu Arg Ile Val Gln Cys Arg Ser Val Glu Gly Ser Cys Gly Phe
            740                 745                 750

<210> SEQ ID NO 121
<211> LENGTH: 851
<212> TYPE: PRT
<213> ORGANISM: Artificial Sequence
<220> FEATURE:
<223> OTHER INFORMATION: Fusion protein

<400> SEQUENCE: 121

Ala Pro Pro Glu Pro Ala Glu Ala Ala Pro Ala Ala Glu Ala
1               5                   10                  15

Pro Ala Glu Ala Ala Pro Pro Glu Pro Pro Ala Glu Ala Ala Pro Ala
                20                  25                  30

Ala Ala Glu Ala Pro Ala Glu Ala Ala Pro Pro Glu Pro Pro Ala Glu
            35                  40                  45

Ala Ala Pro Ala Ala Ala Glu Ala Pro Ala Glu Ala Ala Pro Pro Glu
        50                  55                  60

Pro Pro Ala Glu Ala Ala Pro Ala Ala Glu Ala Pro Ala Glu Ala
65                  70                  75                  80

Ala Pro Pro Glu Pro Pro Ala Glu Ala Ala Pro Ala Ala Ala Glu Ala
                85                  90                  95

Pro Ala Glu Ala Ala Pro Pro Glu Pro Pro Ala Glu Ala Ala Pro Ala
            100                 105                 110

Ala Ala Glu Ala Pro Ala Glu Ala Ala Pro Pro Glu Pro Pro Ala Glu
        115                 120                 125

Ala Ala Pro Ala Ala Ala Glu Ala Pro Ala Glu Ala Ala Pro Pro Glu
    130                 135                 140

Pro Pro Ala Glu Ala Ala Pro Ala Ala Glu Ala Pro Ala Glu Ala
145                 150                 155                 160
```

-continued

```
Ala Pro Pro Glu Pro Pro Ala Glu Ala Ala Pro Ala Ala Glu Ala
            165                 170                 175
Pro Ala Glu Ala Ala Pro Glu Pro Pro Ala Glu Ala Ala Pro Ala
            180                 185                 190
Ala Ala Glu Ala Pro Ala Glu Ala Ala Pro Pro Glu Pro Pro Ala Glu
            195                 200                 205
Ala Ala Pro Ala Ala Ala Glu Ala Pro Ala Glu Ala Ala Pro Pro Glu
        210                 215                 220
Pro Pro Ala Glu Ala Ala Pro Ala Ala Ala Glu Ala Pro Ala Glu Ala
225                 230                 235                 240
Ala Pro Pro Glu Pro Pro Ala Glu Ala Ala Pro Ala Ala Ala Glu Ala
            245                 250                 255
Pro Ala Glu Ala Ala Pro Pro Glu Pro Pro Ala Glu Ala Ala Pro Ala
            260                 265                 270
Ala Ala Glu Ala Pro Ala Glu Ala Ala Pro Pro Glu Pro Pro Ala Glu
            275                 280                 285
Ala Ala Pro Ala Ala Ala Glu Ala Pro Ala Glu Ala Ala Pro Pro Glu
            290                 295                 300
Pro Pro Ala Glu Ala Ala Pro Ala Ala Ala Glu Ala Pro Ala Glu Ala
305                 310                 315                 320
Ala Pro Pro Glu Pro Pro Ala Glu Ala Ala Pro Ala Ala Ala Glu Ala
            325                 330                 335
Pro Ala Glu Ala Ala Pro Pro Glu Pro Pro Ala Glu Ala Ala Pro Ala
            340                 345                 350
Ala Ala Glu Ala Pro Ala Glu Ala Ala Pro Pro Glu Pro Pro Ala Glu
            355                 360                 365
Ala Ala Pro Ala Ala Ala Glu Ala Pro Ala Glu Ala Ala Pro Pro Glu
            370                 375                 380
Pro Pro Ala Glu Ala Ala Pro Ala Ala Ala Glu Ala Pro Ala Glu Ala
385                 390                 395                 400
Ala Pro Pro Glu Pro Pro Ala Glu Ala Ala Pro Ala Ala Ala Glu Ala
            405                 410                 415
Pro Ala Glu Ala Ala Pro Pro Glu Pro Pro Ala Glu Ala Ala Pro Ala
            420                 425                 430
Ala Ala Glu Ala Pro Ala Glu Ala Ala Pro Pro Glu Pro Pro Ala Glu
            435                 440                 445
Ala Ala Pro Ala Ala Ala Glu Ala Pro Ala Glu Ala Ala Pro Pro Glu
            450                 455                 460
Pro Pro Ala Glu Ala Ala Pro Ala Ala Ala Glu Ala Pro Ala Glu Ala
465                 470                 475                 480
Ala Pro Pro Glu Pro Pro Ala Glu Ala Ala Pro Ala Ala Ala Glu Ala
            485                 490                 495
Pro Ala Glu Ala Ala Pro Pro Glu Pro Pro Ala Glu Ala Ala Pro Ala
            500                 505                 510
Ala Ala Glu Ala Pro Ala Glu Ala Ala Pro Pro Glu Pro Pro Ala Glu
            515                 520                 525
Ala Ala Pro Ala Ala Ala Glu Ala Pro Ala Glu Ala Ala Pro Pro Glu
            530                 535                 540
Pro Pro Ala Glu Ala Ala Pro Ala Ala Ala Glu Ala Pro Ala Glu Ala
545                 550                 555                 560
Phe Pro Thr Ile Pro Leu Ser Arg Leu Phe Asp Asn Ala Met Leu Arg
            565                 570                 575
Ala His Arg Leu His Gln Leu Ala Phe Asp Thr Tyr Gln Glu Phe Glu
```

-continued

```
              580             585             590
Glu Ala Tyr Ile Pro Lys Glu Gln Lys Tyr Ser Phe Leu Gln Asn Pro
            595             600             605
Gln Thr Ser Leu Cys Phe Ser Glu Ser Ile Pro Thr Pro Ser Asn Arg
610             615             620
Glu Glu Thr Gln Gln Lys Ser Asn Leu Glu Leu Leu Arg Ile Ser Leu
625             630             635             640
Leu Leu Ile Gln Ser Trp Leu Glu Pro Val Gln Phe Leu Arg Ser Val
            645             650             655
Phe Ala Asn Ser Leu Val Tyr Gly Ala Ser Asp Ser Asn Val Tyr Asp
            660             665             670
Leu Leu Lys Asp Leu Glu Glu Gly Ile Gln Thr Leu Met Gly Arg Leu
            675             680             685
Glu Asp Gly Ser Pro Arg Thr Gly Gln Ile Phe Lys Gln Thr Tyr Ser
            690             695             700
Lys Phe Asp Thr Asn Ser His Asn Asp Asp Ala Leu Leu Lys Asn Tyr
705             710             715             720
Gly Leu Leu Tyr Cys Phe Arg Lys Asp Met Asp Lys Val Glu Thr Phe
            725             730             735
Leu Arg Ile Val Gln Cys Arg Ser Val Glu Gly Ser Cys Gly Phe Ala
            740             745             750
Pro Pro Glu Pro Pro Ala Glu Ala Ala Pro Ala Ala Glu Ala Pro
            755             760             765
Ala Glu Ala Ala Pro Pro Glu Pro Pro Ala Glu Ala Ala Pro Ala Ala
770             775             780
Ala Glu Ala Pro Ala Glu Ala Ala Pro Pro Glu Pro Pro Ala Glu Ala
785             790             795             800
Ala Pro Ala Ala Ala Glu Ala Pro Ala Glu Ala Ala Pro Pro Glu Pro
            805             810             815
Pro Ala Glu Ala Ala Pro Ala Ala Glu Ala Pro Ala Glu Ala Ala
            820             825             830
Pro Pro Glu Pro Pro Ala Glu Ala Ala Pro Ala Ala Glu Ala Pro
            835             840             845
Ala Glu Ala
850

<210> SEQ ID NO 122
<211> LENGTH: 452
<212> TYPE: PRT
<213> ORGANISM: Artificial Sequence
<220> FEATURE:
<223> OTHER INFORMATION: Fusion protein

<400> SEQUENCE: 122

Ala Pro Ala Pro Pro Glu Ala Glu Glu Pro Pro Glu Ala Ala Pro Ala
1               5               10              15
Pro Ala Pro Ala Ala Glu Pro Ala Pro Pro Glu Ala Ala Pro Ala
            20              25              30
Ala Pro Ala Ala Pro Glu Pro Glu Ala Pro Ala Pro Pro Glu Ala Glu
            35              40              45
Glu Pro Pro Glu Ala Ala Pro Ala Pro Ala Ala Pro Ala Ala
            50              55              60
Glu Ala Ala Pro Pro Ala Glu Ala Ala Glu Pro Glu Pro Glu Ala Pro
65              70              75              80
Ala Ala Glu Ala Glu Ala Ala Glu Ala Glu Pro Pro Ala Pro Pro Ala
```

```
                85                  90                  95
Pro Glu Pro Ala Ala Pro Ala Ala Glu Ala Ala Pro Ala Glu Ala
            100                 105                 110
Ala Glu Pro Glu Pro Glu Ala Pro Ala Pro Glu Ala Pro Glu Ala
            115                 120                 125
Pro Glu Ala Ala Pro Ala Ala Pro Glu Pro Ala Glu Ala Ala Glu Ala
145         130             135                 140
Pro Ala Ala Pro Pro Ala Pro Glu Pro Glu Ala Glu Pro Glu Pro Ala
145                 150                 155                 160
Ala Ala Glu Ala Pro Ala Pro Pro Ala Pro Glu Pro Glu Ala Glu
                165                 170                 175
Pro Glu Pro Ala Ala Ala Glu Ala Glu Ala Ala Glu Ala Glu Pro Pro
            180                 185                 190
Ala Pro Pro Ala Pro Glu Pro Ala Ala Pro Pro Ala Glu Glu Pro Ala
            195                 200                 205
Glu Ala Pro Ala Glu Pro Pro Ala Ala Pro Glu Ala Ala Pro Ala Pro
            210                 215                 220
Pro Glu Ala Glu Glu Pro Pro Glu Ala Ala Pro Ala Pro Ala Pro Ala
225                 230                 235                 240
Ala Ala Glu Ala Pro Ala Pro Glu Pro Ala Ala Glu Pro Glu Pro Ala
                245                 250                 255
Pro Glu Ala Pro Ala Glu Pro Ala Pro Pro Ala Ala Glu Pro Ala Pro
            260                 265                 270
Pro Ala Ala Glu Ala Ala Glu Pro Ala Ala Pro Ala Glu Glu Ala Glu
            275                 280                 285
Ala Pro Glu Ala Pro Pro Ala Pro Ala Pro Glu Pro Ala Pro Ala Ala
            290                 295                 300
Glu Ala Ala Pro Pro Ala Glu Ala Ala Glu Glu Pro Glu Ala Pro
305                 310                 315                 320
Ala Ala Glu Ala Glu Ala Ala Glu Ala Glu Pro Pro Ala Pro Pro Ala
                325                 330                 335
Pro Glu Pro Ala Ala Arg Asn Gly Asp His Cys Pro Leu Gly Pro Gly
            340                 345                 350
Arg Cys Cys Arg Leu His Thr Val Arg Ala Ser Leu Glu Asp Leu Gly
            355                 360                 365
Trp Ala Asp Trp Val Leu Ser Pro Arg Glu Val Gln Val Thr Met Cys
            370                 375                 380
Ile Gly Ala Cys Pro Ser Gln Phe Arg Ala Ala Asn Met His Ala Gln
385                 390                 395                 400
Ile Lys Thr Ser Leu His Arg Leu Lys Pro Asp Thr Val Pro Ala Pro
                405                 410                 415
Cys Cys Val Pro Ala Ser Tyr Asn Pro Met Val Leu Ile Gln Lys Thr
            420                 425                 430
Asp Thr Gly Val Ser Leu Gln Thr Tyr Asp Asp Leu Leu Ala Lys Asp
            435                 440                 445
Cys His Cys Ile
450
```

<210> SEQ ID NO 123
<211> LENGTH: 392
<212> TYPE: PRT
<213> ORGANISM: Artificial Sequence
<220> FEATURE:
<223> OTHER INFORMATION: Fusion protein

<400> SEQUENCE: 123

```
Ala Pro Ala Pro Pro Ala Glu Ala Glu Ala Glu Ala Pro Pro Ala Ala
1               5                   10                  15

Pro Glu Pro Ala Ala Ala Pro Ala Glu Pro Ala Ala Pro Pro Ala Pro
            20                  25                  30

Glu Ala Ala Pro Ala Ala Glu Ala Ala Ala Pro Ala Ala Ala Glu Pro
            35                  40                  45

Pro Ala Ala Glu Ala Glu Ala Pro Ala Pro Pro Ala Ala Glu Ala Ala
            50                  55                  60

Glu Ala Pro Ala Pro Ala Ala Pro Pro Ala Ala Pro Ala Pro Glu Pro
65                  70                  75                  80

Ala Glu Ala Ala Ala Pro Ala Glu Ala Ala Pro Ala Pro Ala Pro Glu
                85                  90                  95

Ala Pro Ala Pro Ala Pro Glu Ala Pro Ala Glu Glu Ala Glu Pro Ala
                100                 105                 110

Ala Ala Pro Pro Ala Glu Ala Pro Ala Pro Glu Ala Pro Ala Glu Glu
            115                 120                 125

Ala Glu Pro Ala Ala Ala Pro Pro Ala Glu Ala Pro Ala Ala Pro Ala
            130                 135                 140

Ala Ala Glu Pro Pro Ala Glu Ala Glu Ala Pro Ala Pro Pro Ala
145                 150                 155                 160

Ala Ala Pro Ala Glu Pro Ala Ala Pro Ala Pro Glu Ala Ala Pro
                165                 170                 175

Ala Ala Glu Ala Ala Pro Pro Glu Pro Ala Glu Ala Ala Pro Ala
                180                 185                 190

Ala Ala Glu Ala Pro Ala Glu Ala Pro Ala Ala Pro Pro Glu Glu
                195                 200                 205

Ala Ala Ala Glu Pro Pro Ala Glu Ala Ala Pro Ala Ala Glu Ala
            210                 215                 220

Ala Glu Ala Ala Pro Ala Glu Pro Glu Pro Pro Ala Pro Pro Ala Pro
225                 230                 235                 240

Ala Glu Ala Ala Ala Pro Ala Glu Ala Ala Pro Ala Pro Ala Pro Glu
                245                 250                 255

Ala Pro Ala Pro Ala Pro Glu Ala Pro Ala Glu Glu Ala Glu Pro Ala
                260                 265                 270

Ala Ala Pro Pro Ala Glu Ala Pro Ala Arg Asn Gly Asp His Cys Pro
            275                 280                 285

Leu Gly Pro Gly Arg Cys Cys Arg Leu His Thr Val Arg Ala Ser Leu
290                 295                 300

Glu Asp Leu Gly Trp Ala Asp Trp Val Leu Ser Pro Arg Glu Val Gln
305                 310                 315                 320

Val Thr Met Cys Ile Gly Ala Cys Pro Ser Gln Phe Arg Ala Ala Asn
                325                 330                 335

Met His Ala Gln Ile Lys Thr Ser Leu His Arg Leu Lys Pro Asp Thr
            340                 345                 350

Val Pro Ala Pro Cys Cys Val Pro Ala Ser Tyr Asn Pro Met Val Leu
            355                 360                 365

Ile Gln Lys Thr Asp Thr Gly Val Ser Leu Gln Thr Tyr Asp Asp Leu
370                 375                 380

Leu Ala Lys Asp Cys His Cys Ile
385                 390
```

<210> SEQ ID NO 124

```
<211> LENGTH: 212
<212> TYPE: PRT
<213> ORGANISM: Artificial Sequence
<220> FEATURE:
<223> OTHER INFORMATION: Fusion protein

<400> SEQUENCE: 124

Ala Ala Glu Ala Glu Ala Ala Glu Ala Glu Pro Pro Ala Pro Pro Ala
1               5                   10                  15

Pro Glu Pro Ala Ala Ala Glu Ala Glu Ala Ala Glu Ala Glu Pro Pro
                20                  25                  30

Ala Pro Pro Ala Pro Glu Pro Ala Ala Ala Glu Ala Glu Ala Ala Glu
            35                  40                  45

Ala Glu Pro Pro Ala Pro Pro Ala Pro Glu Pro Ala Ala Ala Glu Ala
        50                  55                  60

Glu Ala Ala Glu Ala Glu Pro Pro Ala Pro Pro Ala Pro Glu Pro Ala
65                  70                  75                  80

Ala Ala Glu Ala Glu Ala Ala Glu Ala Glu Pro Pro Ala Pro Pro Ala
                85                  90                  95

Pro Glu Pro Ala Ala Arg Asn Gly Asp His Cys Pro Leu Gly Pro Gly
            100                 105                 110

Arg Cys Cys Arg Leu His Thr Val Arg Ala Ser Leu Glu Asp Leu Gly
        115                 120                 125

Trp Ala Asp Trp Val Leu Ser Pro Arg Glu Val Gln Val Thr Met Cys
130                 135                 140

Ile Gly Ala Cys Pro Ser Gln Phe Arg Ala Ala Asn Met His Ala Gln
145                 150                 155                 160

Ile Lys Thr Ser Leu His Arg Leu Lys Pro Asp Thr Val Pro Ala Pro
                165                 170                 175

Cys Cys Val Pro Ala Ser Tyr Asn Pro Met Val Leu Ile Gln Lys Thr
            180                 185                 190

Asp Thr Gly Val Ser Leu Gln Thr Tyr Asp Asp Leu Leu Ala Lys Asp
        195                 200                 205

Cys His Cys Ile
    210

<210> SEQ ID NO 125
<211> LENGTH: 312
<212> TYPE: PRT
<213> ORGANISM: Artificial Sequence
<220> FEATURE:
<223> OTHER INFORMATION: Fusion protein

<400> SEQUENCE: 125

Ala Glu Pro Ala Ala Pro Ala Pro Ala Glu Pro Ala Ala Pro Ala Pro
1               5                   10                  15

Glu Ala Pro Ala Ala Glu Pro Ala Ala Pro Ala Pro Ala Glu Pro Ala
                20                  25                  30

Ala Pro Ala Pro Glu Ala Pro Ala Ala Glu Pro Ala Ala Pro Ala Pro
            35                  40                  45

Ala Glu Pro Ala Ala Pro Ala Pro Glu Ala Pro Ala Ala Glu Pro Ala
        50                  55                  60

Ala Pro Ala Pro Ala Glu Pro Ala Ala Pro Ala Pro Glu Ala Pro Ala
65                  70                  75                  80

Ala Glu Pro Ala Ala Pro Ala Pro Ala Glu Pro Ala Ala Pro Ala Pro
                85                  90                  95

Glu Ala Pro Ala Ala Glu Pro Ala Ala Pro Ala Pro Ala Glu Pro Ala
```

```
                    100                 105                 110
Ala Pro Ala Pro Glu Ala Pro Ala Ala Glu Pro Ala Ala Pro Ala Pro
                115                 120                 125
Ala Glu Pro Ala Ala Pro Ala Pro Glu Ala Pro Ala Ala Glu Pro Ala
            130                 135                 140
Ala Pro Ala Pro Ala Glu Pro Ala Ala Pro Ala Pro Glu Ala Pro Ala
145                 150                 155                 160
Ala Glu Pro Ala Ala Pro Ala Pro Glu Pro Ala Ala Pro Ala Pro Ala
                165                 170                 175
Glu Ala Pro Ala Ala Glu Pro Ala Ala Pro Ala Pro Ala Glu Pro Ala
            180                 185                 190
Ala Pro Ala Pro Glu Ala Pro Ala Ala Arg Asn Gly Asp His Cys Pro
        195                 200                 205
Leu Gly Pro Gly Arg Cys Cys Arg Leu His Thr Val Arg Ala Ser Leu
    210                 215                 220
Glu Asp Leu Gly Trp Ala Asp Trp Val Leu Ser Pro Arg Glu Val Gln
225                 230                 235                 240
Val Thr Met Cys Ile Gly Ala Cys Pro Ser Gln Phe Arg Ala Ala Asn
                245                 250                 255
Met His Ala Gln Ile Lys Thr Ser Leu His Arg Leu Lys Pro Asp Thr
            260                 265                 270
Val Pro Ala Pro Cys Cys Val Pro Ala Ser Tyr Asn Pro Met Val Leu
        275                 280                 285
Ile Gln Lys Thr Asp Thr Gly Val Ser Leu Gln Thr Tyr Asp Asp Leu
    290                 295                 300
Leu Ala Lys Asp Cys His Cys Ile
305                 310

<210> SEQ ID NO 126
<211> LENGTH: 312
<212> TYPE: PRT
<213> ORGANISM: Artificial Sequence
<220> FEATURE:
<223> OTHER INFORMATION: Fusion protein

<400> SEQUENCE: 126

Ala Ala Glu Ala Ala Glu Ala Ala Pro Ala Glu Pro Glu Pro Pro Ala
1               5                   10                  15
Pro Pro Ala Pro Ala Glu Ala Ala Glu Ala Ala Pro Ala Glu Pro
            20                  25                  30
Glu Pro Pro Ala Pro Ala Pro Ala Ala Glu Ala Ala Glu Ala Ala
        35                  40                  45
Pro Ala Glu Pro Glu Pro Pro Ala Pro Ala Pro Ala Ala Glu Ala
    50                  55                  60
Ala Glu Ala Ala Pro Ala Glu Pro Glu Pro Pro Ala Pro Ala Pro
65                  70                  75                  80
Ala Ala Glu Ala Ala Glu Ala Ala Pro Ala Glu Pro Glu Pro Pro Ala
                85                  90                  95
Pro Pro Ala Pro Ala Glu Ala Ala Glu Ala Ala Pro Ala Glu Pro
            100                 105                 110
Glu Pro Pro Ala Pro Pro Ala Pro Ala Ala Glu Ala Ala Glu Ala Ala
        115                 120                 125
Pro Ala Glu Pro Glu Pro Pro Ala Pro Pro Ala Pro Ala Ala Glu Ala
    130                 135                 140

Ala Glu Ala Ala Pro Ala Glu Pro Glu Pro Pro Ala Pro Pro Ala Pro
```

```
              145                 150                 155                 160
Ala Ala Glu Ala Ala Glu Ala Ala Pro Ala Glu Pro Glu Pro Pro Ala
                    165                 170                 175
Pro Pro Ala Pro Ala Ala Glu Ala Ala Glu Ala Ala Pro Ala Glu Pro
                    180                 185                 190
Glu Pro Pro Ala Pro Pro Ala Pro Ala Arg Asn Gly Asp His Cys Pro
                    195                 200                 205
Leu Gly Pro Gly Arg Cys Cys Arg Leu His Thr Val Arg Ala Ser Leu
        210                 215                 220
Glu Asp Leu Gly Trp Ala Asp Trp Val Leu Ser Pro Arg Glu Val Gln
225                 230                 235                 240
Val Thr Met Cys Ile Gly Ala Cys Pro Ser Gln Phe Arg Ala Ala Asn
                    245                 250                 255
Met His Ala Gln Ile Lys Thr Ser Leu His Arg Leu Lys Pro Asp Thr
                    260                 265                 270
Val Pro Ala Pro Cys Cys Val Pro Ala Ser Tyr Asn Pro Met Val Leu
                    275                 280                 285
Ile Gln Lys Thr Asp Thr Gly Val Ser Leu Gln Thr Tyr Asp Asp Leu
                    290                 295                 300
Leu Ala Lys Asp Cys His Cys Ile
305                 310

<210> SEQ ID NO 127
<211> LENGTH: 933
<212> TYPE: PRT
<213> ORGANISM: Artificial Sequence
<220> FEATURE:
<223> OTHER INFORMATION: Fusion protein

<400> SEQUENCE: 127

His Gly Asp Gly Ser Phe Ser Asp Glu Met Asn Thr Ile Leu Asp Asn
1               5                   10                  15
Leu Ala Ala Arg Asp Phe Ile Asn Trp Leu Ile Gln Thr Lys Ile Thr
                    20                  25                  30
Asp Ala Pro Pro Glu Ala Pro Glu Ala Pro Glu Ala Ala Pro Ala Ala
                    35                  40                  45
Pro Glu Pro Ala Glu Ala Pro Pro Glu Ala Pro Glu Ala Pro Glu Ala
        50                  55                  60
Ala Pro Ala Ala Pro Glu Pro Ala Ala Pro Glu Ala Pro Glu Ala Glu
65                  70                  75                  80
Ala Pro Glu Ala Ala Pro Ala Pro Glu Pro Ala Glu Ala Pro Pro Pro
                    85                  90                  95
Glu Ala Pro Glu Ala Pro Glu Ala Ala Pro Ala Ala Pro Glu Pro Ala
                    100                 105                 110
Glu Ala Pro Pro Glu Ala Pro Glu Ala Pro Glu Ala Ala Pro Ala Ala
                    115                 120                 125
Pro Glu Pro Ala Glu Ala Pro Glu Ala Pro Glu Ala Pro Glu Ala
                    130                 135                 140
Ala Pro Ala Ala Pro Glu Pro Ala Glu Ala Pro Pro Glu Ala Pro Glu
145                 150                 155                 160
Ala Pro Glu Ala Ala Pro Ala Ala Pro Glu Ala Ala Pro Ala Pro Pro
                    165                 170                 175
Glu Ala Pro Glu Ala Pro Glu Ala Ala Pro Ala Ala Pro Glu Pro Ala
                    180                 185                 190
Glu Ala Pro Pro Glu Ala Pro Glu Ala Pro Glu Ala Ala Pro Ala Ala
```

```
            195                 200                 205
Pro Glu Pro Ala Glu Ala Pro Pro Glu Ala Pro Glu Ala Pro Glu Ala
            210                 215                 220

Ala Pro Ala Ala Pro Glu Pro Ala Glu Ala Pro Pro Glu Ala Pro Glu
225                 230                 235                 240

Ala Pro Glu Ala Ala Pro Ala Ala Pro Glu Pro Ala Glu Ala Pro Pro
                245                 250                 255

Glu Ala Pro Glu Ala Pro Glu Ala Ala Pro Ala Ala Pro Glu Pro Ala
                260                 265                 270

Glu Ala Pro Pro Glu Ala Pro Glu Ala Pro Glu Ala Ala Pro Ala Ala
            275                 280                 285

Pro Glu Pro Ala Glu Ala Pro Pro Glu Ala Pro Glu Ala Pro Glu Ala
            290                 295                 300

Ala Pro Ala Ala Pro Glu Pro Ala Glu Ala Pro Pro Glu Ala Pro Glu
305                 310                 315                 320

Ala Pro Glu Ala Ala Pro Ala Ala Pro Glu Pro Ala Glu Ala Pro Pro
                325                 330                 335

Glu Ala Pro Glu Ala Pro Glu Ala Ala Pro Ala Ala Pro Glu Pro Ala
                340                 345                 350

Glu Ala Pro Pro Glu Ala Pro Glu Ala Pro Glu Ala Ala Pro Ala Ala
            355                 360                 365

Pro Glu Pro Ala Glu Ala Pro Pro Glu Ala Pro Glu Ala Pro Glu Ala
            370                 375                 380

Ala Pro Ala Ala Pro Glu Pro Ala Glu Ala Pro Pro Glu Ala Pro Glu
385                 390                 395                 400

Ala Pro Glu Ala Ala Pro Ala Ala Pro Glu Pro Ala Glu Ala Pro Pro
                405                 410                 415

Glu Ala Pro Glu Ala Pro Glu Ala Ala Pro Ala Ala Pro Glu Pro Ala
                420                 425                 430

Glu Ala Pro Pro Glu Ala Pro Glu Ala Pro Glu Ala Ala Pro Ala Ala
            435                 440                 445

Pro Glu Pro Ala Glu Ala Pro Pro Glu Ala Pro Glu Ala Pro Glu Ala
            450                 455                 460

Ala Pro Ala Ala Pro Glu Pro Ala Glu Ala Pro Pro Glu Ala Pro Glu
465                 470                 475                 480

Ala Pro Glu Ala Ala Pro Ala Ala Pro Glu Pro Ala Glu Ala Pro Pro
                485                 490                 495

Glu Ala Pro Glu Ala Pro Glu Ala Ala Pro Ala Ala Pro Glu Pro Ala
                500                 505                 510

Glu Ala Pro Pro Glu Ala Pro Glu Ala Pro Glu Ala Ala Pro Ala Ala
            515                 520                 525

Pro Glu Pro Ala Glu Ala Pro Pro Glu Ala Pro Glu Ala Pro Glu Ala
            530                 535                 540

Ala Pro Ala Ala Pro Glu Pro Ala Glu Ala Pro Pro Glu Ala Pro Glu
545                 550                 555                 560

Ala Pro Glu Ala Ala Pro Ala Ala Pro Glu Pro Ala Glu Ala Pro Pro
                565                 570                 575

Glu Ala Pro Glu Ala Pro Glu Ala Ala Pro Ala Ala Pro Glu Pro Ala
                580                 585                 590

Glu Ala Pro Pro Glu Ala Pro Glu Ala Pro Glu Ala Ala Pro Ala Ala
            595                 600                 605

Pro Glu Pro Ala Glu Ala Pro Pro Glu Ala Pro Glu Ala Pro Glu Ala
            610                 615                 620
```

Ala Pro Ala Ala Pro Glu Pro Ala Glu Ala Pro Glu
625                 630                 635                 640

Ala Pro Glu Ala Ala Pro Ala Ala Pro Glu Ala Pro Pro
            645                 650                 655

Glu Ala Pro Glu Ala Pro Glu Ala Ala Pro Ala Ala Pro Glu Pro Ala
                660                 665                 670

Glu Ala Pro Pro Glu Ala Pro Glu Ala Pro Glu Ala Ala Pro Ala Ala
            675                 680                 685

Pro Glu Pro Ala Glu Ala Pro Pro Glu Ala Pro Glu Ala Pro Glu Ala
690                 695                 700

Ala Pro Ala Ala Pro Glu Pro Ala Glu Ala Pro Pro Glu Ala Pro Glu
705                 710                 715                 720

Ala Pro Glu Ala Ala Pro Ala Ala Pro Glu Pro Ala Glu Ala Pro Pro
            725                 730                 735

Glu Ala Pro Glu Ala Pro Glu Ala Ala Pro Ala Ala Pro Glu Pro Ala
                740                 745                 750

Glu Ala Pro Pro Glu Ala Pro Glu Ala Pro Glu Ala Ala Pro Ala Ala
            755                 760                 765

Pro Glu Pro Ala Glu Ala Pro Pro Glu Ala Pro Glu Ala Pro Glu Ala
770                 775                 780

Ala Pro Ala Ala Pro Glu Pro Ala Glu Ala Pro Pro Glu Ala Pro Glu
785                 790                 795                 800

Ala Pro Glu Ala Ala Pro Ala Ala Pro Glu Pro Ala Glu Ala Pro Pro
            805                 810                 815

Glu Ala Pro Glu Ala Pro Glu Ala Ala Pro Ala Ala Pro Glu Pro Ala
                820                 825                 830

Glu Ala Pro Pro Glu Ala Pro Glu Ala Pro Glu Ala Ala Pro Ala Ala
            835                 840                 845

Pro Glu Pro Ala Glu Ala Pro Pro Glu Ala Pro Glu Ala Pro Glu Ala
850                 855                 860

Ala Pro Ala Ala Pro Glu Pro Ala Glu Ala Pro Pro Glu Ala Pro Glu
865                 870                 875                 880

Ala Pro Glu Ala Ala Pro Ala Ala Pro Glu Pro Ala Glu Ala Pro Pro
            885                 890                 895

Glu Ala Pro Glu Ala Pro Glu Ala Ala Pro Ala Ala Pro Glu Pro Ala
                900                 905                 910

Glu Ala Pro Pro Glu Ala Pro Glu Ala Pro Glu Ala Ala Pro Ala Ala
            915                 920                 925

Pro Glu Pro Ala Glu
        930

<210> SEQ ID NO 128
<211> LENGTH: 893
<212> TYPE: PRT
<213> ORGANISM: Artificial Sequence
<220> FEATURE:
<223> OTHER INFORMATION: Fusion protein

<400> SEQUENCE: 128

His Gly Asp Gly Ser Phe Ser Asp Glu Met Asn Thr Ile Leu Asp Asn
1               5                   10                  15

Leu Ala Ala Arg Asp Phe Ile Asn Trp Leu Ile Gln Thr Lys Ile Thr
            20                  25                  30

Asp Ala Glu Pro Ala Ala Pro Ala Pro Ala Glu Pro Ala Ala Pro Ala
        35                  40                  45

```
Pro Glu Ala Pro Ala Ala Glu Pro Ala Ala Pro Ala Pro Ala Glu Pro
    50                  55                  60
Ala Ala Pro Ala Pro Glu Ala Pro Ala Ala Glu Pro Ala Ala Pro Ala
65                  70                  75                  80
Pro Ala Glu Pro Ala Ala Pro Ala Pro Glu Ala Pro Ala Ala Glu Pro
                85                  90                  95
Ala Ala Pro Ala Pro Glu Ala Pro Ala Ala Pro Ala Pro Glu Ala Pro
                100                 105                 110
Ala Ala Glu Pro Ala Ala Pro Ala Pro Glu Ala Pro Ala Ala Pro Ala
                115                 120                 125
Pro Glu Ala Pro Ala Ala Glu Pro Ala Ala Pro Ala Pro Ala Glu Pro
    130                 135                 140
Ala Ala Pro Ala Pro Glu Ala Pro Ala Ala Glu Pro Ala Ala Pro Ala
145                 150                 155                 160
Pro Ala Glu Pro Ala Ala Pro Ala Pro Glu Ala Pro Ala Ala Glu Pro
                165                 170                 175
Ala Ala Pro Ala Pro Glu Ala Pro Ala Ala Pro Ala Pro Glu Ala Pro
                180                 185                 190
Ala Ala Glu Pro Ala Ala Pro Ala Pro Glu Ala Pro Ala Ala Pro Ala
                195                 200                 205
Pro Glu Ala Pro Ala Ala Glu Pro Ala Ala Pro Ala Pro Ala Glu Pro
    210                 215                 220
Ala Ala Pro Ala Pro Glu Ala Pro Ala Ala Glu Pro Ala Ala Pro Ala
225                 230                 235                 240
Pro Ala Glu Pro Ala Ala Pro Ala Pro Glu Ala Pro Ala Ala Glu Pro
                245                 250                 255
Ala Ala Pro Ala Pro Glu Ala Pro Ala Ala Pro Ala Pro Glu Ala Pro
                260                 265                 270
Ala Ala Glu Pro Ala Ala Pro Ala Pro Glu Ala Pro Ala Ala Pro Ala
                275                 280                 285
Pro Glu Ala Pro Ala Ala Glu Pro Ala Ala Pro Ala Pro Ala Glu Pro
    290                 295                 300
Ala Ala Pro Ala Pro Glu Ala Pro Ala Ala Glu Pro Ala Ala Pro Ala
305                 310                 315                 320
Pro Ala Glu Pro Ala Ala Pro Ala Pro Glu Ala Pro Ala Ala Glu Pro
                325                 330                 335
Ala Ala Pro Ala Pro Glu Ala Pro Ala Ala Pro Ala Pro Glu Ala Pro
                340                 345                 350
Ala Ala Glu Pro Ala Ala Pro Ala Pro Glu Ala Pro Ala Ala Pro Ala
                355                 360                 365
Pro Glu Ala Pro Ala Ala Glu Pro Ala Ala Pro Ala Pro Ala Glu Pro
    370                 375                 380
Ala Ala Pro Ala Pro Glu Ala Pro Ala Ala Glu Pro Ala Ala Pro Ala
385                 390                 395                 400
Pro Ala Glu Pro Ala Ala Pro Ala Pro Glu Ala Pro Ala Ala Glu Pro
                405                 410                 415
Ala Ala Pro Ala Pro Glu Ala Pro Ala Ala Pro Ala Pro Glu Ala Pro
                420                 425                 430
Ala Ala Glu Pro Ala Ala Pro Ala Pro Glu Ala Pro Ala Ala Pro Ala
                435                 440                 445
Pro Glu Ala Pro Ala Ala Glu Pro Ala Ala Pro Ala Pro Ala Glu Pro
    450                 455                 460
```

```
Ala Ala Pro Ala Pro Glu Ala Pro Ala Ala Glu Pro Ala Ala Pro Ala
465                 470                 475                 480

Pro Ala Glu Pro Ala Ala Pro Ala Pro Glu Ala Pro Ala Ala Glu Pro
                485                 490                 495

Ala Ala Pro Ala Pro Ala Glu Pro Ala Ala Pro Ala Pro Glu Ala Pro
                500                 505                 510

Ala Ala Glu Pro Ala Ala Pro Ala Pro Ala Glu Pro Ala Ala Pro Ala
                515                 520                 525

Pro Glu Ala Pro Ala Ala Glu Pro Ala Ala Pro Ala Pro Ala Glu Pro
            530                 535                 540

Ala Ala Pro Ala Pro Glu Ala Pro Ala Ala Glu Pro Ala Ala Pro Ala
545                 550                 555                 560

Pro Ala Glu Pro Ala Ala Pro Ala Pro Glu Ala Pro Ala Ala Glu Pro
                565                 570                 575

Ala Ala Pro Ala Pro Ala Glu Pro Ala Ala Pro Ala Pro Glu Ala Pro
                580                 585                 590

Ala Ala Glu Pro Ala Ala Pro Ala Pro Ala Glu Pro Ala Ala Pro Ala
                595                 600                 605

Pro Glu Ala Pro Ala Ala Glu Pro Ala Ala Pro Ala Pro Ala Glu Pro
            610                 615                 620

Ala Ala Pro Ala Pro Glu Ala Pro Ala Ala Glu Pro Ala Ala Pro Ala
625                 630                 635                 640

Pro Ala Glu Pro Ala Ala Pro Ala Pro Glu Ala Pro Ala Ala Glu Pro
                645                 650                 655

Ala Ala Pro Ala Pro Ala Glu Pro Ala Ala Pro Ala Pro Glu Ala Pro
                660                 665                 670

Ala Ala Glu Pro Ala Ala Pro Ala Pro Ala Glu Pro Ala Ala Pro Ala
                675                 680                 685

Pro Glu Ala Pro Ala Ala Glu Pro Ala Ala Pro Ala Pro Ala Glu Pro
            690                 695                 700

Ala Ala Pro Ala Pro Glu Ala Pro Ala Ala Glu Pro Ala Ala Pro Ala
705                 710                 715                 720

Pro Ala Glu Pro Ala Ala Pro Ala Pro Glu Ala Pro Ala Ala Glu Pro
                725                 730                 735

Ala Ala Pro Ala Pro Ala Glu Pro Ala Ala Pro Ala Pro Glu Ala Pro
                740                 745                 750

Ala Ala Glu Pro Ala Ala Pro Ala Pro Ala Glu Pro Ala Ala Pro Ala
                755                 760                 765

Pro Glu Ala Pro Ala Ala Glu Pro Ala Ala Pro Ala Pro Ala Glu Pro
            770                 775                 780

Ala Ala Pro Ala Pro Glu Ala Pro Ala Ala Glu Pro Ala Ala Pro Ala
785                 790                 795                 800

Pro Ala Glu Pro Ala Ala Pro Ala Pro Glu Ala Pro Ala Ala Glu Pro
                805                 810                 815

Ala Ala Pro Ala Pro Ala Glu Pro Ala Ala Pro Ala Pro Glu Ala Pro
                820                 825                 830

Ala Ala Glu Pro Ala Ala Pro Ala Pro Ala Glu Pro Ala Ala Pro Ala
                835                 840                 845

Pro Glu Ala Pro Ala Ala Glu Pro Ala Ala Pro Ala Pro Ala Glu Pro
            850                 855                 860

Ala Ala Pro Ala Pro Glu Ala Pro Ala Ala Glu Pro Ala Ala Pro Ala
865                 870                 875                 880

Pro Ala Glu Pro Ala Ala Pro Ala Pro Glu Ala Pro Ala
```

-continued

```
                    885                 890

<210> SEQ ID NO 129
<211> LENGTH: 973
<212> TYPE: PRT
<213> ORGANISM: Artificial Sequence
<220> FEATURE:
<223> OTHER INFORMATION: Fusion protein

<400> SEQUENCE: 129

His Gly Asp Gly Ser Phe Ser Asp Glu Met Asn Thr Ile Leu Asp Asn
1               5                   10                  15

Leu Ala Ala Arg Asp Phe Ile Asn Trp Leu Ile Gln Thr Lys Ile Thr
            20                  25                  30

Asp Ala Pro Ala Ala Pro Pro Glu Glu Ala Ala Ala Glu Pro Pro Ala
        35                  40                  45

Ala Glu Ala Ala Pro Ala Pro Ala Ala Pro Pro Glu Glu Ala Ala Ala
    50                  55                  60

Glu Pro Pro Ala Ala Glu Ala Ala Pro Ala Pro Ala Ala Pro Pro Glu
65                  70                  75                  80

Glu Ala Ala Ala Glu Pro Pro Ala Ala Glu Ala Ala Pro Ala Pro Ala
                85                  90                  95

Ala Pro Pro Glu Glu Ala Ala Ala Glu Pro Pro Ala Ala Glu Ala Ala
            100                 105                 110

Pro Ala Pro Ala Ala Pro Pro Glu Glu Ala Ala Ala Glu Pro Pro Ala
        115                 120                 125

Ala Glu Ala Ala Pro Ala Pro Ala Ala Pro Pro Glu Glu Ala Ala Ala
    130                 135                 140

Glu Pro Pro Ala Ala Glu Ala Ala Pro Ala Pro Ala Ala Pro Pro Glu
145                 150                 155                 160

Glu Ala Ala Ala Glu Pro Pro Ala Ala Glu Ala Ala Pro Ala Pro Ala
                165                 170                 175

Ala Pro Pro Glu Glu Ala Ala Ala Glu Pro Pro Ala Ala Glu Ala Ala
            180                 185                 190

Pro Ala Pro Ala Ala Pro Pro Glu Glu Ala Ala Ala Glu Pro Pro Ala
        195                 200                 205

Ala Glu Ala Ala Pro Ala Pro Ala Ala Pro Pro Glu Glu Ala Ala Ala
    210                 215                 220

Glu Pro Pro Ala Ala Glu Ala Ala Pro Ala Pro Ala Ala Pro Pro Glu
225                 230                 235                 240

Glu Ala Ala Ala Glu Pro Pro Ala Ala Glu Ala Ala Pro Ala Pro Ala
                245                 250                 255

Ala Pro Pro Glu Glu Ala Ala Ala Glu Pro Pro Ala Ala Glu Ala Ala
            260                 265                 270

Pro Ala Pro Ala Ala Pro Pro Glu Glu Ala Ala Ala Glu Pro Pro Ala
        275                 280                 285

Ala Glu Ala Ala Pro Ala Pro Ala Ala Pro Pro Glu Glu Ala Ala Ala
    290                 295                 300

Glu Pro Pro Ala Ala Glu Ala Ala Pro Ala Pro Ala Ala Pro Pro Glu
305                 310                 315                 320

Glu Ala Ala Ala Glu Pro Pro Ala Ala Glu Ala Ala Pro Ala Pro Ala
                325                 330                 335

Ala Pro Pro Glu Glu Ala Ala Ala Glu Pro Pro Ala Ala Glu Ala Ala
            340                 345                 350

Pro Ala Pro Ala Ala Pro Pro Glu Glu Ala Ala Ala Glu Pro Pro Ala
```

```
            355                 360                 365
Ala Glu Ala Ala Pro Ala Pro Ala Ala Pro Pro Glu Glu Ala Ala Ala
370                 375                 380

Glu Pro Pro Ala Ala Glu Ala Ala Pro Ala Pro Ala Ala Pro Pro Glu
385                 390                 395                 400

Glu Ala Ala Ala Glu Pro Pro Ala Ala Glu Ala Ala Pro Ala Pro Ala
                405                 410                 415

Ala Pro Pro Glu Glu Ala Ala Ala Glu Pro Pro Ala Ala Glu Ala Ala
                420                 425                 430

Pro Ala Pro Ala Ala Pro Pro Glu Glu Ala Ala Ala Glu Pro Pro Ala
                435                 440                 445

Ala Glu Ala Ala Pro Ala Pro Ala Ala Pro Pro Glu Glu Ala Ala Ala
450                 455                 460

Glu Pro Pro Ala Ala Glu Ala Ala Pro Ala Pro Ala Ala Pro Pro Glu
465                 470                 475                 480

Glu Ala Ala Ala Glu Pro Pro Ala Ala Glu Ala Ala Pro Ala Pro Ala
                485                 490                 495

Ala Pro Pro Glu Glu Ala Ala Ala Glu Pro Pro Ala Ala Glu Ala Ala
                500                 505                 510

Pro Ala Pro Ala Ala Pro Pro Glu Glu Ala Ala Ala Glu Pro Pro Ala
                515                 520                 525

Ala Glu Ala Ala Pro Ala Pro Ala Ala Pro Pro Glu Glu Ala Ala Ala
530                 535                 540

Glu Pro Pro Ala Ala Glu Ala Ala Pro Ala Pro Ala Ala Pro Pro Glu
545                 550                 555                 560

Glu Ala Ala Ala Glu Pro Pro Ala Ala Glu Ala Ala Pro Ala Pro Ala
                565                 570                 575

Ala Pro Pro Glu Glu Ala Ala Ala Glu Pro Pro Ala Ala Glu Ala Ala
                580                 585                 590

Pro Ala Pro Ala Ala Pro Pro Glu Glu Ala Ala Ala Glu Pro Pro Ala
                595                 600                 605

Ala Glu Ala Ala Pro Ala Pro Ala Ala Pro Pro Glu Glu Ala Ala Ala
610                 615                 620

Glu Pro Pro Ala Ala Glu Ala Ala Pro Ala Pro Ala Ala Pro Pro Glu
625                 630                 635                 640

Glu Ala Ala Ala Glu Pro Pro Ala Ala Glu Ala Ala Pro Ala Pro Ala
                645                 650                 655

Ala Pro Pro Glu Glu Ala Ala Ala Glu Pro Pro Ala Ala Glu Ala Ala
                660                 665                 670

Pro Ala Pro Ala Ala Pro Pro Glu Glu Ala Ala Ala Glu Pro Pro Ala
                675                 680                 685

Ala Glu Ala Ala Pro Ala Pro Ala Ala Pro Pro Glu Glu Ala Ala Ala
690                 695                 700

Glu Pro Pro Ala Ala Glu Ala Ala Pro Ala Pro Ala Ala Pro Pro Glu
705                 710                 715                 720

Glu Ala Ala Ala Glu Pro Pro Ala Ala Glu Ala Ala Pro Ala Pro Ala
                725                 730                 735

Ala Pro Pro Glu Glu Ala Ala Ala Glu Pro Pro Ala Ala Glu Ala Ala
                740                 745                 750

Pro Ala Pro Ala Ala Pro Pro Glu Glu Ala Ala Ala Glu Pro Pro Ala
                755                 760                 765

Ala Glu Ala Ala Pro Ala Pro Ala Ala Pro Pro Glu Glu Ala Ala Ala
770                 775                 780
```

```
Glu Pro Pro Ala Ala Glu Ala Pro Ala Pro Ala Pro Glu
785                 790                 795                 800

Glu Ala Ala Ala Glu Pro Pro Ala Ala Glu Ala Pro Ala
                805                 810                 815

Ala Pro Pro Glu Glu Ala Ala Glu Pro Pro Ala Ala Glu Ala Ala
            820                 825                 830

Pro Ala Pro Ala Ala Pro Pro Glu Glu Ala Ala Glu Pro Pro Ala
            835                 840                 845

Ala Glu Ala Ala Pro Ala Pro Ala Ala Pro Pro Glu Glu Ala Ala
            850                 855                 860

Glu Pro Pro Ala Ala Glu Ala Pro Ala Pro Ala Pro Glu
865                 870                 875                 880

Glu Ala Ala Ala Glu Pro Pro Ala Ala Glu Ala Pro Ala Pro Ala
                885                 890                 895

Ala Pro Pro Glu Glu Ala Ala Glu Pro Pro Ala Ala Glu Ala Ala
            900                 905                 910

Pro Ala Pro Ala Ala Pro Pro Glu Glu Ala Ala Glu Pro Pro Ala
            915                 920                 925

Ala Glu Ala Ala Pro Ala Pro Ala Ala Pro Pro Glu Glu Ala Ala
            930                 935                 940

Glu Pro Pro Ala Ala Glu Ala Ala Pro Ala Pro Ala Pro Glu
945                 950                 955                 960

Glu Ala Ala Ala Glu Pro Pro Ala Ala Glu Ala Ala Pro
                965                 970

<210> SEQ ID NO 130
<211> LENGTH: 1106
<212> TYPE: PRT
<213> ORGANISM: Artificial Sequence
<220> FEATURE:
<223> OTHER INFORMATION: Fusion protein

<400> SEQUENCE: 130

Ala Pro Ala Glu Ala Pro Ala Ala Ala Glu Glu Ala Pro Pro Ala Glu
1               5                   10                  15

Pro Ala Pro Glu Ala Pro Glu Ala Pro Ala Ala Ala Glu Glu Ala
                20                  25                  30

Pro Pro Ala Glu Pro Ala Pro Glu Ala Pro Ala Glu Ala Pro Ala Ala
            35                  40                  45

Ala Glu Glu Ala Pro Pro Ala Glu Pro Ala Pro Glu Ala Pro Ala Glu
    50                  55                  60

Ala Pro Ala Ala Ala Glu Glu Ala Pro Pro Ala Glu Pro Ala Pro Glu
65                  70                  75                  80

Ala Pro Ala Glu Ala Pro Ala Ala Ala Glu Glu Ala Pro Pro Ala Glu
                85                  90                  95

Pro Ala Pro Glu Ala Pro Ala Glu Ala Pro Ala Ala Ala Glu Glu Ala
                100                 105                 110

Pro Pro Ala Glu Pro Ala Pro Glu Ala Pro Ala Glu Ala Pro Ala Ala
            115                 120                 125

Ala Glu Glu Ala Pro Pro Ala Glu Pro Ala Pro Glu Ala Pro Ala Glu
    130                 135                 140

Ala Pro Ala Ala Ala Glu Glu Ala Pro Pro Ala Glu Pro Ala Pro Glu
145                 150                 155                 160

Ala Pro Ala Glu Ala Pro Ala Ala Ala Glu Glu Ala Pro Pro Ala Glu
                165                 170                 175
```

```
Pro Ala Pro Glu Ala Pro Ala Glu Ala Pro Ala Ala Glu Glu Ala
            180                 185                 190
Pro Pro Ala Glu Pro Ala Pro Glu Ala Pro Ala Glu Ala Pro Ala Ala
            195                 200                 205
Ala Glu Glu Ala Pro Pro Ala Glu Pro Ala Pro Glu Ala Pro Ala Glu
            210                 215                 220
Ala Pro Ala Ala Ala Glu Glu Ala Pro Pro Ala Glu Pro Ala Pro Glu
225                 230                 235                 240
Ala Pro Ala Glu Ala Pro Ala Ala Glu Glu Ala Pro Pro Ala Glu
            245                 250                 255
Pro Ala Pro Glu Ala Pro Ala Glu Ala Pro Ala Ala Glu Glu Ala
            260                 265                 270
Pro Pro Ala Glu Pro Ala Pro Glu Ala Pro Ala Glu Ala Pro Ala Ala
            275                 280                 285
Ala Glu Glu Ala Pro Pro Ala Glu Pro Ala Pro Glu Ala Pro Ala Glu
            290                 295                 300
Ala Pro Ala Ala Ala Glu Glu Ala Pro Pro Ala Glu Pro Ala Pro Glu
305                 310                 315                 320
Ala Pro Ala Glu Ala Pro Ala Ala Glu Glu Ala Pro Pro Ala Glu
            325                 330                 335
Pro Ala Pro Glu Ala Pro Ala Glu Ala Pro Ala Ala Glu Glu Ala
            340                 345                 350
Pro Pro Ala Glu Pro Ala Pro Glu Ala Pro Ala Glu Ala Pro Ala Ala
            355                 360                 365
Ala Glu Glu Ala Pro Pro Ala Glu Pro Ala Pro Glu Ala Pro Ala Glu
            370                 375                 380
Ala Pro Ala Ala Ala Glu Glu Ala Pro Pro Ala Glu Pro Ala Pro Glu
385                 390                 395                 400
Ala Pro Ala Glu Ala Pro Ala Ala Glu Glu Ala Pro Pro Ala Glu
            405                 410                 415
Pro Ala Pro Glu Ala Pro Ala Glu Ala Pro Ala Ala Glu Glu Ala
            420                 425                 430
Pro Pro Ala Glu Pro Ala Pro Glu Ala Pro Ala Glu Ala Pro Ala Ala
            435                 440                 445
Ala Glu Glu Ala Pro Pro Ala Glu Pro Ala Pro Glu Ala Pro Ala Glu
            450                 455                 460
Ala Pro Ala Ala Ala Glu Glu Ala Pro Pro Ala Glu Pro Ala Pro Glu
465                 470                 475                 480
Ala Pro Ala Glu Ala Pro Ala Ala Glu Glu Ala Pro Pro Ala Glu
            485                 490                 495
Pro Ala Pro Glu Ala Pro Ala Glu Ala Pro Ala Ala Glu Glu Ala
            500                 505                 510
Pro Pro Ala Glu Pro Ala Pro Glu Ala Pro Ala Glu Ala Pro Ala Ala
            515                 520                 525
Ala Glu Glu Ala Pro Pro Ala Glu Pro Ala Pro Glu Ala Pro Ala Glu
            530                 535                 540
Ala Pro Ala Ala Ala Glu Glu Ala Pro Pro Ala Glu Pro Ala Pro Glu
545                 550                 555                 560
Ala Pro Ala Glu Ala Pro Ala Ala Glu Glu Ala Pro Pro Ala Glu
            565                 570                 575
Pro Ala Pro Glu Ala Pro Ala Glu Ala Pro Ala Ala Glu Glu Ala
            580                 585                 590
```

-continued

Pro Pro Ala Glu Pro Ala Pro Glu Ala Pro Ala Ala
        595                 600             605

Ala Glu Glu Ala Pro Pro Ala Glu Pro Ala Pro Glu
    610             615             620

Ala Pro Ala Ala Ala Glu Glu Ala Pro Pro Ala Glu Pro Ala Pro Glu
625             630             635             640

Ala Pro Ala Glu Ala Pro Ala Ala Ala Glu Glu Ala Pro Pro Ala Glu
            645             650             655

Pro Ala Pro Glu Ala Pro Ala Glu Ala Pro Ala Ala Ala Glu Glu Ala
            660             665             670

Pro Pro Ala Glu Pro Ala Pro Glu Ala Pro Ala Glu Ala Pro Ala Ala
            675             680             685

Ala Glu Glu Ala Pro Pro Ala Glu Pro Ala Pro Glu Ala Pro Ala Glu
    690             695             700

Ala Pro Ala Ala Ala Glu Glu Ala Pro Pro Ala Glu Pro Ala Pro Glu
705             710             715             720

Ala Pro Ala Glu Ala Pro Ala Ala Ala Glu Glu Ala Pro Pro Ala Glu
            725             730             735

Pro Ala Pro Glu Ala Pro Ala Glu Ala Pro Ala Ala Ala Glu Glu Ala
            740             745             750

Pro Pro Ala Glu Pro Ala Pro Glu Ala Pro Ala Glu Ala Pro Ala Ala
            755             760             765

Ala Glu Glu Ala Pro Pro Ala Glu Pro Ala Pro Glu Ala Pro Ala Glu
    770             775             780

Ala Pro Ala Ala Ala Glu Glu Ala Pro Pro Ala Glu Pro Ala Pro Glu
785             790             795             800

Ala Pro Ala Glu Ala Pro Ala Ala Ala Glu Glu Ala Pro Pro Ala Glu
            805             810             815

Pro Ala Pro Glu Ala Pro Ala Glu Ala Pro Ala Ala Ala Glu Glu Ala
            820             825             830

Pro Pro Ala Glu Pro Ala Pro Glu Ala Pro Ala Glu Ala Pro Ala Ala
            835             840             845

Ala Glu Glu Ala Pro Pro Ala Glu Pro Ala Pro Glu Ala Pro Ala Glu
    850             855             860

Ala Pro Ala Ala Ala Glu Glu Ala Pro Pro Ala Glu Pro Ala Pro Glu
865             870             875             880

Ala Pro Ala Glu Ala Pro Ala Ala Ala Glu Glu Ala Pro Pro Ala Glu
            885             890             895

Pro Ala Pro Glu Ala Pro Ala Glu Ala Pro Ala Ala Ala Glu Glu Ala
            900             905             910

Pro Pro Ala Glu Pro Ala Pro Glu Ala Pro Ala Glu Ala Pro Ala Ala
            915             920             925

Ala Glu Glu Ala Pro Pro Ala Glu Pro Ala Pro Glu Ala Pro Ala Glu
    930             935             940

Ala Pro Ala Ala Ala Glu Glu Ala Pro Pro Ala Glu Pro Ala Pro Glu
945             950             955             960

Ala Pro Ala Glu Ala Pro Ala Ala Ala Glu Glu Ala Pro Pro Ala Glu
            965             970             975

Pro Ala Pro Glu Gly Ser Asp Leu Asp Lys Lys Leu Leu Glu Ala Ala
            980             985             990

Arg Ala Gly Gln Asp Asp Glu Val Arg Ile Leu Met Ala Asn Gly Ala
    995             1000            1005

Asp Val Asn Ala Arg Asp Ser Thr Gly Trp Thr Pro Leu His Leu

```
                1010               1015              1020

Ala Ala Pro Trp Gly His Pro Glu Ile Val Glu Val Leu Leu Lys
        1025              1030              1035

Asn Gly Ala Asp Val Asn Ala Ala Asp Phe Gln Gly Trp Thr Pro
        1040              1045              1050

Leu His Leu Ala Ala Ala Val Gly His Leu Glu Ile Val Glu Val
        1055              1060              1065

Leu Leu Lys Tyr Gly Ala Asp Val Asn Ala Gln Asp Lys Phe Gly
        1070              1075              1080

Lys Thr Ala Phe Asp Ile Ser Ile Asp Asn Gly Asn Glu Asp Leu
        1085              1090              1095

Ala Glu Ile Leu Gln Lys Ala Ala
        1100              1105

<210> SEQ ID NO 131
<211> LENGTH: 986
<212> TYPE: PRT
<213> ORGANISM: Artificial Sequence
<220> FEATURE:
<223> OTHER INFORMATION: Fusion protein

<400> SEQUENCE: 131

Ala Glu Pro Ala Ala Pro Ala Pro Ala Glu Pro Ala Ala Pro Ala
1               5                   10                  15

Glu Ala Pro Ala Ala Glu Pro Ala Ala Pro Ala Pro Ala Glu Pro Ala
                20                  25                  30

Ala Pro Ala Pro Glu Ala Pro Ala Ala Glu Pro Ala Ala Pro Ala Pro
                35                  40                  45

Ala Glu Pro Ala Ala Pro Ala Pro Glu Ala Pro Ala Ala Glu Pro Ala
            50                  55                  60

Ala Pro Ala Pro Ala Glu Pro Ala Ala Pro Ala Pro Glu Ala Pro Ala
65                  70                  75                  80

Ala Glu Pro Ala Ala Pro Ala Pro Glu Pro Ala Ala Pro Ala Pro Ala
                85                  90                  95

Glu Ala Pro Ala Ala Glu Pro Ala Ala Pro Ala Pro Ala Glu Pro Ala
                100                 105                 110

Ala Pro Ala Pro Glu Ala Pro Ala Ala Glu Pro Ala Ala Pro Ala Pro
            115                 120                 125

Ala Glu Pro Ala Ala Pro Ala Pro Glu Ala Pro Ala Ala Glu Pro Ala
                130                 135                 140

Ala Pro Ala Pro Ala Glu Pro Ala Ala Pro Ala Pro Glu Ala Pro Ala
145                 150                 155                 160

Ala Glu Pro Ala Ala Pro Ala Pro Ala Glu Pro Ala Ala Pro Ala Pro
                165                 170                 175

Glu Ala Pro Ala Ala Glu Pro Ala Ala Pro Ala Pro Ala Glu Pro Ala
                180                 185                 190

Ala Pro Ala Pro Glu Ala Pro Ala Ala Glu Pro Ala Ala Pro Ala Pro
                195                 200                 205

Ala Glu Pro Ala Ala Pro Ala Pro Glu Ala Pro Ala Ala Glu Pro Ala
                210                 215                 220

Ala Pro Ala Pro Ala Glu Pro Ala Ala Pro Ala Pro Glu Ala Pro Ala
225                 230                 235                 240

Ala Glu Pro Ala Ala Pro Ala Pro Glu Pro Ala Ala Pro Ala Pro Ala
                245                 250                 255

Glu Ala Pro Ala Ala Glu Pro Ala Ala Pro Ala Pro Ala Glu Pro Ala
```

-continued

```
                260                 265                 270
Ala Pro Ala Pro Glu Ala Pro Ala Ala Glu Pro Ala Ala Pro Ala Pro
                275                 280                 285
Ala Glu Pro Ala Ala Pro Ala Pro Glu Ala Pro Ala Ala Glu Pro Ala
                290                 295                 300
Ala Pro Ala Pro Ala Glu Pro Ala Ala Pro Ala Pro Glu Ala Pro Ala
305                 310                 315                 320
Ala Glu Pro Ala Ala Pro Ala Pro Glu Ala Pro Ala Ala Pro Ala Pro
                325                 330                 335
Glu Ala Pro Ala Ala Glu Pro Ala Ala Pro Ala Pro Ala Glu Pro Ala
                340                 345                 350
Ala Pro Ala Pro Glu Ala Pro Ala Ala Glu Pro Ala Ala Pro Ala Pro
                355                 360                 365
Ala Glu Pro Ala Ala Pro Ala Pro Glu Ala Pro Ala Ala Glu Pro Ala
                370                 375                 380
Ala Pro Ala Pro Ala Glu Pro Ala Ala Pro Ala Pro Glu Ala Pro Ala
385                 390                 395                 400
Ala Glu Pro Ala Ala Pro Ala Pro Glu Ala Pro Ala Ala Pro Ala Pro
                405                 410                 415
Glu Ala Pro Ala Ala Glu Pro Ala Ala Pro Ala Pro Ala Glu Pro Ala
                420                 425                 430
Ala Pro Ala Pro Glu Ala Pro Ala Ala Glu Pro Ala Ala Pro Ala Pro
                435                 440                 445
Ala Glu Pro Ala Ala Pro Ala Pro Glu Ala Pro Ala Ala Glu Pro Ala
                450                 455                 460
Ala Pro Ala Pro Ala Glu Pro Ala Ala Pro Ala Pro Glu Ala Pro Ala
465                 470                 475                 480
Ala Glu Pro Ala Ala Pro Ala Pro Glu Ala Pro Ala Ala Pro Ala Pro
                485                 490                 495
Glu Ala Pro Ala Ala Glu Pro Ala Ala Pro Ala Pro Ala Glu Pro Ala
                500                 505                 510
Ala Pro Ala Pro Glu Ala Pro Ala Ala Glu Pro Ala Ala Pro Ala Pro
                515                 520                 525
Ala Glu Pro Ala Ala Pro Ala Pro Glu Ala Pro Ala Ala Glu Pro Ala
                530                 535                 540
Ala Pro Ala Pro Ala Glu Pro Ala Ala Pro Ala Pro Glu Ala Pro Ala
545                 550                 555                 560
Ala Glu Pro Ala Ala Pro Ala Pro Glu Ala Pro Ala Ala Pro Ala Pro
                565                 570                 575
Glu Ala Pro Ala Ala Glu Pro Ala Ala Pro Ala Pro Ala Glu Pro Ala
                580                 585                 590
Ala Pro Ala Pro Glu Ala Pro Ala Ala Glu Pro Ala Ala Pro Ala Pro
                595                 600                 605
Ala Glu Pro Ala Ala Pro Ala Pro Glu Ala Pro Ala Ala Glu Pro Ala
                610                 615                 620
Ala Pro Ala Pro Ala Glu Pro Ala Ala Pro Ala Pro Glu Ala Pro Ala
625                 630                 635                 640
Ala Glu Pro Ala Ala Pro Ala Pro Glu Ala Pro Ala Ala Pro Ala Pro
                645                 650                 655
Glu Ala Pro Ala Ala Glu Pro Ala Ala Pro Ala Pro Ala Glu Pro Ala
                660                 665                 670
Ala Pro Ala Pro Glu Ala Pro Ala Ala Glu Pro Ala Ala Pro Ala Pro
                675                 680                 685
```

```
Ala Glu Pro Ala Ala Pro Ala Pro Glu Ala Pro Ala Ala Glu Pro Ala
        690                 695             700
Ala Pro Ala Pro Ala Glu Pro Ala Ala Pro Ala Pro Glu Ala Pro Ala
705             710             715             720
Ala Glu Pro Ala Ala Pro Ala Pro Ala Glu Pro Ala Ala Pro Ala Pro
            725             730             735
Glu Ala Pro Ala Ala Glu Pro Ala Ala Pro Ala Pro Ala Glu Pro Ala
            740             745             750
Ala Pro Ala Pro Glu Ala Pro Ala Ala Glu Pro Ala Ala Pro Ala Pro
        755             760             765
Ala Glu Pro Ala Ala Pro Ala Pro Glu Ala Pro Ala Ala Glu Pro Ala
        770             775             780
Ala Pro Ala Pro Ala Glu Pro Ala Ala Pro Ala Pro Glu Ala Pro Ala
785             790             795             800
Ala Glu Pro Ala Ala Pro Ala Pro Ala Glu Pro Ala Ala Pro Ala Pro
            805             810             815
Glu Ala Pro Ala Ala Glu Pro Ala Ala Pro Ala Pro Ala Glu Pro Ala
            820             825             830
Ala Pro Ala Pro Glu Ala Pro Ala Ala Glu Pro Ala Ala Pro Ala Pro
        835             840             845
Ala Glu Pro Ala Ala Pro Ala Pro Glu Ala Pro Ala Gly Ser Asp Leu
        850             855             860
Asp Lys Lys Leu Leu Glu Ala Ala Arg Ala Gly Gln Asp Asp Glu Val
865             870             875             880
Arg Ile Leu Met Ala Asn Gly Ala Asp Val Asn Ala Arg Asp Ser Thr
                885             890             895
Gly Trp Thr Pro Leu His Leu Ala Ala Pro Trp Gly His Pro Glu Ile
                900             905             910
Val Glu Val Leu Leu Lys Asn Gly Ala Asp Val Asn Ala Ala Asp Phe
            915             920             925
Gln Gly Trp Thr Pro Leu His Leu Ala Ala Ala Val Gly His Leu Glu
        930             935             940
Ile Val Glu Val Leu Leu Lys Tyr Gly Ala Asp Val Asn Ala Gln Asp
945             950             955             960
Lys Phe Gly Lys Thr Ala Phe Asp Ile Ser Ile Asp Asn Gly Asn Glu
            965             970             975
Asp Leu Ala Glu Ile Leu Gln Lys Ala Ala
            980             985
```

ARTIFICIAL RECOMBINANT PROTEIN FOR IMPROVING PERFORMANCE OF ACTIVE PROTEIN OR POLYPEPTIDE AND USE THEREOF

CROSS REFERENCE TO RELATED PATENT APPLICATION

The present application is the US national stage of PCT/CN2019/106092 filed on 2019 Sep. 17, which claims the priority of the Chinese patent application No. 201811319700.1 filed on 2018 Nov. 7, which application is incorporated herein by reference.

TECHNICAL FIELD

The present disclosure relates to the field of biotechnology, and in particular to an artificial recombinant protein for improving the performance of an active protein or polypeptide and the use thereof.

BACKGROUND

It is well known that proteins or polypeptides with a molecular weight less than 70 kDa are easily eliminated by the body through kidney filtration (Jevsevar S et al., 5:113-28, 2010). Therefore, carrier proteins with large molecular weights, polyethylene glycol (PEG), and fatty acids, etc. are generally fused or cross-linked with proteins or polypeptides to increase the latter's apparent molecular weight and hydrodynamic radius, thereby reducing their glomerular filtration rate (Kontermann RE,BioDrugs,23:93-109; 2009; Kang J S et al.,ExpertOpinEmerg Drugs., 14:363-80, 2009), and finally extending the in-vivo half-life of the proteins or polypeptides.

The carrier used for cross-linking is generally PEG or fatty acid, etc. Human serum albumin, immunoglobulin Fc fragment and transferrin are commonly used for recombinant fusion, and most of them have corresponding successfully marketed drugs. In recent years, new types of carrier proteins for recombinant fusion have continued to emerge (WR Strohl,Biodrugs, 2015, 29 (4): 215-39), such as URP (Chinese Patent No.ZL200780015899.2), XTEN (Chinese patent application No. CN201080011467.6; Volker Schellenberger et al., Nature Biotechnology 27 (12): 1186, 2009), elastin-like protein ELP (MacEwan SR, Chilkoti A., J Control Release.2014; 190:314-30.), PAS (Patent No. ZL200880019017, M Schlapschy, et al., Protein Engineering Design&Selection Peds.2013,26 (8): 489-501) and GLK (Chinese Patent No. 200980103870.9). Protein drugs prepared by fusion of XTEN and ELP are already in clinical trials (Yuen K C, et al.,JClinEndocrinol Metab.,98 (6): 2595-603.2013; Christiansen M et al., Weekly Subcutaneous Doses of Glymera (PB1023) a Novel GLP-1 Analogue Reduce Glucose Exposure Dose Dependently, http://phasebio.com/). These artificially designed non-natural proteins are recombinantly expressed or cross-linked with certain active proteins or peptides to form fusion proteins or products. Compared with active proteins and peptides alone, the above fusion proteins or products significantly improve the serum stability and prolong the in-vivo half-life, and ultimately improve the therapeutic effect.

Chinese Patent ZL200780015899.2 discloses an unstructured recombinant polymer (URP), which is substantially incapable of non-specifically binding to a serum protein, and is characterized in that: (a) the URP includes at least 100 contiguous amino acids; (b) the sum of glycine (G), aspartate (D), alanine (A), serine(S), threonine (T), glutamate (E) and proline (P) residues contained in the URP constitutes more than about 80% of the total amino acids of the URP; (c) at least 50% of the amino acids in the URP sequence are devoid of secondary structure as determined by the Chou-Fasman algorithm; (d) the URP has a Tepitope score less than-4.

Chinese patent ZL 201080011467.6 discloses an isolated extended recombinant polypeptide (XTEN) including more than about 400 to about 3000 amino acid residues, and the XTEN is characterized in that: (a) the sum of glycine (G), alanine (A), serine(S), threonine (T), glutamate (E) and proline (P) residues constitutes more than about 80% of the total amino acid sequence of the XTEN; (b) the XTEN sequence is substantially non-repetitive; (c) the XTEN sequence lacks a predicted T-cell epitope when analyzed by the TEPITOPE algorithm, and the TEPITOPE algorithm prediction for epitopes within the XTEN sequence is based on a score of −9 or greater; (d) the XTEN sequence has greater than 90% random coil formation as determined by the GOR algorithm; and (e) the XTEN sequence has less than 2% alpha helices and less than 2% beta-sheets as determined by the Chou-Fasman algorithm. The number of amino acid species is not emphasized in the above publication. However, it is reported that the contents of amino acids in XTEN includes: 8% A, 12% E, 18% G, 17% P, 28% S and 17% T (Volker Schellenberger et al., Nature Biotechnology., 27 (12): 1186, 2009). This is because the composition of two to five amino acids found during the construction of unstructured sequences would lead to strong immunogenicity and low water solubility, and has limited effect on the extension of half-life.

Chinese Patent ZL200880019017 discloses a biologically active protein comprising at least two domains, and the biologically active protein is characterized in that: (a) a first domain of the at least two domains includes an amino acid sequence having and/or mediating the biological activity; and (b) a second domain of the at least two domains includes an amino acid sequence consisting of at least about 10 amino acid residues forming random coil conformation, the second domain consists of alanine, serine and proline residues, and the random coil conformation mediates an increased in-vivo and/or in-vitro stability of the biologically active protein.

Elastin-like protein ELP is composed of (VPGXG) n, where X may be any amino acid except proline (Pro). The value of n is not fixed. ELP has the characteristic that its state will undergo a sharp transition at a specific temperature (within the range of 2-3° C.): below this temperature, the ELP is soluble; above this specific temperature, the ELP will quickly aggregate into micron-sized particles visible to the naked eye; when the temperature is lowered again, the ELP will be dissolved again; this specific temperature is called the reverse phase transition temperature, or phase-transition temperature (Tt). ELP belongs to elastin, which is biodegradable and non-immunogenic. Therefore, ELP is suitable for use as a fusion protein to extend the half-life of drugs.

Chinese patent ZL200980103870.9 discloses a recombinant gelatin-like unit (GLK) for prolonging the in-vivo half-life of proteins, which is characterized in that the gelatin-like unit is a polypeptide having the following structure: (Gly-X-Y) n;Gly represents a glycine residue; X and Y represent a residue of any amino acid except Cys in the twenty kinds of natural amino acids, and Hyp, respectively; n is from 20 to 300; and the gelatin-like unit has the following characteristics: (a) in the gelatin-like unit, the sum of percentage contents of the following hydrophilic amino acids, Asn, Asp, Gln, Glu, Lys, Pro, Ser, Hyp and Arg, is from 40% to 2/3×100%; (b) in the gelatin-like unit, the ratio of the sum of the numbers of Pro and Hyp to n is greater than or equal to 0.6; (c) the ratio of the sum of the number of Gly to n is less than or equal to 1.15; and the GRAVY value representing hydrophilicity is less than-1.5 according to ProtParam formula; an additional condition is that the gelatin-like unit is not a natural gelatin protein.

The above-mentioned several new carrier proteins differ from the traditional albumin and immunoglobulin IgG Fc fragments in that most of sequences of the new carrier proteins have fewer types of amino acids. In the VPGXG component unit of the elastin-like protein ELP, there is no strict restriction on the charge or hydrophilicity of the amino acid at the X position. The design of URP and XTEN emphasizes the use of hydrophilic amino acids, and the addition of negatively charged aspartic acid and/or glutamic acid to further extend the half-life. This is due to the fact that most tissues and surfaces of humans or animals have a net negative charge, and therefore the XTEN sequence can be designed to have a net negative charge to minimize non-specific interactions between the XTEN-containing composition and various surfaces such as blood vessels, healthy tissues or various receptors (Chinese patent ZL201080011467.6); in contrast, PAS focuses on imitating polyethylene glycol (PEG), using three kinds of uncharged amino acids: proline, alanine and serine. On the other hand, the XTEN sequence emphasizes the feature of "essentially non-repetitive": "repetitive amino acid sequences tend to aggregate to form higher-order structures (such as natural repetitive sequences including collagen and leucine zippers), or to form contacts which result in crystalline or quasi-crystalline structures; on the contrary, the low tendency of non-repetitive sequences to aggregate allows for the design of long XTEN sequences with relatively low frequency of charged amino acids, which may aggregate if the sequence is repeated". The XTEN technique interprets "substantially non-repetitive" as "a lack of or a limited degree of internal homology within a peptide or polypeptide sequence. For example, few or none of the four contiguous amino acids of the sequence are of the same amino acid type, or, the polypeptide has a subsequence score of 10 or lower, or, there is no pattern of motif constituting the polypeptide sequence in the sequence from N-terminal to C-terminal". However, XTEN, PAS and URP are highly glycosylated when expressed in eukaryotic system since they are rich in S and T.

The fusion or cross-linking of active proteins or polypeptides with these carrier proteins may significantly reduce their biological activities, for example, Gething N C et al. reported that the glucagon-XTEN fusion protein exhibited only 15% of the bioactivity of the unmodified glucagon polypeptide (Gething N C et al., PLOS One, 2010, 5 (4): e10175). However, the improvement of physicochemical properties such as stability and solubility after fusion or cross-linking can compensate for this defect.

In summary, it is necessary to further develop other substances or methods that can improve the stability of polypeptides and prolong the half-life of polypeptides, to further improve the in vivo activity of active polypeptides.

SUMMARY

The present disclosure provides an artificial recombinant protein for improving the performance of an active protein or polypeptide and the use thereof.

A first aspect of the present disclosure provides a polypeptide unit (U) having the following features: (1) the polypeptide unit is composed of proline (P), alanine (A) and glutamic acid (E); (2) at least 50% of the polypeptide unit has alpha-helix secondary structures; and (3) the length of the polypeptide unit is greater than or equal to 15 amino acids.

In a preferred embodiment, alpha-helix secondary structures account for at least 60%, preferably at least 70%, more preferably at least 80%, still more preferably at least 90% of the polypeptide unit, as calculated by the Chou-Fasman formula.

In another preferred embodiment, the proportion of the alpha-helix secondary structures is calculated according to the the Chou-Fasman algorithm; and/or the length of the polypeptide unit is greater than or equal to 20 amino acids.

In another preferred embodiment, the length of the polypeptide unit is 15-100 aa, preferably 16-60 aa; Specifically, the length of the polypeptide unit is 18aa, 19aa, 20aa, 22aa, 25aa, 30aa, 40aa, 50aa, 60aa, 70aa, 80aa or 90aa.

In another preferred embodiment, the polypeptide unit includes a polypeptide unit selected from the group consisting of: polypeptide units of the amino acid sequences shown in SEQ ID NO: 19-47.

A second aspect of the present disclosure provides a polypeptide complex unit (PU), and the core structure of the polypeptide complex unit (PU) is selected from:

$$U_1\text{-}U_2 \text{ or } U_1\text{-}U_2 \ldots U_n;$$

$U_1, U_2, \ldots, U_n$ each represents one of the above-mentioned polypeptide units, and n is a positive integer greater than 2; and, the amino acid sequences of the two or more of the polypeptide units are the same or different.

In another preferred embodiment, n is a positive integer from 3 to 100, for example, n is a positive integer from 4 to 90, or a positive integer from 5 to 80; more specifically, n is 6, 7, 8, 9, 10, 15, 20, 25, 30, 40, 50, 60 or 70.

In another preferred embodiment, the number of amino acid residues in the core structure accounts for at least 70% of the total number of amino acid residues in the polypeptide complex unit, preferably at least 80%, more preferably at least 85%, and still more preferably at least 90%, at least 95%, at least 99%, or 100%.

In another preferred embodiment, the polypeptide complex unit is selected from: (a) a protein with an amino acid sequence shown in any one of SEQ ID NO: 48-105 or a repeatedly spliced protein of the polypeptide units corresponding to SEQ ID NO: 48-76; (b) a polypeptide derived from (a), formed by any of the polypeptides defined in (a) by substitution, deletion or addition of one or more (such as 1-20, preferably 1-10, more preferably 1-5) amino acid residues and having the function of the polypeptide of (a); or (c) a polypeptide whose amino acid sequence has a sequence similarity of at least 80% (preferably at least 85%; more preferably at least 90%; still more preferably at least 95%, such as at least 98% or at least 99%) with the amino acid sequence of the polypeptide defined in (a) and having the function of the polypeptide of (a). The polypeptide unit or polypeptide complex unit has no biological function, and its properties are similar to those of PEG, which only functions as a "carrier".

A third aspect of the present disclosure provides a biologically active fusion protein, which includes the above-mentioned polypeptide unit or polypeptide complex unit, and an active protein or polypeptide.

In another preferred embodiment, the fusion protein includes a structure selected from a group consisting of:
$(D_1\text{-}PU_1)$;
$(D_1\text{-}PU_1)\text{-}(D_2\text{-}PU_2)$; or
$(D_1\text{-}PU_1)\text{-}(D_2\text{-}PU_2) \ldots (D_m\text{-}PU_m)$;

$PU_1, PU_2, \ldots, PU_m$ are selected from the above-mentioned polypeptide complex units; $D_1, D_2, \ldots, D_m$ are the active polypeptides, and m is a positive integer greater than 2;and, $(D_1\text{-}PU_1)$ includes $(PU_1\text{-}D_1)$, $(D_2\text{-}PU_2)$ includes $(PU_2\text{-}D_2)$, and $(PU_m\text{-}D_m)$ includes $(D_m\text{-}PU_m)$.

In another preferred embodiment, $D_1, D_2, \ldots, D_m$ each represents one or more (including two) interconnected active proteins or polypeptides, and the functions of the active proteins or polypeptides are the same or different.

In another preferred embodiment, m is a positive integer from 3 to 50, for example, m is a positive integer from 4 to 40, or a positive integer from 5 to 35; More specifically, m is 6, 7, 8, 9, 10, 15, 20, 25 or 30.

In another preferred embodiment, the length of the fusion protein is greater than or equal to 50 amino acids, preferably greater than or equal to 80 amino acids, and more preferably greater than or equal to 100 amino acids; for example, the length of the fusion protein may be 50-5000aa, preferably be 80-4000aa, and more preferably be 100-2000aa; More specifically, the length of the fusion protein may be 150aa, 200aa, 300aa, 50aa, 60aa, 700aa, 800aa or 1000aa.

In another preferred embodiment, in the amino acid sequence of the fusion protein, the polypeptide unit or the polypeptide complex unit accounts for at least 10% of the amino acid sequence, preferably at least 20%.

In another preferred embodiment, the active protein or polypeptide includes (but is not limited to): GLP-2 analogue, ARVEGF, hGH, Arginase 1, G-CSF, Exendin-4, GLP-1 analogue, GDF15, glucacon, IL-2, IL-15, FGF19, EPO, IL-6, M-CSF or FGF21.

In another preferred embodiment, the fusion protein includes (but not limited to) a fusion protein selected from: (a) a protein with an amino acid sequence shown in any one of SEQ ID NO: 106-131; (b) a protein derived from (a), formed by any of the polypeptides defined in (a) by substitution, deletion or addition of one or more (such as 1-20, preferably 1-10, more preferably 1-5) amino acid residues and having the activity of the polypeptide of (a); or (c) a protein having at least 80% (preferably at least 85%; more preferably at least 90%; still more preferably at least 95%, such as at least 98% or at least 99%) sequence similarity to the amino acid sequence of the polypeptide defined in (a) and having the activity of the polypeptide of (a).

In another preferred embodiment, the in vivo half-life or stability of the fusion protein is statistically higher than that of the unfused active polypeptide (for example, at least 50% higher, preferably at least 100% higher, more preferably at least 200% higher, and more specifically, 500% higher, 1000% higher, 2000% higher, 5000% higher, or 10000% higher or more).

A fourth aspect of the present disclosure provides a nucleic acid molecule, which encodes the above-mentioned polypeptide unit, polypeptide complex unit or fusion protein.

A fifth aspect of the present disclosure provides a recombinant expression vector, which includes the above-mentioned nucleic acid molecule.

A sixth aspect of the present disclosure provides a genetically engineered cell, the genetically engineered cell including the above-mentioned recombinant expression vector; or, the nucleic acid molecule which is integrated in the genome of the genetically engineered cell.

A seventh aspect of the present disclosure provides a conjugate, which includes (a) the above-mentioned polypeptide unit or polypeptide complex unit, and (b) an active protein or polypeptide; (b) and (a) are connected by conjugation or adsorption.

An eighth aspect of the present disclosure provides the use of the above-mentioned polypeptide unit or polypeptide complex unit for improving the stability (preferably including thermostability, enzyme resistance stability, and serum stability) of an active polypeptide, prolonging the half-life of the active polypeptide, i.e., prolonging the time that the active polypeptide takes effect, and/or increasing the solubility of the active polypeptide.

A ninth aspect of the present disclosure provides a composition, which includes: the above-mentioned fusion protein or conjugate, and a pharmaceutically acceptable or food-acceptable carrier.

Other aspects of the present disclosure are obvious to those skilled in the art due to the disclosure herein.

28-GH-PU98×4 samples on day 0 and day 7, respectively; 5-6 are PU130×28-GH-PU130×5 samples on day 0 and day 7, respectively.

Figure 13:
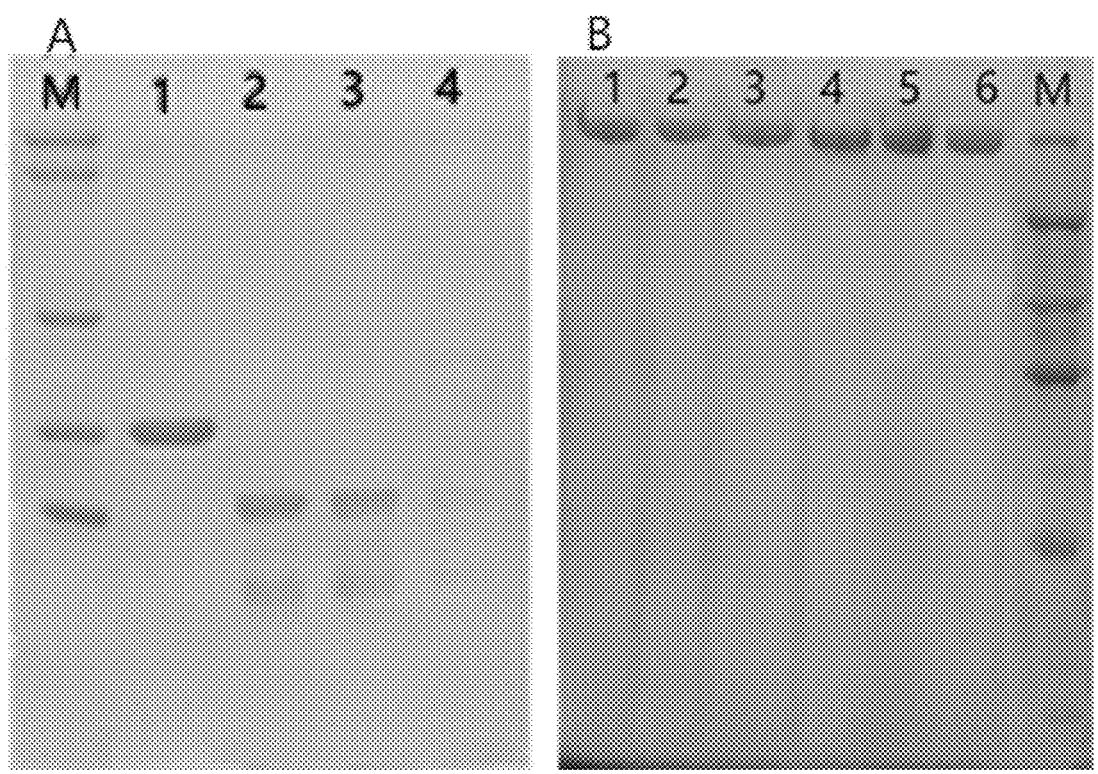

FIG. 13 shows the stability of PU-GH fusion protein and hGH in the presence of trypsin; A. Lanes 1~4 are the results of hGH incubated in 0%, 0.02%, 0.1% and 0.5% trypsin for 40 min; M is low molecular weight MARKER: 97.2KD, 66.4KD, 44KD, 29KD, 21KD, and 14KD; B. Lanes 1-2: PU27×28-GH-PU27×5; Lanes 3-4: PU98×28-GH-PU98×4; Lanes 5-6: PU130×28-GH-PU130×5; M is a high molecular weight MARKER: 220KD, 135KD, 90KD, 66KD, 45KD, and 35KD.

DETAILED DESCRIPTION OF THE PREFERRED EMBODIMENTS

After in-depth research, the present disclosure provides a polypeptide unit (U) or a polypeptide complex unit (PU) that is effective for prolonging the in-vivo half-life of a protein or polypeptide or improving in-vivo and in-vitro physicochemical properties of a protein or polypeptide, wherein the polypeptide unit (U) is mainly composed of proline (P), alanine (A), and glutamic acid (E).

1. Single or Repetitive Polypeptide Unit (U)

The present disclosure first provides an artificially designed polypeptide unit (U) having the following features: (1) the polypeptide unit is composed of proline (P), alanine (A), and glutamic acid (E); (2) at least 50% of the polypeptide unit (U) has alpha-helix secondary structures as calculated by the Chou-Fasman formula; and (3) the length of the polypeptide unit is greater than or equal to 15 amino acids, preferably greater than or equal to 20 amino acids.

As a preferred embodiment of the present disclosure, at least 60% of the polypeptide unit (U) has alpha-helix secondary structures as calculated by the Chou-Fasman formula; Preferably, at least 70% of the polypeptide unit (U) has alpha-helix secondary structures as calculated by the Chou-Fasman formula; preferably, at least 80% of the polypeptide unit (U) has alpha-helix secondary structures as calculated by the Chou-Fasman formula; Preferably, at least 90% of the polypeptide unit (U) has alpha-helix secondary structures as calculated by the Chou-Fasman formula;

Secondary structures of proteins or polypeptides can be detected by far ultraviolet circular dichroism (CD) spectrum. Each alpha-helice, beta-sheet, or random coil formation corresponds to a characteristic peak and the width thereof on the CD spectrum, respectively. As a preferred embodiment of the present disclosure, secondary structures of PU may be predicted by the Chou-Fasman algorithm (Chou, P.Y., etc., Biochemistry, 1974, 13, 222-45).

According to the Chou-Fasman formula, not all polypeptide units (U) composed of P, A, and E contain more than 50% alpha-helix structures (such as SEQ ID NO: 17 and SEQ ID NO: 18). Due to the high proline content of SEQ ID NO: 17 and SEQ ID NO: 18, the polypeptide complex unit (PU) composed of SEQ ID NO: 17 and SEQ ID NO: 18 was found to be extremely difficult to obtain expression products during the preparation process of the present disclosure. Proline has a typical function of destroying secondary structures. For example, when proline (P) is present repetitively in a high frequency, the degree of alpha-helix structures is extremely low; however, when alanine (A) or glutamate (E) are highly repeated, the degree of alpha-helices is significantly increased.

Some exemplary polypeptide units (U) are shown in SEQ ID NOs: 19-47. It should be understood that any other sequence composed of P, A, and E and different from any one of SEQ ID NOs: 19-47 may also be covered by the present disclosure, as long as the sequence contains at least 50% of alpha-helix secondary structures, and has a length greater than or equal to 15 amino acids, preferably greater than or equal to 20 amino acids.

Further, the present disclosure provides a polypeptide complex unit (PU) including the above-mentioned polypeptide unit (U), and the polypeptide complex unit (PU) includes two or a plurality of (including two) the polypeptide units (U). When the polypeptide complex unit (PU) includes a plurality of the polypeptide units (U), the polypeptide units (U) may have the same or different sequence arrangements.

As a preferred embodiment of the present disclosure, the polypeptide complex unit (PU) has 100-2000 amino acids. Exemplary preferred embodiments include: the polypeptide complex unit (PU) has at least 100 amino acids, at least 200 amino acids, at least 300 amino acids, and at least 400 amino acids, at least 500 amino acids, at least 600 amino acids, at least 700 amino acids, at least 800 amino acids, at least 900 amino acids, at least 1000 amino acids, or at least 1200 amino acids.

As a preferred embodiment of the present disclosure, at least 80% of the polypeptide complex unit (PU) is composed of proline (P), alanine (A), and glutamic acid (E); More preferably, at least 85% of the polypeptide complex unit (PU) is composed of proline (P), alanine (A), and glutamic acid (E); More preferably, at least 90% of the polypeptide complex unit (PU) is composed of proline (P), alanine (A), and glutamic acid (E); More preferably, at least 95% of the polypeptide complex unit (PU) is composed of proline (P), alanine (A), and glutamic acid (E); Most preferably, 100% of the polypeptide complex unit (PU) is composed of proline (P), alanine (A), and glutamic acid (E). In a preferred embodiment, the polypeptide complex unit (PU) is formed by repeated splicing of polypeptide units (U) of the same sequence, or by splicing of different polypeptide units (U)

XTEN is a polypeptide composed of 6 kinds of amino acids (A, E, G, P, S, and T), including 8% of A, 12% of E, 18% of G, 17% of P, 28% of S and 17% of T (Volker Schellenberger et al., A recombinant polypeptide extends the in vivo half-life of peptides and proteins in a tunable manner, Nature Biotechnology., 27 (12): 1186, 2009), rich in S and T. PAS is composed of proline (P), alanine (A) and serine(S), and is also rich in S. However, during the study of the present disclosure, it was found that the inclusion of S and T would lead to serious glycosylation in the eukaryotic expression system. For macromolecular proteins that are not suitable for recombinant expression in a prokaryotic expression system and are not suitable for chemical synthesis, it is difficult to solve the problem of glycosylation with a carrier protein rich in S and T. As we all know, generally, there are two main types of glycosylation: 1. O-linked oligosaccharide glycosylation, where the binding site is at a serine or threonine residue; 2. N-linked oligosaccharide glycosylation, where the binding site is at an asparaginic acid residue site of the Asn-X-Ser/Thr sequence, where X may be any amino acid except proline. The glycosylation system of yeast is different from that of humans. A high degree of glycosylation, especially O-glycosylation, is prone to generate strong immunogenicity, and it is difficult to control batch-to-batch variation in the production process. Theoretically, sequences rich in S or T such as XTEN, PAS, GLK or URP are expressed in an expression system other than a prokaryotic expression system, with heavy glycosylation and heterogeneity of products.

In addition, the N-terminal structure of some proteins or peptides is closely related to their activity. For example, the N-terminal exposure of Exendin-4 or GLP-1 is critical for activity. However, when foreign proteins are expressed in prokaryotic systems (such as E. coli), they often have extra methionine at the N-terminal, which makes it difficult to directly obtain active products. Therefore, it is generally necessary to add a fusion expression tag, such as a CBD tag (Volker Schellenberger et al., A recombinant polypeptide extends the in vivo half-life of peptides and proteins in a tunable manner, Nature Biotechnology., 27 (12)): 1186, 2009), in front of the N-terminal of Exendin-4, and cut the tag with a protease after the expression is completed; or, to add other amino acids (such as two consecutive alanines) in front of the GLP-1 sequence, to improve the cleavage efficiency (M. Amiram et al., A depot-forming glucagon-like peptide-1 fusion protein reduces blood glucose for five days with a single Injection, J Control Release., 172 (1): 144-51, 2013), only in this way can the GLP-1 fusion protein with natural biological activity be obtained. The direct expression of GLP-1 fusion protein by yeast or mammalian cells can directly obtain GLP-1 active fusion proteins with natural N-terminal sequence without the need of additional protease digestion.

The polypeptide unit (U) or polypeptide complex unit (PU) of the present disclosure is mainly composed of P, A and E, and is prepared in either prokaryotic or eukaryotic expression system, without the problem of glycosylation.

In addition, compared with the traditional technology, the polypeptide unit (U) or polypeptide complex unit (PU) of the present disclosure is very unlikely to show heterogeneity caused by the deamidation of Asn (N) and Gln (Q) and degradation caused by the increase of potential protease sites due to the variety of amino acids. In an embodiment of the present disclosure, the polypeptide unit (U) or polypeptide complex unit (PU) has superior serum stability and enzyme resistance stability compared with traditional carrier proteins.

2. Fusion Protein with Therapeutic Activity

Fusion Protein

The present disclosure further provides a fusion protein with therapeutic activity, which includes a structure in which one or a plurality of the same or different active protein drugs (D) are connected (such as connected in series) with the polypeptide unit (U) or polypeptide complex unit (PU). Exemplary such fusion proteins include, but are not limited to the following structures:

D-PU
PU-D
$D_1$-PU-$D_2$
PU1-D-PU2
PU1-$D_1$-PU2-$D_2$-PU3-$D_3$
PU1-$D_1$-$D_2$-PU2-$D_3$
PU1-$D_1$-PU2-$D_2$-$D_3$
PU1-$D_1$-PU2-$D_2$-$D_3$-PU3
$D_1$-PU1-$D_2$-PU2-$D_3$
PU1-$D_1$-PU2-$D_2$-PU3-$D_3$-PU4-$D_4$
$D_1$-PU1-$D_2$-PU2-$D_3$-PU3-$D_4$-PU4

In the present disclosure, $D_1$, $D_2$, $D_3$, $D_4$ . . . are active proteins or polypeptides with therapeutic activity, and $D_1$, $D_2$, $D_3$, $D_4$ . . . may be the same or different; PU1, PU2, PU3, PU4 . . . each represents one of the polypeptide complex units, and PU1, PU2, PU3, PU4 . . . may be the same or different.

The polypeptide unit (U) or polypeptide complex unit (PU) of the present disclosure is suitable for fusion with a variety of active proteins or polypeptides to improve the stability, half-life and other properties of the active protein or polypeptide. The active proteins or polypeptides (D) may be selected from agonist, receptor, ligand, antagonist, enzyme or hormone. The active proteins or polypeptides may be medicative proteins or polypeptides that have been or will be used to treat a variety of diseases, which include but are not limited to: metabolism-related diseases, cardiovascular diseases, blood coagulation/bleeding diseases, growth disorders or conditions, tumors, vascular disorders, inflammations, and autoimmune disorders. Or, specifically, the diseases include type 1 diabetes, type 2 diabetes, gestational diabetes, hypercholesterolemia, obesity, hyperglycemia, hyperinsulinemia, decreased insulin production, insulin resistance, metabolic disorder, polycystic ovarian syndrome, dyslipidemia, eating disorder, hypertension, pulmonary hypertension, retinal neurodegeneration, metabolic disorder, glucagonoma, ulcerative colitis, renal failure, congestive heart failure, nephrotic syndrome, nephropathy, diarrhea, postoperative dumping syndrome, irritable bowel syndrome, critically ill polyneuropathy, systemic inflammatory response syndrome, dyslipidemia, stroke, coronary heart disease, hemophilia, GH deficiency in adults and children, Turner syndrome, chronic renal failure, intrauterine growth retardation, idiopathic short stature, AIDS consumption, obesity, multiple sclerosis, aging, fibromyalgia, Crohn's disease, ulcerative colitis, muscular dystrophy, and low bone density.

For example, the $D_1$, $D_2$, $D_3$, $D_4$ . . . may be selected from, but not limited to, the active proteins or polypeptides listed in Table 1 or their analogues.

TABLE 1

| Active protein or polypeptide | SEQ ID NO: | Active protein or polypeptide | SEQ ID NO: |
|---|---|---|---|
| GLP-2 analogue | 1 | Glucagon | 2 |
| $AR_{VEGF}$ | 3 | IL-2 | 4 |
| hGH | 5 | IL-15 | 6 |
| Arginase 1 | 7 | FGF19 | 8 |
| G-CSF | 9 | EPO | 10 |
| Exendin-4 | 11 | IL-6 | 12 |
| GLP-1 analogue | 13 | M-CSF | 14 |
| GDF15 | 15 | FGF-21 | 16 |

After fusing the polypeptide unit (U) or polypeptide complex unit (PU), the physicochemical properties of the active protein (D) are significantly improved, which is manifested by enhanced water solubility, enhanced stability of resistance to enzyme, and increased hydrodynamic radius. These desirable properties result in a significantly prolonged in-vivo half-life of the active protein drug (D). In an embodiment of the present disclosure, after fusing the polypeptide unit (U) or polypeptide complex unit (PU), the biological activity of the active protein drug (D) decreases. However, as the half-life of the fusion protein significantly increase, such decrease in activity is still acceptable.

3. Chemical Conjugate

Antibody-drug conjugates (ADC) are therapeutic drugs prepared by antibodies and toxic compounds or radionuclides via lysine, cysteine, unnatural amino acids and engineered tags. A prominent disadvantage of ADC drugs is that the entire ADC molecule is prone to aggregation and even produce insoluble precipitates due to the cross-linking of highly hydrophobic toxic compounds or radionuclides, especially when the drug/antibody ratio (DAR) is high. In order to solve this problem, chemically synthesized highly hydrophilic polyethylene glycol (PEG) or biodegradable short-chain molecules may serve as linkers, such as PHF (also known as Flexmer"). These methods can effectively improve the hydrophilicity and stability of ADC molecules.

Similarly, when the protein with therapeutic activity is of very small molecular weight or is a polypeptide that is not suitable for recombinant expression, chemical cross-linking is preferred. In the present disclosure, the protein with therapeutic activity may be prepared by chemical cross-linking of a plurality of different active proteins or polypeptides (D) and the polypeptide unit (U) or polypeptide complex unit (PU). Chemical cross-linking can be performed on most amino acid residues, but the nucleophilic primary amine group on lysine and the active sulfhydryl group on cysteine are the most commonly used cross-linking sites. In addition, tyrosine and selenocysteine may be used for chemical cross-linking.

The polypeptide unit (U) or polypeptide complex unit (PU) of the present disclosure is suitable for chemically coupling with a variety of active proteins or polypeptides. The active proteins or polypeptides (D) may be selected from agonists, receptors, ligands, antagonists, enzymes, or hormones, which include, but not limited to the active proteins or polypeptides listed in Table 1 or their analogues. The active proteins or polypeptides may be medicative proteins or polypeptides that have been or will be used to treat a variety of diseases, which include but are not limited to: metabolism-related diseases, cardiovascular diseases, blood coagulation/bleeding diseases, growth disorders or conditions, tumors, vascular disorders, inflammations, and autoimmune disorders. Or, specifically, the diseases include type 1 diabetes, type 2 diabetes, gestational diabetes, hypercholesterolemia, obesity, hyperglycemia, hyperinsulinemia, decreased insulin production, insulin resistance, metabolic disorder, polycystic ovarian syndrome, dyslipidemia, eating disorder, hypertension, pulmonary hypertension, retinal neurodegeneration, metabolic disorder, glucagonoma, ulcerative colitis, renal failure, congestive heart failure, nephrotic syndrome, nephropathy, diarrhea, postoperative dumping syndrome, irritable bowel syndrome, critically ill polyneuropathy, systemic inflammatory response syndrome, dyslipidemia, stroke, coronary heart disease, hemophilia, GH deficiency in adults and children, Turner syndrome, chronic renal failure, intrauterine growth retardation, idiopathic short stature, AIDS consumption, obesity, multiple sclerosis, aging, fibromyalgia, Crohn's disease, ulcerative colitis, muscular dystrophy, and low bone density.

4. Preparation of Polypeptide Unit (U), Polypeptide Complex Unit (Pu) or Fusion Protein and Composition Thereof The present disclosure further provides an isolated polynucleotide, which encodes the polypeptide unit (U), the polypeptide complex unit (PU), or the fusion protein. The polynucleotide may be in the form of DNA or RNA. A polynucleotide encoding a protein or polypeptide may include a polynucleotide encoding the protein or polypeptide, or may further include a polynucleotide that includes additional coding and/or non-coding sequences. The polynucleotide encoding the protein or polypeptide may be obtained by a PCR amplification method, recombinant method or artificial synthesis method.

The present disclosure further provides a recombinant expression vector, which includes the polynucleotide. The present disclosure further provides a host cell, which includes the above-mentioned recombinant expression vector, or incorporates the above-mentioned exogenous polynucleotide in the genome, to express the protein, polypeptide unit (U), the polypeptide complex unit (PU) or the fusion protein.

The present disclosure further provides a method for preparing the polypeptide unit (U), the polypeptide complex unit (PU) or the fusion protein, including the following steps: 1) the host cells were cultured to express the polypeptide unit (U), the polypeptide complex unit (PU) or the fusion protein; 2) the culture containing the polypeptide unit (U), the polypeptide complex unit (PU) or the fusion proteins were collected; and 3) the polypeptide unit (U), the polypeptide complex unit (PU) or the fusion protein is separated from the culture obtained in step 2).

The present disclosure further provides a composition, including the polypeptide unit (U), the polypeptide complex unit (PU), the fusion protein or the culture of the host cell, and a pharmaceutically acceptable or food-acceptable carrier. "Pharmaceutically acceptable or food-acceptable" ingredients are those suitable for humans and/or animals without excessive side effects (such as toxicity, irritation, and allergic reactions), i.e., substances with a reasonable benefit/risk ratio; such as drug carriers or excipients commonly used in the art. The polypeptide unit (U), the polypeptide complex unit (PU), the fusion protein or the culture of the host cell is usually in an "effective amount". "Effective amount" refers to an amount that can produce function or activity on humans and/or animals and acceptable to humans and/or animals.

5. Performance of the Fusion Protein

Protein viscosity: Protein drugs are generally stored at high concentrations and are administered by injection. Therefore, the lower the viscosity of the protein drug, the higher the protein concentration can be during storage and administration. In particular, for drugs administered in eyes, decreased protein drug viscosity can reduce the volume of administration and improve patient compliance, which has extremely high clinical significance. The fusion protein including the polypeptide unit (U) or the polypeptide complex unit (PU) according to the present disclosure has extremely low protein viscosity and extremely high solubility.

Immunogenicity: As a carrier protein, in-vivo immunogenicity is the most important concern. Factors involved in immunogenicity include amino acid sequences, polymer production, presence of impurities, patient's immune status and genetic background, and dosage and route of administration. The polypeptide complex unit (PU) of the present disclosure is formed by repeated splicing of a plurality of polypeptide units (U). If a single polypeptide unit (U) shows immunogenicity, for example a T cell epitope exists, it is very likely to cause a strong humoral immune reaction. In addition to potential cell epitopes, protein aggregation may also induce substantial cross-linking of B cell receptors, leading to rapid B cell activation and enhancing antigen uptake, processing and presentation. In an embodiment of the present disclosure, the polypeptide unit (U) uses the prediction tool TEPITOPE (Sturniolo T et al., Nat. Biotechnol. 17:555-561.) based on the QAM method to calculate the scores of alleles DRB1*01:01, DRB1*01:02, DRB1*03:01, DRB1*03:02, DRB1*04:01, DRB1*04:02, DRB1*07:01 and DRB1*15:01, and the results show that the scores are all lower than or equal to −8. The lizard-derived Exendin-4 (SEQ ID NO: 11) has a higher score, indicating a higher risk of immunogenicity. In another embodiment, the polypeptide unit (U) or the polypeptide complex unit (PU) has no tendency to aggregate at high temperature after fusion with a human growth hormone which has a high tendency to aggregate, indicating that the polypeptide unit (U) or the polypeptide complex unit (PU) has good in-vitro stability and a low risk of immunogenicity. In another embodiment of the present disclosure, no anti-drug antibody against the polypeptide unit (U) or the polypeptide complex unit (PU) is detected after repeated administrations of the fusion protein in rats.

Pharmacokinetic properties: The polypeptide unit (U) or the polypeptide complex unit (PU) of the present disclosure can enhance the pharmacokinetic properties of biologically active proteins. The half-life of the active protein or polypeptide fused with the polypeptide unit (U) or the polypeptide complex unit (PU) can be prolonged by more than 2 times. The pharmacokinetic properties are determined by measuring the terminal half-life of the biologically active protein administered to the subject and comparing the measured terminal half-life with the biologically active protein fused with the polypeptide unit (U) or the polypeptide complex unit (PU) at a corresponding dose.

The hydrodynamic radius of the active protein fused with the polypeptide unit (U) or the polypeptide complex unit (PU) is significantly increased, thereby reducing the renal clearance rate of the active protein. The hydrodynamic radius of the fusion proteins may be measured by ultracentrifugation, size exclusion chromatography or light scattering. An increase in the hydrodynamic radius may cause a decrease in tissue permeability, which may be used to minimize the side effects of pharmaceutically active proteins. It has been reported that hydrophilic polymers tend to selectively accumulate in tumor tissues due to enhanced permeability and retention effects (EPR). The underlying cause of the EPR effect lies in the leaky nature of tumor blood vessels (McDonald, D.M., etc., Cancer Res, 2002, 62, 5381-5) and the lack of lymphatic outflow in tumor tissues. Therefore, the selectivity of pharmacologically active proteins for tumor tissues can be enhanced by the addition of hydrophilic polymers. Similarly, fusing a polypeptide unit (U) or a polypeptide complex unit (PU) can increase the therapeutic index of a given pharmaceutically active protein.

Physicochemical properties: the biologically active proteins fused with the polypeptide unit (U) or the polypeptide complex unit (PU) has significantly improved solubility and stability, such as thermostability, enzyme resistance stability and serum stability. In an embodiment of the present disclosure, the hGH fusion protein fused with the polypeptide unit (U) or the polypeptide complex unit (PU) has a significantly higher thermostability at high temperatures compared with unfused hGH. hGH is prone to aggregate during preparation. However, after fusing with the polypeptide unit (U) or the polypeptide complex unit (PU), no significant aggregation was observed on SEC-HPLC. In addition, in an embodiment of the present disclosure, the serum stability of the biologically active proteins may be determined by measuring the integrity of the biologically active proteins after exposure to 37° C. and in the rat serum for at least 7 days. In another embodiment, the hGH fusion protein with trypsin added shows higher enzyme resistance stability than unfused hGH.

6. Explanation of Terms:

"Biologically active proteins/polypeptides" refers to proteins, antibodies, polypeptides, and fragments and variants thereof having one or more pharmacological and/or biological activities, or functions such as targeted guidance and multimerization. The biologically active proteins/polypeptides may be naturally occurring or artificially constructed. "Biologically active proteins/polypeptides" includes enzymes, enzyme inhibitors, antigens, antibodies, hormones, coagulation factors, interferons, cytokines, growth factors, differentiation factors, factors related to bone tissue growth, factors related to bone factor absorption, chemotactic factors, cell motility factors, migration factors, cytostatic factors, bactericidal factors, antifungal factors, plasma adhesion molecules, interstitial adhesion molecules and extracellular matrix, receptor ligands, and fragments thereof.

In some embodiments, the biologically active proteins/polypeptides involved in the present disclosure are proteins/polypeptides that exhibit "therapeutic activity", and have one or more known biological and/or therapeutic activities. These activities are related to one or more of the therapeutic proteins described herein or other known therapeutic proteins. As a non-limiting example, "therapeutic protein" (which may be interchanged with "therapeutical protein" or "active protein drug" herein) refers to a kind of protein useful for treating, preventing, or ameliorating diseases, symptoms, or functional disorders. As a non-limiting example, a "therapeutic protein" may be a protein that specifically binds to cells of a specific type (for example, lymphocytes or cancer cells) and is localized on the cell surface (or subsequently endocytosed into the cell). In another non-limiting example, "therapeutic protein" refers to a biologically active protein, especially a biologically active protein useful for treating, preventing or ameliorating diseases. Non-limiting therapeutic proteins include those with biological activities such as increasing angiogenesis, inhibiting angiogenesis, regulating hematopoietic function, promoting neurodevelopment, improving immune response, and suppressing the immune response.

As mentioned above, "therapeutic activity" or "activity" may refer to an activity that achieves an effect consistent with a desired therapeutic result in humans, non-human mammals, or other species. The therapeutic activity may be measured in vivo or in vitro.

The "therapeutic proteins" of the present disclosure may include, but are not limited to: VEGF receptor or fragment thereof, TNF receptor, HER-2/neuromembrane receptor, human ErbB3 receptor secreted morphoisomer, transforming growth factor bIII Type receptor extracellular domain, transforming growth factor bII type receptor extracellular domain, IL-1 receptor, IL-4 receptor, urokinase, β-glucocerebrosidase, arginine deiminase, Arginase, herstatin, epidermal growth factor, FGF-1, FGF-19, FGF-21, fibroblast growth factor-2, ordinary fibrocyte growth factor, nerve growth factor, platelet-derived growth factor, VEGF-1, IL-1, IL-2, IL-3, IL-4, IL-6, IL-8, IL-10, IL-11, IL-12, IL-15, IL-18, IL-21, IL-24, IL-1RA, RANKL, RANK, OPG, LEPTIN, interferon alpha, interferon beta, interferon gamma, interferon omega, TGF beta, TGF beta-1, TGF beta-3, TNF alpha, atrial natriuretic peptide, B-type natriuretic peptide, gonadotropin, human luteinizing hormone, follicle stimulating hormone, human growth hormone, EPO, G-CSF, GM-CSF, TPO, M-CSF, SCF, VEGF, EPO mimic peptide, TPO mimic peptide, FLT3 ligand, Apo2 ligand, bone cell inhibitory factor, BMP-2, BMP-7, GLP-1 and analogues thereof, GLP-2 and analogues thereof, Exendin-3, Exendin-4 and analogues thereof, insulin and analogues thereof, GIP and analogues thereof, glucagon and analogues thereof, endostatin, plasminogen kringle 1 domain, plasminogen kringle 5 domain and angiostatin. The therapeutic protein may be antibodies and fragments thereof, especially antigen-binding fragments, including single-chain antibody scFv. These proteins and the nucleic acid sequences encoding these proteins are well known and can be found in public databases such as Chemical Abstracts Services Databases (such as CAS Registry), GenBank and GenSeq. For those skilled in the art, according to the spirit of the present disclosure, it is easy to understand that most of the biologically active proteins that have been discovered are applicable to the present disclosure. Of course, it should be understood that proteins/polypeptides with biological activity newly discovered after the present disclosure are also applicable to the present disclosure.

Sequence homology is used herein to describe the genetic relationship between species. Two sequences are homologous if they share a common evolutionary ancestor. When analyzing sequence homology, the sequence to be studied is generally added to a set of multiple sequences from different species, to determine the homology relationship between the sequence and other sequences. Commonly used analysis tools are CLUSTAL and so on.

Sequence identity herein refers to the percentage of identical residues in the sequences participating in alignment. The sequence identity of two or more sequences may be calculated using calculation software well known in the art, and such software may be obtained from NCBI.

Sequence similarity herein refers to the degree of similarity between several DNA, RNA or protein sequences, and can be understood as the percentage of identical residues in the sequences that participate in alignment (identity %) or the percentage of residues having similar physical and chemical properties (similarity %). For example, the sequence similarity of two different protein sequences can be understood as the percentage of identical amino acid residues (identity %) in the two sequences or the percentage of amino acid residues with similar physical and chemical properties (similarity %) in the two protein sequences.

Repetitive sequence: In the present disclosure, the polypeptide unit (U) is mainly or only composed of three kinds of amino acids: P, A, and E. Within each unit (>20 amino acids), the probability of consecutive occurrence of a same amino acid is extremely high, unless such amino acid arrangement affects its recombinant expression.

Secondary structures of proteins or polypeptide chains: regularly repeated conformation within proteins or polypeptide chains, mainly including alpha-helix, alpha-sheet, beta-turn and random coils. The following explanations of terms are consistent with the definitions in classical molecular biology.

Alpha-helix: an Alpha-helix is a common secondary structure, where the main chain of a peptide chain is coiled into a helix around an imaginary central axis. An Alpha-helix is generally a right-handed helix, and the helix is maintained by hydrogen bonds within the chain. A carbonyl oxygen of each (n-th) amino acid residue forms a hydrogen bond with an amide nitrogen of the fourth ((n+4)-th) residue in the C-terminal direction of the polypeptide chain. In a typical right-handed alpha-helix structure, the pitch is 0.54 nm, each circle contains 3.6 amino acid residues, and each residue ascends 0.15 nm along the long axis of the helix. The terms "alpha-helix" and "alpha-helice" are used interchangably herein.

Beta-sheet: a Beta-sheet is a secondary structure commonly found in proteins and is composed of stretched polypeptide chains. The conformation of the folded sheet is maintained by hydrogen bonds formed between the carbonyl oxygen of a peptide bond and another amide hydrogen located in the same or an adjacent peptide chain. Hydrogen bonds are basically perpendicular to the long axis of the helix of the peptide chains, which may be arranged in parallel or in anti-parallel.

Beta-turn: a Beta-turn is a non-repetitive polypeptide region that connects an alpha-helix and beta-sheet in a protein molecule to alter the direction of the peptide chain. Generally, a beta-turn contains 2-16 amino acid residues. Turns containing more than 5 amino acid residues are often called loops. A common turn contains 4 amino acid residues and comes in two types. The characteristic of Turn I is that a hydrogen bond is formed between the first amino acid residue and the fourth residue. The third residue of Turn II is often glycine. The second residue of these two types of turns is mostly proline.

Random coil: a random coil structure is the secondary structure conformation of the part of the peptide chain that has no regularity except the above-mentioned several regular conformations in the polypeptide chain.

Secondary structure prediction: At present, methods for predicting the secondary structure of proteins or peptides include: the Chou-Fasman algorithm, the PHD algorithm, multi-sequence alignment prediction, neural network-based sequence prediction, knowledge-based methods and hybrid system methods. These methods are well known to the skilled in the art. The present disclosure uses the result of the Chou-Fasman algorithm.

Hydrophilic amino acids: Examples are arginine, lysine, threonine, asparagine, glutamine, proline, and glutamic acid.

Hydrophobic amino acid: Examples are tryptophan, tyrosine, phenylalanine, methionine, leucine, isoleucine, valine, and alanine.

As used herein, "PEG" and/or "PEGylation" refers to the covalent attachment of polyethylene glycol (PEG) polymer chains to the biologically active protein or polypeptide of interest. It is generally believed that the covalent attachment of PEG to a biologically active protein or polypeptide can mask the protein or polypeptide from the attack by the host's immune system, and increase the hydrodynamic radius of the biologically active protein or polypeptide of interest, thereby prolonging the in-vivo residence time by reducing renal clearance.

The following specific embodiments, unless otherwise specified, are conventional methods well known to the skilled in the art. Embodiments of the present disclosure use conventional techniques of immunology, biochemistry, microbiology, cell biology, genetics, and recombinant DNA, for which reference may be made to the third edition of Molecular Cloning: A Laboratory Manual (Sambrook J, Russell DW, Molecular Cloning: A Laboratory Manual.3rd Edition, New York: Cold Spring Harkbor Laboratory Press, 2001) or a technical scheme in an operating manual provided by a commercial company.

Example 1 Obtaining of the Polypeptide Unit (U)

The polypeptide unit (U) is composed of three kinds of amino acids: P, A and E. The preferred exemplary sequences and their corresponding TEPITOPE scores are shown in Table 2.

TABLE 2

| SEQ ID NO. | Code | Amino acid sequence | TEPITOPE score (Threshold: 3%) | | | | | | | |
|---|---|---|---|---|---|---|---|---|---|---|
| | | | DRB1* 01:01 | DRB1* 01:02 | DRB1* 03:01 | DRB1* 03:02 | DRB1* 04:01 | DRB1* 04:02 | DRB1* 07:01 | DRB1* 15*01 |
| 19 | U12 | APPAEEPAEAPAEPPAAPEA | -12.6 | -12.6 | -8.9 | -12.6 | -11 | -12.6 | -10.2 | -8 |
| 20 | U23 | AEPAPPEEAAPAAPAAPEPE | -12.6 | -12.6 | -8.9 | -12.6 | -11 | -12.6 | -10.2 | -8 |
| 21 | U27 | APEEPAPEAPAAPAEAPPAP | -12.6 | -12.6 | -8.9 | -12.6 | -11 | -12.6 | -10.2 | -8 |
| 22 | U34 | AAPAEEAEAPEAPPAPAPEP | -12.6 | -12.6 | -8.9 | -12.6 | -11 | -12.6 | -10.2 | -8 |
| 23 | U35 | AEPAPPAAEPAPPAAEAAEP | -12.6 | -12.6 | -8.9 | -12.6 | -11 | -12.6 | -10.2 | -8 |
| 24 | U46 | APAAEAAPPAEAAEPEPEAP | -12.6 | -12.6 | -8.9 | -12.6 | -11 | -12.6 | -10.2 | -8 |
| 25 | U51 | APAPPPEAEEPPEAAPAPAPA | -12.6 | -12.6 | -8.9 | -12.6 | -11 | -12.6 | -10.2 | -8 |
| 26 | U58 | AAEAEAAEAEPPAPPAPEPA | -12.6 | -12.6 | -8.9 | -12.6 | -11 | -12.6 | -10.2 | -8 |
| 27 | U69 | APPEAPEAPEAAPAAPEPAE | -12.6 | -12.6 | -8.9 | -12.6 | -11 | -12.6 | -10.2 | -8 |
| 28 | U70 | APPEAEPPEAPEAAEAAPAP | -12.6 | -12.6 | -8.9 | -12.6 | -11 | -12.6 | -10.2 | -8 |
| 29 | U73 | APAEAPAAAEEAPPAEPAPE | -12.6 | -12.6 | -8.9 | -12.6 | -11 | -12.6 | -10.2 | -8 |
| 30 | U79 | AAEAPAAPPAPEPEAEPEPA | -12.6 | -12.6 | -8.9 | -12.6 | -11 | -12.6 | -10.2 | -8 |
| 31 | U83 | AAEAPAPEPAAEPEPAPEAP | -12.6 | -12.6 | -8.9 | -12.6 | -11 | -12.6 | -10.2 | -8 |
| 32 | U94 | AEAEPAAPAPAEPAEPEAPA | -12.6 | -12.6 | -8.9 | -12.6 | -11 | -12.6 | -10.2 | -8 |
| 33 | U98 | AEPAAPAPAEPAAPAPEPAPA | -12.6 | -12.6 | -8.9 | -12.6 | -11 | -12.6 | -10.2 | -8 |
| 34 | U106 | APAPEAPAAEPAAPAPAEPA | -12.6 | -12.6 | -8.9 | -12.6 | -11 | -12.6 | -10.2 | -8 |
| 35 | U117 | AAPPAPAPAAAEEAPAEAPA | -12.6 | -12.6 | -8.9 | -12.6 | -11 | -12.6 | -10.2 | -8 |
| 36 | U128 | AEPAAPAAPEPEPAAPAEAA | -12.6 | -12.6 | -8.9 | -12.6 | -11 | -12.6 | -10.2 | -8 |
| 37 | U130 | APPEPPAEAAPAAAEAPAEA | -12.6 | -12.6 | -8.9 | -12.6 | -11 | -12.6 | -10.2 | -8 |
| 38 | U138 | AAPAAAEPPAAEAEAPAPPA | -12.6 | -12.6 | -8.9 | -12.6 | -11 | -12.6 | -10.2 | -8 |
| 39 | U141 | APAAPPEEAAAEPPAAEAAP | -12.6 | -12.6 | -8.9 | -12.6 | -11 | -12.6 | -10.2 | -8 |
| 40 | U152 | AAEAAPAAPAAPEPAEEEAAP | -12.6 | -12.6 | -8.9 | -12.6 | -11 | -12.6 | -10.2 | -8 |
| 41 | U163 | APEAAPAAAEPAPAPAAPEP | -12.6 | -12.6 | -8.9 | -12.6 | -11 | -12.6 | -10.2 | -8 |
| 42 | U170 | APAEAAEAAPEAPEPAAPAA | -12.6 | -12.6 | -8.9 | -12.6 | -11 | -12.6 | -10.2 | -8 |
| 43 | U175 | AEAAPAEAAPAPAPEAPAP | -12.6 | -12.6 | -8.9 | -12.6 | -11 | -12.6 | -10.2 | -8 |
| 44 | U184 | AAEAAEAAPAEPEPPAPPAP | -12.6 | -12.6 | -8.9 | -12.6 | -11 | -12.6 | -10.2 | -8 |
| 45 | U193 | AEAAEAPAPAAPPAAPAPEP | -12.6 | -12.6 | -8.9 | -12.6 | -11 | -12.6 | -10.2 | -8 |
| 46 | U208 | APEAPAEEAEPAAAPPAEAP | -12.6 | -12.6 | -8.9 | -12.6 | -11 | -12.6 | -10.2 | -8 |
| 47 | U219 | APAPPAEAEAEAPPAAPEPA | -12.6 | -12.6 | -8.9 | -12.6 | -11 | -12.6 | -10.2 | -8 |
| 11 | Exendin-4 | HGEGTFTSDLSKQMEEEAVR LFIEWLKNGGPSSGAPPPS | 0.4814 | -0.2945 | 2.6648 | 2.3365 | 0.6757 | 1.7185 | 1.6815 | 3.453 |

The degree of the alpha-helix secondary structure is calculated according to the Chou-Fasman algorithm. The alpha-helix degree of exemplary polypeptide units (U) are shown in Table 3.

TABLE 3

| SEQ ID NO: | Sequence | Alpha-helix content (%) |
|---|---|---|
| 17 | PPPPPPPPPPPPPPPAEAE | 10.5 |
| 18 | PPPAEPPPAPPPEPPPPPP | 0 |
| 19 | APPAEEPAEAPAEPPAAPEA | 95 |
| 20 | AEPAPPEEAAPAAPAAPEPE | 80 |
| 21 | APEEPAPEAPAAPAEAPPAP | 90 |
| 22 | AAPAEEAEAPEAPPAPAPEP | 55 |
| 23 | AEPAPPAAEPAPPAAEAAEP | 75 |
| 24 | APAAEAAPPAEAAEPEPEAP | 90 |
| 25 | APAPPEAEEPPEAAPAPAPA | 75 |
| 26 | AAEAEAAEAEPPAPPAPEPA | 60 |
| 27 | APPEAPEAPEAAPAAPEPAE | 80 |
| 28 | APPEAEPPEAPEAAEAAPAP | 90 |
| 29 | APAEAPAAAEEAPPAEPAPE | 95 |
| 30 | AAEAPAAPPAPEPEAEPEPA | 80 |
| 31 | AAEAPAPEPAAEPEPAPEAP | 90 |
| 32 | AEAEPAAPAPAEPAEPEAPA | 95 |
| 33 | AEPAAPAPAEPAAPAPEAPA | 95 |
| 34 | APAPEAPAAEPAAPAPAEPA | 95 |
| 35 | AAPPAPAPAAAEEAPAEAPA | 75 |
| 36 | AEPAAPAAPEPEPAAPAEAA | 95 |
| 37 | APPEPPAEAAPAAAAEAPAEA | 80 |
| 38 | AAPAAAEPPAAEAEAPAPPA | 80 |
| 39 | APAAPPEEAAAAEPPAAEAAP | 80 |
| 40 | AAEAAPAAPAAPEPAEEAAP | 90 |
| 41 | APEAAPAAAEPAPAPAAPEP | 90 |
| 42 | APAEAAEAAPEAPEPAAPAA | 95 |
| 43 | AEAAAPAEAAPAPAPEAPAP | 90 |
| 44 | AAEAAEAAPAEPEPPAPPAP | 65 |
| 45 | AEAAEAPAPAAPPAAPAPEP | 90 |
| 46 | APEAPAEEAEPAAAPPAEAP | 90 |
| 47 | APAPPAEAEAEAPPAAPEPA | 85 |

Example 2 Obtaining of Low Molecular Weight Polypeptide Complex Unit (PU) with High Expression The polypeptide complex unit (PU) is formed by splicing of polypeptide units (U), which can be realized by one of the following methods:

Method a: Firstly, a polypeptide complex unit (PU) sequence composed of different or identical polypeptide units (U) was designed; then, the protein sequence of the polypeptide complex unit (PU) was converted to a DNA sequence. The full-length DNA was obtained by gene synthesis.

Method b: The polypeptide units (U) was spliced through complementary sticky ends under the action of T4DNA ligase, and then agarose gel electrophoresis was performed to recover DNA fragments of appropriate size, as reported by Martin Schlapschy et al. (Martin Schlapschy et al., Protein Engineering, Design&Selection, 20:273-284, 2007). Similarly, the polypeptide units (U) involved in splicing may have the same sequence or different sequences. To facilitate purification, a 6×His affinity purification tag was added to the N-terminal or C-terminal of the polypeptide complex unit (PU).

According to method b, the nucleotide (DNA) fragment corresponding to the polypeptide unit (U) was synthesized: for example, the BglI and SfiI restriction enzyme sites were introduced at both ends of the DNA fragment corresponding to AEPAAPAPAEPAAPAPEAPA (SEQ ID NO: 33), the base sequence was optimized by E. coli codons, the sequence was inserted into pUC57 by EcoRV blunt end, and the plasmid was named pUC57-$U_1$. The fragment of pUC57-$U_1$ digested with BglI was ligated with the vector digested with SfiI and dephosphorylated, to obtain a dimer. Dimer clones were confirmed and selected by colony PCR and enzyme digestion. The same operations were repeated until a desired length was selected by the splicing. By this method of splicing, polypeptide complex units (PU) composed of polypeptide units (U) with different sequences can be formed, such as PUMix17 (containing $U_{35}$, $U_{34}$, $U_{46}$ and so on), PUMix357 (containing $U_{79}$, $U_{27}$, $U_{12}$ and so on) and other polypeptide complex units (PU), which were formed by mixing and splicing polypeptide units (U) with a length of 20 amino acids (as shown in Table 3). Or, polypeptide units (U) with the same sequence may be repeatedly spliced to obtain polypeptide complex units (PU) such as PU12×5 ($U_{12}$ was repeatedly spliced 5 times) and PU23×10 ($U_{23}$ is repeatedly spliced 10 times). Exemplary polypeptide complex unit (PU) sequences are shown in Table 4. It is worth noting that the polypeptide complex units (PU) have low staining efficiency under conventional Coomassie brilliant blue staining conditions, socopper staining is required (Chris Lee et al., Analytical Biochemistry 166:308-312, 1987). The specific operations are as follows: 1. preparing 0.3M CuCl2 aqueous solution; 2. rinsing the electrophoresis gel with double distilled water for 2-3 min after detaching the electrophoresis gel. 3. immersing the gel into the 0.3M CuCl2 solution and dyeing for 2-5 minutes; 4. taking out the gel, taking a picture of the gel with an imager.

TABLE 4

Exemplary polypeptide complex unit (PU) sequences

| Amino acid sequence SEQ ID NO: | Code |
|---|---|
| 48 | PU12x5 |
| 49 | PU23x10 |
| 50 | PU27x12 |
| 51 | PU34x17 |
| 52 | PU35x9 |
| 53 | PU46x15 |
| 54 | PU51x21 |
| 55 | PU58x6 |

TABLE 4-continued

Exemplary polypeptide complex unit (PU) sequences

| Amino acid sequence SEQ ID NO: | Code |
|---|---|
| 56 | PU69x7 |
| 57 | PU70x8 |
| 58 | PU73x10 |
| 59 | PU79x13 |
| 60 | PU83x9 |
| 61 | PU94x7 |
| 62 | PU98x5 |
| 63 | PU106x5 |
| 64 | PU117x6 |
| 65 | PU128x8 |
| 66 | PU130x10 |
| 67 | PU138x7 |
| 68 | PU141x11 |
| 69 | PU152x9 |
| 70 | PU163x7 |
| 71 | PU170x8 |
| 72 | PU175x5 |
| 73 | PU184x6 |
| 74 | PU193x8 |
| 75 | PU208x9 |
| 76 | PU219x12 |
| 77 | PUMix17 |
| 78 | PUMix35 |
| 79 | PUMix49 |
| 80 | PUMix64 |
| 81 | PUMix76 |
| 82 | PUMix94 |
| 83 | PUMix109 |
| 84 | PUMix128 |
| 85 | PUMix149 |
| 86 | PUMix163 |
| 87 | PUMix177 |
| 88 | PUMix186 |
| 89 | PUMix193 |
| 90 | PUMix214 |
| 91 | PUMix215 |
| 92 | PUMix236 |
| 93 | PUMix257 |
| 94 | PUMix278 |
| 95 | PUMix289 |
| 96 | PUMix332 |
| 97 | PUMix341 |
| 98 | PUMix348 |
| 99 | PUMix353 |
| 100 | PUMix376 |
| 101 | PUMix385 |
| 102 | PUMix397 |
| 103 | PUMix427 |
| 104 | PUMix428 |
| 105 | PUMix439 |

Example 3 Preparation of PU-hArg1 Fusion Protein

The spliced PU fragment in Embodiment 2 was fused with the coding sequence of hArg1 (human arginase; sequence: SEQ ID NO: 7) (as shown in Table 5), and the C-terminal was connected to the His-6 tag to be constructed into the vector pET4la. The plasmid was transformed into *E. coli* competent BL21 (DE3) Gold. Single colonies were picked and cultured in LB kanamycin-resistant liquid medium at 37° C. at 250 RPM until OD is 0.4-0.6 (about 3 hours). 200 µL of pre-induction culture was taken as a negative control. Then, IPTG was added to the remaining culture to a final concentration of 1 mM, and 200 µL was taken after 2.5 hours of induction at 37° C. The pre-induction and post-induction samples were centrifuged at 5000 rpm for 4 min, the supernatant was discarded before addition of 40 µL of 2% SDS for resuspending. 10 µL of 5*Loading Buffer was added and mixed before heating at 100° C. for 8-10 min.

TABLE 5

Exemplary PU-hArg1 fusion protein sequence

| SEQ ID NO: | Code |
|---|---|
| 106 | PU12x10-hArg1 |
| 107 | PU12x5-hArg1-PU12x5 |
| 108 | PU98x10-hArg1 |
| 109 | PU98x5-hArg1-PU106x5 |
| 110 | PUMix17-hArg1-PUMix49 |
| 111 | PUMix35-hArg1-PUMix76 |
| 112 | PUMix109-hArg1-PUMix163 |
| 113 | mPAS-hArg1-mPAS |
| 114 | mXTEN-hArg1-mXTEN |
| 115 | mURP-hArg1-mURP | mPAS, mXTEN, and mURP are three carrier proteins of the prior art.

Example 4 Separation and Purification of PU-hArg1 Proteins

The method of protein purification varies according to different expression systems. The prior art already contains a lot of knowledge that provides guidance on protein purification, such as Antibody Purification Handbook (GE Healthcare's classic Purification guide), or METHODS IN ENZYMOLOGY, Guide to Protein Purification, 2nd Edition (published by Elsevier press). Affinity chromatography, molecular exclusion chromatography, ion-exchange chromatography and hydrophobic chromatography are techniques already well-known by the skilled in the art. The following purification procedures are illustrative of the purification methods used when the expression host is *Escherichia coli* and under specific fermentation conditions. The purification conditions should be slightly adjusted accordingly when the fermentation conditions are different, which will not be detailed herein.

Purification steps of PU-hArg1 fusion protein include ammonium sulfate precipitation, metal ion heating precipitation, cation exchange, anion exchange, and hydrophobic chromatography. The apparent molecular weight is too large after the fusion of a long peptide complex unit (PU) sequence, and a filler with a large pore size is required for purification to obtain a high load. The purification processes of different structures were slightly different. For example, as the percentage of glutamic acid in the fused polypeptide complex unit (PU) sequence increases, the weaker the binding of the cation exchange column is, the lower the pH is required for binding, and the lower the salt concentration is required to elute. On the contrary, the stronger the binding of the anion exchange column is, the lower the pH is required to bind, and the higher the salt concentration is required to elute. As the length of the fused polypeptide complex unit (PU) increases, the binding and elution properties of the ion exchange column will experience similar phenomena to what occurs when the percentage of glutamic acid increases. When a certain length of polypeptide complex unit (PU) sequence fused at one end of a protein is dispersed to both ends of the protein, the binding capacity of the cation exchange column is weakened, and the binding capacity of the anion exchange column is increased.

50g bacteria was mixed with 300 ml 20 mM PB buffer solution (pH 7.0) and sonicated with a @15 ultrasonic probe for 2 h, 3 seconds on and 3 seconds off. Then, the sonicated bacteria solution was centrifuged at 8000 rpm for 30 min to obtain the supernatant, and then the supernatant was filtered with a 1 µm filter membrane. The pH of the supernatant was adjusted to 5.0 loaded onto a 25 ml MMC (Bestarose Diamond MMC) chromatographic column equilibrated with 0.2M NaCl, 20 mM NaAc—HAc, pH 5.0. First, impurity proteins were eluted with 2M NaCl, 20 mM NaAC-HAC, pH 5.0, and then the target proteins were eluted with eluent (2M NaCl, 20 mM Tris-HCl, pH8.0). After adjusting the pH of the eluent to 6.0, the eluent was mixed with 50 mM $CoCl_2$ and activated at 60° C. for 10 min. $(NH_4)_2SO_4$ was added to the eluent to adjust the conductivity to 140 ms/cm, and the samples was loaded onto a 5 ml Phenyl (Phenyl Bestarose HP, Bestchrom (Shanghai) Biotechnology Co., Ltd.) chromatographic column. The target protein was eluted with 50% eluent, and the impurities and polymers were eluted with 100% eluent. Loading buffer: 1M $(NH_4)_2SO_4$, 20 mM NaAc—HAc, pH6.0; elution buffer: 20 mMNaAc-HAc, pH6.0. The eluted samples were desalted on a G25 (Sephadex G-25, Coarse) chromatographic column with 10 mM Tris-HCl, pH 8.0, and then loaded onto a 20 mL SuperQ (SuperQ-650M, TOSOH) chromatographic column equilibrated with 20 mM Tris-HCl, pH8.0. The effluent was collected and the target protein was in the effluent. The column was eluted with 2M NaCl 20 mM Tris-HCl, pH8.0, and the eluent was discarded. Example 5 Apparent molecular weight analysis of PU-hArg1 by SEC-HPLC 1 mg/mL sample and molecular weight standard mixed solution were analyzed by SEC-HPLC-UV. The relative molecular weight ($M_r$) was served as the abscissa, and the actually measured elution volume ($V_e$) served as the ordinate. Linear regression: $V_e=K_1-K_2\log M_r$. $K_1$ and $K_2$ are constants, and $M_r$ is the relative molecular weight. The measurement method is as follows: measurement wavelength: 214 nm; Chromatographic column: column temperature 25° C., Sepax SRT-1000SEC 5 μm (300×7.8 mm), mobile phase: 50 mM PB, 150 mM NaCl, pH7.2; running time: 20 minutes.

Figure 1:
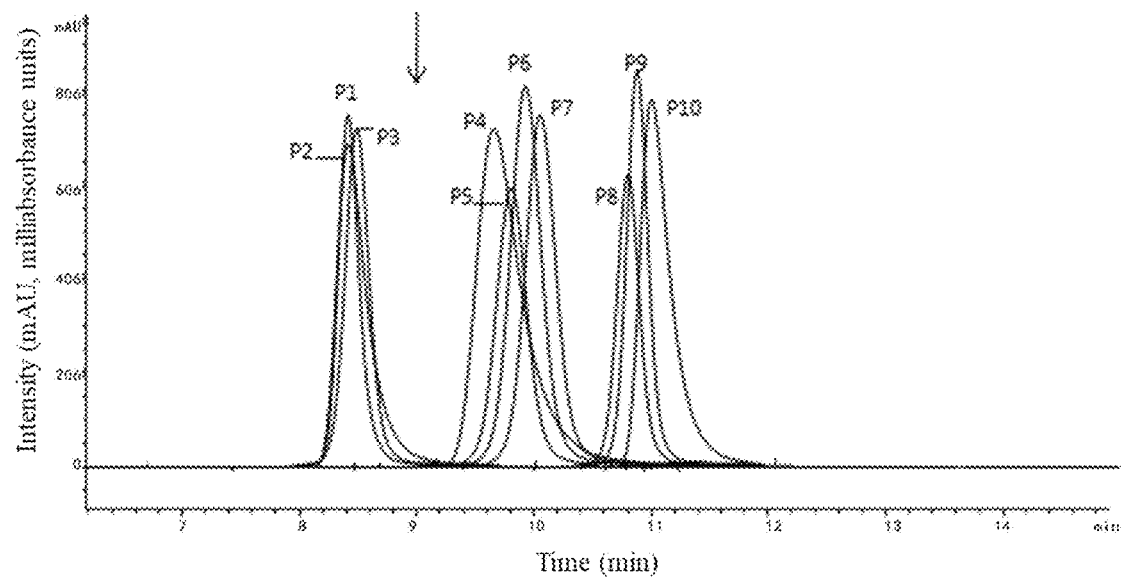
FIG. 1 shows SEC-HPLC analysis results of PU-hArg1 fusion proteins; P1 is PUMix17-hArg1-PUMix49, P2 is PUMix35-hArg1-PUMix76, P3 is PUMix109-hArg1-PUMix163, P4 is PU98×5-hArg1-PU106×5, P5 is PU12×5-hArg1-PU12×5, P6 is PU98×10-hArg1, P7 is PU12×10-hArg1, P8 is mURP-hArg1-mURP, P9 is mXTEN-hArg1-mXTEN, and P10 is mPAS-hArg1-mPAS; the arrow in the figure points to Thyroglobulin (669 kDa).

As can be seen from the results, the apparent molecular weight of each PU-hArg1 is greater than 669 kDa, as shown in FIG. 1

Example 6 Hydrodynamic Radius Analysis of PU-hArg1 by DLS 1.5 ml of 1 mg/ml sample was pipetted and placed in a cuvette. The measurement was repeated three times in the Malvern Zetasizer Nano ZS.

Figure 2:
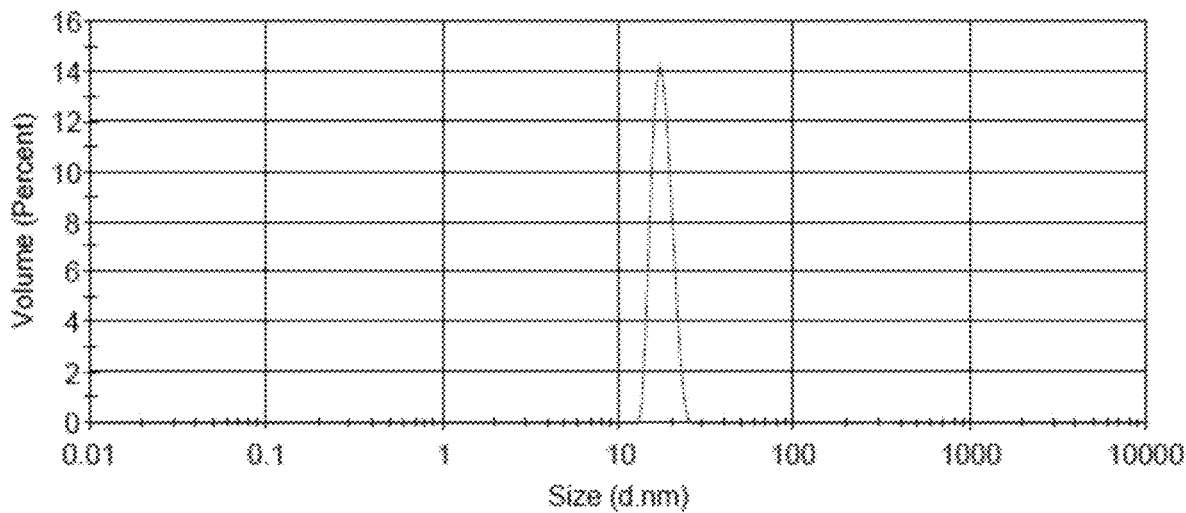
FIG. 2 shows DLS analysis results of PU98×5-hArg1-PU106×5.

The detection method is as follows: Detector: 173-degree light scattering detector; detection temperature: 25° C.; An exemplary particle size is shown in FIG. 2. The particle size of PU98×5-hArg1-PU106×5 in an aqueous solution reaches 17 nm.

Example 7 Activity Assay of In Vitro Hydrolysis of Arginine by PU-hArg1

The to-be-tested sample was diluted to 1 μM. 45 μL of the diluted sample was mixed with 5 μL 500 mM $CoCl_2$ and then activated at 60° C. for 10 min. 450 μl of 500 mM L-arginine (pH7.4) was added to 50 μl of the activated sample, followed by mixing well and hydrolyzing at 37° C. for 15 min. 20 μL sample was added to 2 mL of urea nitrogen reagent mixture (Nanjing Jiancheng Bioengineering Institute), and immediately placed into boiling water for 15 min before cooled in ice water for 5 min, and then OD520 nm was measured. The urea nitrogen content was calculated according to the standard curve. $Kcat(s^{-1})$ refers to the mole number of products produced by the catalytic decomposition of the substrate per mol enzyme per second, $Kcat(s^{-1})$=urea nitrogen concentration (mmol/mL)/[reaction time(s)× (sample concentration/dilution factor/molecular weight) (mmol/mL)]. The specific activity of an enzyme refers to the catalytic activity of a certain enzyme contained in each milligram of protein, and the specific activity=(1/MW)×Kcat×60×1000. The experimental results are shown in Table 6 below. Since each sample after the fusion of the polypeptide unit (U) or the polypeptide complex unit (PU) has a different molecular weight, the IU (specific activity) per unit mass (mg) varies. However, as is evident from the Kcat value, the hydrolysis activity of arginine by PU-hArg1 fusion protein has not been reduced, but is slightly increased compared with hArg1.

TABLE 6

Hydrolysis activity of arginine by PU-hArg1 fusion protein

| Sample name | Specific activity (IU/mg) | $Kcat(s^{-1})$ |
|---|---|---|
| hArg1 | 252.6 | 147.9 |
| PU12×10-hArg1 | 185.1 | 165.2 |
| PU12×5-hArg1-PU12×5 | 184.1 | 164.3 |
| PU98×10-hArg1 | 192.5 | 168.1 |
| PU98×5-hArg1-PU106×5 | 193.9 | 169.3 |
| PUMix17-hArg1-PUMix49 | 100.4 | 155.3 |
| PUMix35-hArg1-PUMix76 | 100.1 | 157.9 |
| PUMix109-hArg1-PUMix163 | 101.6 | 160.2 |
| mPAS-hArg1-mPAS | 120.0 | 152.5 |
| mXTEN-hArg1-mXTEN | 150.5 | 153.7 |
| mURP-hArg1-mURP | 120.4 | 155.1 |

Example 8 Immunogenicity Assay of Different PU-hArg1 Proteins

Figure 3:
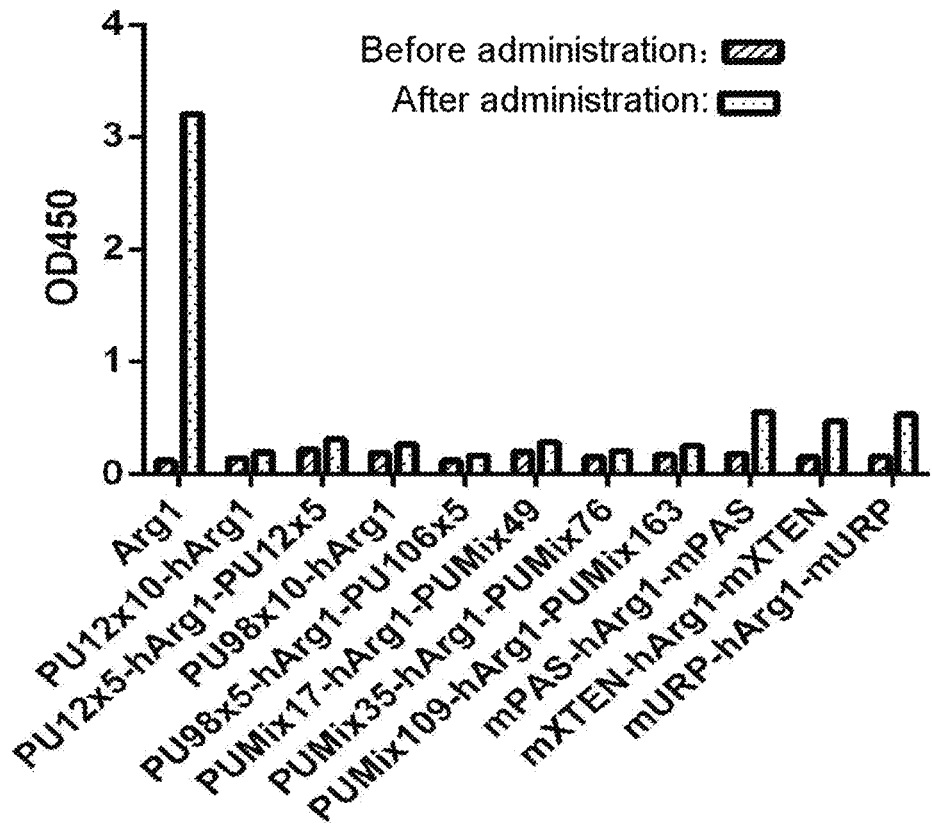
FIG. 3 shows immunogenicity results of different PU-hArg1 fusion proteins in SD rats (serum is diluted 500 times).

SD rats were randomly divided into groups, with 10 rats in each group. The rats were immunized with different PU-hArg1 or unfused hArg1 protein (R&D Systems, Cat: 5868-AR) at a dose of 3 mg/kg subcutaneously, and once a week for continuous 4 weeks; one group of the rats were injected with PBS as the negative control. Two weeks after the last immunization, the rats were sacrificed to collect the blood, and the blood was separated to obtain serum. The anti-PU antibodies in serum was detected by ELISA assay. Specifically, the ELISA plates were coated with different PU-hArg1 fusion proteins which immunized in corresponding rats, control proteins from SEQ ID NO:113-115, and unfused hArg1 protein. The serum of the immunized animals of the PU-hArg1 fusion protein administration group was diluted 100 times, 500 times and 1000 times, respectively, then excessive hArg1 protein was added to antagonize the antibody that recognized hArg1, and then incubated at 37° C. for 2h. Finally, HRP-labeled goat anti-rat secondary antibody (EarthOX, E030140-01) was added and OD450 was recorded. If the OD450 after administration was more than twice of that before administration, the result was considered as positive; otherwise negative. FIG. 3 shows the results of the serum which was diluted 500 times. The Arg1 administration group has higher anti-drug antibodies. However, the PU-hArg1 fusion protein group was basically negative after antagonizing the anti-drug antibody against Arg1. While the OD450 of the control group exceeded the negative value by more than 2 times, which was considered as weakly positive.

Example 9 Pharmacokinetic Assay of Different PU-hArg1 Proteins

SD rats were randomly divided into groups, with 10 rats in each group. The rats were injected with different PUhArg1 proteins andcontrol proteins from SEQ ID NO:113-115 at a dose of 2 mg/kg subcutaneously. Blood was collected before injection and 3 h, 8h, 12 h, 24 h, 36h, 48h, 72h, 96h, 120h, 144h, 168h after injection. The blood was separated to obtain serum.

Figure 4:
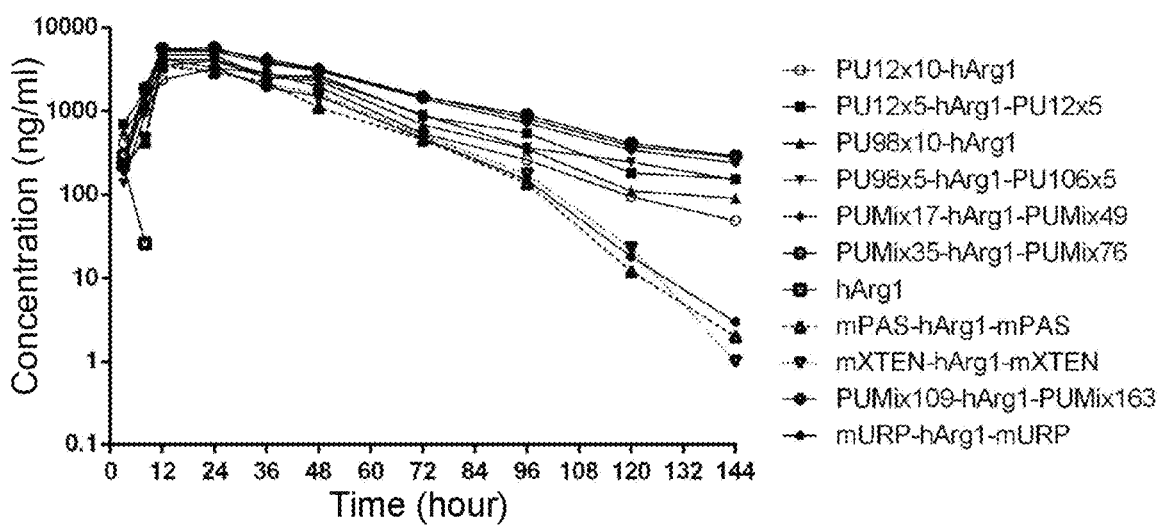
FIG. 4 shows pharmacokinetic results of PU-hArg1 fusion proteins.

The pharmacokinetic profiles of the fusion proteins in rats were detected by sandwich ELISA. Anti-hArg1 rabbit polyclonal antibody (Hangzhou HuaAn Biotechnology Co., Ltd.) was coated on a plate in 100 ng/well overnight, and washed 3 times with PBST. The plate was blocked with 5% non-fat dry milk and washed 3 times with PBST. The serum at each time point was diluted by a specified factor, and then added into the ELISA plate at 100 μL/well. After incubating at 37° C. for 2 h, the plate was washed 3 times with PBST. Biotin-labeled anti-hArg1 rabbit polyclonal antibody (Hangzhou HuaAn Biotechnology Co., Ltd.) was added before the plate was incubated at 37° C. for 2 h and washed 3 times with PBST. Finally, the HRP-labeled streptavidin was diluted 50,000 times and added into the ELISA plate. Adter incubating for 1 h at 37° C., the plate was washed 5 times with PBST and detected by conventional TMB method, and OD450 values were recorded. As shown in FIG. 4, the half-lives of the PU-hArg1 fusion protein was significantly improved compared with the control proteins.

Example 10 Preparation of PU-GH Fusion Proteins

The spliced polypeptide unit (U) or polypeptide complex unit (PU) in Example 2 were connected to the hGH (human auxin) fragment (SEQ ID NO:5), as shown in Table 7. His6 tag was added to the N-terminal and cloned into the vector pET41a. The plasmid was transformed into *E. coli* competent BL21 (DE3) Gold. Single colonies were picked and cultured in LB kanamycin-resistant liquid medium at 37° C. at 250 RPM until OD was 0.4-0.6 (about 3h). 200 μL of pre-induction culture was taken as a negative control. Then, IPTG was added to the remaining culture to a final concentration of 1 mM, and 200 μL was taken after 2.5 hours of induction at 37° C. The pre-induction and post-induction samples were centrifuged at 5000 rpm for 4 min, the supernatant was discarded before adding 40 μL of 2% SDS for resuspending. 10 μL of 5*Loading Buffer was added and mixed before heating at 100° C. for 8-10 min. The expression strains were screened by SDS-PAGE electrophoresis.

30 g of bacteria was mixed with 300 ml of 20 mM PB buffer (pH 7.0) and sonicated with a @15 ultrasonic probe for 2 h, 3 seconds on and 3 seconds off. The lysed bacteria was centrifuged at 8000 rpm for 30 min to obtain the supernatant, and then the supernatant was filtered with a 1 μm filter membrane. Ammonium sulfate was added to the bacteria supernatant until the conductivity was 180 mS/cm, and the supernatant was centrifuged at 8000 rpm at 10° C. for 15 min to collect the protein precipitate. The precipitate was dissolved in 20 mM PB (pH 7.0) solution, and then precipitated with ammonium sulfate at a conductivity of 180 mS/cm. The precipitate was dissolved in 20 mMNaAc (pH5.0) solution and diluted with water until the conductivity was below 4 mS/cm. The solution was purified with Super Q-650M (TOSOH) chromatographic column (Buffer A: 20 mMNaAc pH5; Buffer B: 0.5 M NaCl 20 mMNaAc pH5), and eluted with 20% B, 70% B, and 100% B. The 70% B eluted sample was adjusted to pH 6.0 and the conductivity was adjusted to 140 mS/cm with ammonium sulfate. The purification was carried out on a Phenyl HP (Bestchrom (Shanghai) Biotechnology Co., Ltd.) chromatographic column, and the elution was directly carried out with 50 mM PB (pH 6). The eluted sample was kept at water bath at 80° C. for 30 min to inactivate proteases. After the sample temperature returned to room temperature, pH was adjusted to 4.0 and conductivity was diluted to below 4 mS/cm.

Finally, Diamond SP Mustang chromatographic column (Bestchrom (Shanghai) Biotechnology Co., Ltd.) was used for purification (buffer A: 20 mMNaAc, pH 4.0; Buffer B1: 20 mMNaAc, pH 5.0; Buffer B2: 20 mM PB, pH 7.0) and eluted with B1 and B2 successively, and B2 eluted samples were collected.

When the sample purity showed by SDS-PAGE was less than 95%, the following operations were performed: the eluent was loaded onto a 50 ml Chelating Sepharose Fast Flow chromatographic column (GE Healthcare) equilibrated with equilibration buffer (0.5 M NaCl, 20 mM imidazole, 20 mMTris-HCl, pH 7.5), and eluted with 10%, 50%, and 100% elution buffer (0.15 M NaCl, 0.5 M imidazole, 20 mMTris-HCl, pH 8.0) after reequilibration.

TABLE 7

| PU-GH fusion protein | |
|---|---|
| SEQ ID NO: | Code |
| 116 | PU27x28-GH |
| 117 | PU27x28-GH-PU27x5 |
| 118 | PU98x28-GH |
| 119 | PU98x28-GH-PU98x4 |
| 120 | PU130x28-GH |
| 121 | PU130x28-GH-PU130x5 |

Example 11 Thermal Stability of PU-GH Fusion Proteins

Figure 5:
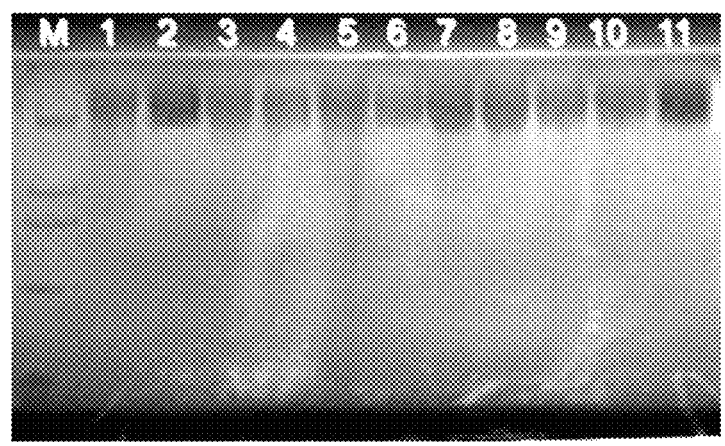
FIG. 5 shows the thermal stability of PU-GH fusion proteins (copper staining); M is the protein molecular weight MARKER: 200KD, 116KD, 97.2KD, 66.4KD, and 44.3KD; Lane 1: PU27×28-GH-PU27×5 placed at 4° C. for 20h; Lane 2: PU27×28-GH-PU27×5 placed at 37° C. for 20h; Lane 3: PU27×28-GH-PU27×5 placed at 60° C. for 20h; Lane 4: PU98×28-GH-PU98×4 placed at 4° C. for 20h; Lane 5: PU98×28-GH-PU98×4 placed at 37° C. for 20h; Lane 6: PU98×28-GH-PU98×4 placed at 60° C. for 20h; Lane 7: PU130×28-GH-PU130×5 placed at 4° C. for 20h; Lane 8: PU130×28-GH-PU130×5 placed at 37° C. for 20h; Lane 9: PU130×28-GH-PU130×5 placed at 60° C. for 20h; Lane 10: PU98×28-GH-PU98×4 placed at 80° C. for 5h; Lane 11: PU130×28-GH-PU130×5 placed at 80° C. for 5h.

The purified PU-GH fusion protein samples were adjusted to have the same concentration (1 mg/ml), and filtered and sterilized under sterile conditions. Samples of the same volume are pipette into sterile 1.5 mL centrifuge tubes and placed at 4° C., 37° C., and 60° C. for 20 h, or at 80° C. for 5 h. SDS-PAGE electrophoresis was performed to observe the purity. hGH was not subjected to electrophoresis analysis due to aggregation and precipitation at a high temperature. The results are shown in FIG. 5, indicating that the fusion proteins have good thermal stability.

Example 12 SEC-HPLC Analysis of the Aggregation of PU-GH Samples

Figure 6:
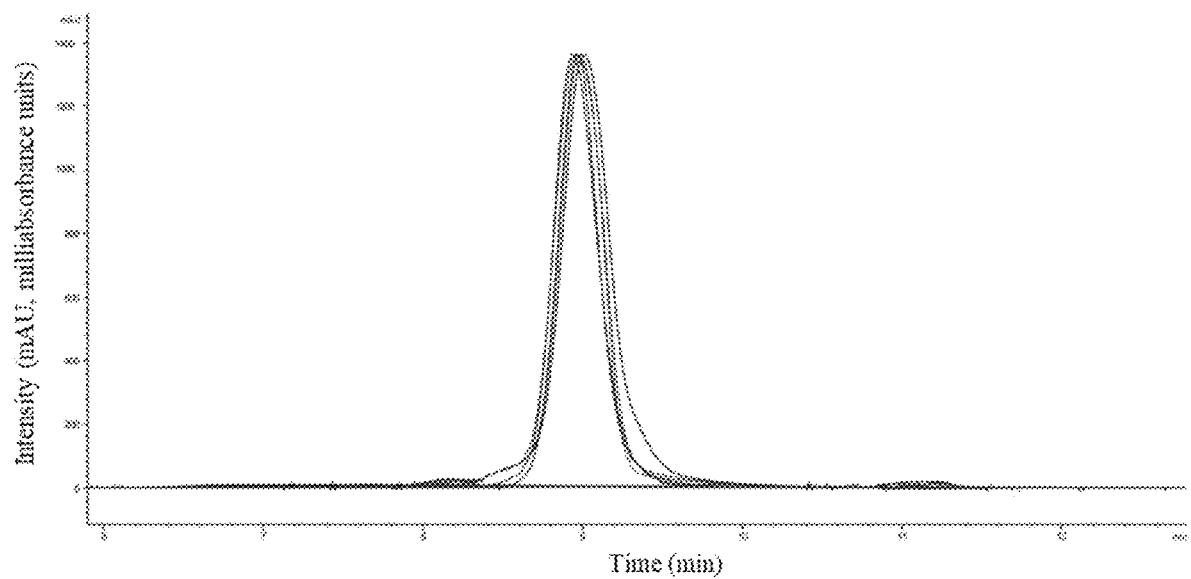
FIG. 6 shows the thermal stability of the PU-GH fusion protein in Example 11.

The heat-treated samples in Embodiment 11 (PU27×28-GH-PU27×5 was placed at 60° C. for 20 h; PU98×28-GH-PU98×4 was placed at 60° C. for 20 h; PU130×28-GH-PU130×5 was placed at 60° C. for 20 h; PU98×28-GH-PU98×4 was placed at 80° C. for 5 h; PU130×28-GH-PU130×5 was placed at 80° C. for 5h) were analyzed by SEC-HPLC-UV. The relative molecular weight ($M_r$) served as the abscissa, and the actually measured elution volume ($V_e$) served as the ordinate. Linear regression: $V_e = K_1 - K_2 \log M_r$. $K_1$ and $K_2$ are constants, and $M_r$ is the relative molecular weight. The detection method is as follows: detection wavelength: 214 nm; Chromatographic column: column temperature 25° C., Sepax SRT-1000SEC 5 μm (300×7.8 mm), mobile phase: 50 mM PB, 150 mM NaCl, pH7.2; running time: 20 minutes. The thermal stability test results are shown in FIG. 6, indicating that the fusion protein has good thermal stability. hGH was not subjected to liquid phase analysis due to aggregation and precipitation at high temperature.

Example 13 In Vitro Cell Viability Detection of PU-GH Samples

Figure 7:
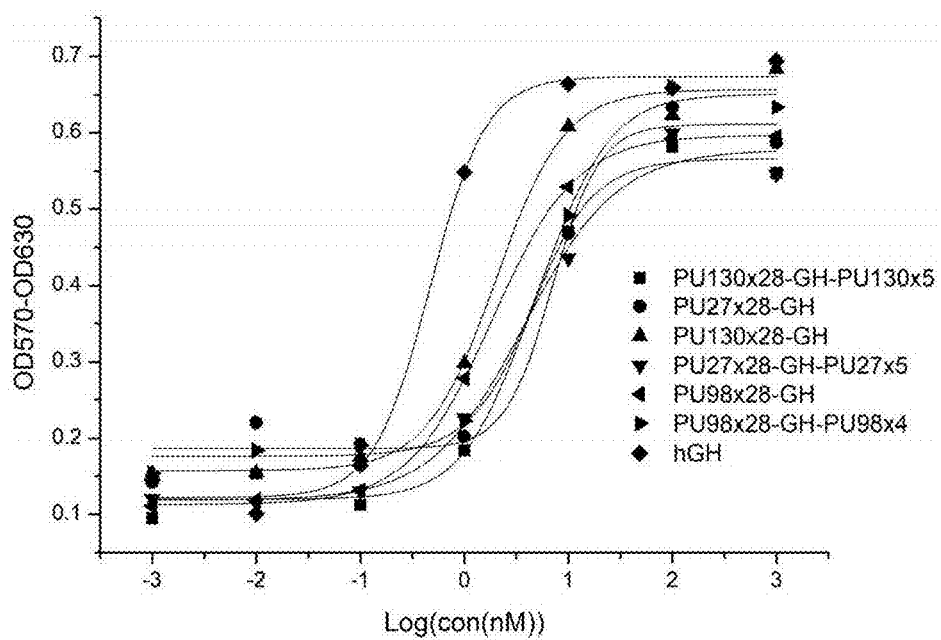
FIG. 7 shows the in vitro cell-based bioactivity of the PU-GH fusion protein.

Ba/f3-GHR cells were starved with IL-3 free RPMI 1640 medium (containing 5% FBS and 1 mg/mL G418) for 4-6 h, then transferred to a centrifuge tube for centrifuging at 1000 RPM for 5 min. After resuspending in the above medium, the cells were counted. The cells were adjusted to $2\times10^5$/mL and plated in a 96-well plate (100 µl per well, i.e., 20,000 cells per well). Each protein to be detected was diluted to an appropriate concentration with the above medium. 10 µL of proteins was added to each well for stimulation for 48 h before detection by MTT. Results are shown in Table 8 and FIG. 7.

TABLE 8

In vitro cytological activity of PU-GH fusion proteins

| Code | EC50(nM) |
| --- | --- |
| PU27x28-GH | 3.12 |
| PU27x28-GH-PU27x5 | 6.45 |
| PU98x28-GH | 2.33 |
| PU98x28-GH-PU98x4 | 5.13 |
| PU130x28-GH | 2.11 |
| PU130x28-GH-PU130x5 | 6.23 |
| hGH | 0.54 |

The above Table shows that the cytological activity of the fusion proteins were decreased to a certain extent, but still within an acceptable range.

Example 14 Pharmacokinetic Assay of Different PU-GH Proteins

SD rats were randomly divided into groups, with 10 rats in each group. The rats were injected with different PU-GH proteins or hGH recombinant protein (Sino Biological, Cat: 16122-H07E) at a dose of 2 mg/kg subcutaneously. Blood was collected before injection and 3 h, 8 h, 12 h, 24 h, 36 h, 48 h, 72 h, 96 h, 120 h, 144 h, 168 h after injection. The blood was separated to obtain serum. The pharmacokinetics of the PU-GH proteins in rats were detected by the sandwich ELISA method. Anti-hGH antibody (Sino Biological, Cat: 16122-R101) was added to the ELISA plate at 100 ng/well for coating at 4° C. overnight. The plate was washed 3 times with PBST and blocked with 5% dry milk for 2 h before washing again 3 times with PBST. The serum at each time point was diluted by a specified factor, and then added into the ELISA plate. The plate was incubated at 37° C. for 2 h and washed 3 times with PBST. Biotin-labeled anti-hGH polyclonal antibody (Sino Biological,Cat: 16122-T24, biotin-labeled self-made) was added and incubated at 37° C. for 2 h, and washed 5 times with PBST. Finally, HRP-labeled streptavidin was diluted 50,000 times and added into the ELISA plate. After incubating for 1 h at 37° C., the plate was detected by the conventional TMB and OD450 values were recorded. The half-lives of PU-GH fusion proteins are shown in Table 9.

TABLE 9

| Codes of fusion proteins | Half-life ($t_{1/2}$, hour) |
| --- | --- |
| PU27x28-GH | 10.1 |
| PU27x28-GH-PU27x5 | 16.7 |
| PU98x28-GH | 10.4 |
| PU98x28-GH-PU98x4 | 17.6 |

TABLE 9-continued

| Codes of fusion proteins | Half-life ($t_{1/2}$, hour) |
| --- | --- |
| PU130x28-GH | 11.5 |
| PU130x28-GH-PU130x5 | 16.5 |
| hGH | 0.17 |

As can be seen from the above Table, the half-lives of the fusion proteins are significantly prolonged, which is more than 50 times or even more than 100 times of that of the pre-fusion hGH.

Example 15 Preparation of PU-GDF15 Fusion Proteins

The spliced PU fragments in Embodiment 2 were fused with GDF15 (growth differentiation factor, SEQ ID NO:15) for expression, as shown in Table 10. His6 tag was added to the N-terminal. The nucleotide fragments were subcloned into plasmid pPIC9 (Life Technologies) to construct expression vectors. Methylotrophic yeast *Pichia* pastor GS115 (His) serves as the expression host cell, and the linearized expression plasmids were transformed into GS115 by electrotransformation. The yeast was cultured at 30° C. for 3 days until single colonies appeared. Single colonies of the above-mentioned transformed recombinant yeasts were inoculated the into 10 ml BMGY liquid medium and cultured at 30° C. at 250 rpm for 24h, and then standed for overnight. The supernatant was discarded, and 10 ml of BMMY liquid medium containing 1% methanol was added to induce expression at 30° C. at 250 rpm. The culture solutions were centrifuged to obtain supernatant. 5* loading buffer was added and mixed before heating at 100° C. for 8-10 min. The expression strains were screened by SDS-PAGE electrophoresis.

TABLE 10

| Amino acid sequence (SEQ ID NO:) | Codes of fusion proteins |
| --- | --- |
| 122 | PUMix76-GDF15 |
| 123 | PUMix257-GDF15 |
| 124 | PU58x5-GDF15 |
| 125 | PU98x10-GDF15 |
| 126 | PU184x10-GDF15 |

The centrifuged supernatant of the fermentation broth was first precipitated with 40% ammonium sulfate, and then reconstituted with deionized water. The samples were loaded onto a 50 ml Chelating Sepharose Fast Flow chromatographic column (GE Healthcare) equilibrated with equilibration buffer (0.5 M NaCl, 20 mM imidazole, 20 mMTris-HCl, pH 7.5), and eluted with 10%, 50%, and 100% elution buffer (0.15 M NaCl, 0.5 M imidazole, 20 mM Tris-HCl, pH 8.0) after reequilibration. The eluents were mixed, and ammonium sulfate with 30-50% saturation was added to precipitate, followed by centrifugation at 8000 rpm for 20 minutes to collect the precipitate, and reconstitution with deionized water. The reconstituted samples were desalted on a G25 (Sephadex G-25, Coarse) chromatographic column with 10 mM Tris-HCl, pH 8.0.

Example 16 Pharmacodynamic Study of PU-GDF15 Fusion Proteins in DIO Mice 7-week-old C57BL/6J male mice were fed with high-fat diet (60% kcal from fat) for another 16 weeks (a total of 23 weeks), and the study started when body weights of the mice reached approximately 55g. Feeding conditions: 12 h light/ 12 h darkness, freely fed, single cage feeding; mice were grouped (8 mice per group) according to body weight and body weight growth curve the day before administration; at the next day, the drugs were administered subcutaneously. The administrations were given at a dose of 30 nmol per kilogram of body weight, and the control group was injected with normal saline (PBS) of an equal volume. The fusion proteins were administered once every 4 days for 28 consecutive days. The body weights and food intake of mice were recorded every day. Mice were sacrificed on the 5th day after the last administration. The average body weight changes of each group animals between pre-administration and sacrific were calculated.

Figure 8:
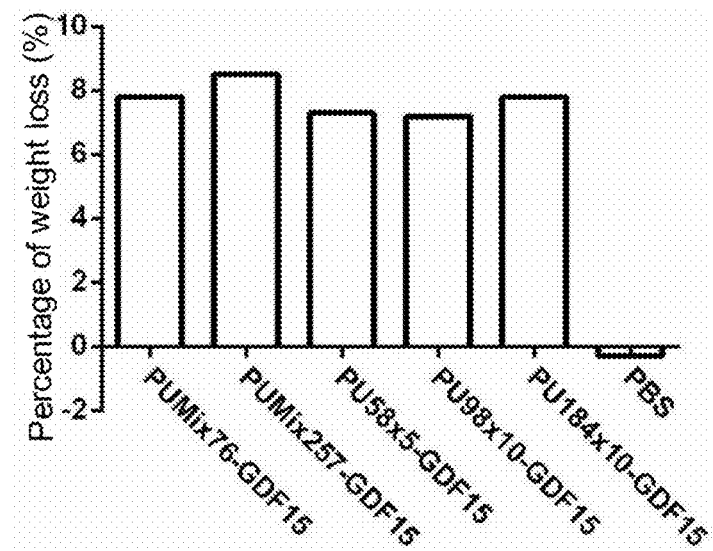
FIG. 8 shows the effect of PU-GDF15 fusion protein on weight loss in DIO mice.
Figure 9:
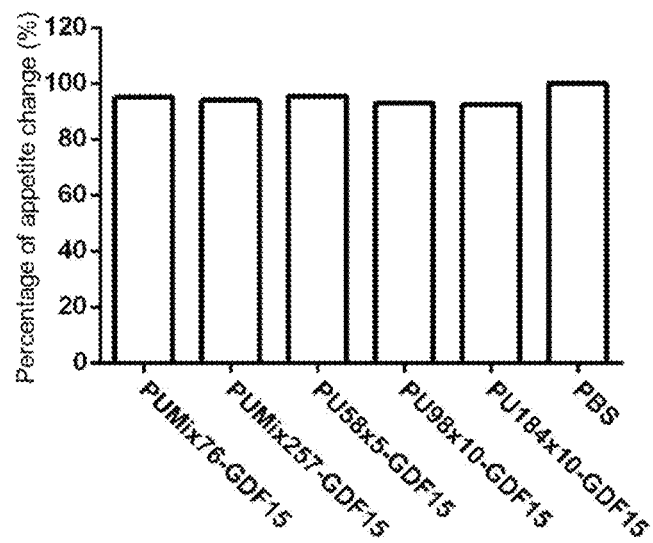
FIG. 9 shows the effect of PU-GDF15 fusion protein on appetite suppression in DIO mice.

As shown in FIGS. 8-9, the fusion proteins significantly reduced the body weights of obese animals, indicating that the fusion proteins retained the biological activities of GDF15.

Example 17 Preparation of PU and GLP-2 Analogue Fusion Proteins

The spliced PU fragments in Embodiment 2 were fused with Glucagon-like Peptide-2 analogue GLP-2G (SEQ ID NO:1). The C-terminal was connected to the His-6 tag, and the nucleotide fragment was subcloned into plasmid pPIC9 (Life Technologies) to construct an expression vector. Methylotrophic yeast *Pichia* pastor GS115 (His) served as the expression host cell, and the linearized expression plasmid was transformed into GS115 by electrotransformation. The yeast was cultured at 30° C. for 3 days until single colonies appeared. A single colony of the above-mentioned transformed recombinant yeast was inoculated the into 10 ml BMGY liquid medium and cultured at 30° C.,250 rpm, for 24 h, followed by standing overnight. The supernatant was discarded, and 10 ml of BMMY liquid medium containing 1% methanol was added, and expression was induced at 30° C., 250 rpm. The culture solution was centrifuged to obtain the supernatant, 5* loading buffer was added and mixed, followed by heating at 100° C. for 8-10 min. The expression strains were screened by SDS-PAGE electrophoresis.

TABLE 11

| Amino acid sequence (SEQ ID NO:) | Codes of fusion proteins |
|---|---|
| 127 | GLP2G-PU69x45 |
| 128 | GLP2G-PU98x43 |
| 129 | GLP2G-PU141x47 |

The centrifuged supernatant of the fermentation broth was first precipitated with 40% ammonium sulfate, and then reconstituted with deionized water. The sample was loaded onto a 50 ml Chelating Sepharose Fast Flow chromatographic column (GE Healthcare) equilibrated with equilibration buffer (0.5 M NaCl, 20 mM imidazole, 20 mMTris-HCl, pH 7.5), and eluted with 10%, 50%, and 100% elution buffer (0.15 M NaCl, 0.5 M imidazole, 20 mMTris-HCl, pH 8.0) after reequilibration. The eluents were mixed, and ammonium sulfate with 30-50% saturation was added to precipitate, followed by centrifugation at 8000 rpm for 20 minutes to collect the precipitate, and reconstitution with deionized water. The reconstituted samples were desalted on a G25 (Sephadex G-25, Coarse) chromatographic column with 10 mMTris-HCl, pH 8.0.

Example 18 Activity Assay of PU and GLP-2G Fusion Proteins

The in vitro cytological activity of GLP-2G fusion protein is detected by luciferase reporter gene detection method. The GLP-2R (GLP-2 receptor) gene was cloned into mammalian cell expression plasmid pCDNA3.1 to construct a recombinant expression plasmid pCDNA3.1-GLP-2R. The full-length luciferase gene was cloned into a pCRE-EGFP plasmid, and the EGFP gene was replaced to obtain a pCRE-Luc recombinant plasmid. CHO cells were transfected with pCDNA3.1-GLP-2R and pCRE-Luc plasmids at a molar ratio of 1:10, and stably transfected expression strains were screened to obtain recombinant GLP-2R/Luc-CHO stably transfected strains.

The cells were cultured in a 10-cm cell culture dish using DMEM/F12 medium containing 10% FBS and 300 µg/ml G418. The supernatant was discarded when the confluence reached about 90%. 2 ml trypsin was added and digested for 2 min, then the supernatant was discarded and 2 ml DMEM/F12 medium containing 10% FBS and 300 µg/ml G418 was added for neutralizion. The mixture was transferred to a 15 ml centrifuge tube for centrifugaion at 800 rpm for 5 min, then the supernatant was discarded before addtion of 2 ml DMEM/F12 medium containing 10% FBS and 300 µg/ml G418 for resuspending, the cells was then counted. The cells were diluted to 3*105/mL with DMEM/F12 medium containing 10% FBS. 100 µl of cell suspension were plated in each well of a 96-well plate, i.e ., 3*104 per well. The cells were cultured in DMEM/F12 medium containing 0.1% FBS overnight after adherence.

Figure 10:
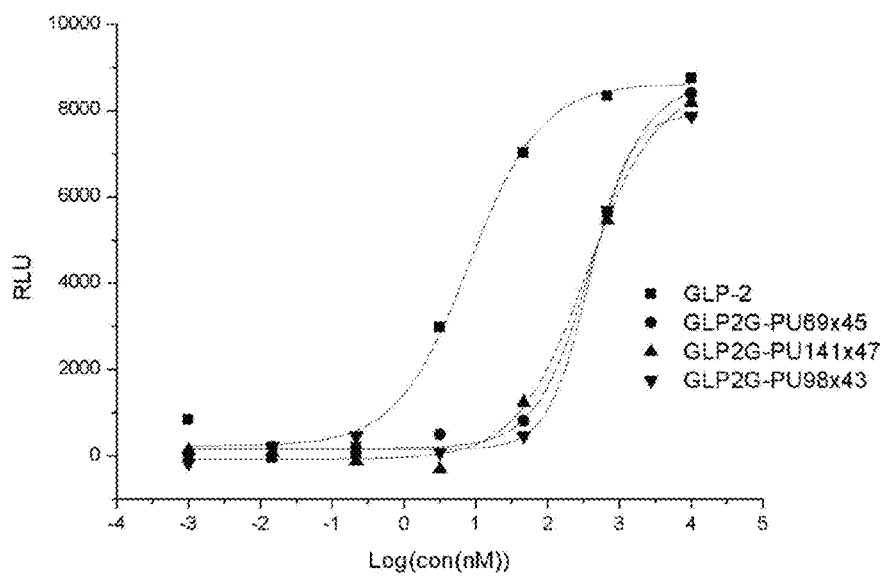
FIG. 10 shows the in vitro cell viability assay results of GLP-2G and PU fusion protein.

The supernatant of the cells plated in the 96-well plate was discarded. The purified recombinant proteins or GLP-2 (Hangzhou Chinese Peptide Biochemical Co., Ltd., Cat.No: GLUC-002A) were diluted to a series of specified concentrations with DMEM/F12 medium containing 0.1% FBS and added to the wells (100 µl/well). The plate was detected after stimulating for 6 h. The detection was carried out according to the instructions of lucifersae reporter kit (Ray Biotech, Cat: 68-LuciR-S200). The results are shown in Table 12 and FIG. 10.

TABLE 12

| Codes of fusion proteins | EC50(nM) |
|---|---|
| GLP2G-PU69x45 | 278.9 |
| GLP2G-PU98x43 | 311.1 |
| GLP2G-PU141x47 | 298.6 |
| GLP-2 | 5.2 |

Table 12 shows that the cytological activities of the fusion proteins are decreased to a certain extent, but are still within an acceptable range.

Example 19 Pharmacokinetic Assay of PU and GLP-2G Fusion Proteins

SD rats were randomly divided into groups, 10 rats in each group. The rats were injected with different fusion proteins at a dose of 2 mg/kg subcutaneously. Blood was collected before injection, and 3 h, 8h, 12 h, 24 h, 36h, 48h, 72h, 96h, 120h, 144h, 168h after injection. The blood was separated to obtain serum. The pharmacokinetics profiles of the fusion proteins in rats were detected by sandwich ELISA. Anti-GLP-2 antibody (Abcam, Cat.No: ab14183) was added to the ELISA plate at 100 ng/well. The plate was coated at 4° C. overnight and washed 3 times with PBST.

The plate was then blocked with 5% milk for 2 h and washed again 3 times with PBST. The sera at each time point were diluted by a specified factor, and then added to the ELISA plate. The plate was incubated at 37° C. for 2 h, then washed 3 times with PBST. Biotin-labeled anti-GLP-2 polyclonal antibody (Abcam, Cat.No: ab48292) was added and incubated at 37° C. for 2 h, followed by washing 5 times with PBST. Finally, the HRP-labeled streptavidin was diluted 50,000 times and added to the ELISA plate. The plate was incubated for 1 h at 37° C. and detected by the conventional TMB method. OD450 values were read.

TABLE 13

| Codes of fusion proteins | Half-life ($t_{1/2}$, hour) |
|---|---|
| GLP2G-PU69x45 | 42.7 |
| GLP2G-PU98x43 | 40.5 |
| GLP2G-PU141x47 | 41.2 |

Table 13 indicates that the half-life of GLP-2 in the body is only a few minutes, while the half-livs of the fusion proteins have been significantly prolonged.

Example 20 Preparation of PU-ARVEGF Fusion Proteins

The spliced PU in Example 2 were fused with an ankyrin repeat protein binding to VEGF (ARVEGF, SEQ ID NO:3), as shown in Table 14. The C-terminal was connected to the 6His tag and cloned to vector pET41a. The plasmid was transformed into *E. coli* competent BL21 (DE3) gold. Single colonies were picked and cultured in LB kanamycin-resistant liquid medium at 37° C. at 250 RPM until OD reached 0.4-0.6 (about 3 h). 200 µL of pre-induction culture was taken as a negative control. Then, IPTG was added to the remaining culture to a final concentration of 1 mM, and a 200 µL aliquot was taken after 2.5 h of induction at 37° C. The pre-induction and post-induction samples were centrifuged at 5000 rpm for 4 min, and the supernatant was discarded before 40 µL of 2% SDS was added for resuspending. 10 µL of 5*Loading Buffer was added and mixed before heating at 100° C. for 8-10 min. The expression strains were screened by SDS-PAGE electrophoresis.

40 g of bacteria were mixed with 300 ml of 20 mM PB buffer solution (pH 7.0) and sonicated with a @15 ultrasonic probe for 2 h, 3 seconds on and 3 seconds off. The sonicated bacteria solution was centrifuged at 8000 rpm for 30 min to obtain the supernatant, and then the supernatant was filtered with a 1 µm filter membrane. The bacteria supernatant was heated at 80° C. for 20 min, and then centrifuged to precipitate the impurity proteins. The fusion proteins were precipitated with 40% ammonium sulfate and then reconstituted with deionized water. The samples were then loaded onto a 50 ml Chelating Sepharose Fast Flow chromatographic column (GE Healthcare) equilibrated with equilibration buffer (0.5 M NaCl, 20 mM imidazole, 20 mMTris-HCl, pH 7.5), and eluted linearly with 10-100% elution buffer (0.15 M NaCl, 0.5 M imidazole, 20 mMTris-HCl, pH 8.0) after reequilibration. The eluents were precipitated by ammonium sulfate with 45% saturation and centrifuged at 8000 rpm for 20 minutes to collect the precipitate, then reconstituted with deionized water. The reconstituted samples were desalted on a G25 (Sephadex G-25, Coarse) chromatographic column with 10 mM Tris-HCl, pH 8.0.

TABLE 14

| Amino acid sequence (SEQ ID NO:) | Code |
|---|---|
| 130 | PU73x49-AR$_{VEGF}$ |
| 131 | PU98x43-AR$_{VEGF}$ |

Example 21 Affinity assay of PU-ARVEGF fusion proteins

The binding affinities of the fusion proteins were detected using BLI (Bio-layer inteferometry, ForteBio). First, Biotin (Thermo, Prod #21338, Sulfo-NHS) and VEGF were mixed at a molar ratio of 2:1 for labeling. Excess biotin not involved in labeling was removed by dialysis. Then, according to the instructions of Octet-QK, a high-sensitivity experimental program was selected and the biotin-labeled VEGF was loaded on the avidin probe SA (forteBIO, Part #18-5019). The buffer used in the experiment was PBS (containing 0.1% Tween-20). The fusion proteins and the control antibody diluted in gradients were added to a predetermined position of the 96-well black plate (Greiner, 655209) according to the settings of the program. Based on the program settings, the fusion proteins were bound, and then dissociated in PBST solution, to obtain the experimental curves. According to the result analysis software of Octet-QK, local full was used to fit the curves of the experimental results, then kon, kdis and Kd were determined. Table 15 summarizes the Kd of the fusion proteins and the control drug Bevacizumab (Medchemexpress, Cat. No.: HY-P9906). It can be seen from the table that there is no significant difference in the average affinities of ARVEGF to VEGF before and after the PU fusion. Their affinities show a same order of magnitude as Bevacizumab.

TABLE 15

Dissociation equilibrium constant (Kd) of PU-AR$_{VEGF}$ fusion proteins

| Samples | Kd(nM) | | | | |
| | Repeat 1 | Repeat 2 | Repeat 3 | Average value | STD |
|---|---|---|---|---|---|
| PU73x49-AR$_{VEGF}$ | 0.62 | 0.61 | 0.70 | 0.64 | 0.05 |
| PU98x43-AR$_{VEGF}$ | 0.63 | 0.49 | 0.42 | 0.51 | 0.11 |
| AR$_{VEGF}$ | 0.58 | 0.69 | 0.77 | 0.68 | 0.10 |
| Bevacizumab | 0.46 | 0.39 | 0.55 | 0.47 | 0.08 |

Example 22 In vitro activity of PU-ARVEGF fusion proteins

The activities of PU-ARVEGF were measured by VEGF receptor competitive inhibition method. Two 96-well plates were prepared, namely an ELISA plate and a cell plate. The two plates were treated as follows:

An ELISA plate was coated with 5 µg/mL VEGF Receptor 2 (KDR) (Abcam, ab 155628), 50 µL per well, and placed at 37° C. for 2 h. The plate was then blocked with 1% BSA/TBS and placed at 37° C. for 1 h; 1% BSA/TBS was added to the plate, 200 µL per well, and placed at 37° C. for 2 h.

Figure 11:
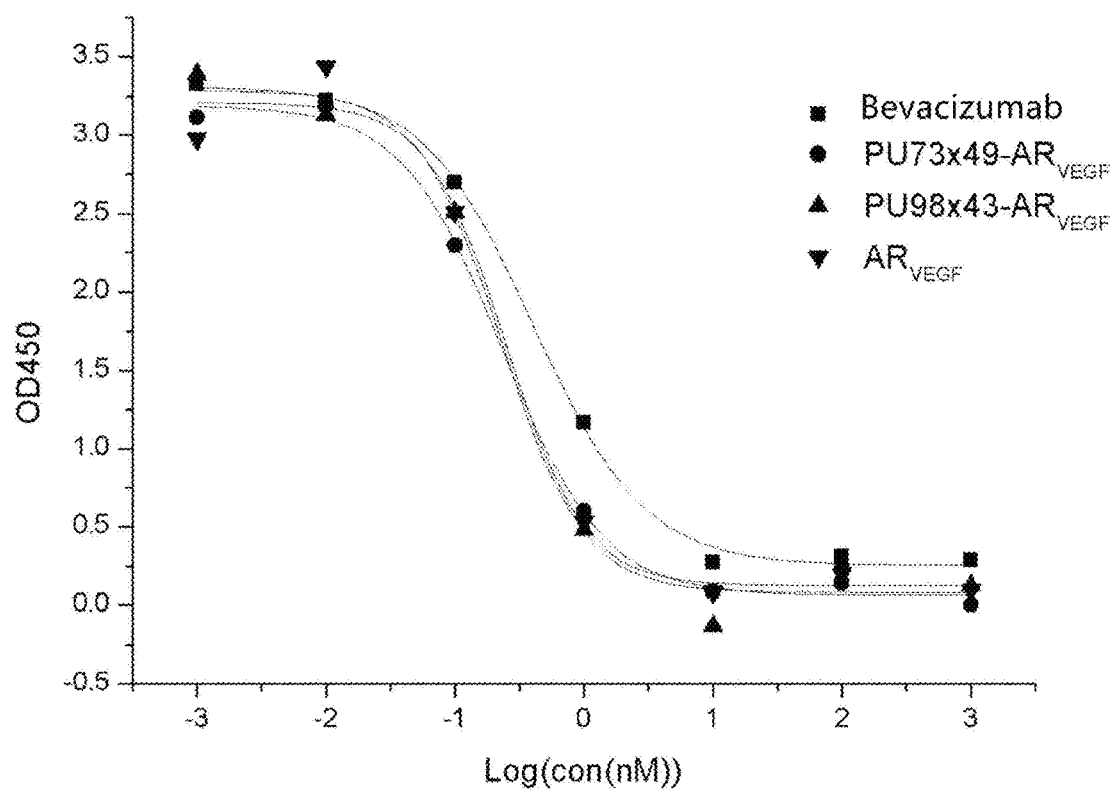
FIG. 11 shows the in vitro cell viability assay results of PU and ARVEGF fusion protein.

The PU-ARVEGF and the reference Bevacizumab were diluted with PBS into 100 µg/mL stock solutions, respectively. Then, the stock solutions were diluted by 3 times to a total of 11 concentrations. A 80 µL aliquot of the diluted sample was mixed with an equal volume of 1 µg/mL VEGF and placed at 37° C. for 1 h. The KDR-coated ELISA plate was washed twice and pat-dried. The mixture was successively transferred to the ELISA plate and placed at 37° C. for 1 h, then the plate was washed for 6 times. Mouse anti-human VEGF monoclonal antibody (sigma, V4758-. 5 mg) diluted at 1:1000 was added to the wells in the ELISA plate, 50 μL per well. The plate was placed at 37° C. for 1 h and washed for 6 times. Then, goat anti-rat secondary antibody (Pierce, 31432, QA1969921) diluted at 1:1000 was added, 50 μL per well. The plate was placed at 37° C. for 1 h and washed for 6 times. Color developing solution was added after reaction, and the plated was incubated at 37° C. for 15 min. Stop buffer was added to terminate the color reaction. OD450 values were read on a microplate reader. As shown in Table 16 and FIG. 11, the biological activities of the fused proteins were equivalent to their unfused counterparts.

TABLE 16

IC50 of PU-AR$_{VEGF}$ fusion protein

| Protein sample | IC50(nM) |
|---|---|
| PU73×49-AR$_{VEGF}$ | 0.55 |
| PU98×43-AR$_{VEGF}$ | 0.51 |
| AR$_{VEGF}$ | 0.65 |
| Bevacizumab | 0.56 |

Example 23 Serum stability

Figure 12:
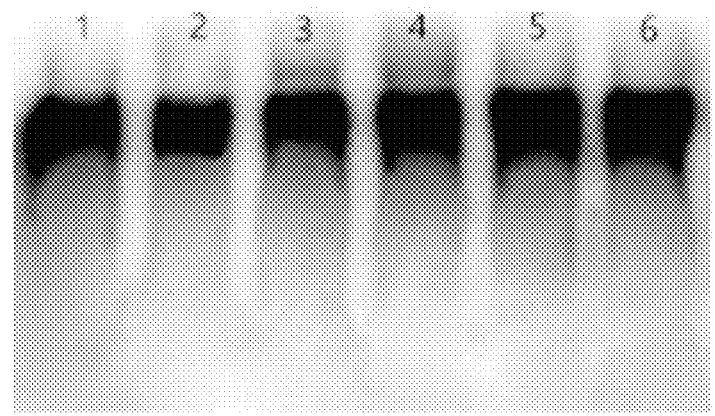
FIG. 12 shows the PU-GH fusion protein after a 7-day incubation in rat serum; 1-2 are PU27×28-GH-PU27×5 samples on day 0 and day 7, respectively; 3-4 are PU98×

Fusion protein (PU27×28-GH-PU27×5, PU98×28-GH-PU98×4, PU130×28-GH-PU130×5) were prepared into 2.0-3.0 mg/ml with 40 mM PB (pH 7.4), sterilized and filtered (0.22 μm, Millipore). After sterilization and filtration (0.22 μm, Millipore), the samples were diluted 10 times with rat serum, mixed well, and divided into sterile centrifuge tubes; The samples were placed in a 37° C. incubator. Samples on day 0 and day 7 were taken for Western blot analysis. HRP-labeled Anti-6X His tag® antibody (ABCAM, AB1187) was used as the detection antibody. The results are shown in FIG. 12, indicating that the fusion proteins have good stability in serum.

Example 24 Enzyme resistance stability

Appropriate amount of trypsin (Sangon Biotech (Shanghai) Co., Ltd., Cat.No: A620627-0250) was dissolved in a high-temperature sterilized 20 mM PB (containing 0.15 M NaCl, pH7.5) buffer to make a 10% W/W solution. The PU-GH fusion proteins (5 mg/ml) and hGH (Sino Biological, Cat: 16122-H07E, prepared into 1 mg/ml) were mixed with the trypsin solution in final W/W concentrations of 0%, 0.02%, 0.1%, and 0.5% respectively. The mixtures were filled up with 20 mM PB (containing 0.15M NaCl, pH 7.5) to desired volume and then incubated at 37° C. for 40 min. Electrophoresis buffer was added and boiled for 10 min to stop the reaction. hGH in 0%, 0.02%, 0.1% and 0.5% trypsin treatment groups were analysed on 12% SDS-PAGE. PU-GH fusion proteins in 0% and 0.5% trypsin treatment groups were analysed on 8% SDS-PAGE. As shown in FIG. 13, hGH treated with 0.02% trypsin has almost no intact protein, while the PU-GH fusion proteins show almost no degradation, indicating that the fusion proteins have excellent enzyme resistance stability.

The above-mentioned embodiments are merely illustrative of the principle and effects of the present disclosure instead of limiting the present disclosure. Modifications or variations of the above-described embodiments may be made by those skilled in the art without departing from the spirit and scope of the disclosure. Therefore, all equivalent modifications or changes made by those who have common knowledge in the art without departing from the spirit and technical concept disclosed by the present disclosure shall be still covered by the claims of the present disclosure.

Reference To An Electronic Sequence Listing

The contents of the electronic sequence listing created on Dec. 29, 2021, named GUH-443US-210083_ST25.txt and 315,392 bytes in size, are hereby incorporated by reference in its entirety.

---

I claim:

1. A polypeptide unit, wherein the polypeptide unit:
   (1) consists of proline, alanine and glutamic acid;
   (2) contains at least 50% of alpha-helix secondary structures, as calculated by the Chou-Fasman algorithm; and
   (3) has a length greater than or equal to 15-100 amino acids.

2. The polypeptide unit according to claim 1, wherein the polypeptide unit contains at least 60%, 70%, 80%, or 90% of alpha-helix secondary structures as calculated by the Chou-Fasman formula.

3. The polypeptide unit according to claim 1, wherein the proportion of the alpha-helix secondary structures is calculated according to the Chou-Fasman algorithm; and the length of the polypeptide unit is greater than or equal to 20-100 amino acids.

4. The polypeptide unit according to claim 1, wherein the polypeptide unit is selected from the group consisting of SEQ ID NO: 19-47.

5. A polypeptide complex unit, wherein a core structure of the polypeptide complex unit is selected from:

$U_1$-$U_2$ or $U_1$-$U_2$ ..., $U_n$;

wherein each of $U_1$, $U_2$, ..., $U_n$ represents a polypeptide unit of claim 1, and n is a positive integer greater than 2; and amino acid sequences of two or more of the polypeptide units are the same or different.

6. The polypeptide complex unit according to claim 5, wherein the polypeptide complex unit is selected from:
   a protein with an amino acid sequence selected from the group consisting of SEQ ID NO: 48-105 or a repeatedly spliced protein of polypeptide units selected from the group consisting of SEQ ID NO: 48-76.

7. A biologically active fusion protein, comprising the polypeptide unit according to claim 1 or a polypeptide complex unit according to claim 5, and an active protein or polypeptide.

8. The fusion protein according to claim 7, comprising a structure selected from the group consisting of:
($D_1$-PU1);
($D_1$-PU1)-($D_2$-PU2); or
($D_1$-PU1)-($D_2$-PU2) ... ($D_m$-$PU_m$);
wherein PU1, PU2, ..., $PU_m$ are selected from a polypeptide unit (PU) or a polypeptide complex unit of the fusion protein; $D_1$, $D_2$, ..., $D_m$ are the active proteins or polypeptides, and m is a positive integer greater than 2; and, ($D_1$-PU1) includes (PU1-$D_1$), ($D_2$-PU2) includes (PU2-$D_2$), and ($PU_m$-$D_m$) includes ($D_m$-$PU_m$); wherein,
the polypeptide unit: (1) consists of proline, alanine and glutamic acid; (2) contains at least 50% of alpha-helix secondary structures; and (3) has a length greater than or equal to 15 amino acids; and
a core structure of the polypeptide complex unit is selected from: $U_1$-$U_2$ or $U_1$-$U_2$ ..., $U_n$; wherein each of $U_1$, $U_2$, ..., $U_n$ represents the polypeptide unit, and n is a positive integer greater than 2; and amino acid sequences of two or more of the polypeptide units are the same or different.

9. The fusion protein according to claim 8, wherein $D_1$, $D_2$, ..., $D_m$ each represents one or more interconnected active proteins or polypeptides, and functions of the active proteins or polypeptides are the same or different.

10. The fusion protein according to claim 9, wherein the active protein or polypeptide includes: GLP-2 analogue, ARVEGF, hGH, Arginase 1, G-CSF, Exendin-4, GLP-1 analogue, GDF15, glucacon, IL-2, IL-15, FGF19, EPO, IL-6, M-CSF or FGF21.

11. The fusion protein according to claim 7, wherein the fusion protein is selected from the group consisting of:
(a) a protein of selected from the group consisting of SEQ ID NO: 106-131; and
(b) a protein derived from (a), formed by any polypeptide defined in (a) after substitution, deletion or addition of one or more amino acid residues to the active protein or polypeptide and having an activity of the active protein of (a).

12. The fusion protein of claim 7, wherein the in vivo half-life or stability of the fusion protein is statistically higher than that of an unfused active polypeptide or protein.

13. A composition, comprising the fusion protein according to claim 7, and a pharmaceutically acceptable or food-acceptable carrier.

14. A conjugate, comprising:
(a) the polypeptide unit according to claim 1 or a polypeptide complex unit, wherein a core structure of the polypeptide complex unit is selected from: $U_1$-$U_2$ or $U_1$-$U_2$ ..., $U_n$, each of $U_1$, $U_2$, ..., $U_n$ represents the polypeptide unit, n is a positive integer greater than 2, and amino acid sequences of two or more of the polypeptide units are the same or different; and
(b) an active protein or polypeptide;
wherein (b) and (a) are connected by conjugation or adsorption.

15. A composition, comprising the conjugate according to claim 14, and a pharmaceutically acceptable or food-acceptable carrier.

16. A nucleic acid molecule, wherein the nucleic acid molecule encodes:
the polypeptide unit according to claim 1;
a polypeptide complex unit, wherein a core structure of the polypeptide complex unit is selected from: $U_1$-$U_2$ or $U_1$-$U_2$ ..., $U_n$; wherein each of $U_1$, $U_2$, ..., $U_n$ represents the polypeptide unit, and n is a positive integer greater than 2; and amino acid sequences of two or more of the polypeptide units are the same or different; or
a biologically active fusion protein, which comprises the polypeptide unit according to claim 1 or the polypeptide complex unit, and an active protein or polypeptide.

17. A recombinant expression vector, comprising the nucleic acid molecule according to claim 16.

18. A genetically engineered cell, wherein the genetically engineered cell comprises a recombinant expression vector comprising the nucleic acid molecule according to claim 16, or incorporates the nucleic acid molecule according to claim 16 in a cell genome.

19. A method for improving stability, increasing half-life, prolonging action time and/or increasing solubility of an active polypeptide comprising incorporating the polypeptide unit according to claim 1 into said active polypeptide, wherein the improved stability, increased half-life, prolonged action time and/or increased solubility is compared to the active polypeptide without the polypeptide unit according to claim 1, and wherein the improved stability includes thermostability, enzyme resistance stability and/or serum stability.

* * * * *